United States Patent [19]

Berg

[11] 3,824,597

[45] July 16, 1974

[54] DATA TRANSMISSION NETWORK

[75] Inventor: Edward A. Berg, Vienna, Va.

[73] Assignee: Data Transmission Company, Vienna, Va.

[22] Filed: Nov. 9, 1970

[21] Appl. No.: 88,068

[52] U.S. Cl. .............. 343/204, 178/50, 179/15 AT, 325/51

[51] Int. Cl. .............................................. H04j 3/00

[58] Field of Search ............. 325/1, 2, 3, 5, 367, 13, 325/14, 51, 53–56, 184, 305; 178/50, 58; 343/200–204; 179/15 BD, 15 AD, 15 A, 15 AW, 15 FD, 18 R, 18 FC, 15 BS; 340/147 R, 147 T, 150, 155, 167 R; 250/199

[56] References Cited

UNITED STATES PATENTS

| | | | |
|---|---|---|---|
| 2,509,218 | 5/1950 | Deloraine | 343/200 X |
| 2,626,348 | 1/1953 | Nobles | 325/14 X |
| 2,833,861 | 5/1958 | Anderson et al. | 179/15 AD |
| 2,907,874 | 10/1959 | Halvorson | 325/3 |
| 2,977,417 | 3/1961 | Doelz et al. | 178/51 |
| 3,121,221 | 2/1964 | Sullivan et al. | 325/184 X |
| 3,281,789 | 10/1966 | Willcox et al. | 340/152 |
| 3,365,666 | 1/1968 | Reynders et al. | 325/2 |
| 3,430,047 | 2/1969 | Hurkamp | 250/199 |
| 3,446,917 | 5/1969 | Inose et al. | 179/15 AW |
| 3,482,165 | 12/1969 | Leming | 325/56 |
| 3,484,694 | 12/1969 | Brothman et al. | 325/55 |
| 3,486,029 | 12/1969 | Barrett et al. | 250/199 X |
| 3,492,484 | 1/1970 | Iti | 250/199 |
| 3,499,713 | 3/1970 | Ito | 250/199 X |
| 3,517,312 | 6/1970 | Yamato et al. | 325/55 X |
| 3,527,949 | 9/1970 | Huth et al. | 250/199 |
| 3,548,106 | 12/1970 | Watson | 179/15 |
| 3,553,367 | 1/1971 | Krauss | 178/50 |
| 3,553,380 | 1/1971 | Greenwald | 179/15 FD |
| 3,564,147 | 2/1971 | Puente et al. | 179/15 FD |
| 3,569,838 | 3/1971 | Blair et al. | 325/184 |
| 3,632,884 | 1/1972 | Inose | 179/15 AQ |

*Primary Examiner*—Ralph D. Blakeslee
*Attorney, Agent, or Firm*—LeBlanc & Shur

[57] ABSTRACT

Disclosed is a transcontinental communications network particularly designed for the very rapid transmission of digital data between subscribers throughout major areas of the United States. The network comprises a microwave trunkline extending from San Francisco downwardly through the center of the country and upwardly to Boston along which data may be transmitted at rates of 4800, 9600, and 14,400 bits per second and higher. Transmission along the trunkline is by phase modulation of a carrier in the 6 MHz and 11 MHz band. Time division multiplexing provides a minimum of 4,000 channels utilizing a relatively small bandwidth of the frequency spectrum. The trunklines are under the control of switching centers comprising regional and district offices which allocate channels and handle communications traffic through the network. A microwave cable or optical local distribution system connected to the basic trunkline provides a full duplex operation throughout the network and insures the rapid transmission of data completely throughout the network from one subscriber to another.

22 Claims, 92 Drawing Figures

PATENTED JUL 16 1974 3,824,597

SHEET 01 OF 58

INVENTOR
EDWARD A. BERG

BY Le Blanc & Shur

ATTORNEYS

NOTES:
1. IF FREQUENCY 70 MHZ
2. ASSIGNMENTS AS CCIR REC 387 & TL & TJ

DATA TRANSMISSION NETWORK

The invention is directed to a nationwide digital communications network or system specifically designed and engineered for the rapid transmission of data. The network comprises three basic elements, namely, a backbone or main trunking system, a switching system for controlling operation, and a local distribution system. These elements are integrated into an end-to-end data communications system specifically designed for the rapid transmission of digital data all the way through the system from one subscriber to another.

Within the past decade, major advances in data processing technology have focused attention on the entire spectrum of data transmission services. The development of the first viable computer/communications interfaces in the late 1950's and early 1960's fostered a series of pioneering data communications applications such as message switching, airline reservations, and command and control systems. In 1960, about 8,000 data terminals had been installed—most of these were standard keyboard/teleprinter devices. During the past 10 years, the number of data terminals has swelled to over 150,000, including such varied types of terminals as cathode ray tubes (CRT's), remote entry devices, digital and graphic plotters, optical/mark scanners, magnetic tape units and a host of special purpose devices. Using these terminals, data communications applications now include order processing, inventory management, time sharing, information retrieval, and other mainstream business, government and institutional systems.

Major economic and social pressures are spurring users to seek faster, less costly, and more accurate ways of transporting data. Most businesses are faced with rapidly rising costs, shrinking profit margins, deteriorating customer service, and growing domestic and international competition. The federal government, state and local governments and private institutions are striving to raise socio-economic standards, control the environment, advance scientific and defense efforts, and speed legislative and administrative processes.

In all of these endeavors, the need for access to large amounts of data has been accentuated by the computer's ability to put such data to effective use. The desire and need to increase the scope and magnitude of data communications systems to make this data processing capability more widely available is intensifying rapidly in most organizations.

Through improved data transmission, a consumer of the products and services of industry, finance, government, not-for-profit organization, and educational and other institutions can enjoy the benefits of faster, lower cost and more accurate flows of information. Examples of specific benefits include: faster medical diagnosis and other services, greater responsiveness to information inquiries, more efficient use of credit, faster settlement of insurance claims, advent of the "checkless" and "certificateless" society, lower cost, more up-to-date publications, improved product design, more comprehensive reservation systems for transportation, lodging and entertainment, more rapid processing and execution of orders for consumers, contractors and investors, faster delivery and more efficient distribution of goods and services. In addition, many current development activities are focused on making computer-related services directly accessible to individuals. The ultimate impact of these developments will be to bring the benefits of the computer inside the home through data transmission. Some of the more practical applications include computer-assisted instruction, remote order entry and catalog buying real-time opinion sampling, voting, and census taking, computational assistance, personal financial counseling, and direct banking services.

Impressive advances in computer-related technology have been realized in recent years. These include powerful computing and peripheral equipment, such as expanded memories, larger disks, optical scanners, and multiprocessors, low-cost data terminals and portable data recorders such as CRT's, digital plotters, remote job entry devices, mini-computers, tape cassettes, facsimilie units, and many others. Additional developments include packaged software such as compilers, time-sharing logic, applications, compatibility, and new services such as time-sharing, information utilities, data banks, and specialized applications. Despite these advances, the application of many of them to the public interest has been inhibited by the lack of availability of suitable, economical data transmission facilities.

A principal reason for the failure to make optimum use of computer capabilities by way of efficient data transmission is due to the fact that digital data is uniquely different from the voice and personal message traffic for which the present analog common carrier facilities were designed. The present analog systems have grown over the years from simple beginnings involving few of the present requirements of the nationwide data communications market. In attempting to meet new demands, these systems have been modified again and again, always with the requirement that compatibility with the analog transmission of voice signals was of prime importance. Ingenious but complicated arrangements have been developed to permit transmission of more information over each analog circuit. For the most part these techniques have relied upon frequency selective means exclusively, which have been combined into the frequency division multiplexing (FDM) systems now used by most communications carriers.

Because of inherent design limitations involving relatively expensive filters and other components, the limitations of these FDM systems have become more apparent over the past three decades. In recent years, however, large scale digital data handling and computer systems have come into widespread use, adding a new and large dimension to communications market demand. Today a digital computer terminal must of necessity utilize the facilities of the common carrier analog communications systems, systems whose transmission characteristics are dissimilar from the data to be transmitted.

Accordingly, signal conversion equipment—modulator-demodulators (MODEMS)—has been made available both by the common carriers and independent manufacturers to convert digital signals for analog transmission. This equipment is inherently complex, even for use in low speed data transmission. But for transmission at high bit rates, such equipment can become prohibitively expensive. The requirements for MODEMS in the current analog networks creates discontinuity in the transmitted signal which is generally considered a major impediment to the efficient transmission of digital information. In short, data transmission by means of an end-to-end digital system has become not only attractive but essential to effective and efficient data communications. The present invention is directed to a digital transmission network which meets the needs of the data communications market with the same basic effectiveness with which the present analog systems have met the demands of the communications markets for which they were designed.

The system of the present invention has been structured to serve the national data communications market taking advantage of the economies of scale which results. The system traverses the United States with a high channel density microwave backbone trunk following a route between San Francisco, Los Angeles, Dallas, Minneapolis-St. Paul, Atlanta, and Boston. Spur routes from the backbone trunk provide service to additional cities and are planned to accommodate growth in demand for service.

The system is designed to include service characteristics responsive to the expressed demands of the present data communications market, as well as in anticipation of requirements for this market's future. These characteristics include high reliability, rapid connection, ability to accommodate different data transmission rates, a good grade of service (circuit availability), high system availability, and availability in all locations. The system utilizes time division multiplexing (TDM) techniques in providing an all digital transmission path. The inherent advantages of a digital transmission system include reliability, maximum channel density and assigned frequency bandwidths, efficient utilization of transmitted power, maximum potential for system expansion, and flexibility of system configuration.

In the present invention, the system and its components are modular in design so that as the demand for service increases, terminal capacity can be easily and economically expanded. Digital processors control the switches, optimize call routing and provide off-line reports for billing and other administrative functions. All switching centers feature redundant equipment to reduce the probability of loss of service due to component failure. Wherever possible, identical equipment is utilized in the system to minimize logistic problems and facilitate centralized spare parts distribution.

In addition to the basic operational system, future expansion is contemplated in order to more fully satisfy the needs of the emerging data communications market. This expansion has been taken into full account in the design of this system to insure that no degradation of transmission characteristics or reduction of system efficiency will result from an increase in system capacity.

The data transmission system of the present invention is composed of three basic elements, namely, a trunking system, a switching system, and a local distribution system. These elements are integrated into an end-to-end data communications system specifically designed for the transmission of digital data. The system is equipped with order wire, alarm, and control facilities to insure maximum reliability by providing the capability for rapid maintenance response to outages. The TDM transmission mode of the system provides for maximum conservation of the frequency spectrum. For data transmission purposes, the proposed system provides significant channelization advantages over a fully data loaded frequency division multiplexing (FDM) type of system. Frequency studies have been made and the integration of complementary transmission capabilities, such as cable and satellite, have been considered in planning the system.

It is therefore one object of the present invention to provide a national data communications system for the rapid transfer of digital data between subscribers.

Another object of the present invention is to provide a digital data system comprised of a trunking system, a switching system, and a local distribution system for the end-to-end transfer of digital data at high speeds.

Another object of the present invention is to provide a digital data system incorporating a high channel density microwave backbone trunk extending completely across the continental United States.

Another object of the present invention is to provide a data transmission network incorporating time division multiplexing techniques to provide an all digital transmission path.

Another object of the present invention is to provide a data transmissing system including a time division multiplex system which provides for maximum conservation of the frequency spectrum.

Another object of the present invention is to provide a data transmission system that is equipped with order wire, alarm, and control facilities to insure maximum reliability by providing the capabilities for rapid maintenance response to outages.

Another object of the present invention is to provide a data transmission system which includes high reliability and rapid connection to subscribers in the system.

Another object of the present invention is to provide a data transmission system which incorporates maximum potential for system expansion and flexibility of system configuration.

Another object of the present invention is to provide a nationwide data communications network designed to provide a degree of error rate probability less than $10^{-7}$ resulting in an average of no more than one error during transmission of 10,000,000 bits of data on any one channel.

Another object of the present invention is to provide a nationwide data communications network in which the operation of the total system is full duplex.

Another object of the present invention is to provide a digital data transmission system which incorporates up to approximately 4,000 channels capable of simultaneously transmitting up to 4,800 bits per second over a single radio path.

Another object of the present invention is to provide an improved trunking system for digital data transmission.

Another object of the present invention is to provide an improved switching system for digital data transmission.

Another object of the present invention is to provide an improved local distribution network for a digital data transmission system.

Another object of the present invention is to provide a data transmission system which makes it possible to establish a switched point-to-point connection between two compatible subscribers within the network, provides manual or automatic addressing by the sender, provides for abbreviated addressing, provides for broadcast transmission of up to six compatible subscribers simultaneously, provides for originating requested callback and for controlled privacy.

Another object of the present invention is to provide a digital data transmission system capable of speed conversion within specified ranges, code conversion between any two permissible code formats, speed and code conversion, and expedited information transfer service to provide the originating subscriber the option of forwarding data to a switching center with positive control over the time of delivery to the desired subscriber or subscribers.

Another object of the present invention is to provide a digital data transmission system having improved integrity and continuity of operation.

Another object of the present invention is to provide a digital data transmission system including space diversity reception for increased reliability.

Another object of the present invention is to provide a digital data transmission system incorporating simple phase shift keying of the radio transmitter to increase the efficiency of data transmission.

Another object of the present invention is to provide a digital data system incorporating minimum shift keying as the modulation mode in the system trunkline.

Another object of the present invention is to provide a unique digital data communications console for use in a digital data transmission system.

Another object of the present invention is to provide a digital data transmission system incorporating a store and forward feature whereby information may be stored and forwarded to the addressed subscriber at a later time.

Another object of the present invention is to provide a data transmission system in which functional components in the system are packaged in modules for economic installation and ease of upgrading.

Another object of the present invention is to provide a digital data communication system utilizing standardized equipment to minimize logistic problems and facilitate centralized parts distribution.

Another object of the present invention is to provide a digital transmission system having high speed switching equipment and designed to provide rapid response (within 3 seconds) and the reliability required for present day and future data communications.

Another object of the present invention is to provide a data transmission system which may be reconfigured to compensate for changes in system loading over different time periods.

These and further objects and advantages of the invention will be more apparent upon reference to the following specification, claims, and appended drawings, wherein:

Figure 19A:
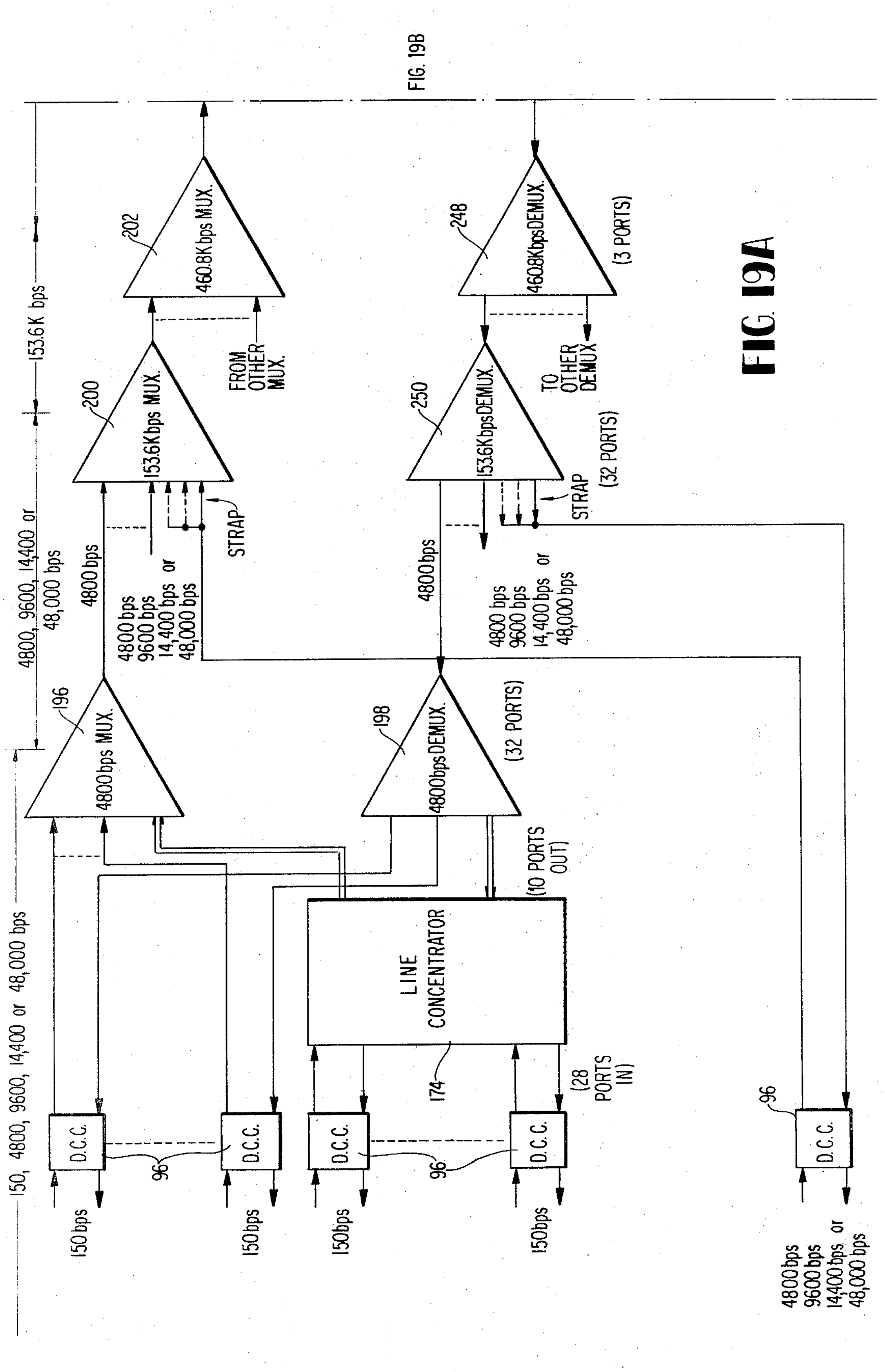
Figure 19B:
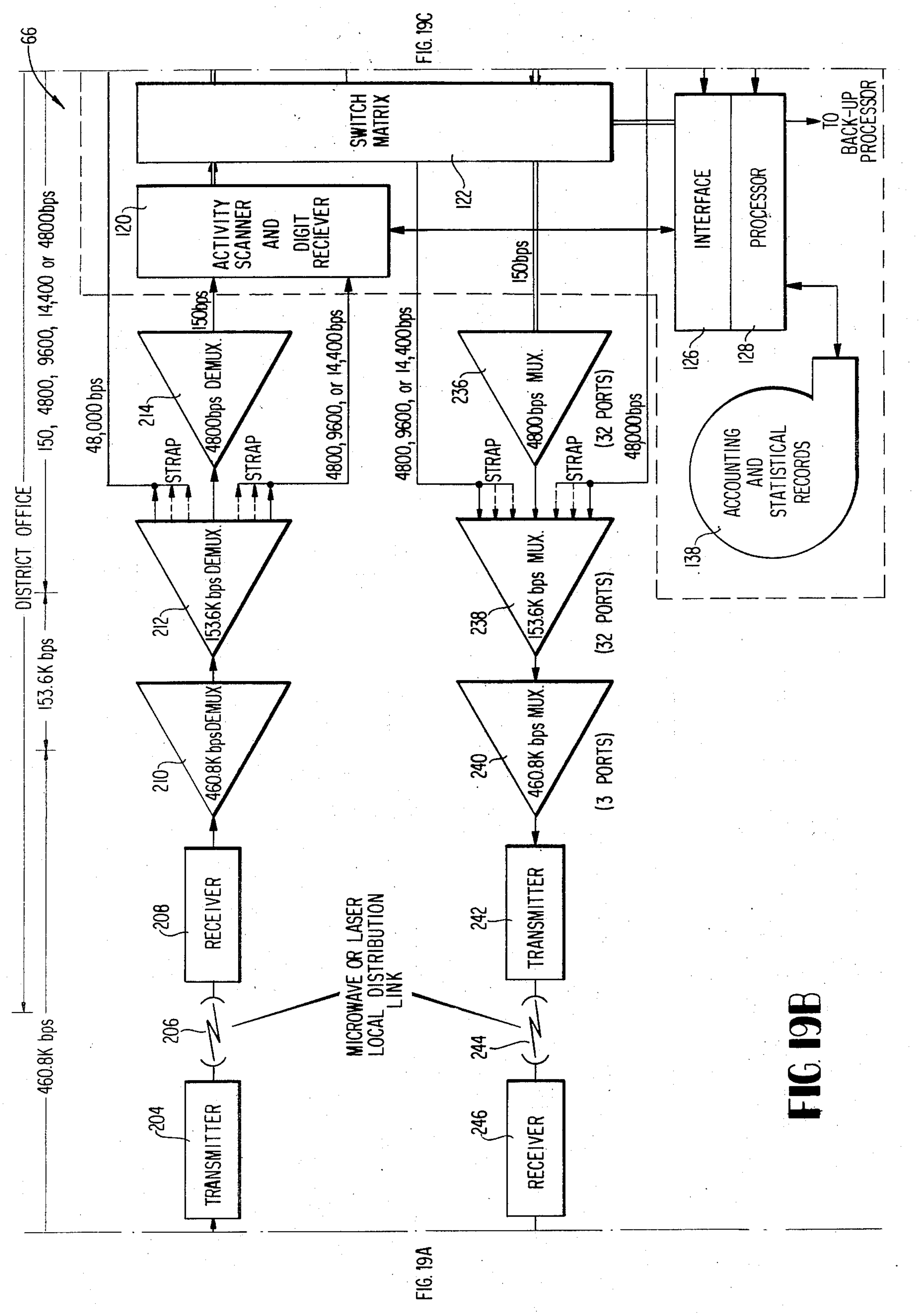
Figures 19B, 19C:
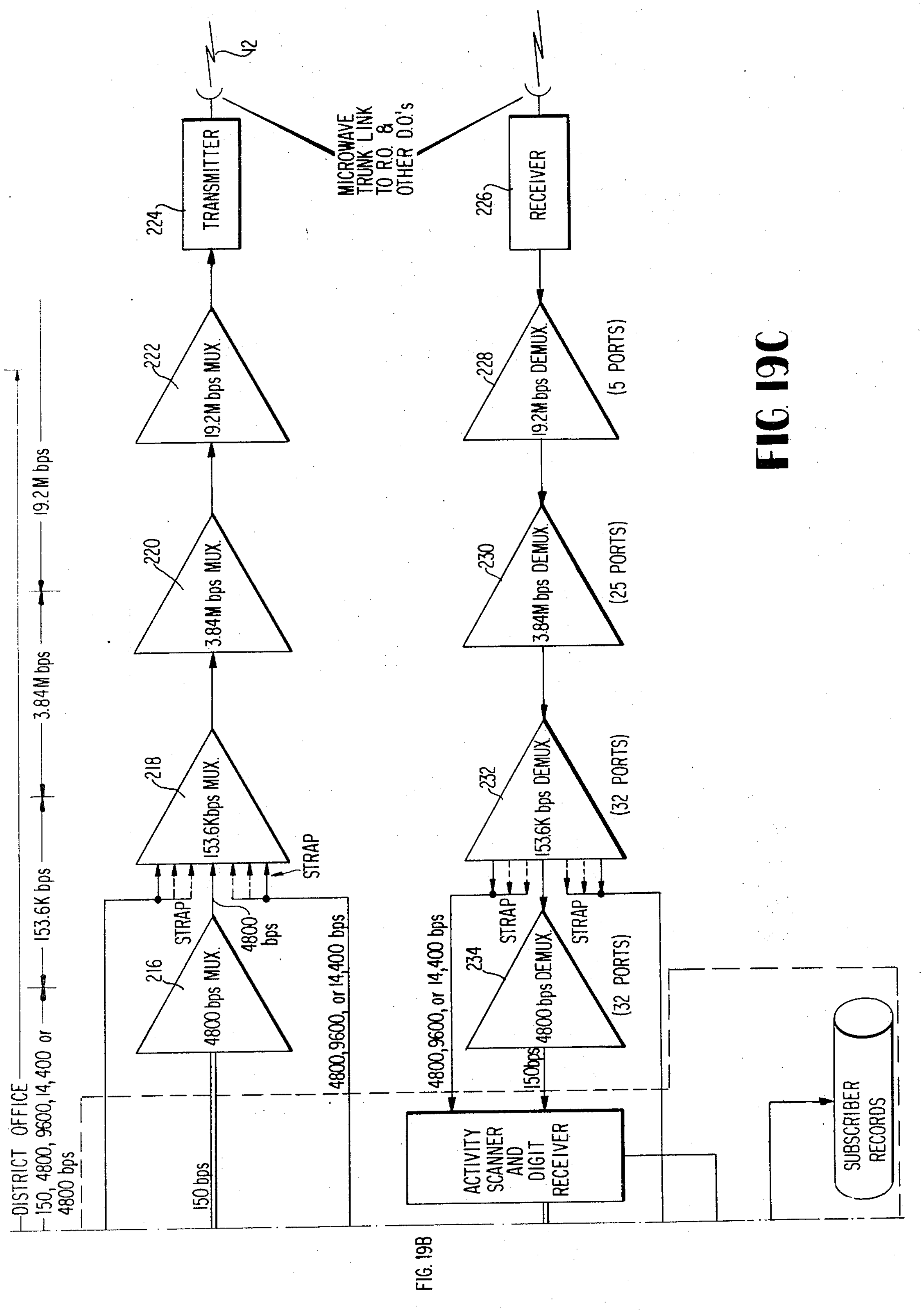
Figure 20:
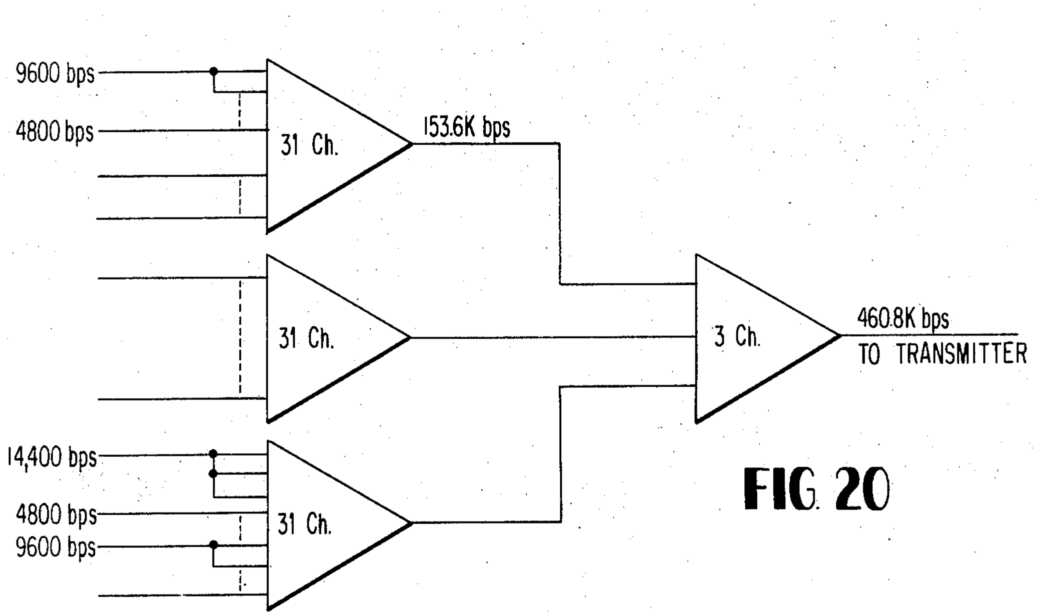
Figure 21:
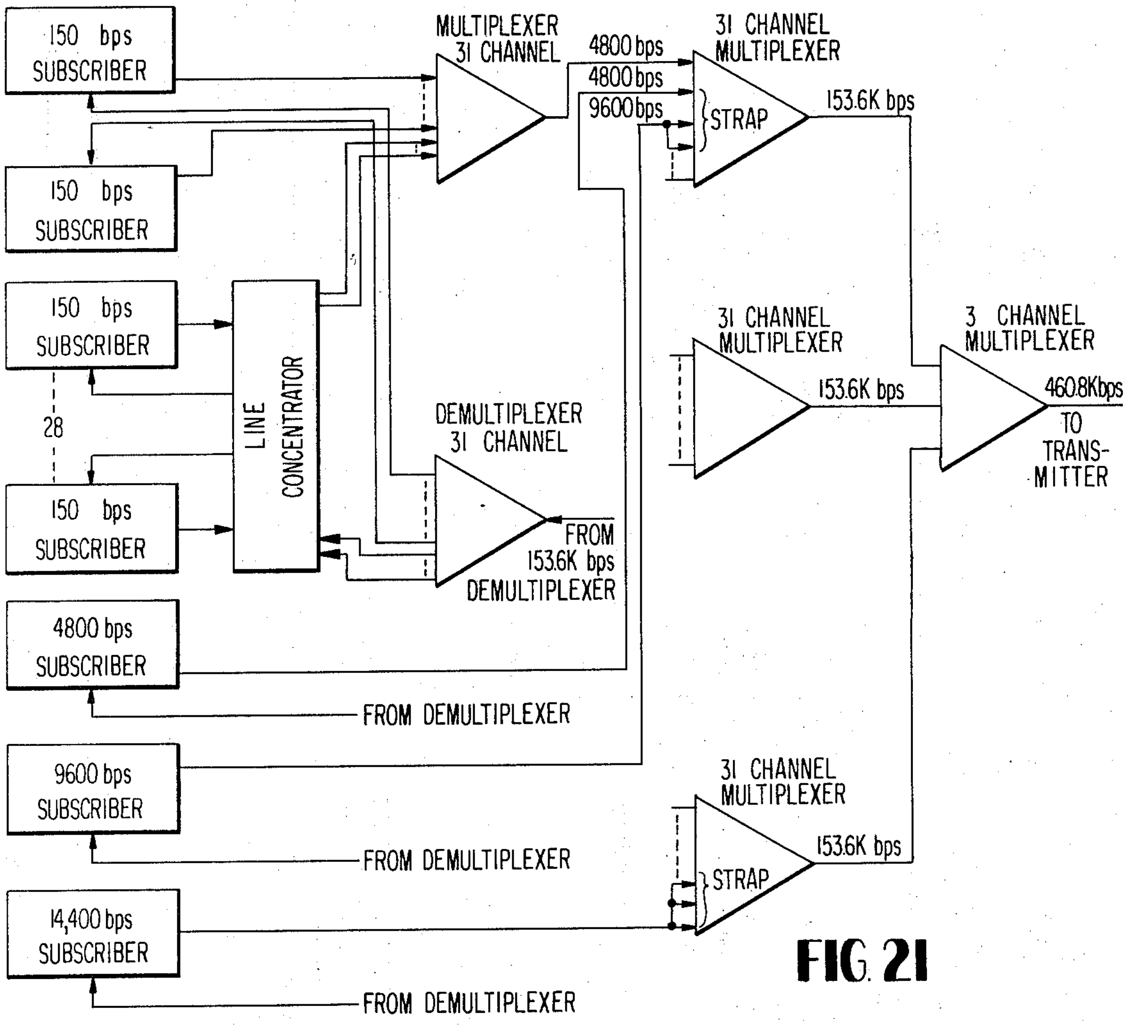
Figure 22A:
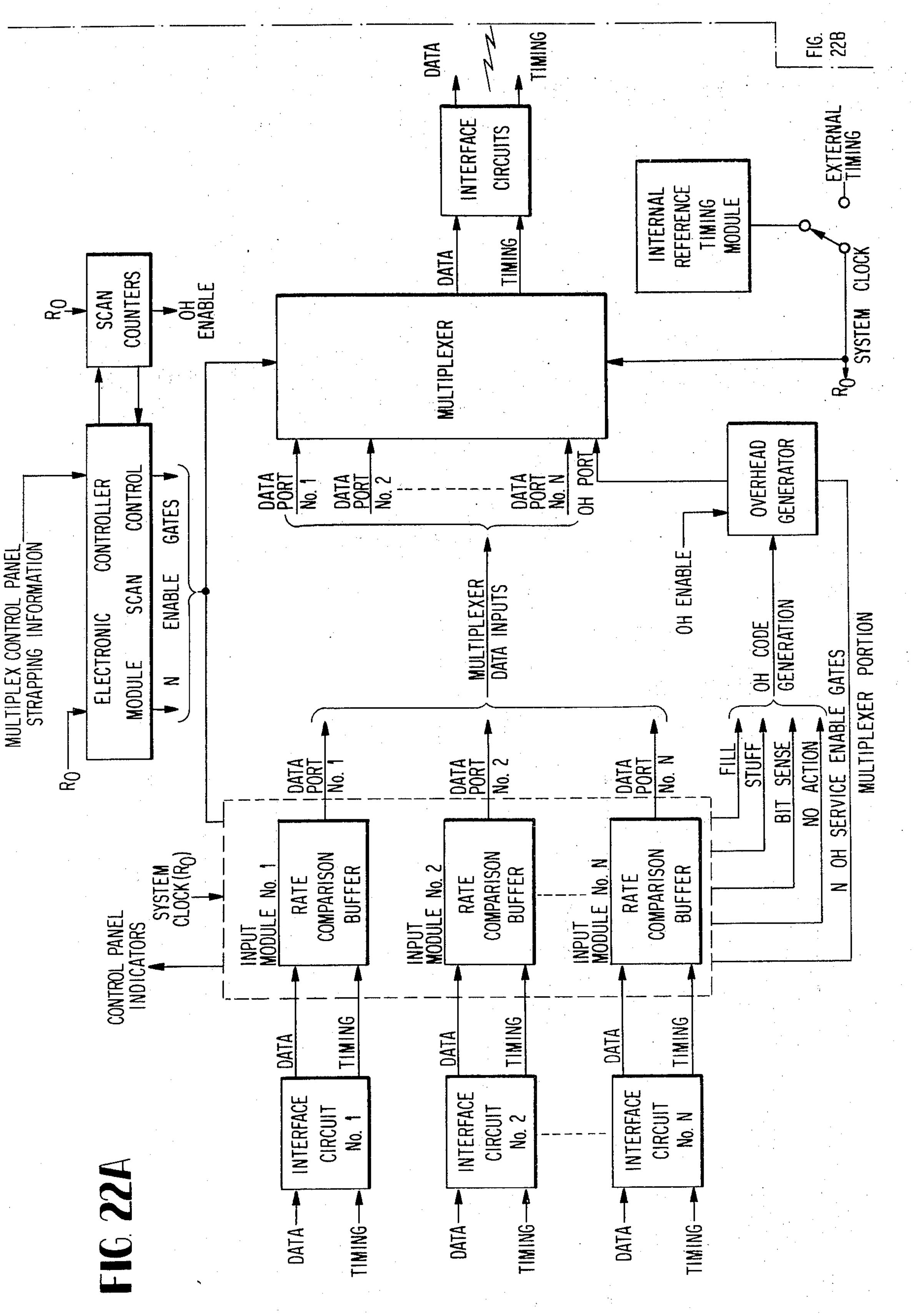
Figures 22A, 22B:
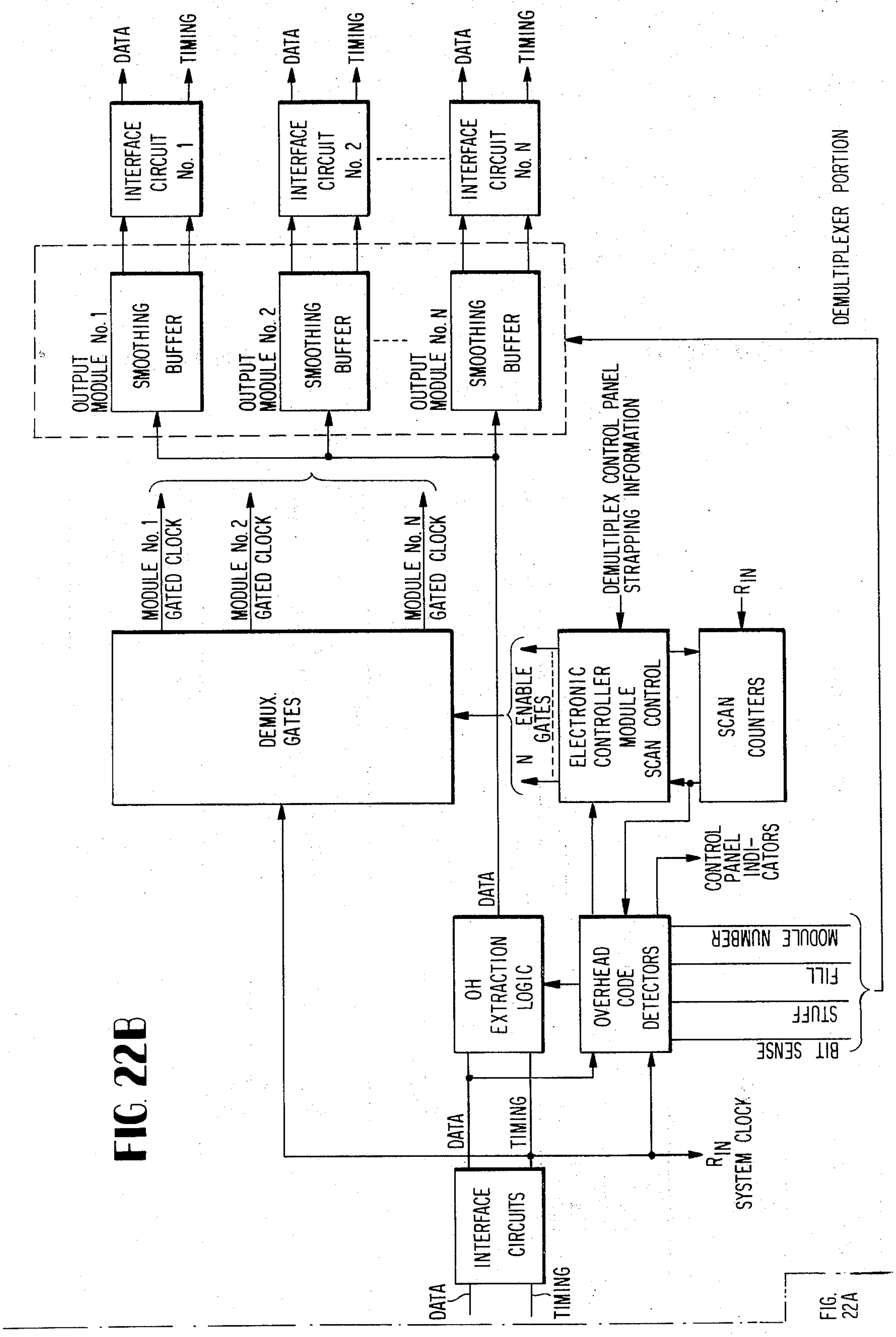
Figure 23:
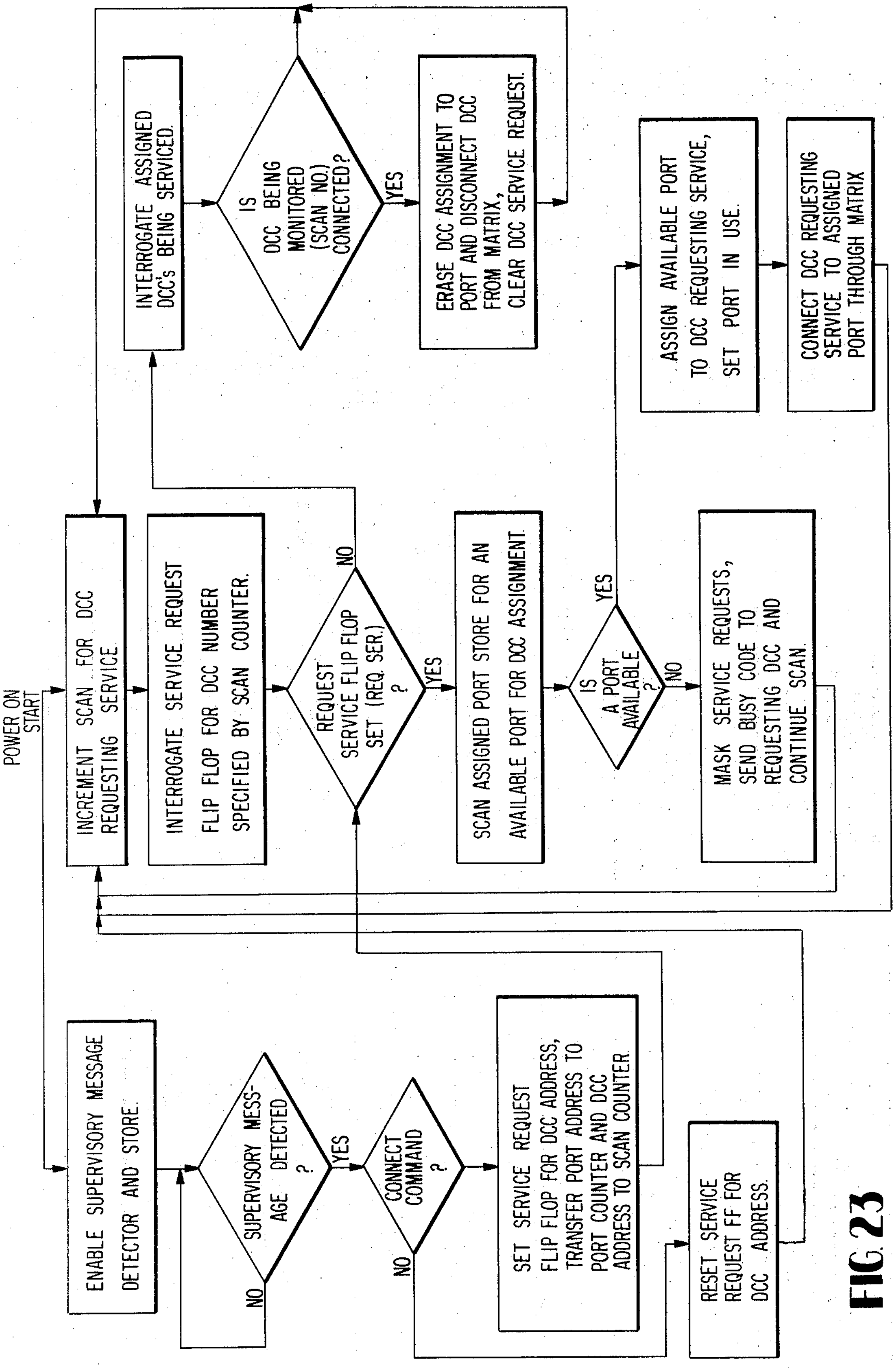
Figure 24A:
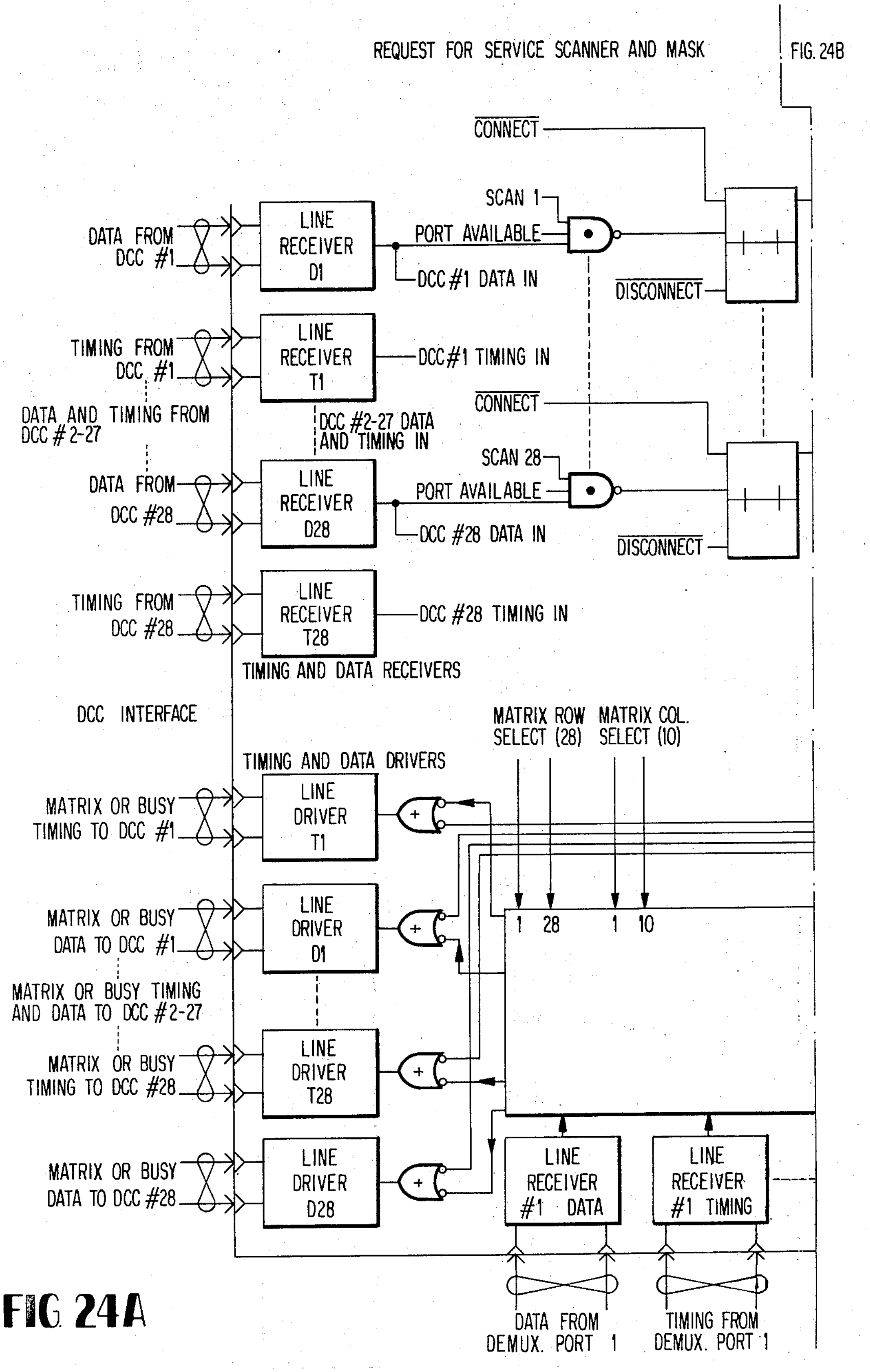
Figure 24B:
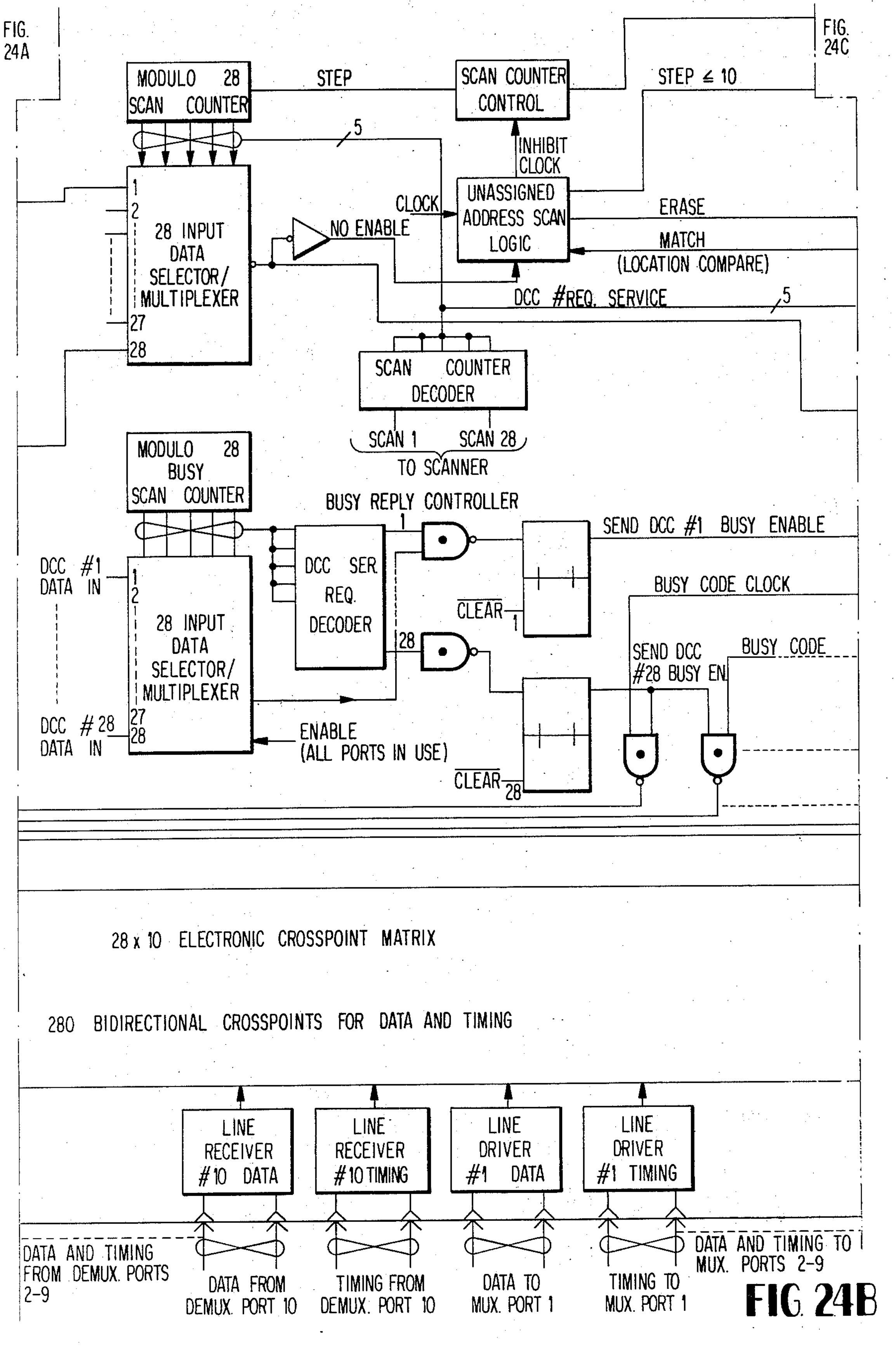
Figure 24C:
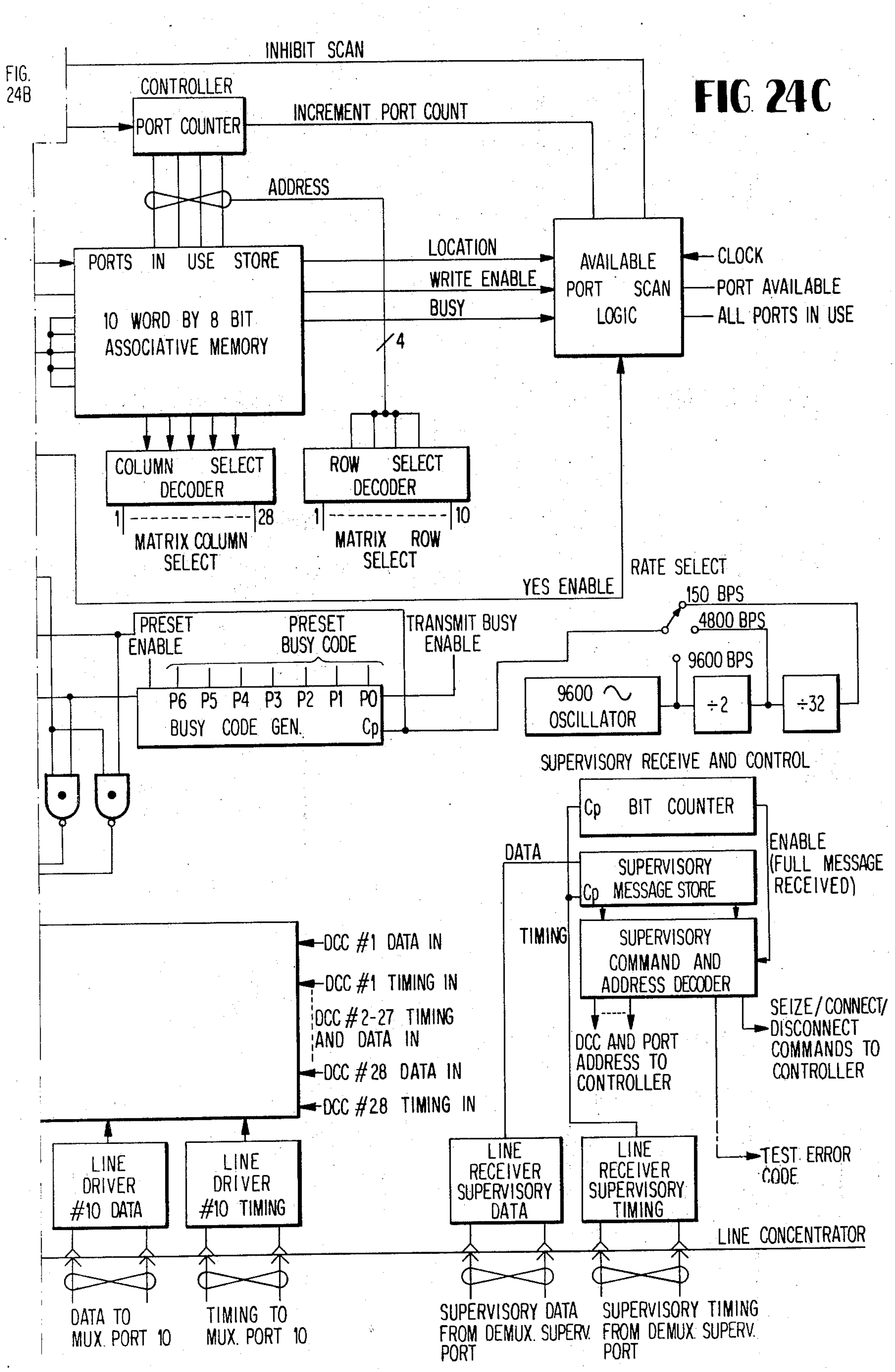
Figure 25A:
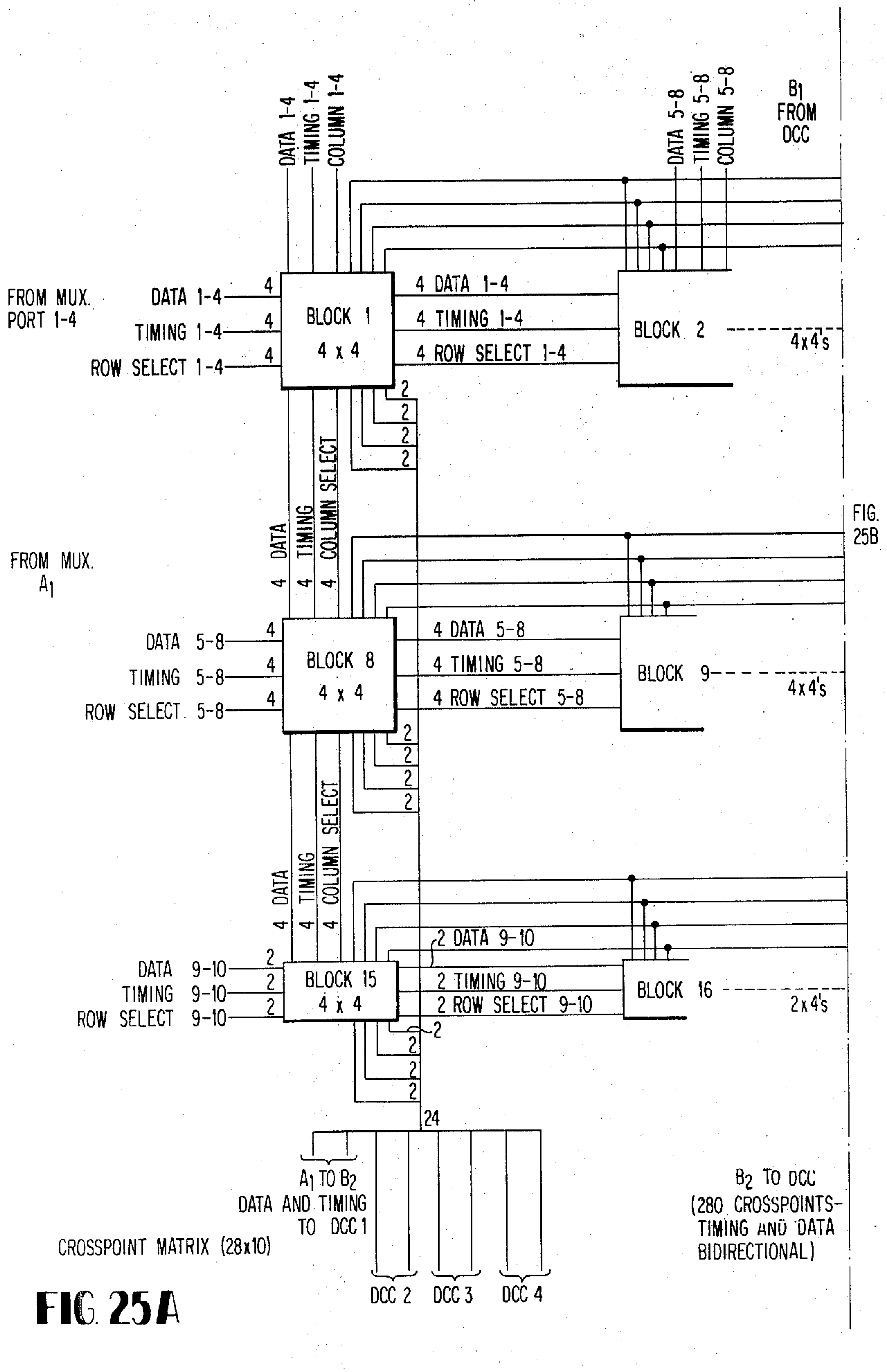
Figure 25B:
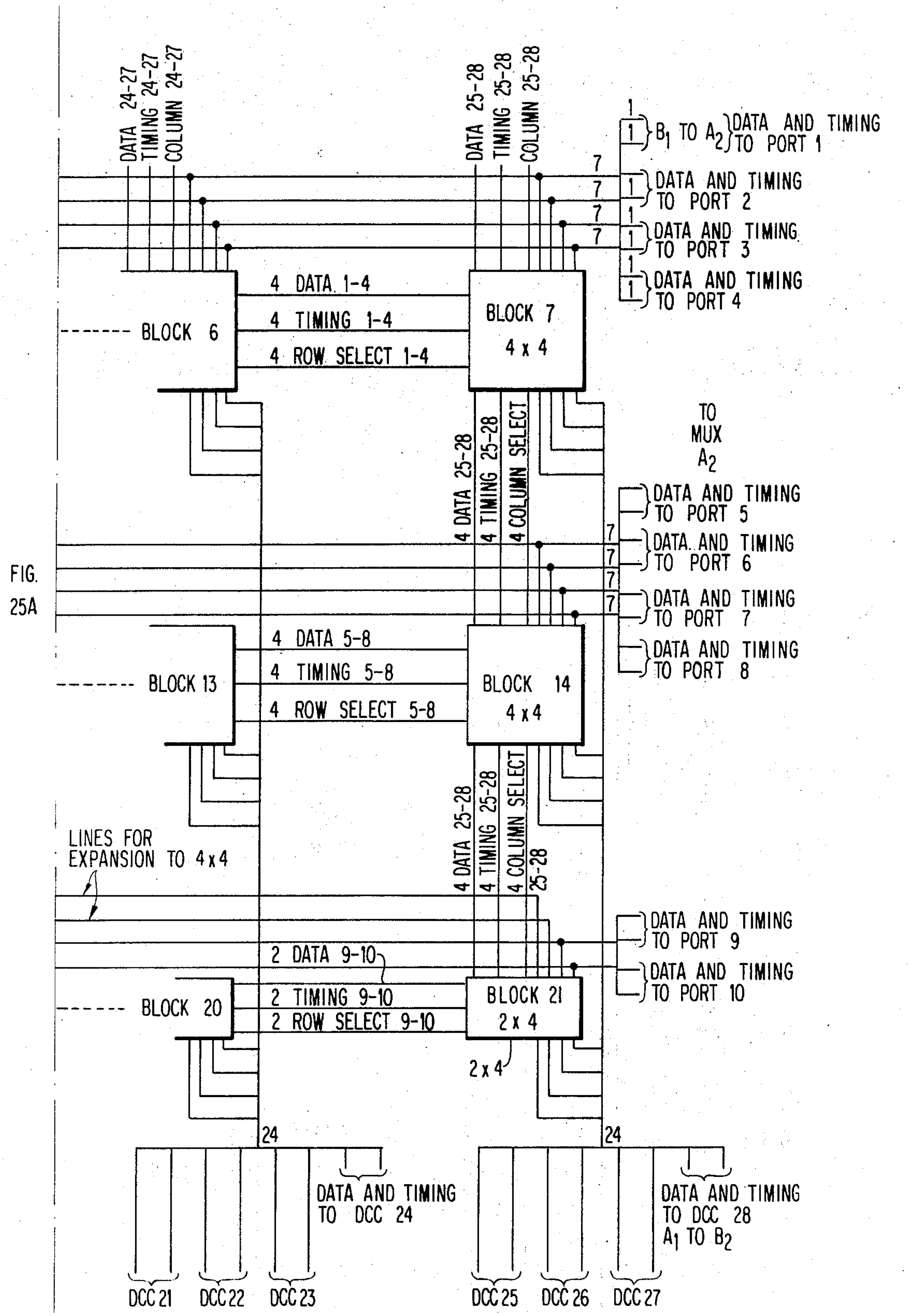
Figure 26:
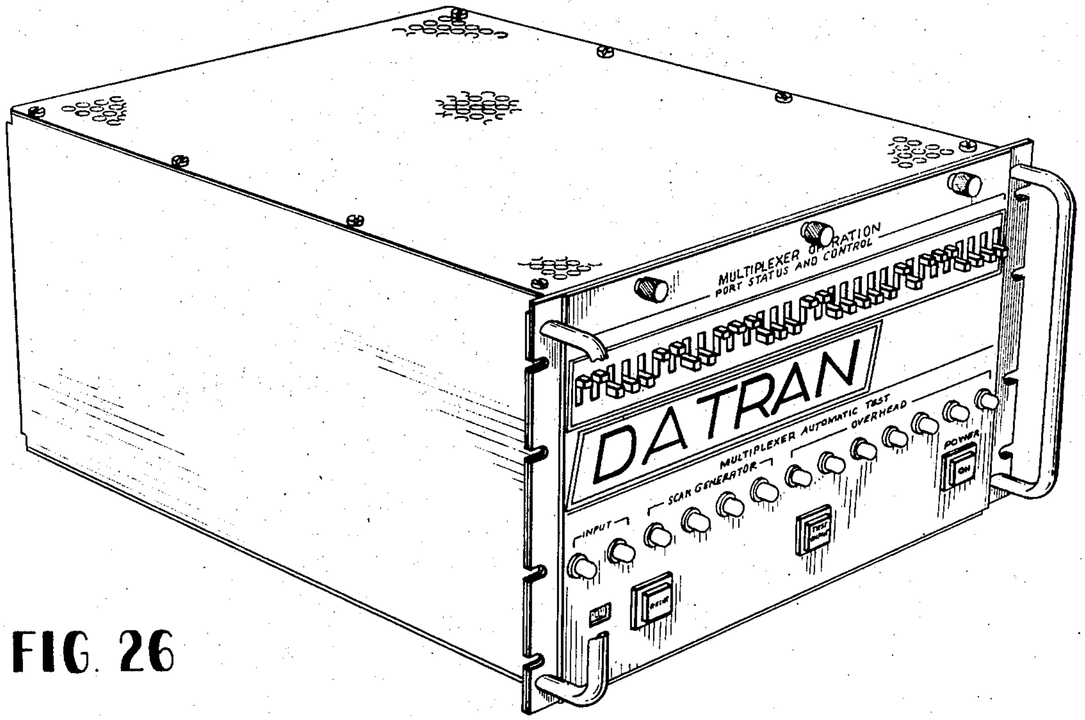
Figure 27:
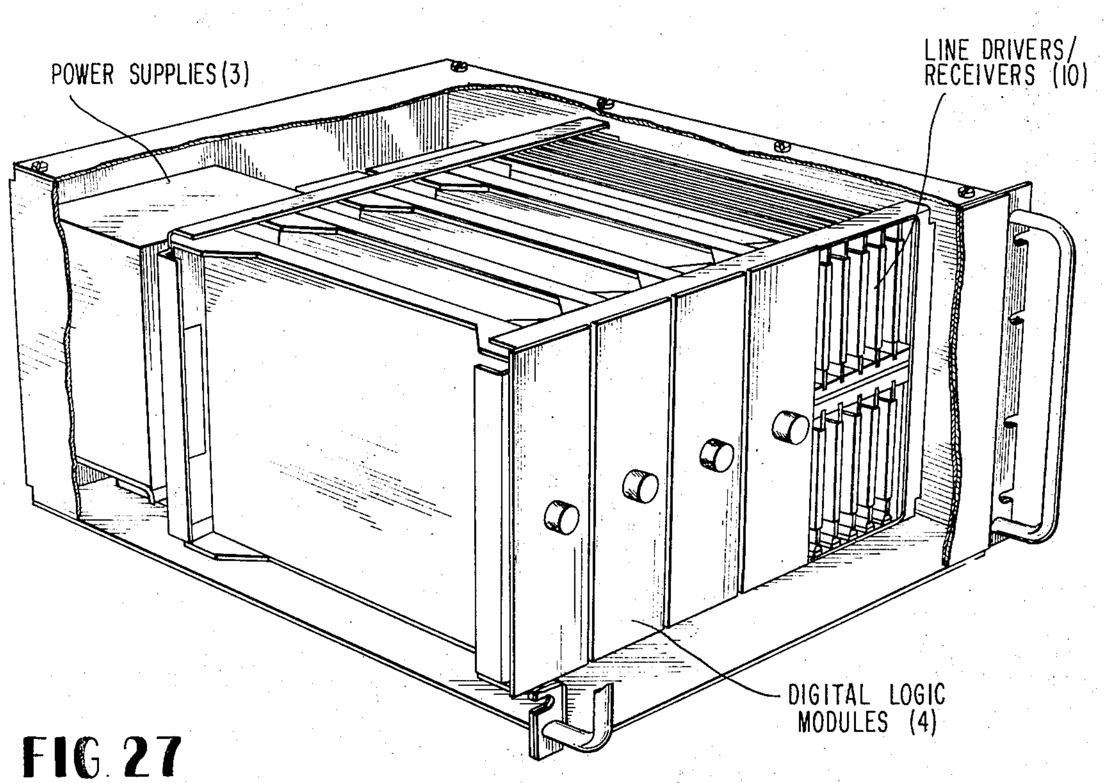
Figure 29:
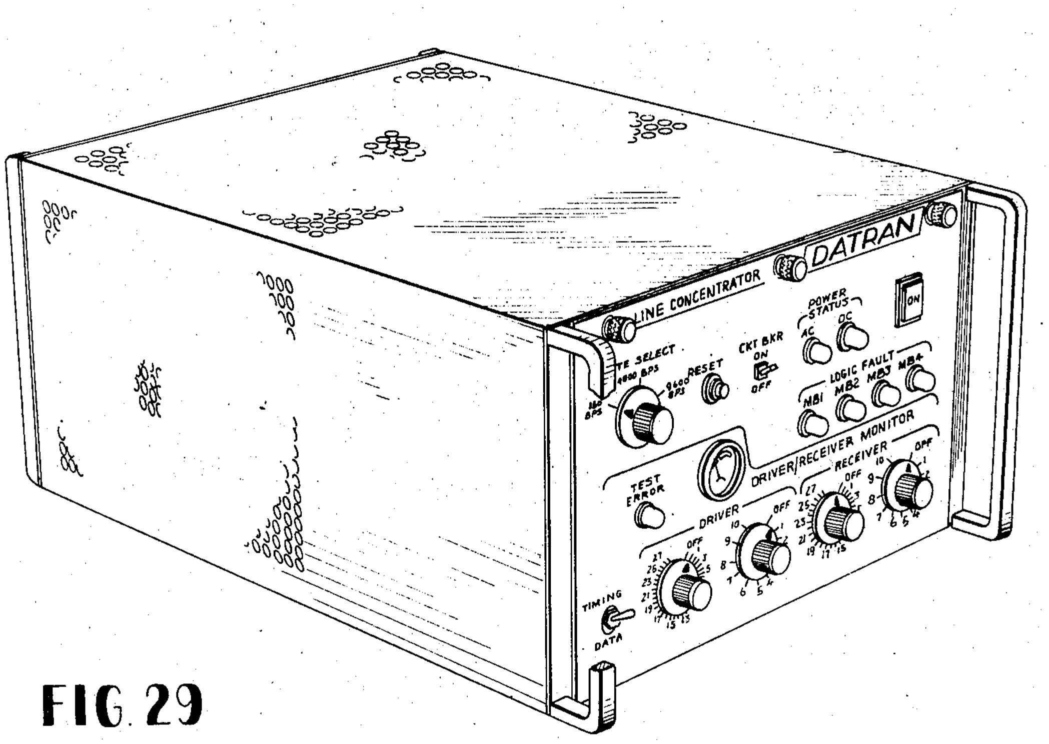
Figure 28:
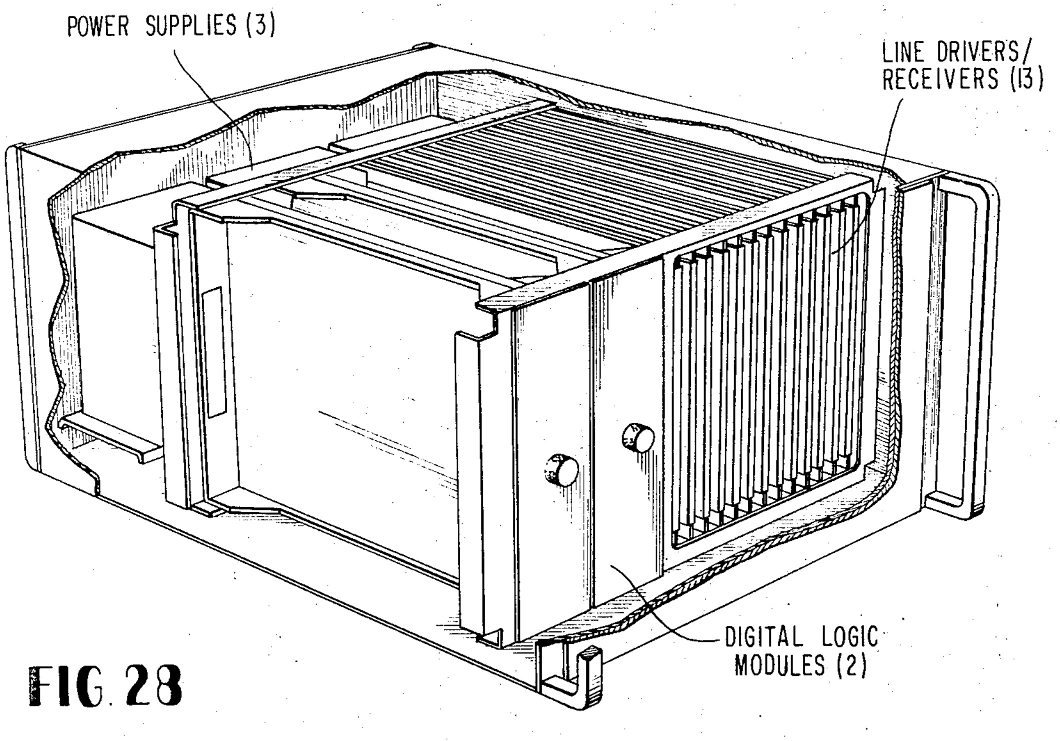
Figure 30:
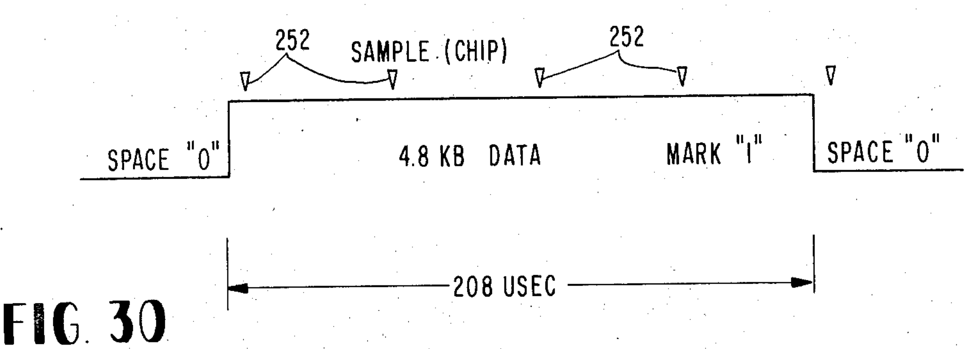
Figure 31:
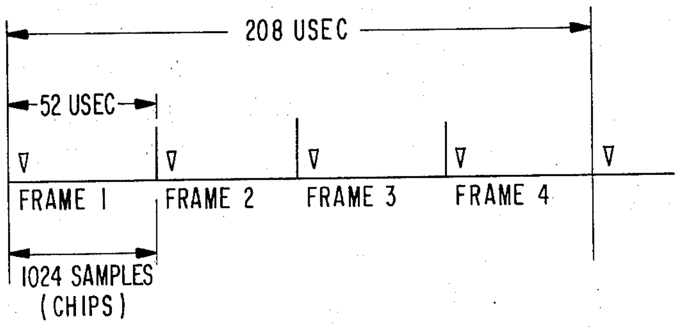
Figure 32:
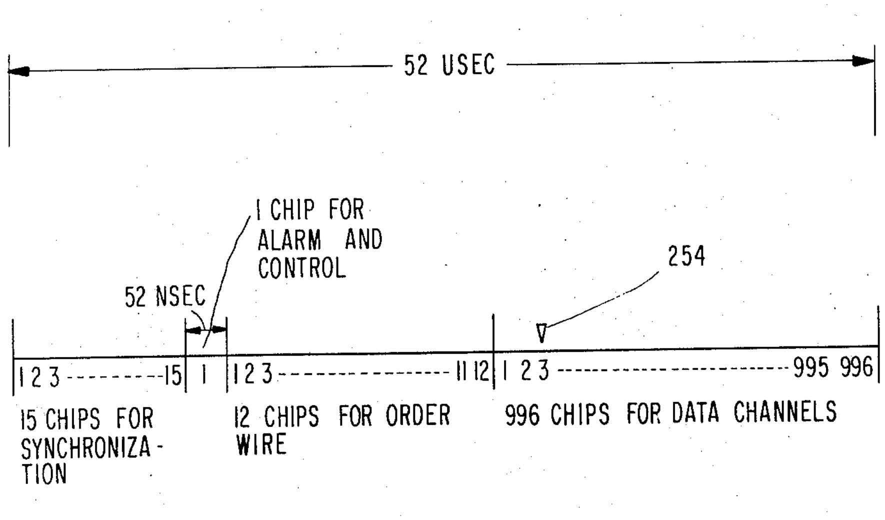
Figure 33:
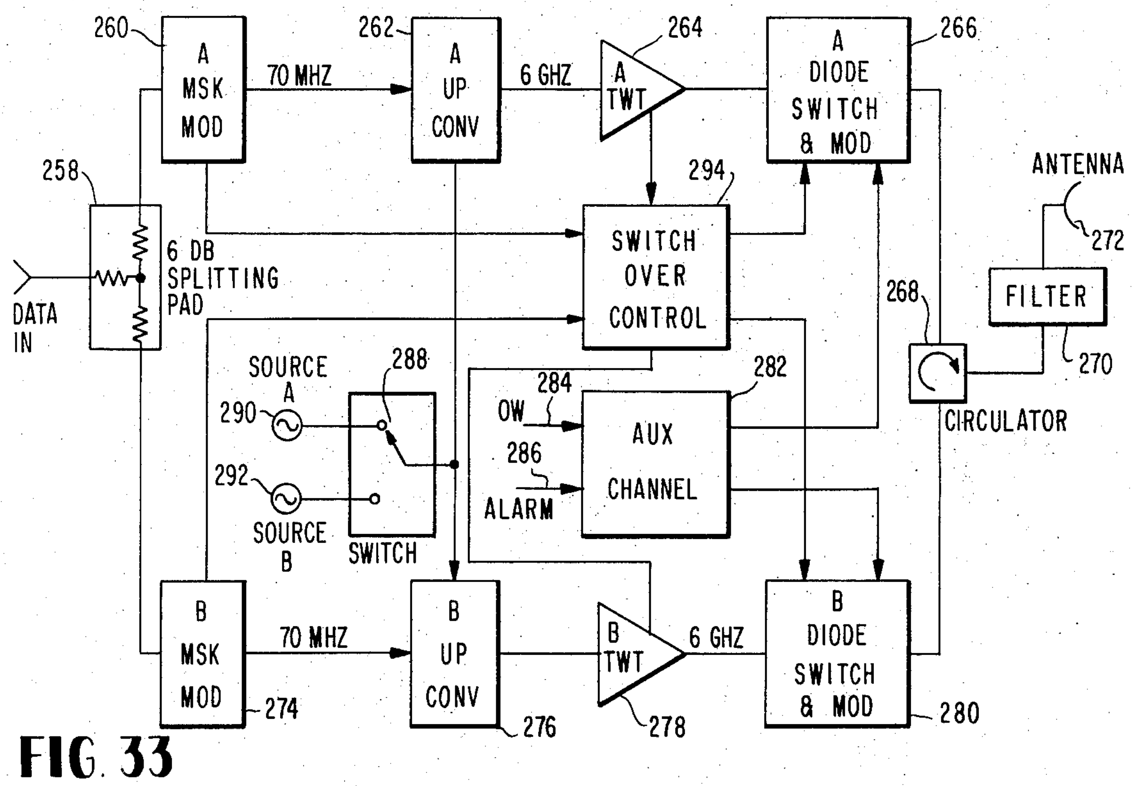
Figure 34:
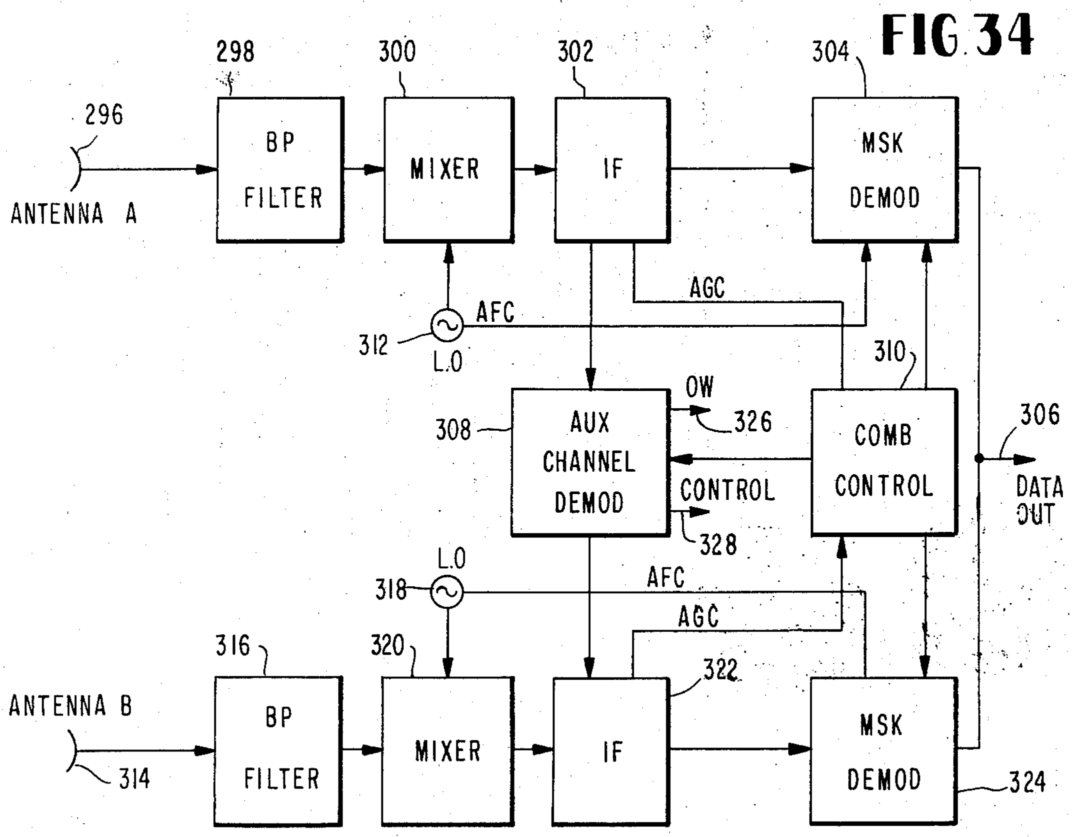
Figure 35:
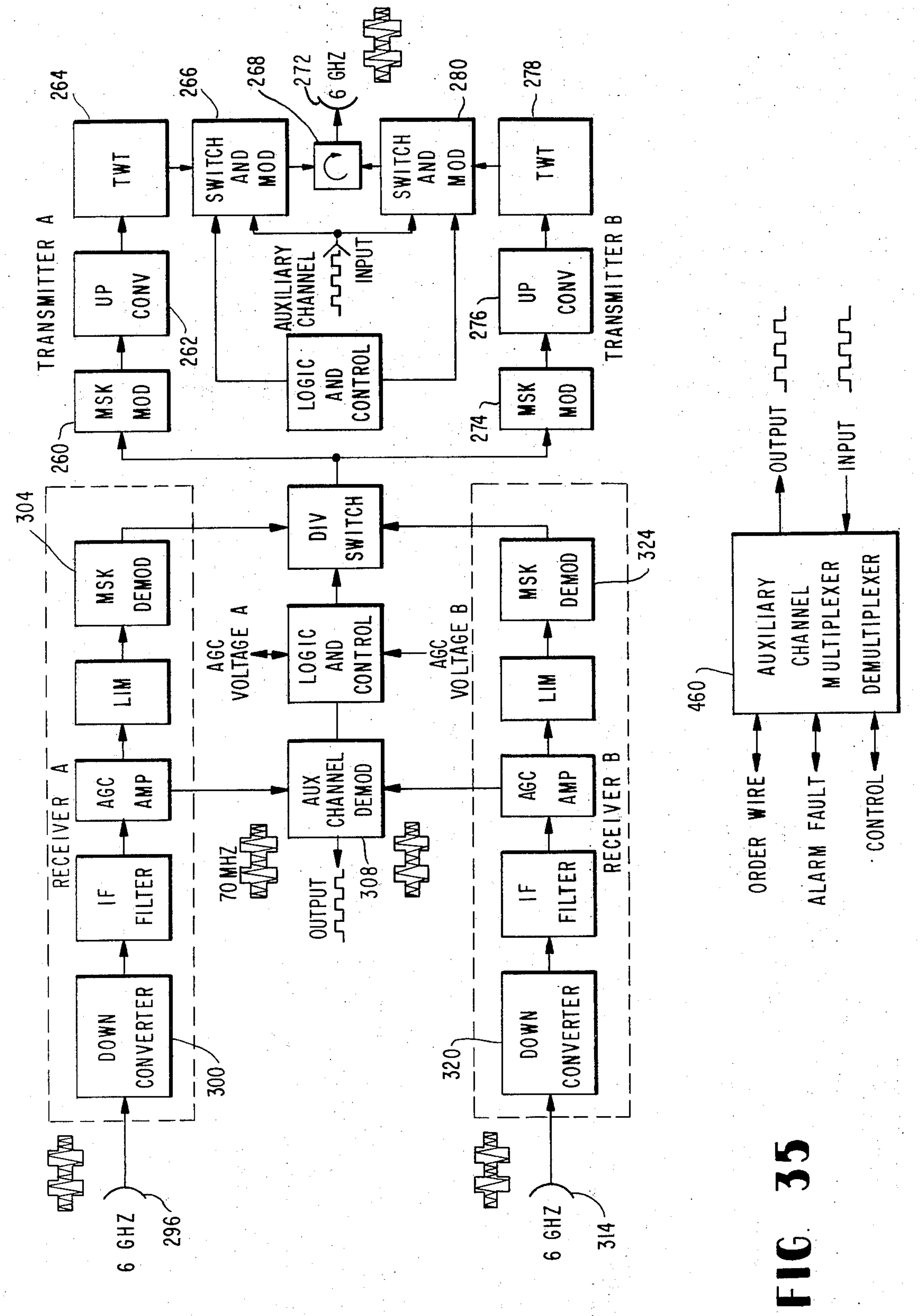
Figure 36:
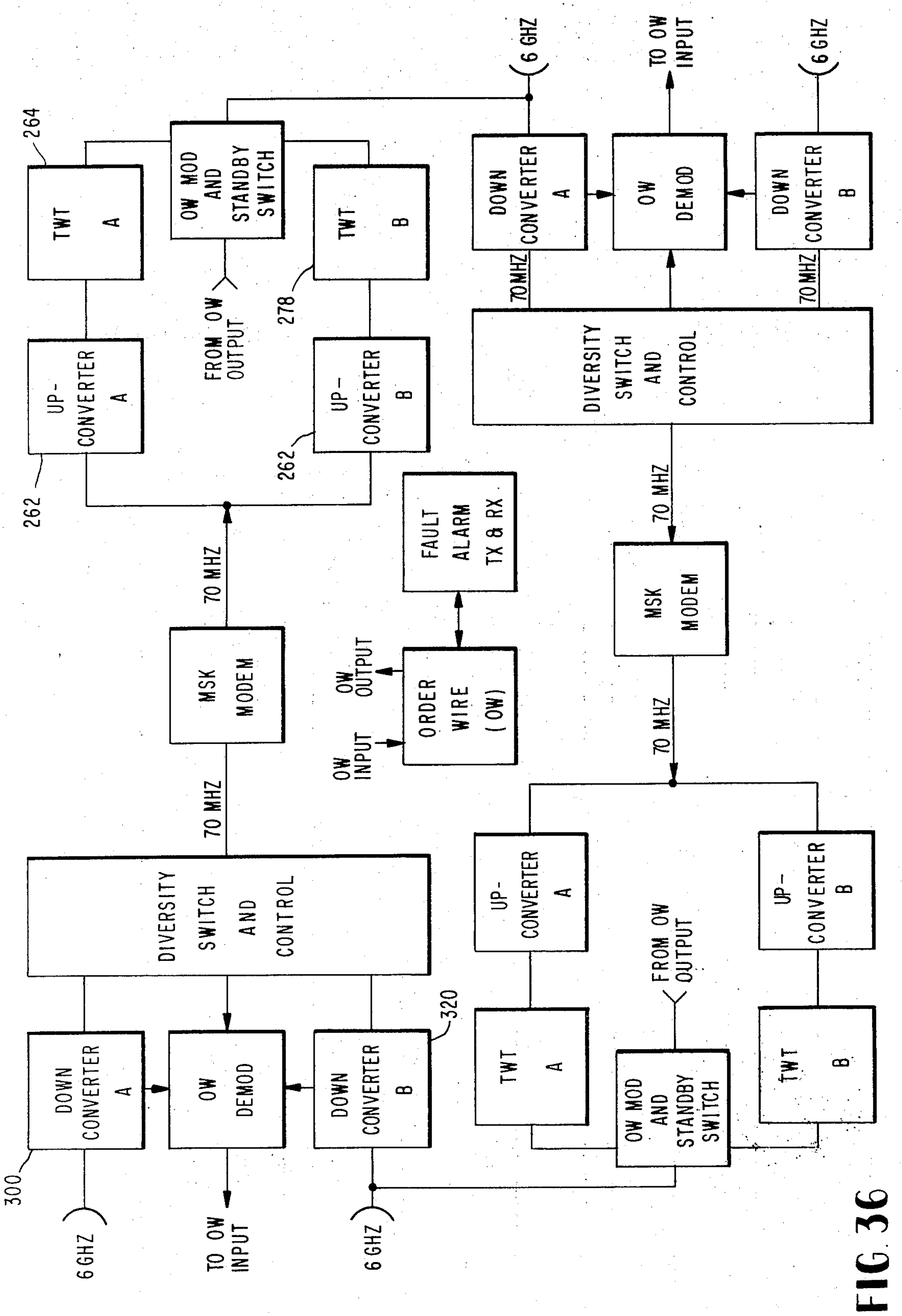
Figure 36A:
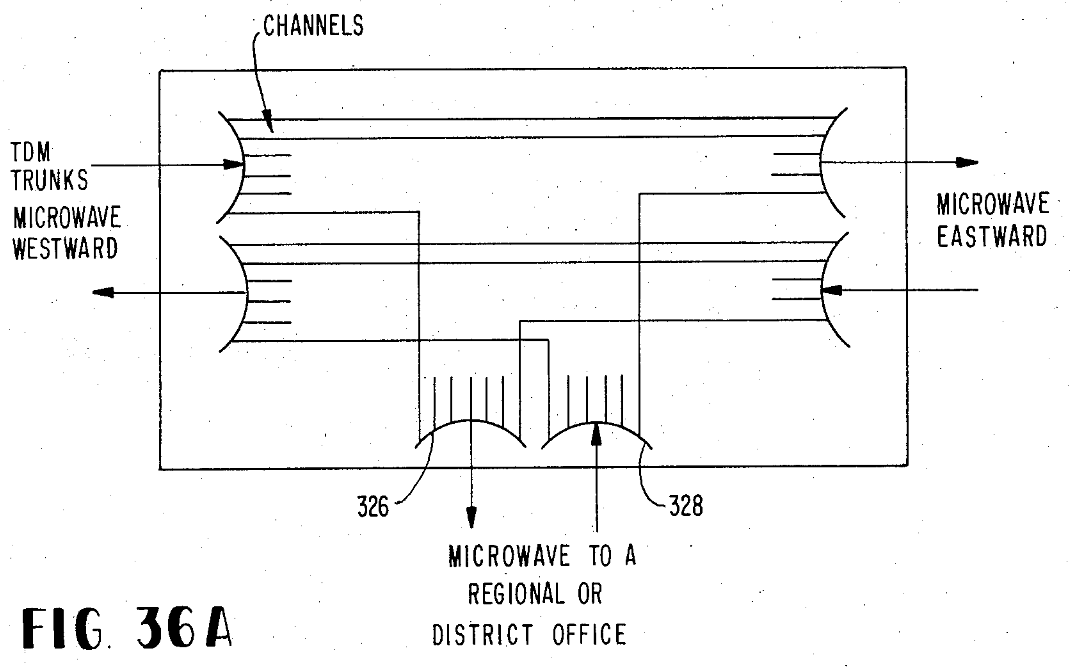
Figure 37:
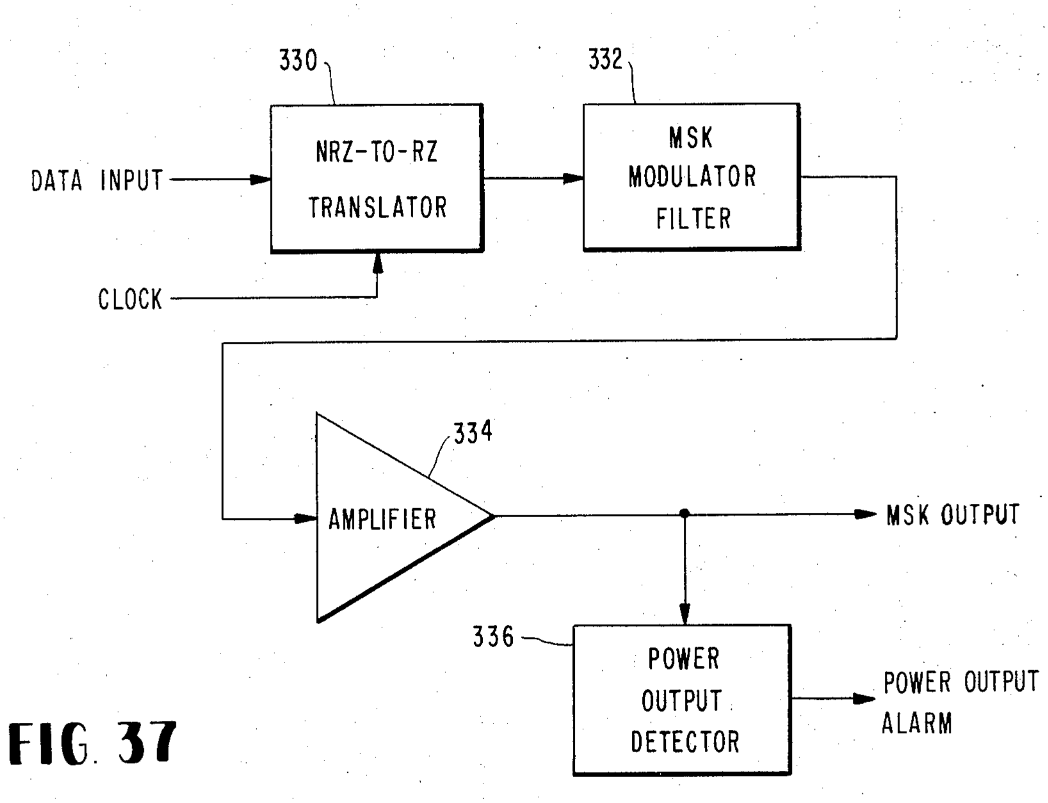
Figure 38:
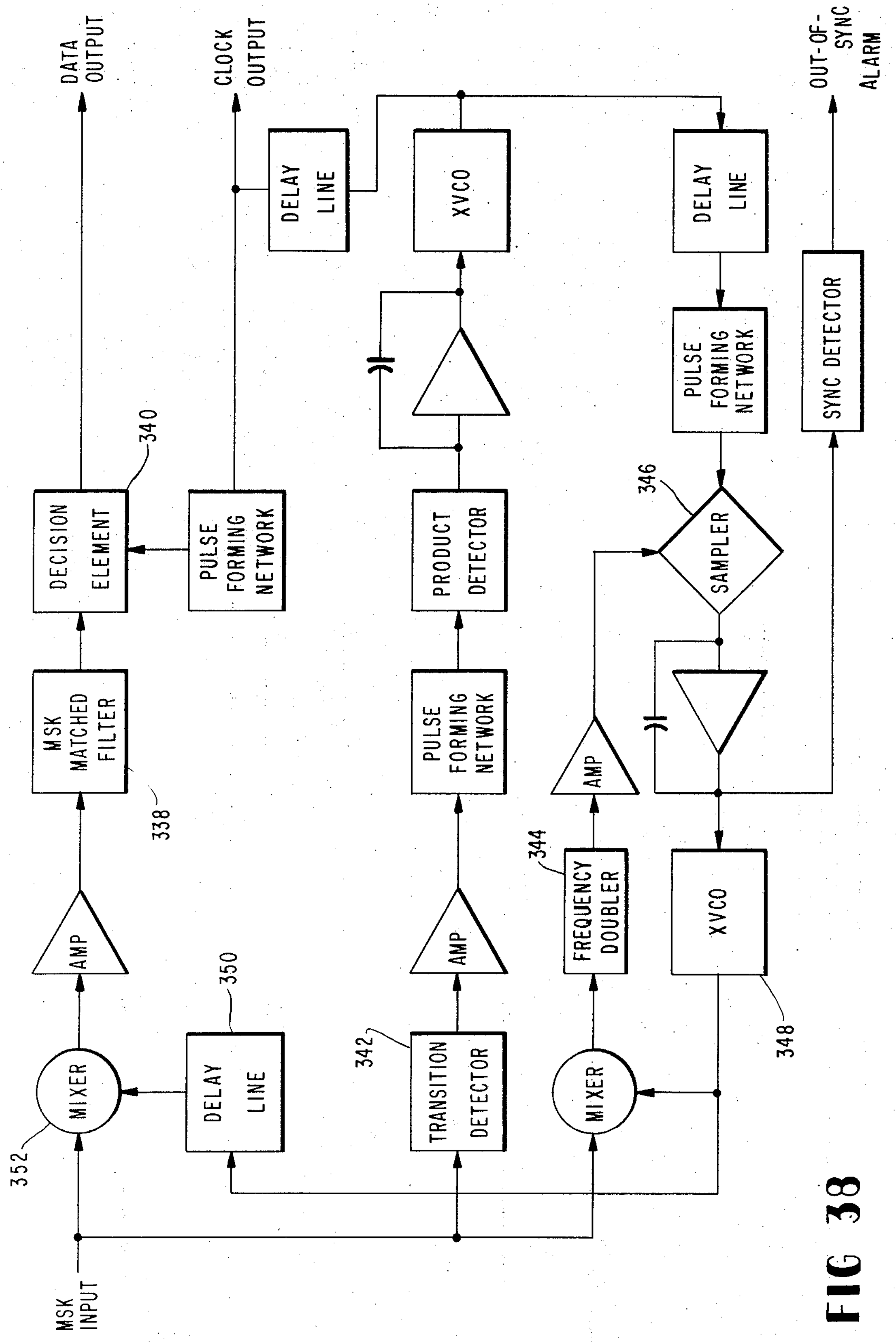
Figure 39:
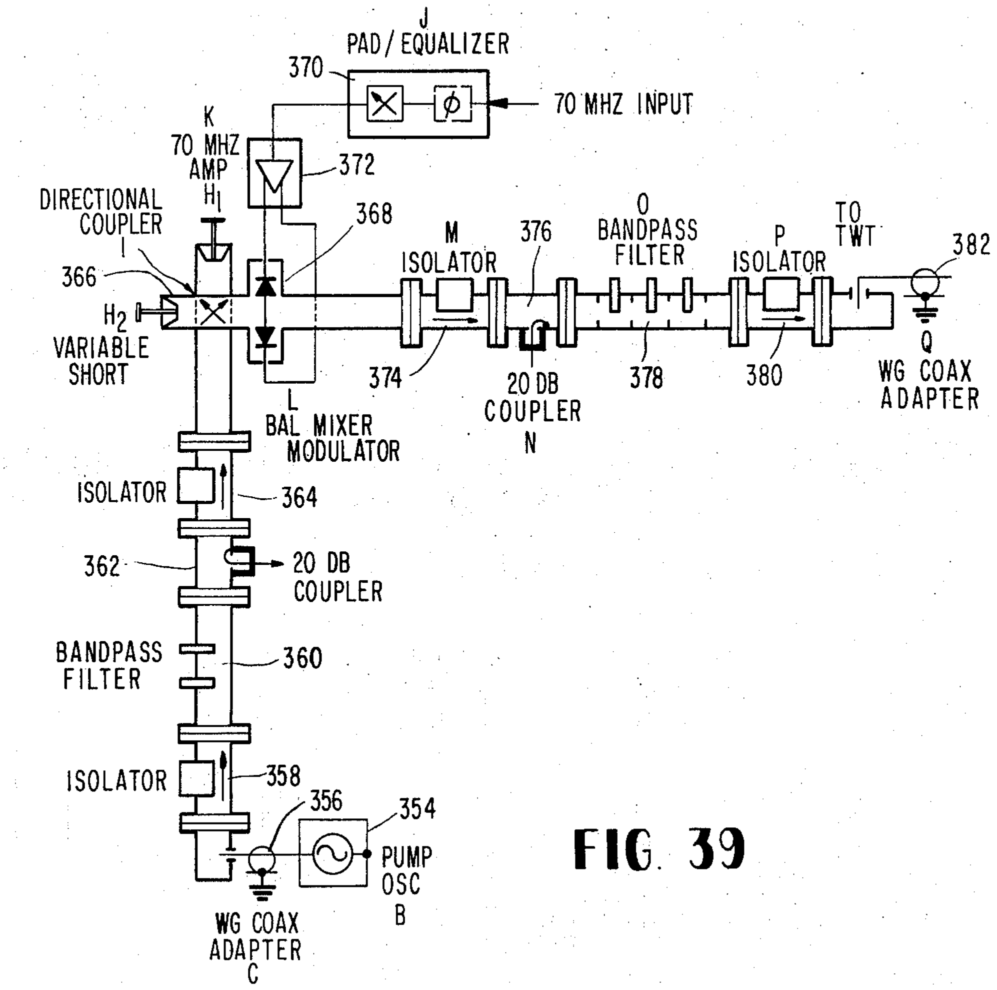
Figure 40:
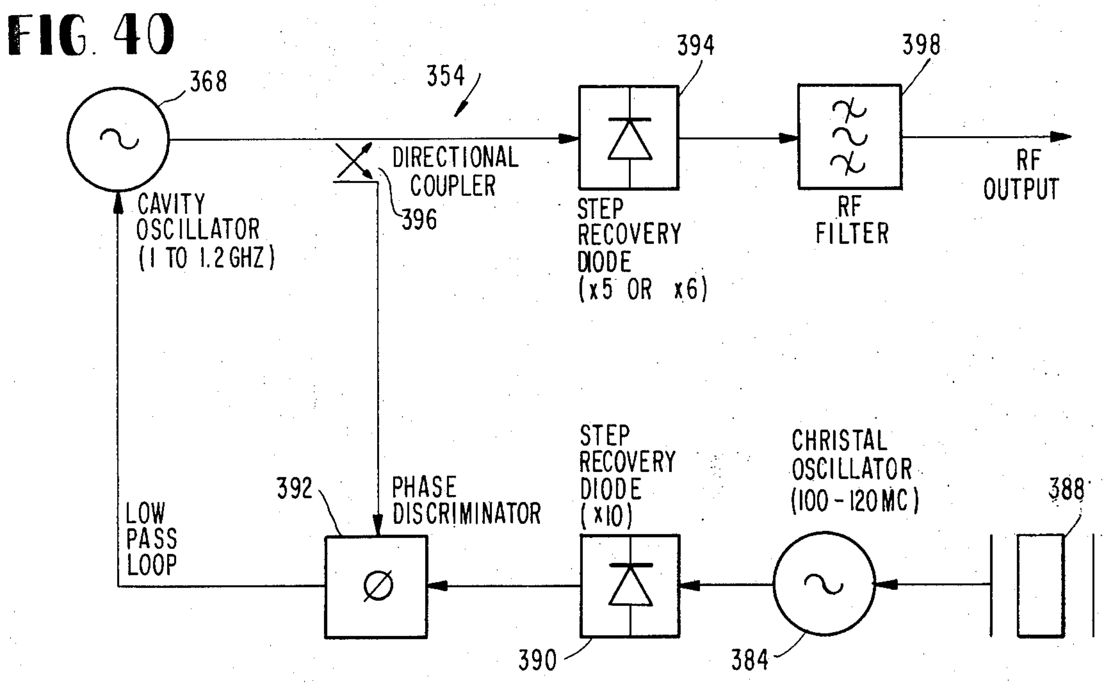
Figures 41, 42:
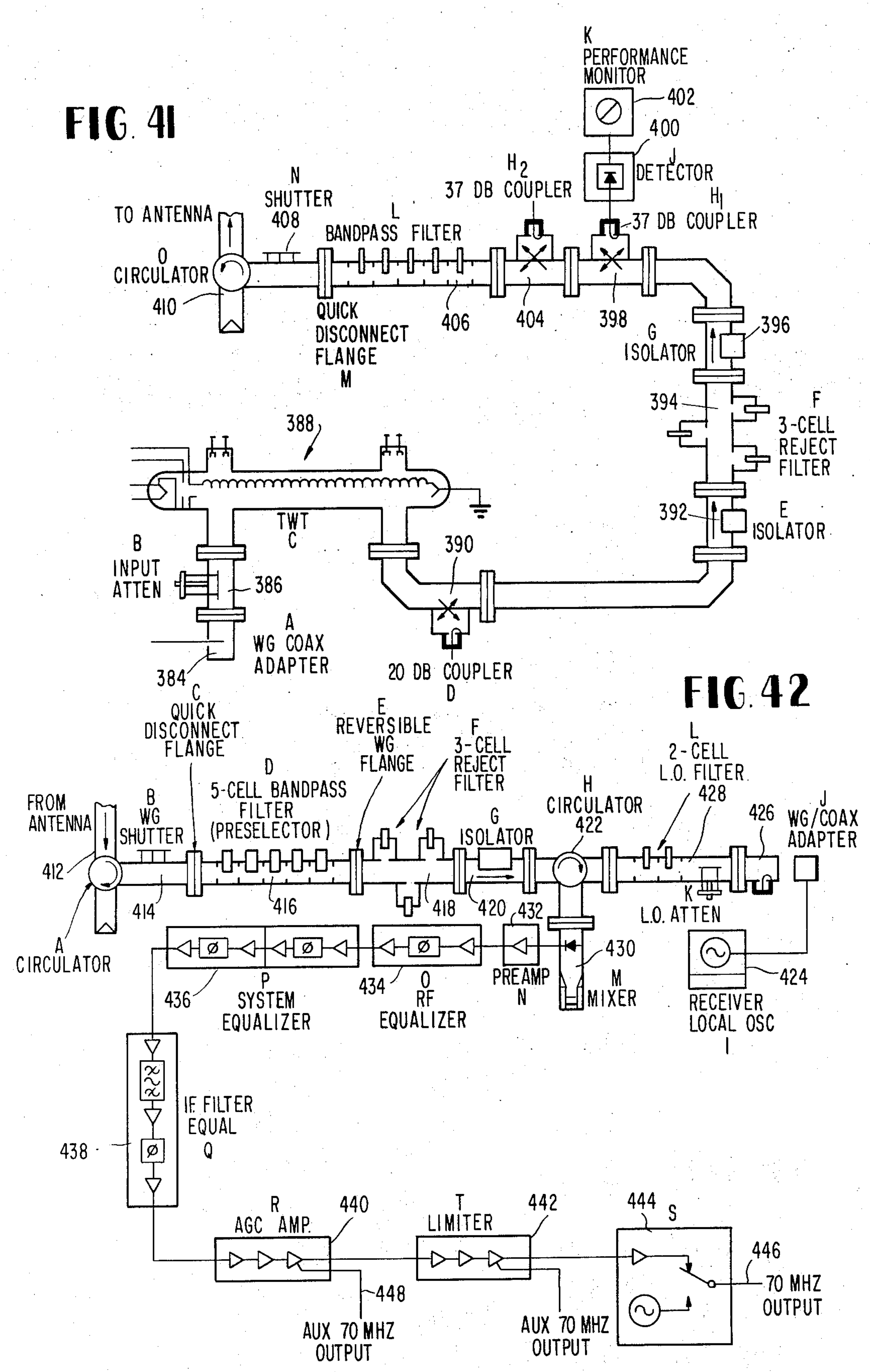
Figures 43, 44:
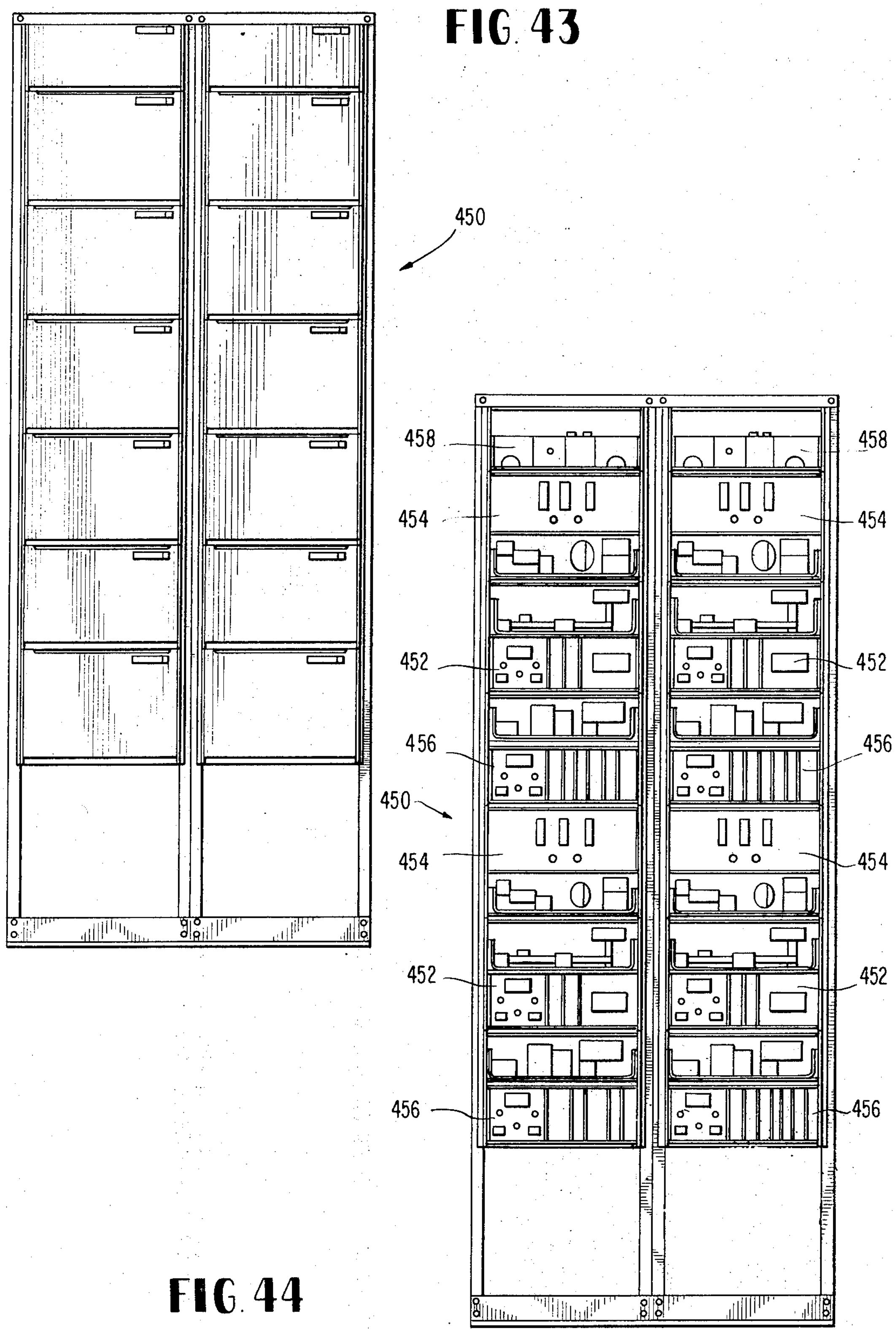
Figure 45A:
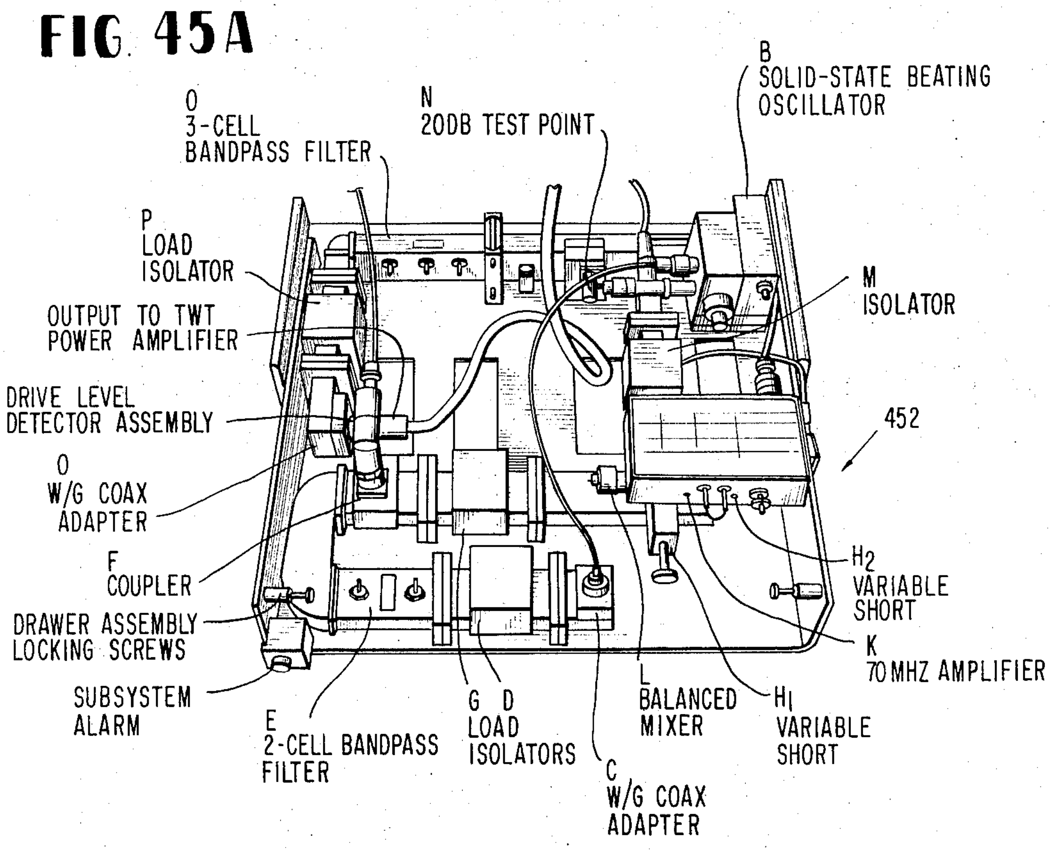
Figure 45B:
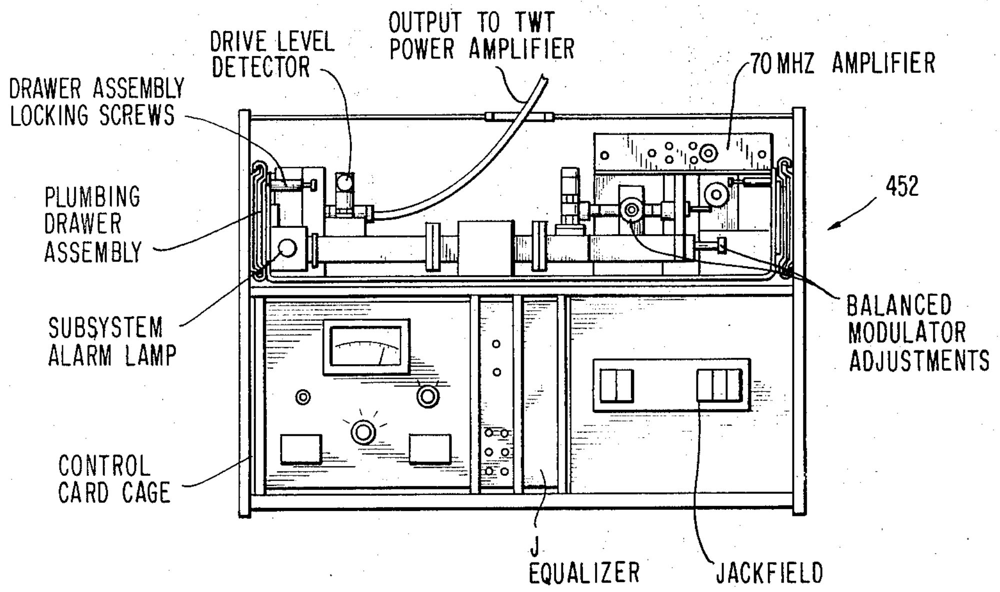
Figure 46A:
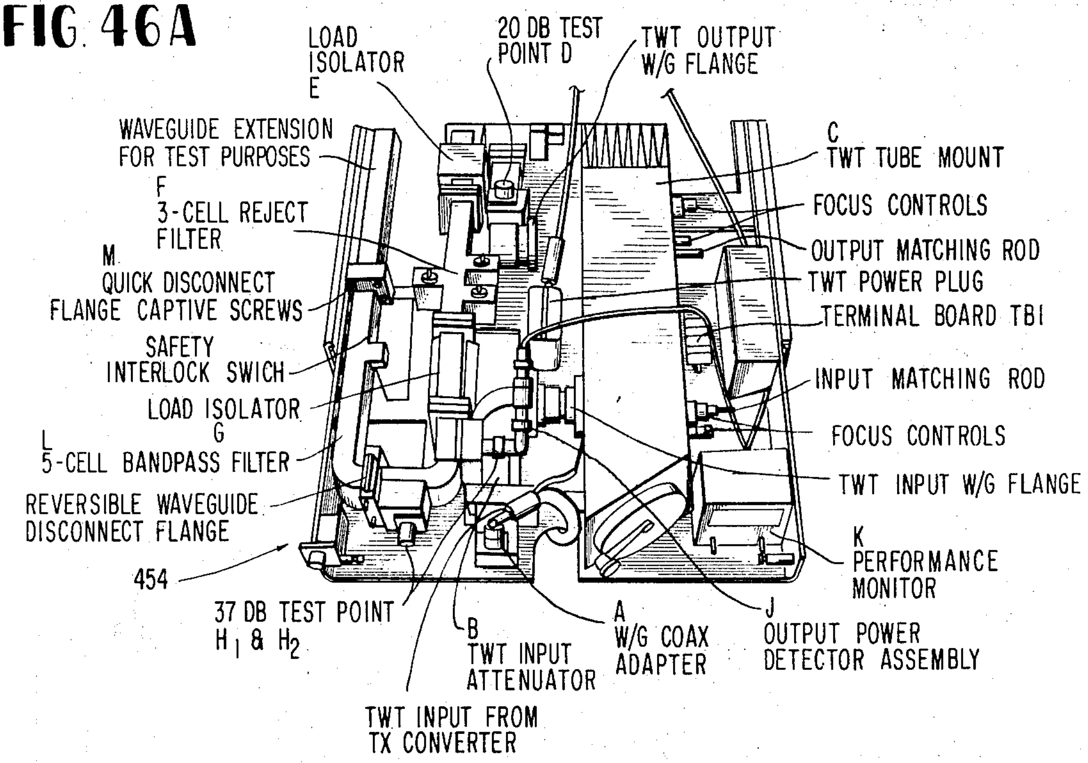
Figure 46B:
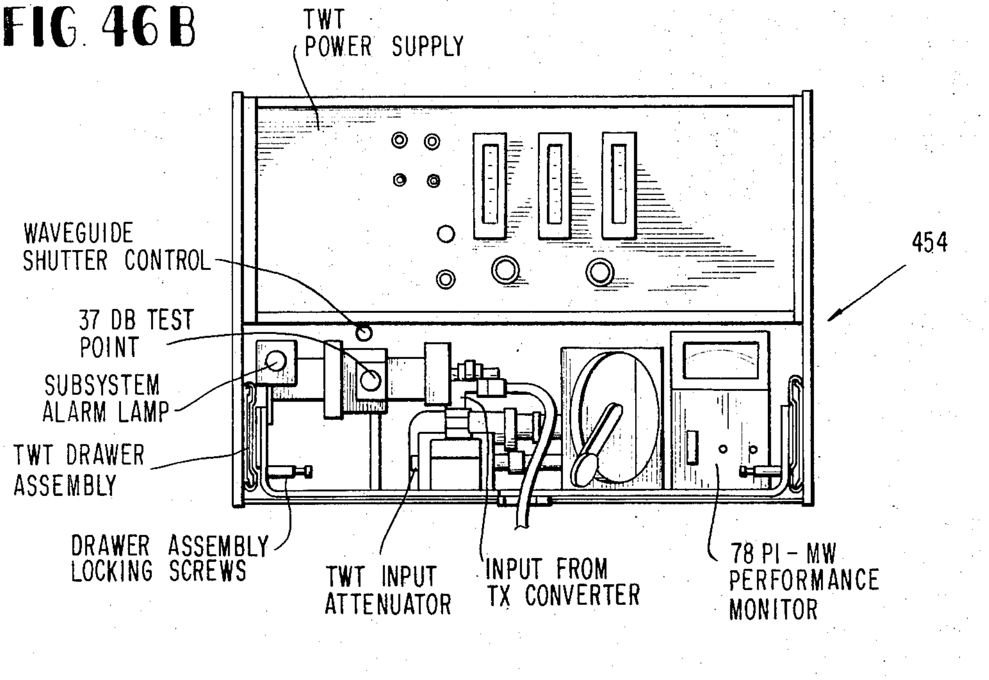
Figure 47A:
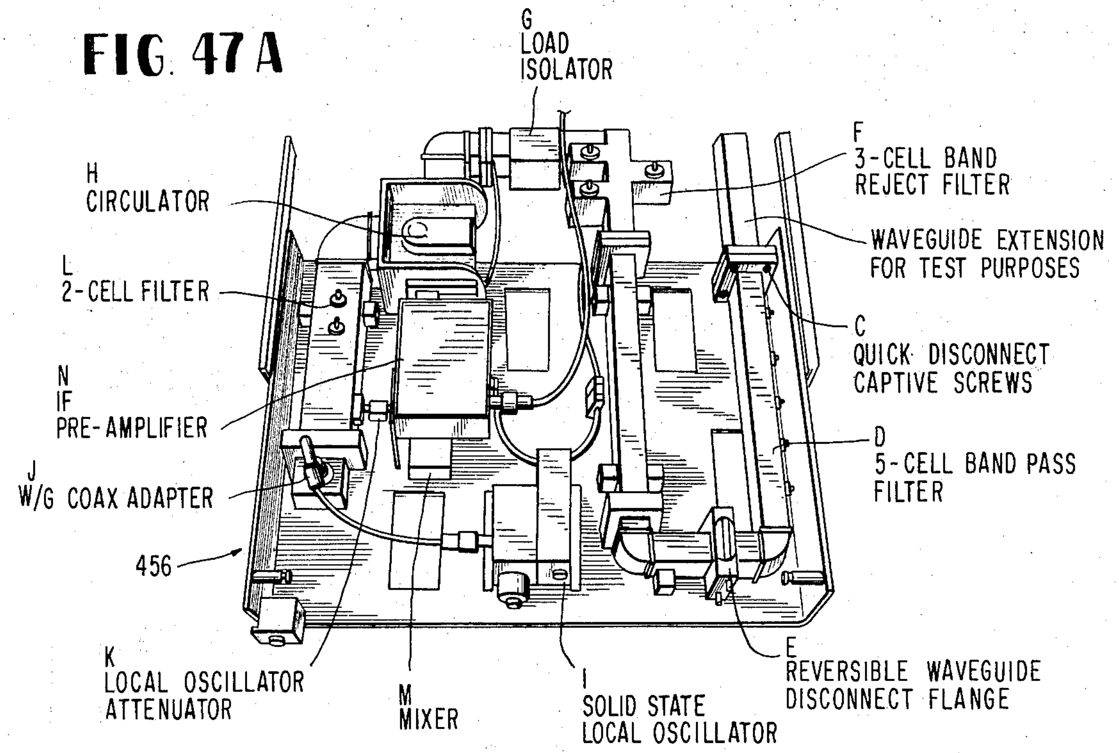
Figure 47B:
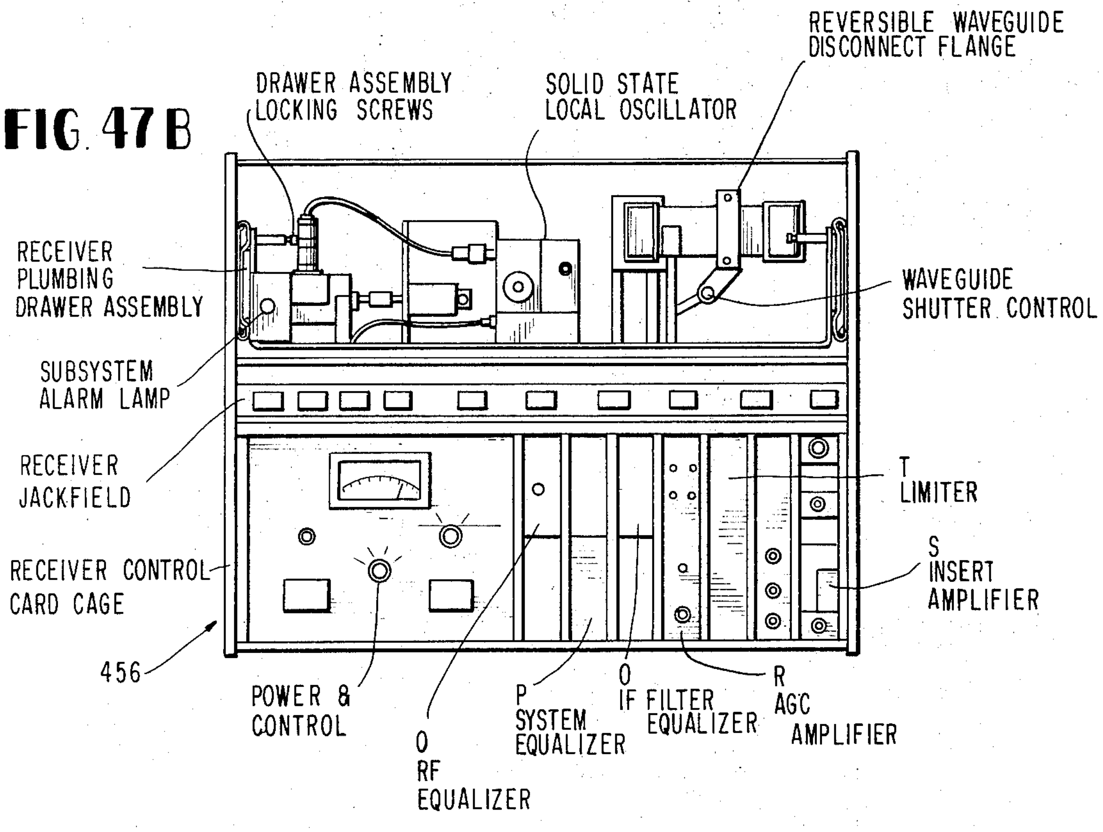
Figure 48:
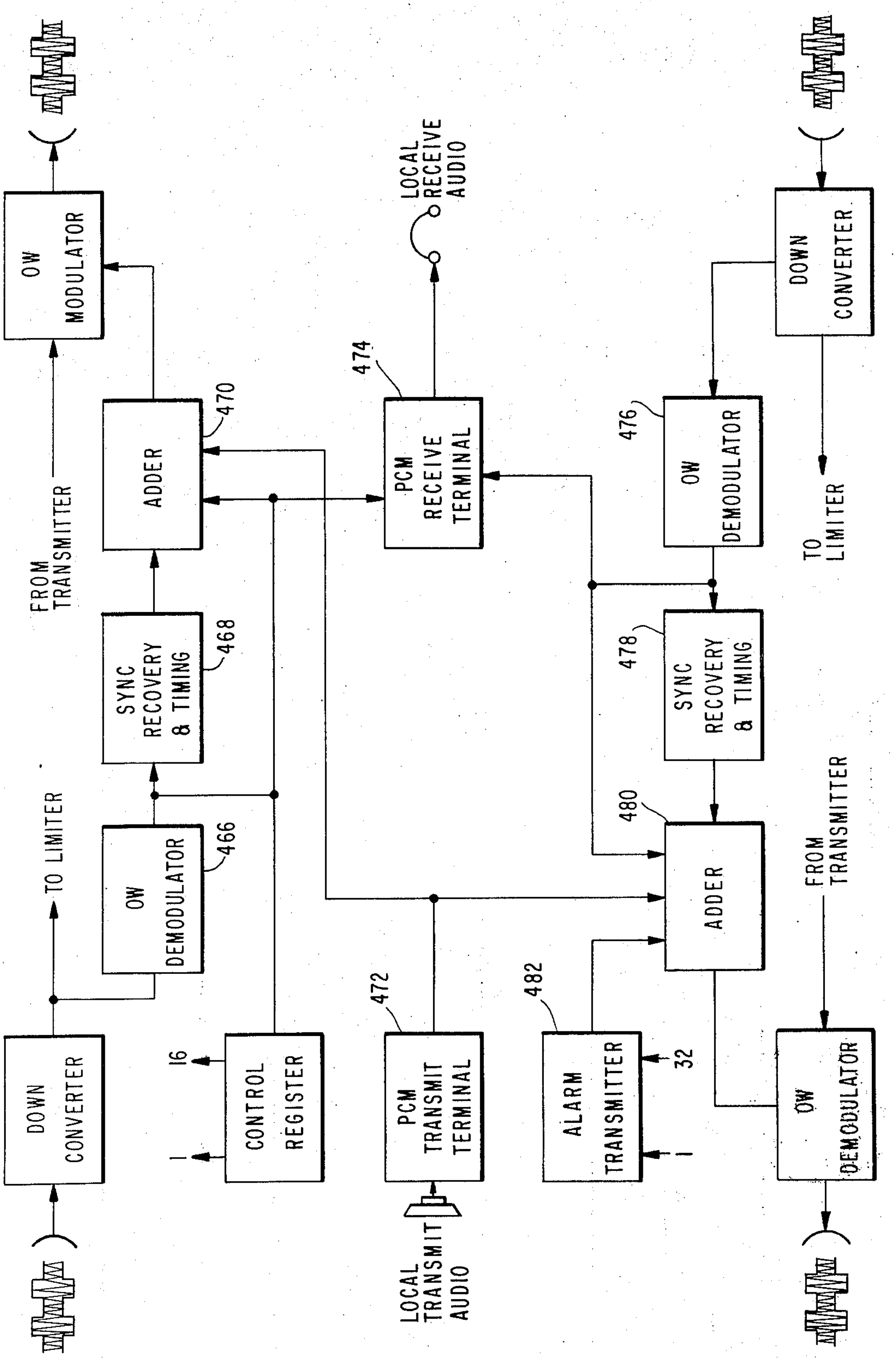
Figures 49, 50:
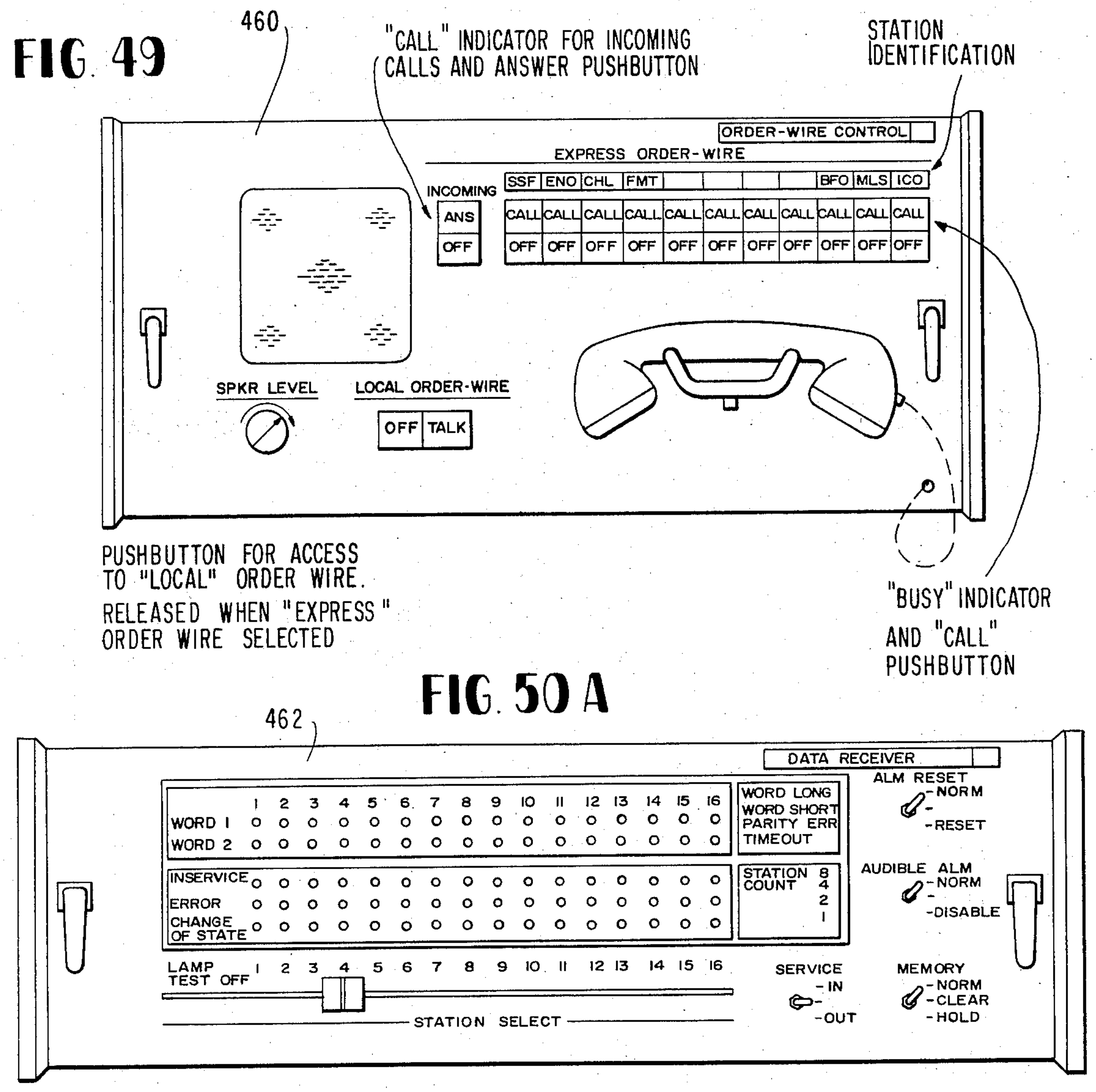
Figure 50B:
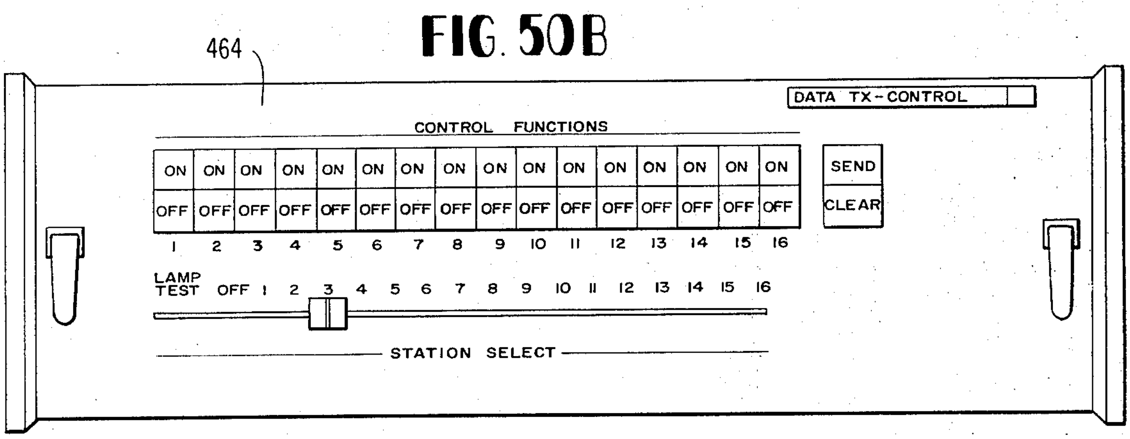
Figure 51A:
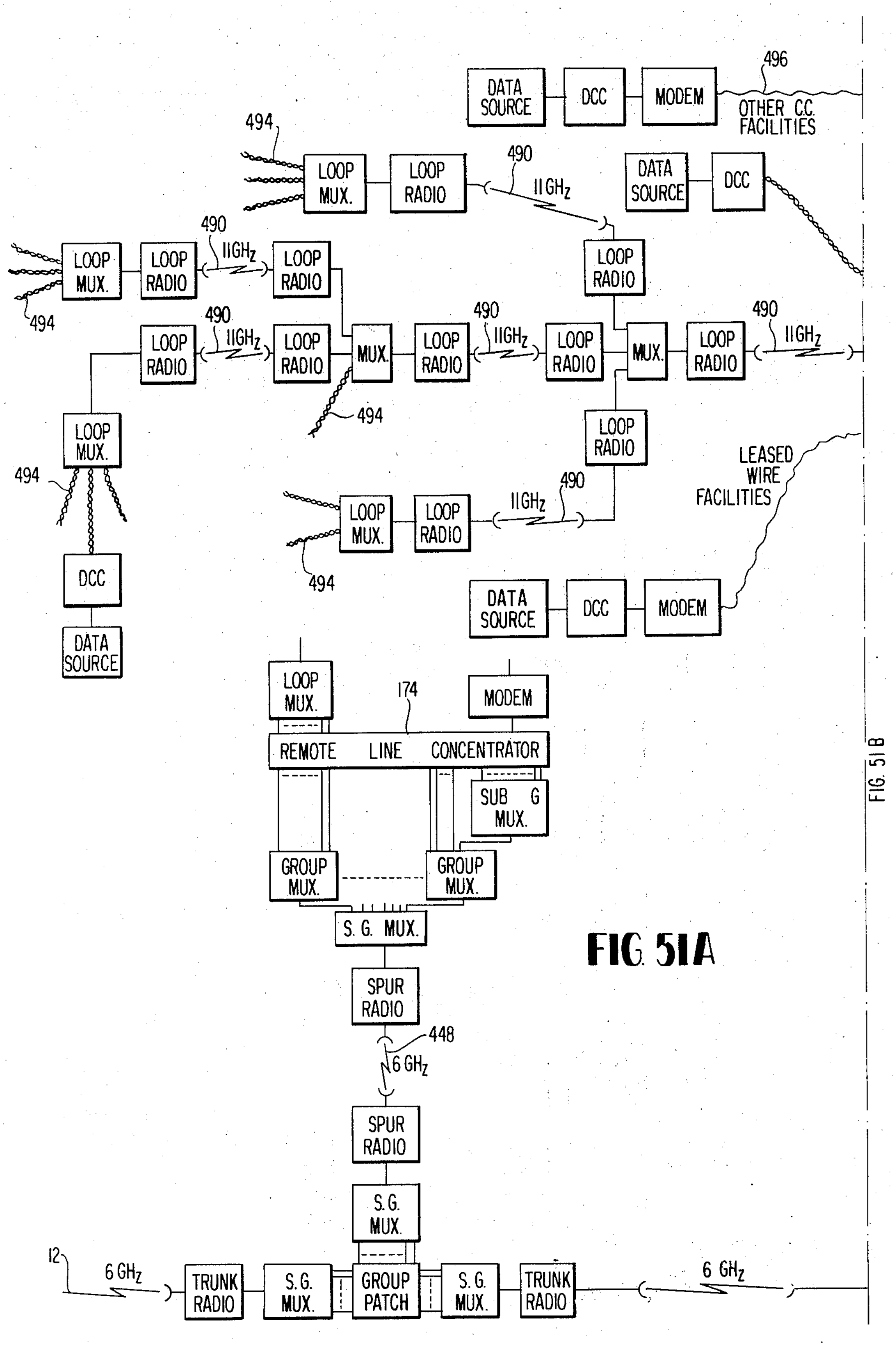
Figures 51A, 51B:
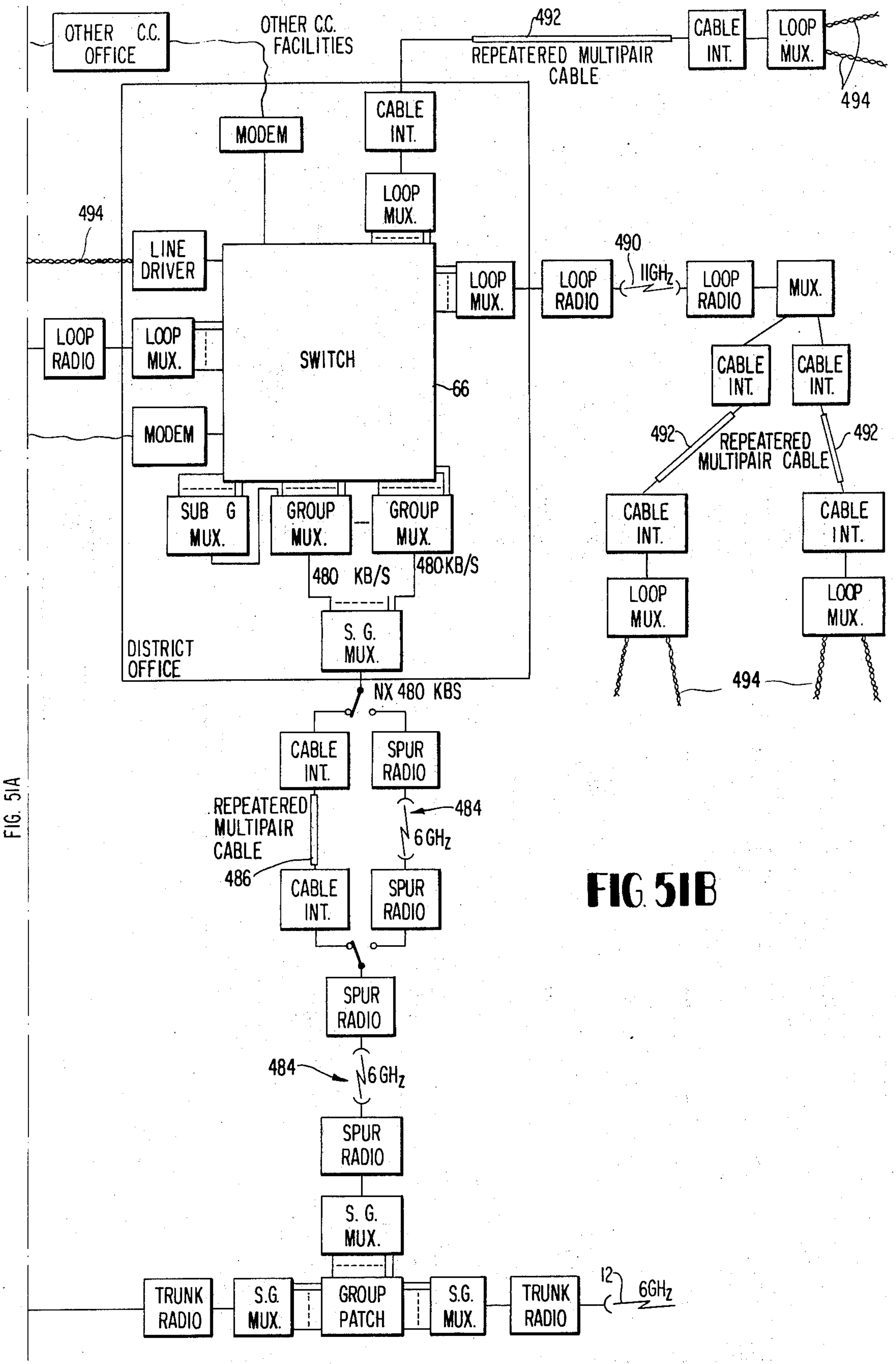
Figure 52:
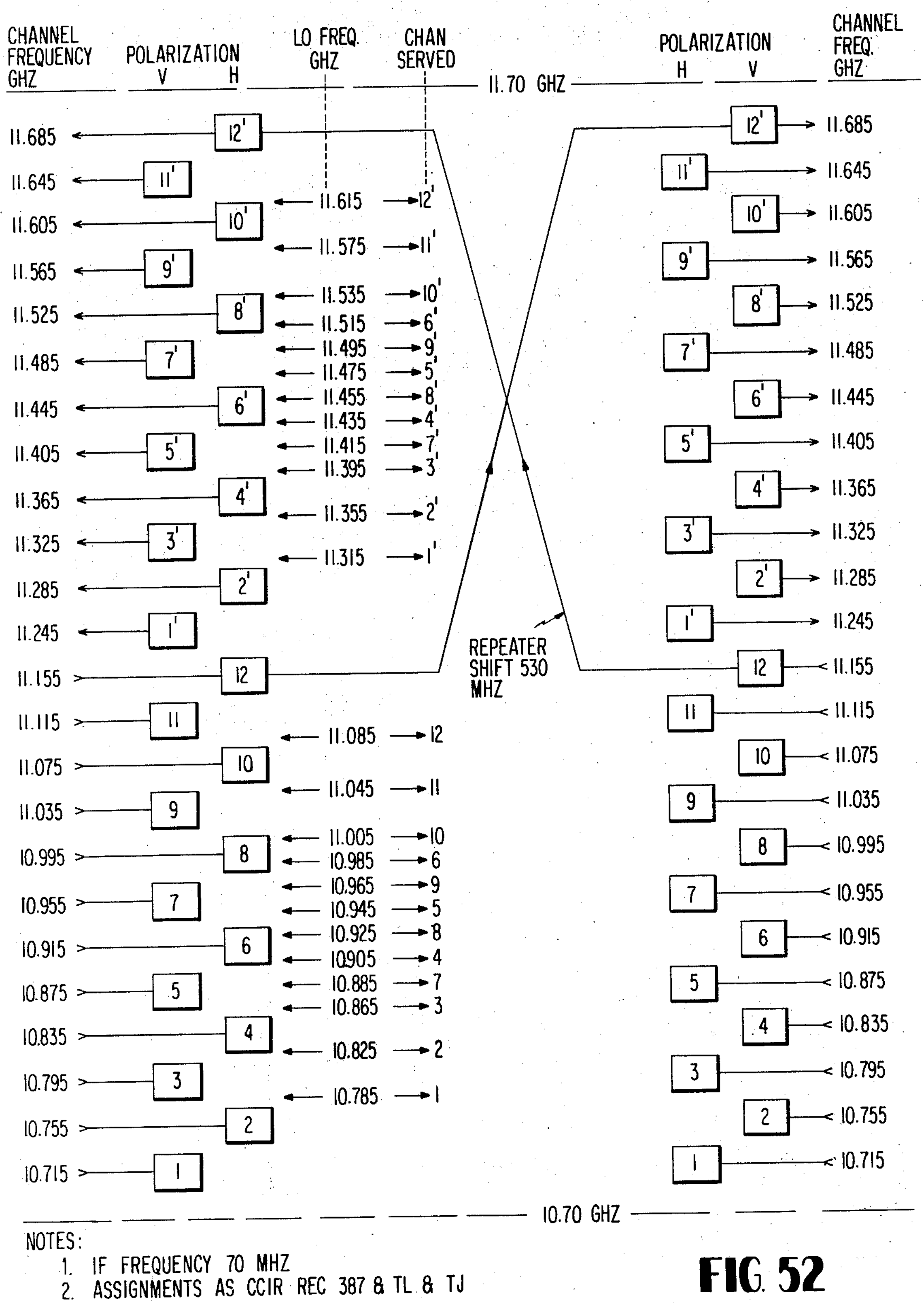
Figure 53:
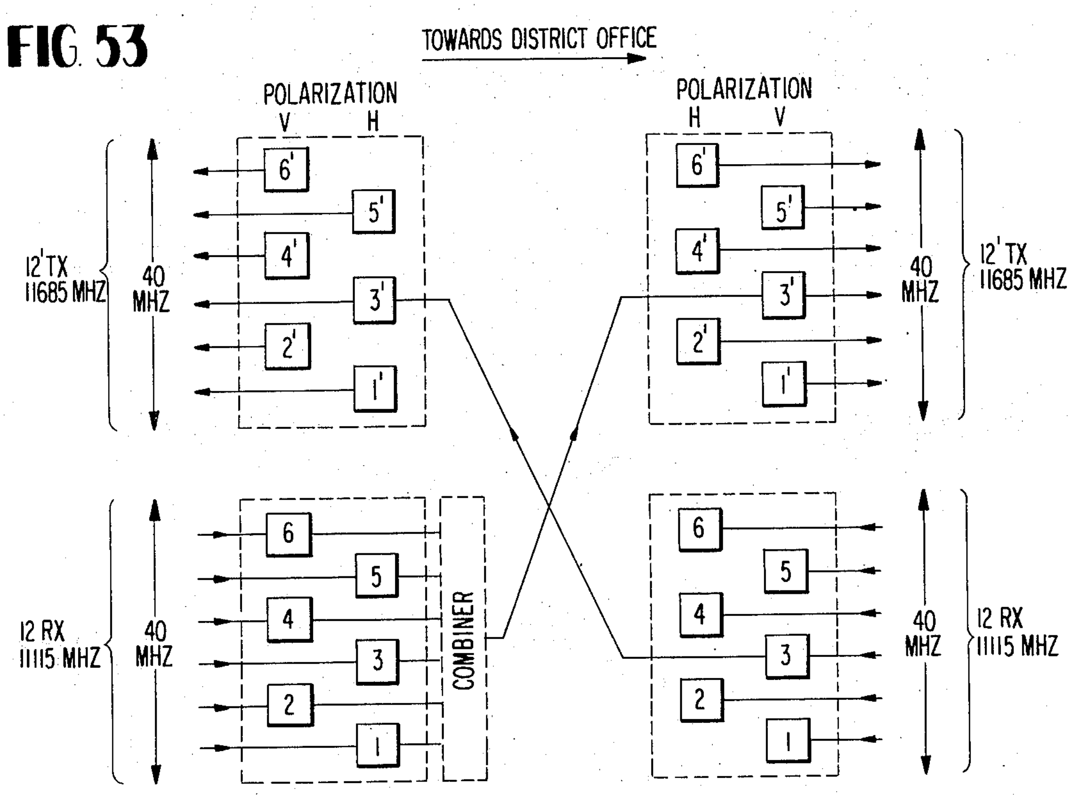
Figure 54:
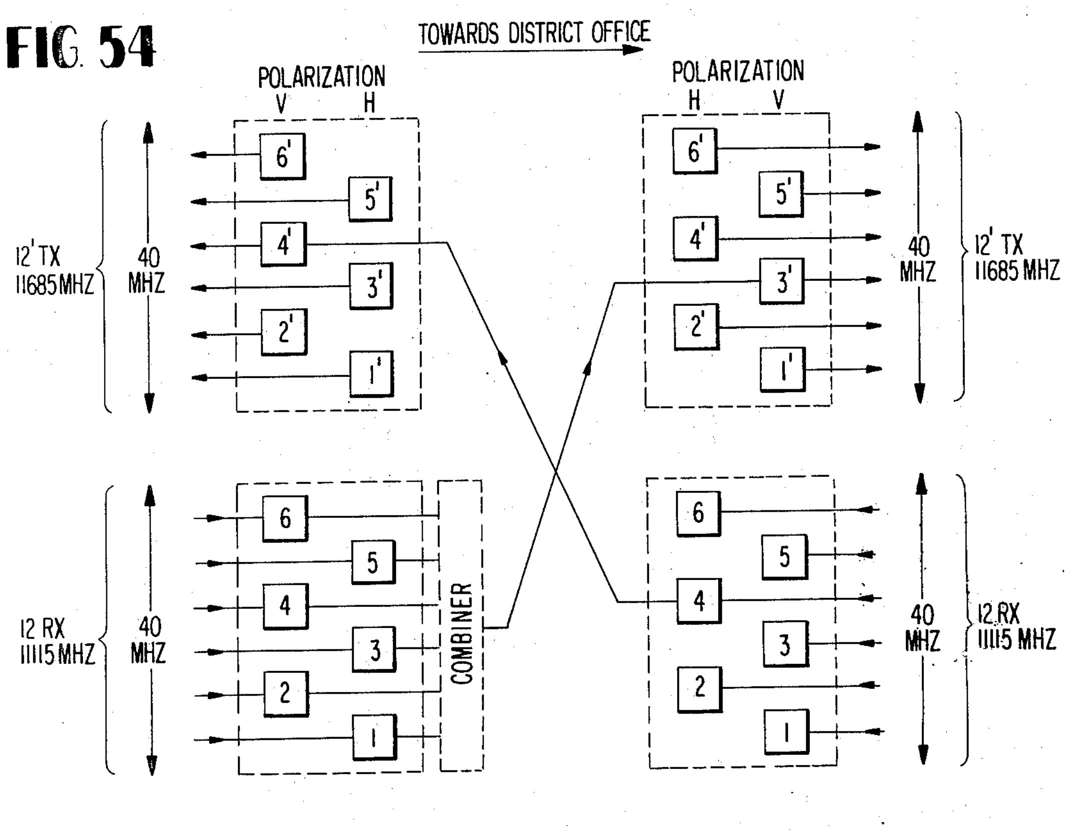
Figure 55:
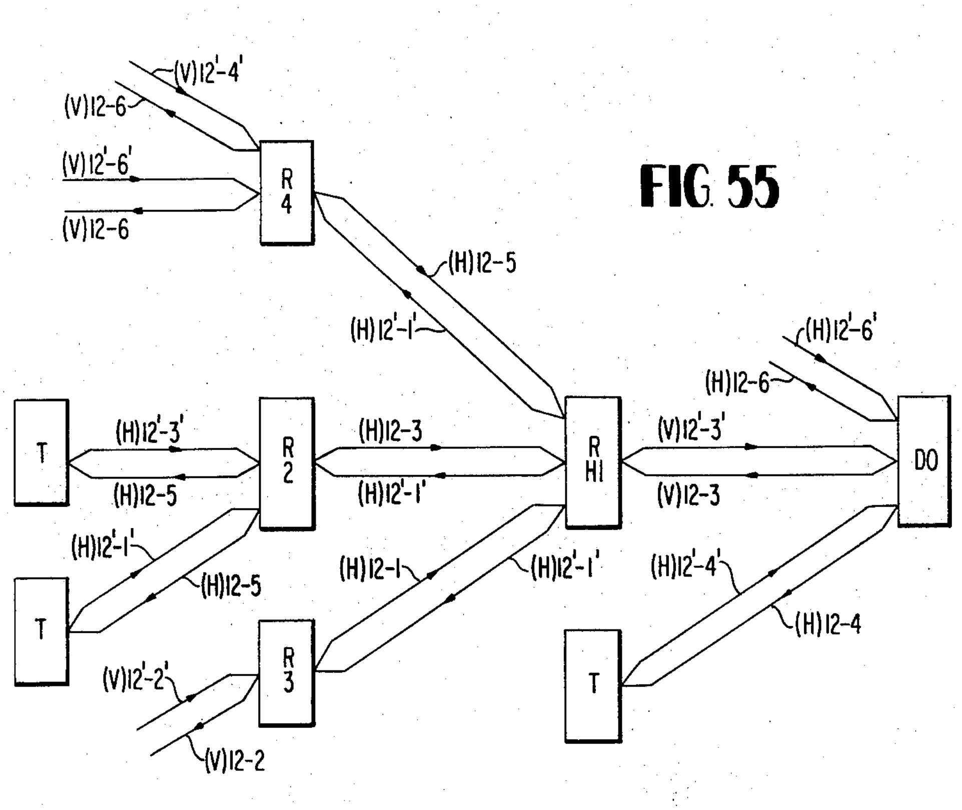
Figure 57:
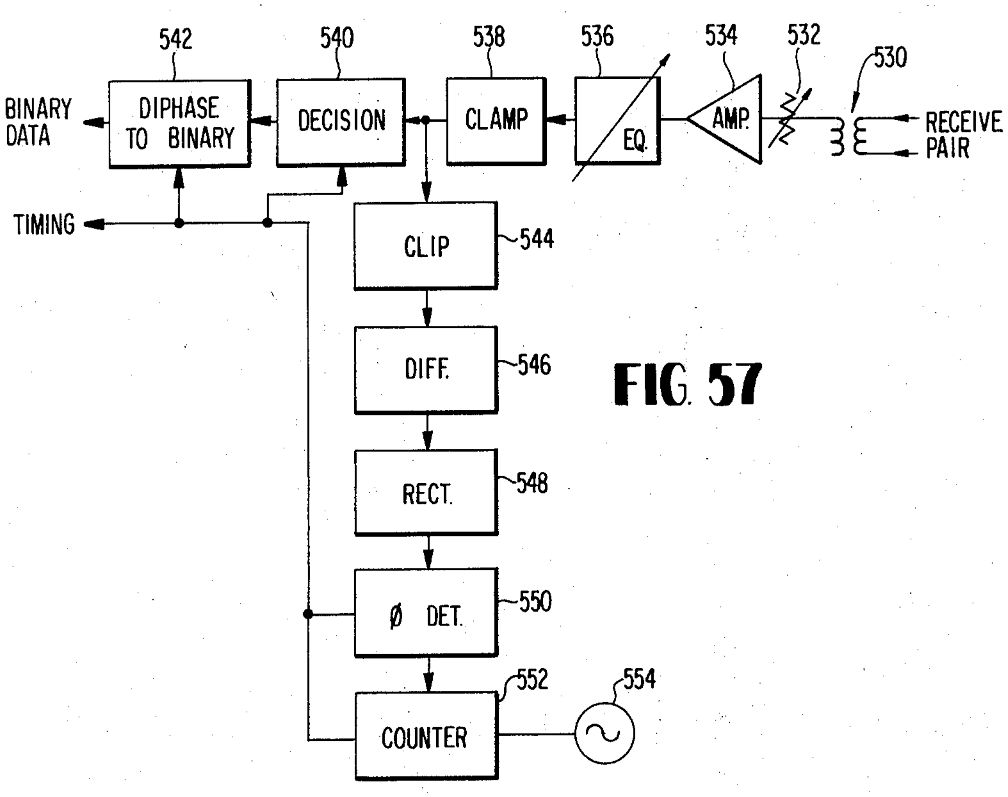
Figure 56:
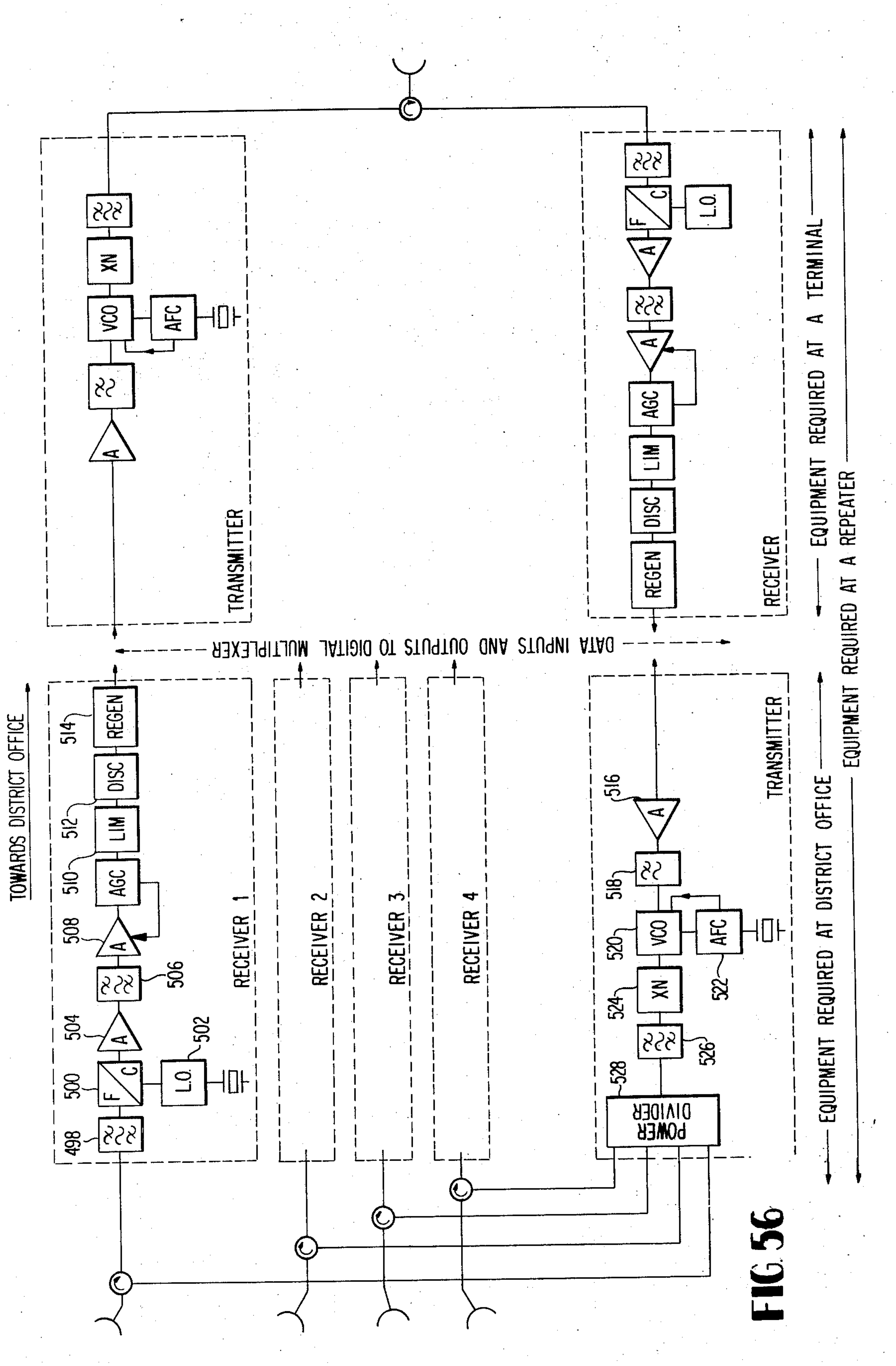
Figure 58:
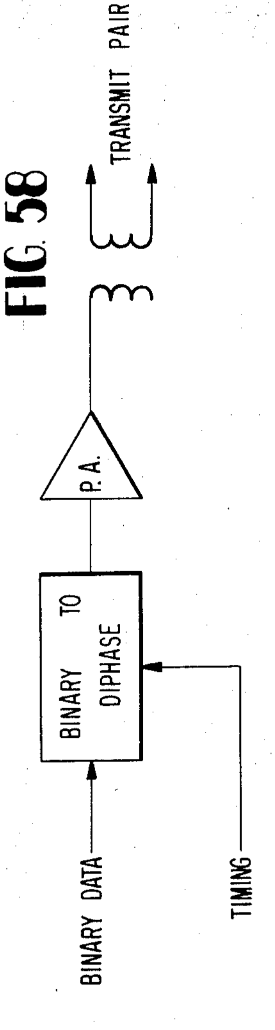
Figure 59:
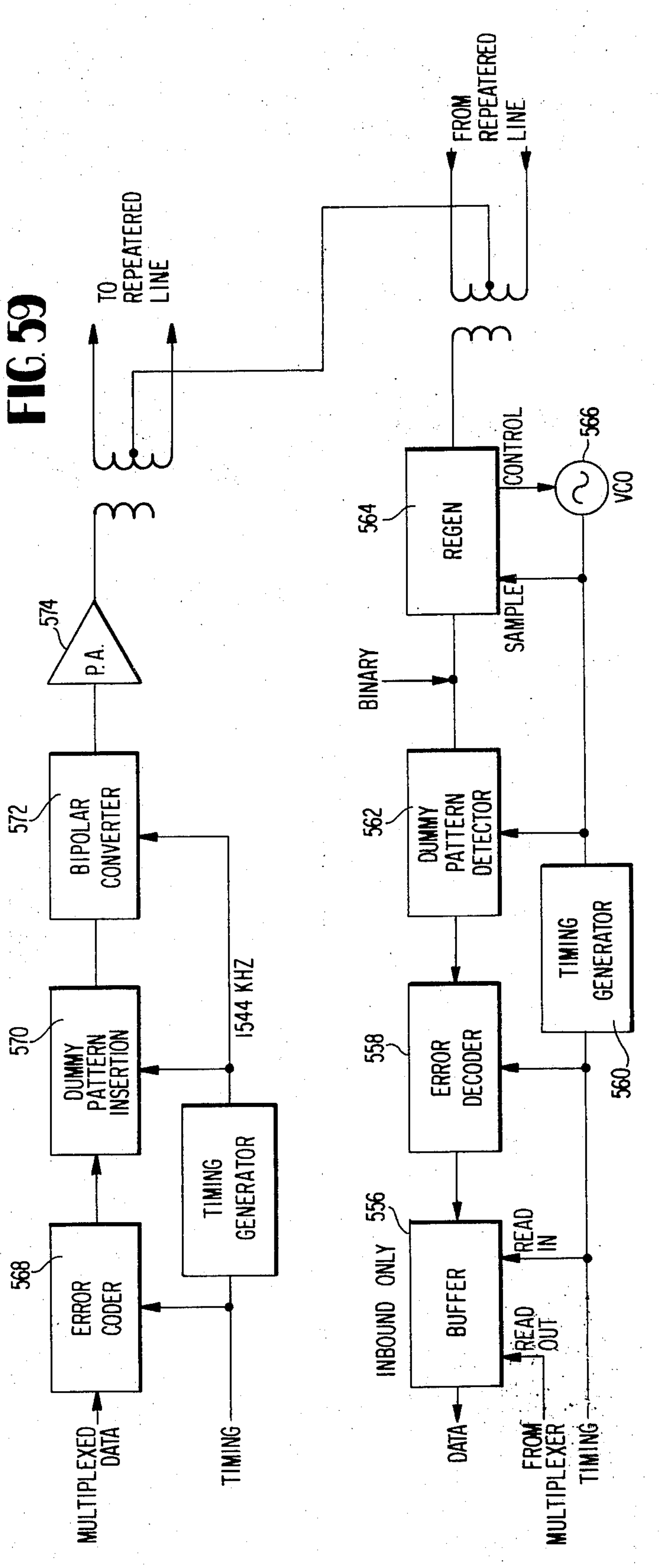
Figure 60:
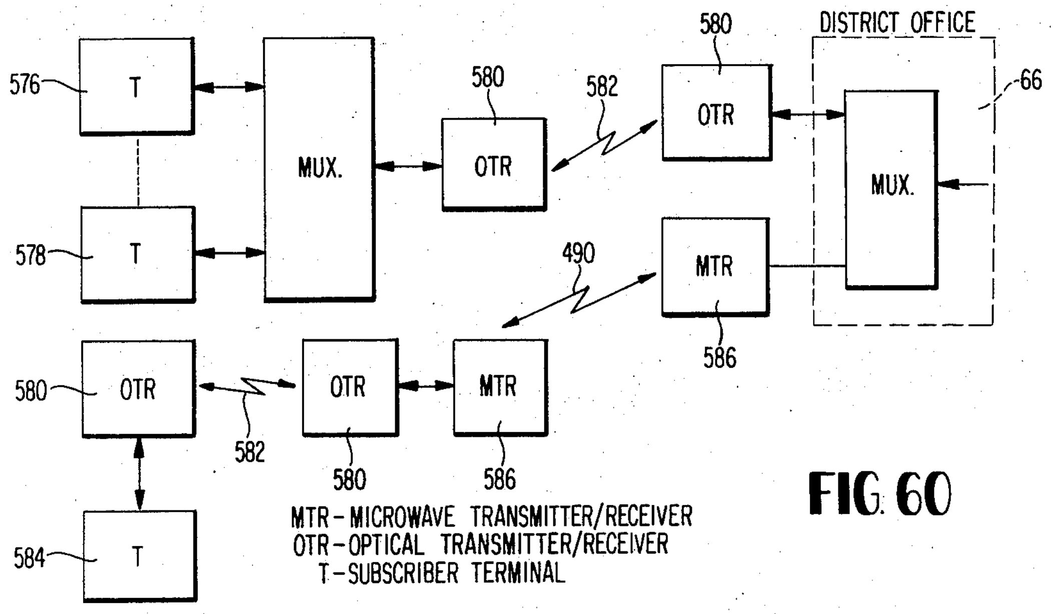
Figure 61:
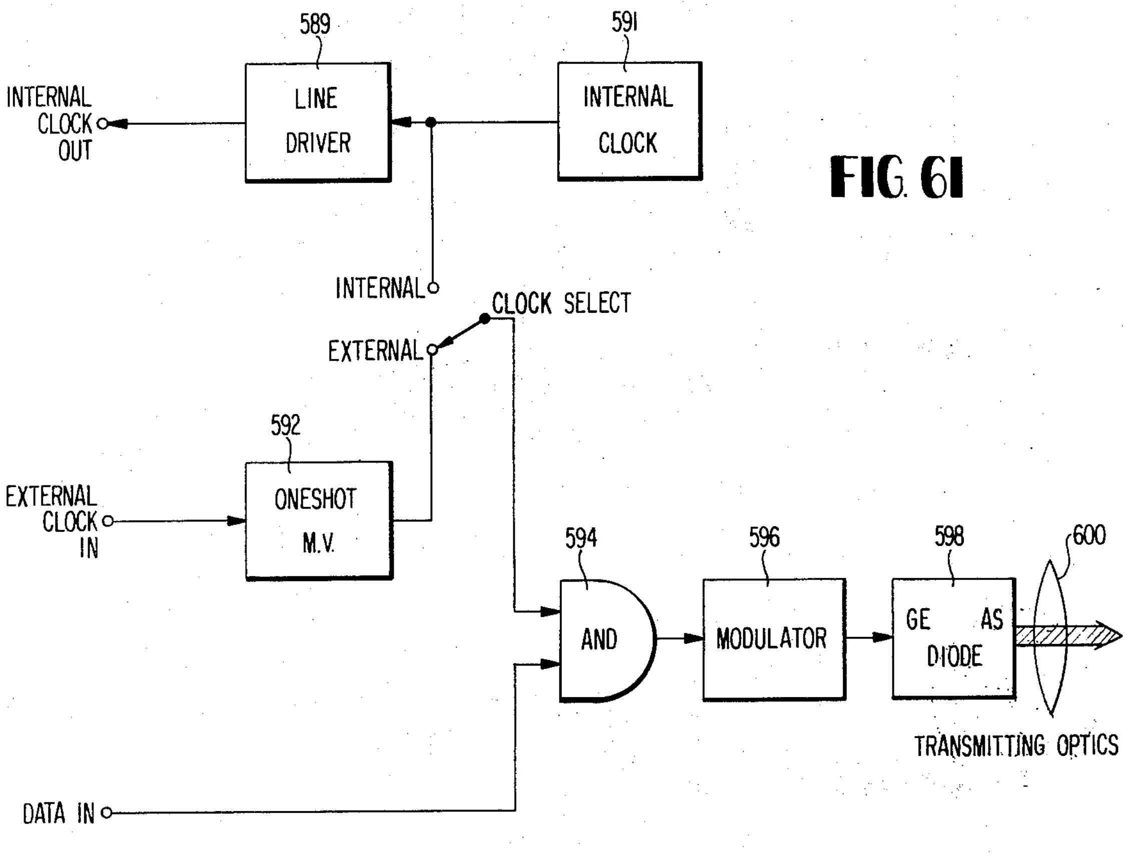
Figure 62:
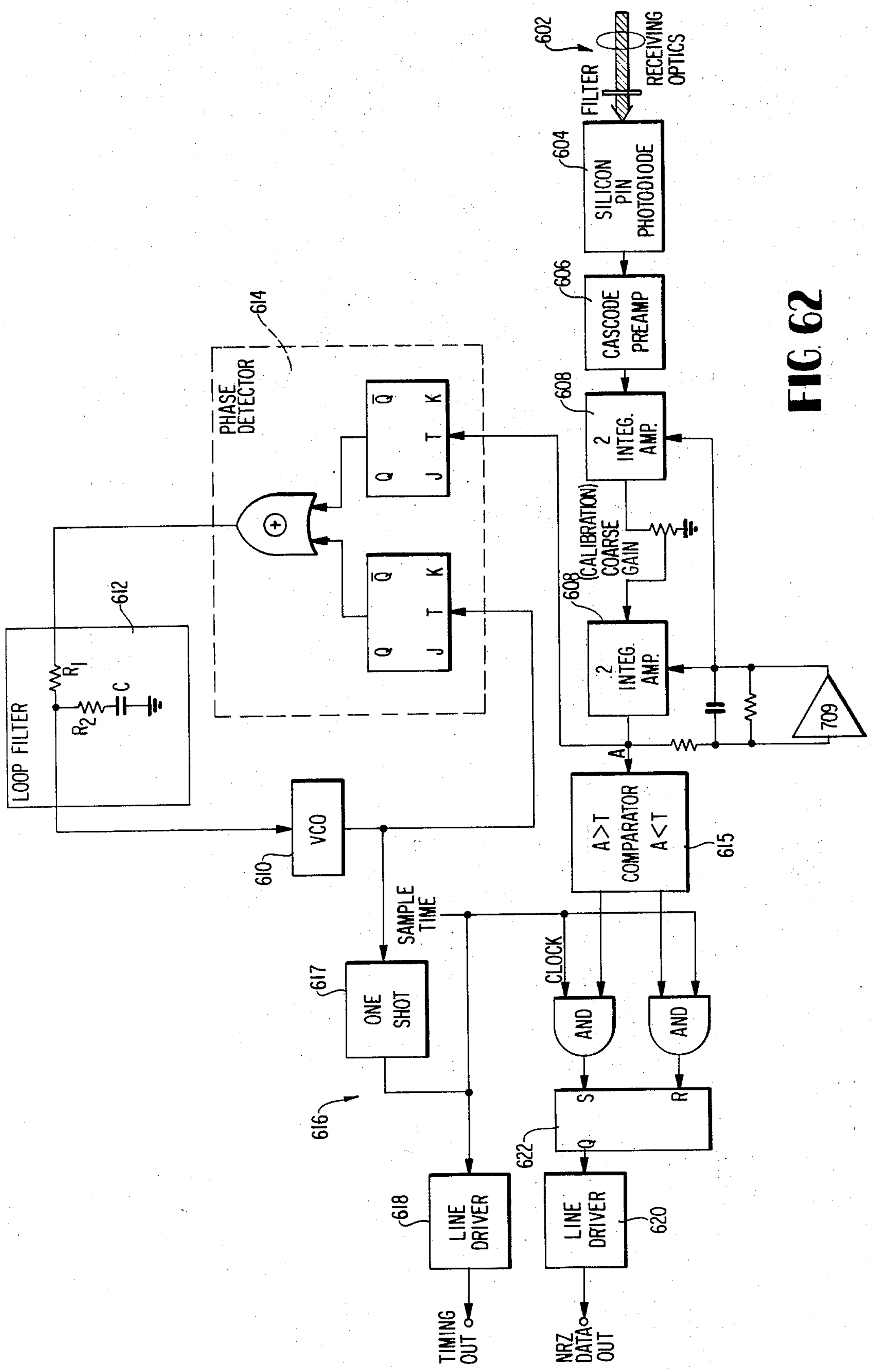
Figure 66:
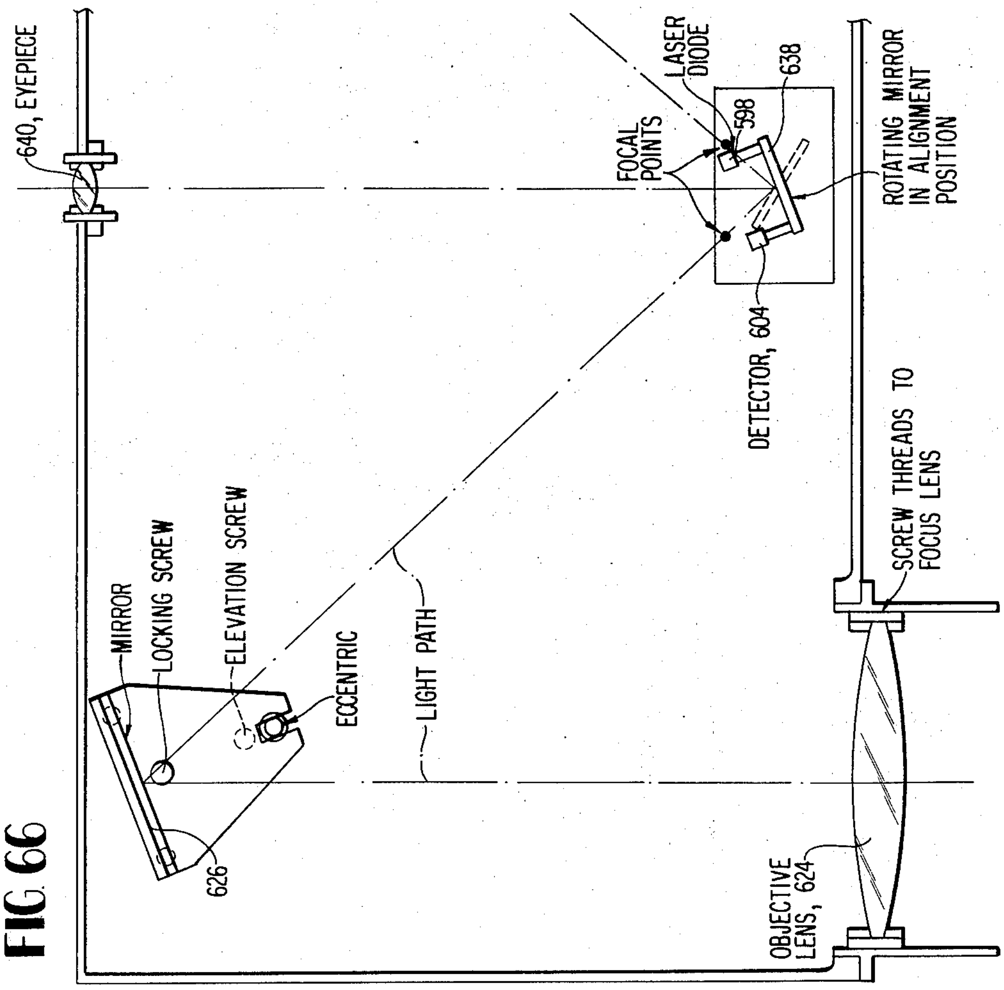
Figure 63:
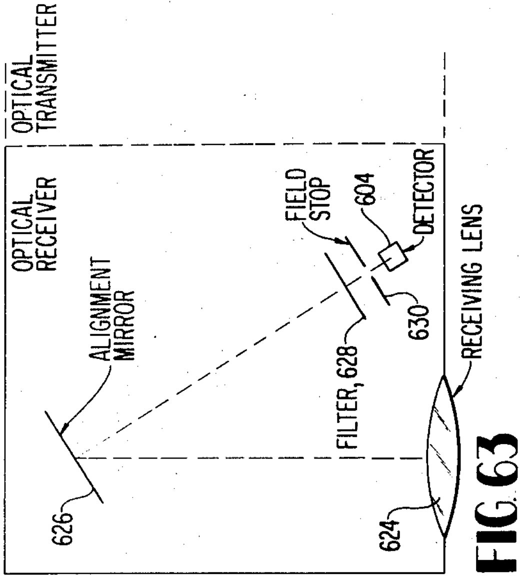
Figure 64:
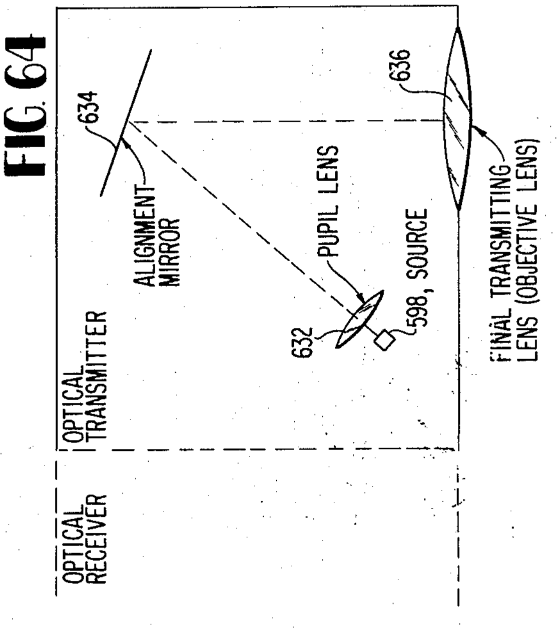
Figure 65:
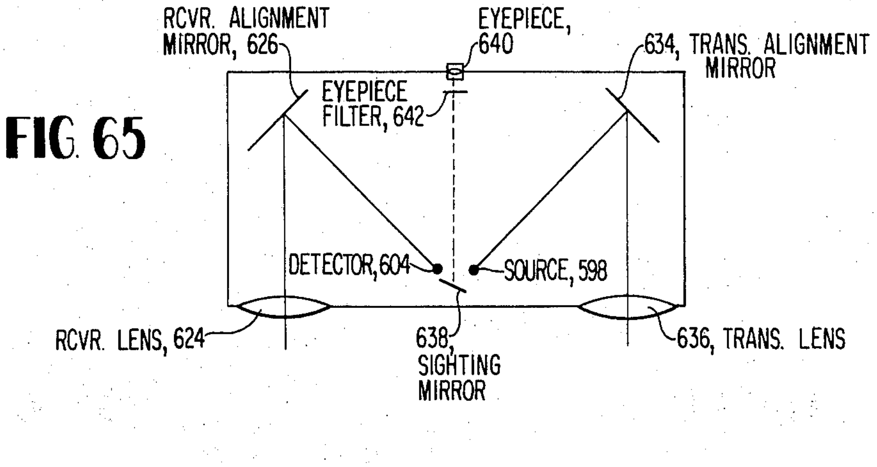
Figure 67:
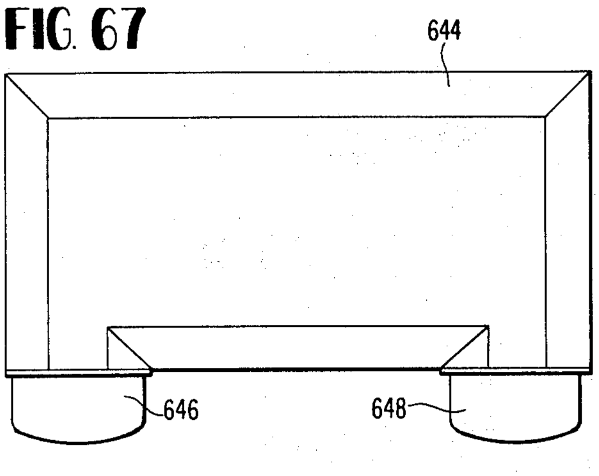
Figure 68:
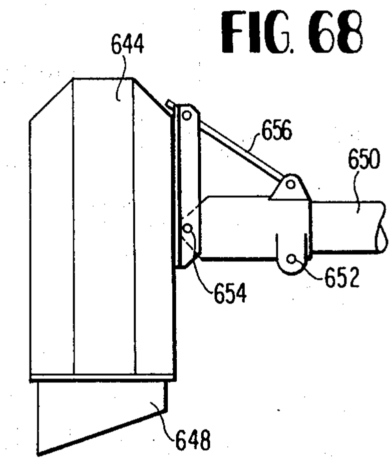
Figure 69:
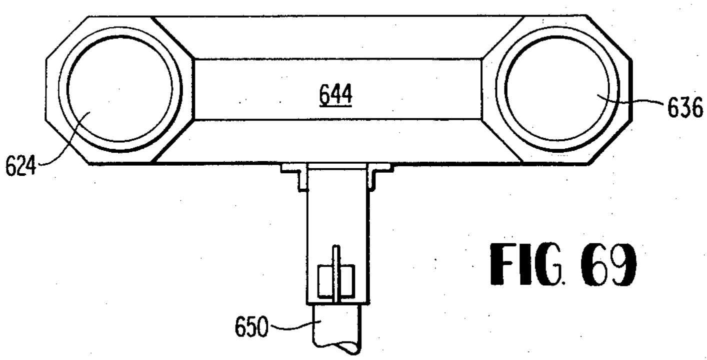
Figure 70A:
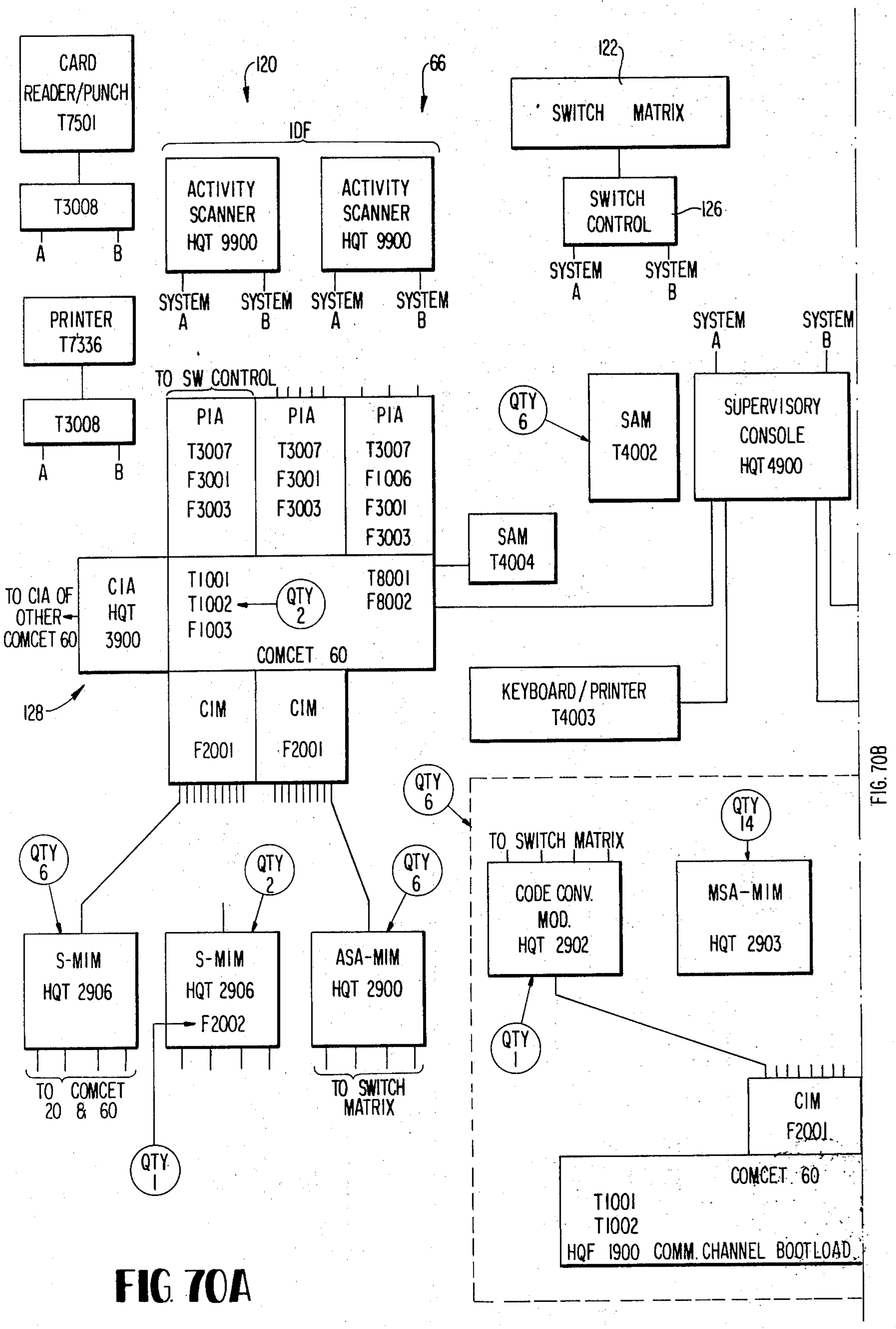
Figures 70A, 70B:
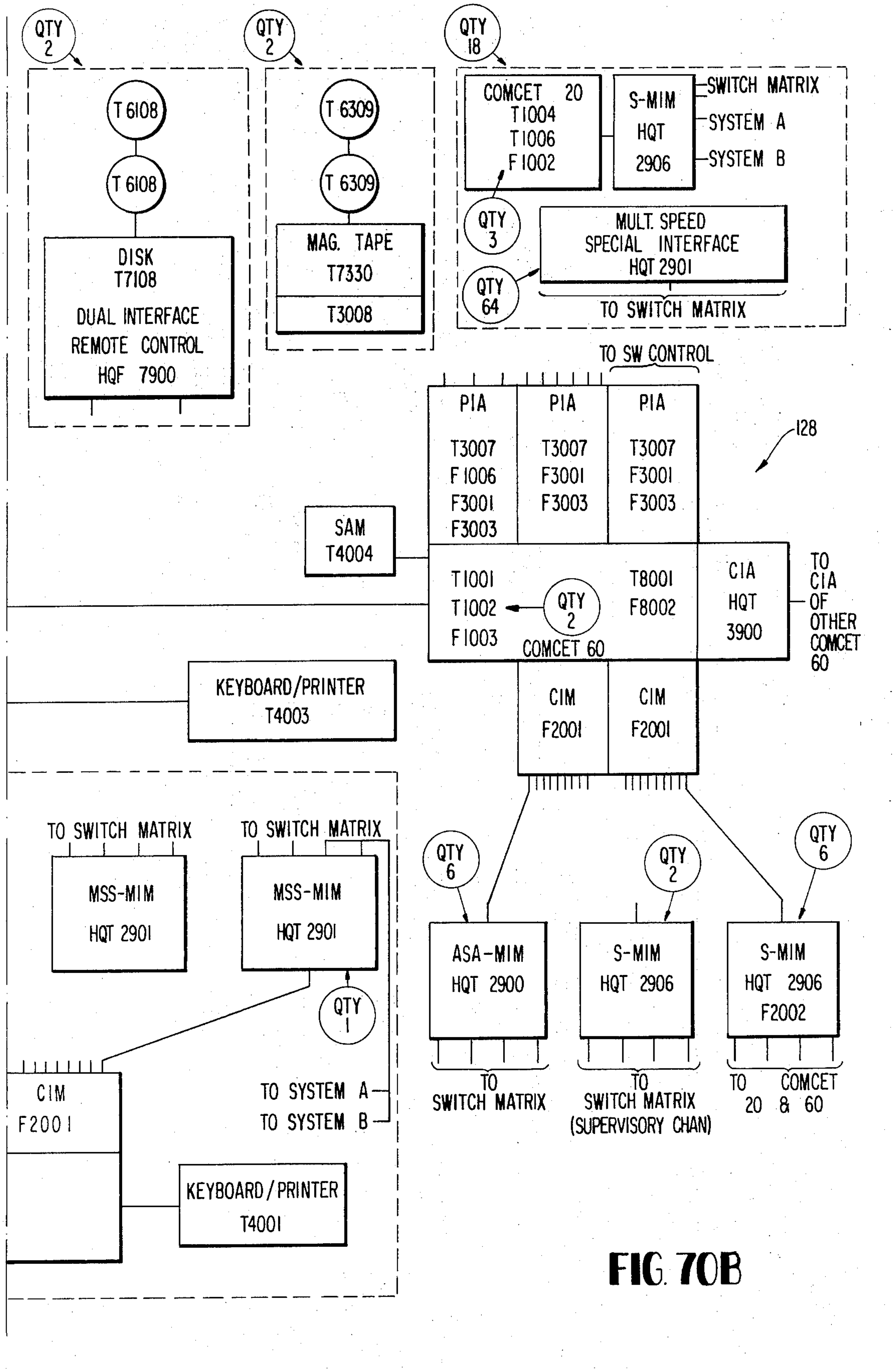
Figures 71A, 71B:
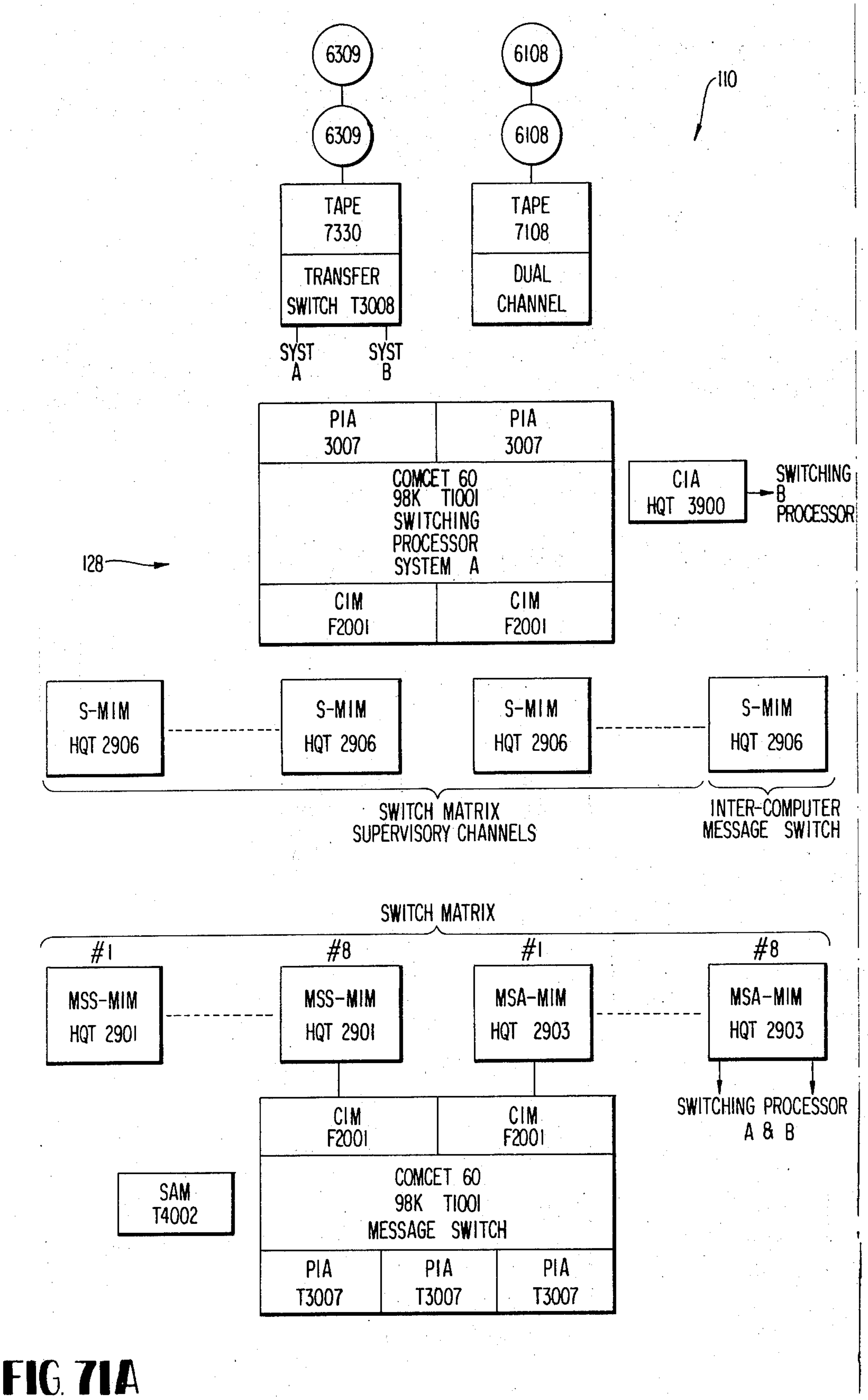
Figure 72:
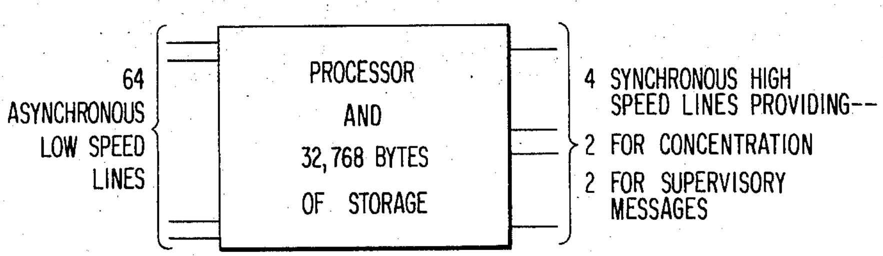
Figure 73:
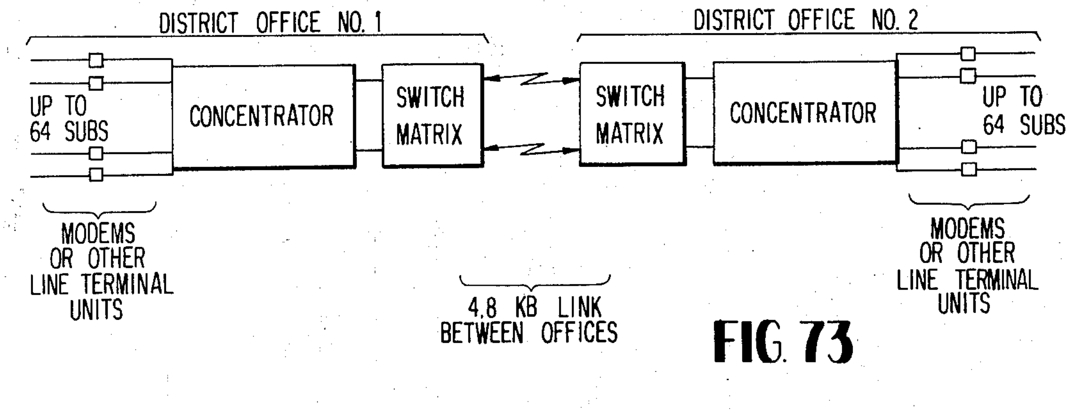
Figure 74:
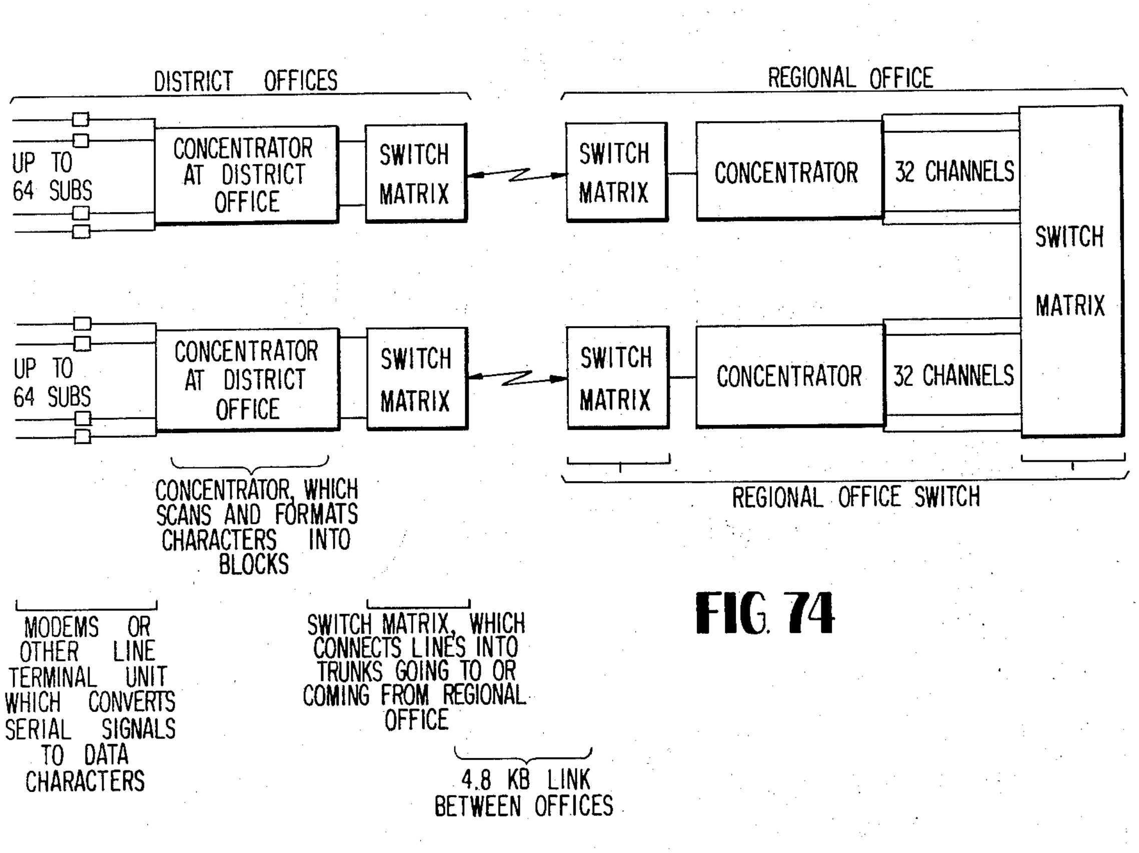
Figure 75:
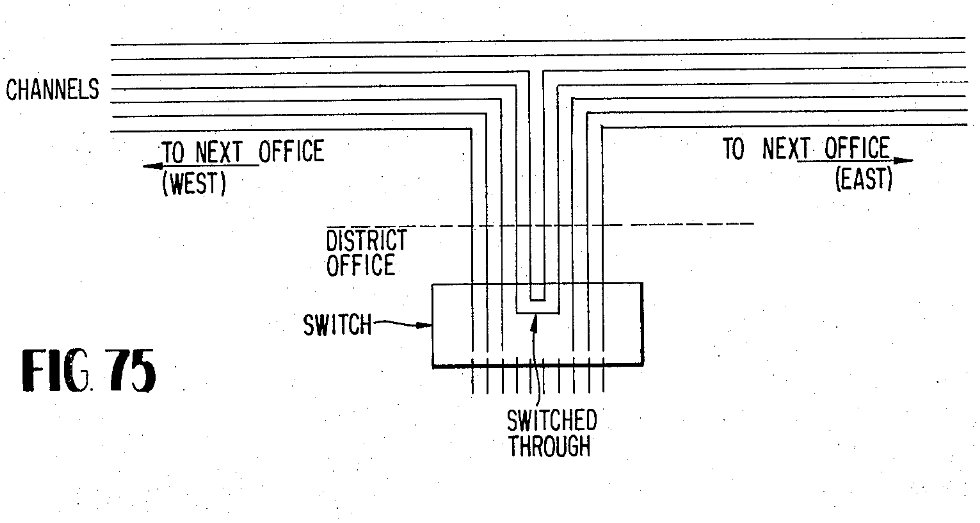
Figure 76:
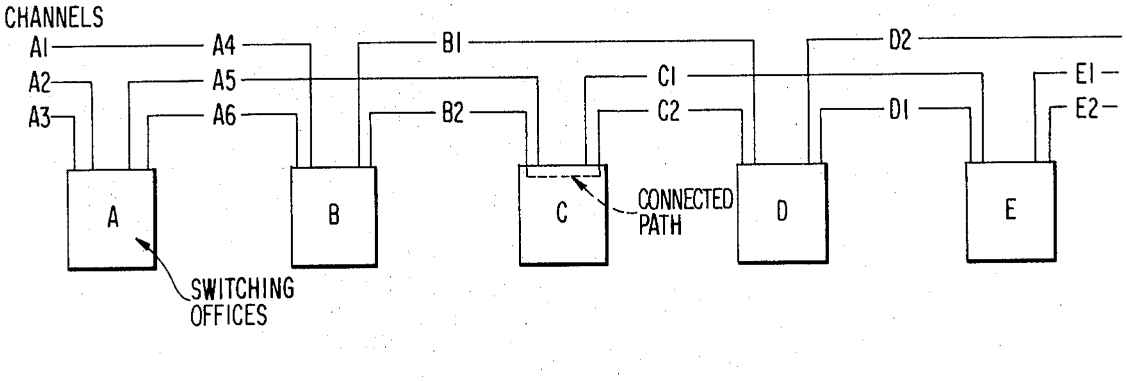

FIGS. 19A, 19B, and 19C, taken together, show a multiplexer system block diagram construction in accordance with the present invention;

FIG. 20 is a block diagram of a subscriber group multiplexer;

FIG. 21 is a block diagram showing multiplexer port strapping;

FIGS. 22A and 22B, taken together, is a block diagram of a multiplexer set;

FIG. 23 is a line concentrator flow diagram;

FIGS. 24A and 24B, taken together, form a line concentrator block diagram;

FIGS. 25A and 25B, taken together, form a line concentrator crosspoint matrix;

FIG. 26 is a perspective view of a multiplexer/demultiplexer constructed in accordance with the present invention;

FIG. 27 is a similar perspective view of the multiplexer/demultiplexer with parts removed for the sake of clarity;

FIG. 28 is a perspective view of a line concentrator with parts omitted for the sake of clarity;

FIG. 29 is a perspective view of the line concentrator of FIG. 28 showing the line concentrator control panel;

FIG. 30 is an illustration showing one method of sampling data in accordance with the system of the present invention;

FIG. 31 is a diagram showing the frame of data samples in accordance with the method of FIG. 30;

FIG. 32 is a diagram showing the allocation of chips per frame in accordance with the method of FIG. 30;

FIG. 33 is a transmitter block diagram for the trunking system of the present invention;

FIG. 34 is a receiver block diagram of the trunking system of the present invention;

FIG. 35 is a block diagram of a one-way repeater constructed in accordance with the present invention having an auxiliary channel;

FIG. 36 is a block diagram of a two-way repeater constructed in accordance with the present invention;

FIG. 36A is a diagram illustrating the function and operation of a branching two-way repeater forming a part of the system of the present invention;

FIG. 37 is a block diagram of a minimum shift keying modulator constructed in accordance with the present invention;

FIG. 38 is a block diagram of a minimum shift keying demodulator used in the trunking system of the present invention;

FIG. 39 is a transmitter converter block diagram;

FIG. 40 is a block diagram of a pump oscillator used in the converter of FIG. 39;

FIG. 41 is a block diagram of a traveling wavetube waveguide assembly for the transmitter;

FIG. 42 is a block diagram of an IF heterodyne receiver;

FIG. 43 is a front view of a transmitter and receiver cabinet;

FIG. 44 is a view of the transmitter and receiver cabinet of FIG. 43 with the front removed;

FIGS. 45A and 45B are perspective and front views respectively of the transmitter converter;

FIGS. 46A and 46B are perspective and front views respectively of the traveling wavetube amplifier;

FIGS. 47A and 47B are perspective and front views respectively of the IF heterodyne receiver;

FIG. 48 is a simplified block diagram of the order wire, control and alarm;

FIG. 49 is a view of the order wire control panel; FIG. 50A is a front view of a fault alarm receiver;

FIG. 50B is a front view of a control function transmitter;

FIGS. 51A and 51B, taken together, show a typical trunk and loop local distribution system constructed in accordance with the present invention;

FIG. 52 shows a basic local distribution frequency plan;

FIG. 53 shows a local distribution system subfrequency plan;

FIG. 54 shows an alternate local distribution system subfrequency plan;

FIG. 55 shows a partial expansion of the local distribution system frequency plan;

FIG. 56 is a block diagram of a local distribution radio system;

FIG. 57 is a block diagram of a wire line driver;

FIG. 58 shows a binary to di-phase coupling for a transmission pair;

FIG. 59 is a block diagram of an interface unit for repeatered cable;

FIG. 60 is a block diagram of a local distribution facility using an optical system;

FIG. 61 is a simplified block diagram of an optical transmitter for the local distribution system of FIG. 60;

FIGS. 62A and 62B, taken together, form an optical receiver block diagram;

FIG. 63 is a schematic diagram of the receiver optics;

FIG. 64 is a schematic diagram of the transmitter optics;

FIG. 65 is a schematic diagram illustrating transmitter and receiver optical alignment;

FIG. 66 is a schematic half view of a production transceiver package with cover removed;

FIG. 67 is a plan view of the optical transceiver;

FIG. 68 is a side view of the optical transceiver of FIG. 67;

FIG. 69 is an elevational view of the optical transceiver;

FIGS. 70A and 70B, taken together, show a detailed block diagram of a district office configuration;

FIGS. 71A and 71B, taken together, is a detialed block diagram of a regional office configuration;

FIG. 72 shows a processor used in the system of the present invention;

FIG. 73 shows an arrangement in block form for concentration of asynchronous data for intra-regional communications;

FIG. 74 is a block diagram showing concentration of asynchronous data for inter-regional communications;

FIG. 75 is a diagram illustrating dynamic trunk allocation;

FIG. 76 is a diagram illustrating dynamic trunk configuration; and

Figure 77:
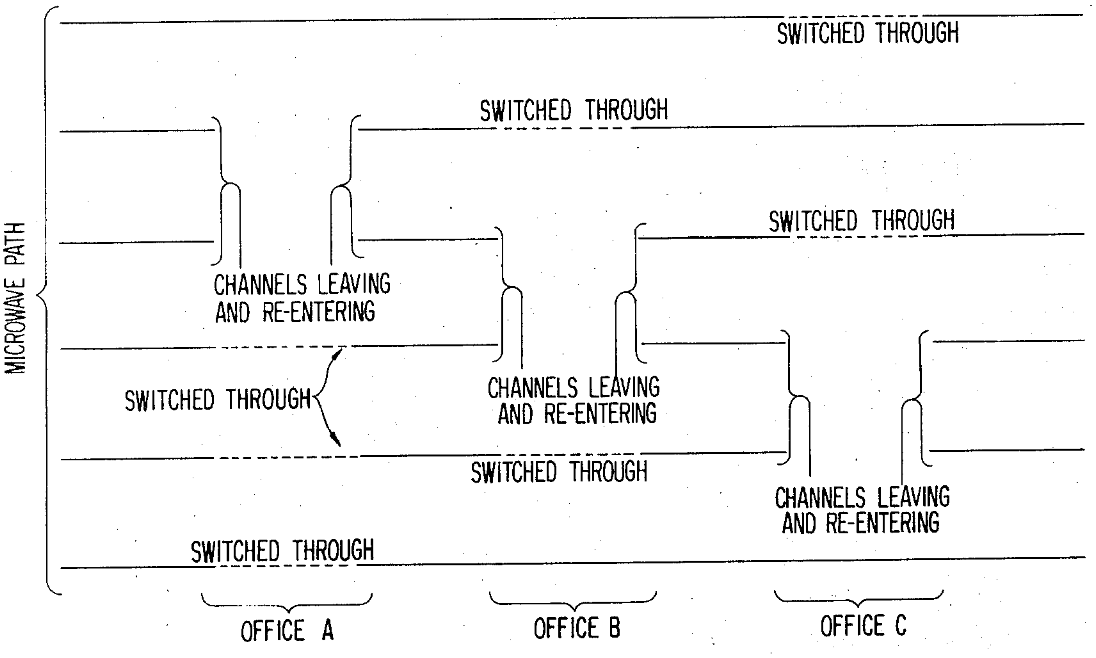

FIG. 77 is a diagram illustrating channel switching in the microwave paths.

DEFINITIONS

Following is a definition of terms used in this disclosure. Unless otherwise indicated, the terms are intended to have the meaning set forth in these definitions.

Active. A signal indicating (1) a subscriber terminal is originating a call, (2) a subscriber terminal is busy, or (3) a subscriber terminal is answering a call.

Address. A number which identifies a subscriber within the transmission network.

Activity Scanner. A device used to detect active or clear condition of a subscriber terminal. It also has the capability of transmitting signals to the subscriber terminal.

Analog. Pertaining to electrical quantities which vary in a continuous manner as opposed to digital where a discrete number of electrical states exist.

Automatic Addressing. Pertaining to automatic addressing on a communications network by a machine, such as a computer.

Availability. The number of hours that a system will be fully available for all system capabilities before failure. Failures include software as well as hardware faults. System availability can be increased by providing redundancy.

Baud. A term meaning bits per second for binary data transmission systems.

Branching Repeater (BR). The point where offices bridge on to the microwave path taking a number of channels from both directions and feeding them into the office.

Callback. In the event the called party is busy, the calling party is called back after the called party has been connected.

Central Office (CO). An office to provide for gathering billing and traffic data, to prepare customer billing and to analyze network performance.

Channel. A nominal 4,800 bit per second (4.8 KB) transmission path. This is the basic path controlled by the network to transmit information.

Chip. One sample of one data channel. This is the basic increment of time used in this time division multiplex microwave modulation system.

Circuit Switching. Provides direct subscriber to subscriber circuit connections, through one or more switching centers.

Class of Service. The customer's requirements, such as code format, lines feed, bandwidth requirements, and other special capabilities.

Clear. A signal indicating (1) a subscriber terminal is terminating a call, or (2) a subscriber terminal is not busy.

Communications Common Carrier. A company which dedicates its facilities to a public offering of communications services, and which is subject to public utility regulations.

Concentrator. A full duplex device with several low speed switch terminations and one high speed switch termination used in this system to multiplex/demultiplex a number of low speed asynchronous lines onto one 4.8 KB channel.

Conferencing. A circuit switched service which allows connections between three or more subscribers simultaneously.

Contact. A two-state switching device possessing a low transmission impedance in one state and a very high impedance in the other.

Crosspoint. A term associated with a coordinate of a switch matrix which may consist of one or more sets of ganged contacts.

Crosstalk. The undesired signal injected into a communication circuit from other communication circuits. Expressed in decibels, the ratio of undesired signal to the desired signal for a given circuit.

Customer. Any individual or organization which rents or leases a transmission capability in the described transmission network.

Data Set (MODEM). A modulator-demodulator and control circuitry interfacing a communication line to a terminal device.

Digital. Pertaining to discrete electrical quantities as opposed to analog.

Digital Adapter. A device which performs the subscriber's signalling functions for data terminals connected to the subject transmission network.

District Office (DO). An office containing switching hardware providing the interface between one subscriber and another subscriber by way of a local connection or by way of a trunk to another office.

Distortion. A type of "jitter" which results in the intermittent shortening or lengthening of the signals.

Drop and Insert Capability. The capability of a branching repeater which allows for a number of channels to branch from the crosscountry microwave link.

Dynamic Trunk Allocation (DTA). The switching of a number of channels in a given office at any time to reconfigure the network.

Erlang. A measure of traffic that one trunk can handle in 1 hour if it were occupied 100 percent of the time.

Erlang = Calls per hour × Average Holding Time per call (Sec.) 3,600

Error. Any discrepancy between a computed, observed or measured quantity and the true, specified, or theoretically correct value or condition.

Full Duplex. Simultaneous two-way communication capability.

Half Duplex. A two-way communication capability which permits transmission in both directions, but not simultaneously.

Intermediate Distribution Frame (IDF). A terminal in a switching center. It consists of jumpers to allow changeable connections between particular switches or jacks. The IDF serves as a line of demarcation between the switch matrix, its associated controls, and the outgoing lines and trunks. Multiplex equipment associated with subscriber circuits or trunks are not considered within the IDF boundary.

Intra-Office Call (Local Call). A call between two subscribers handled exclusively by a district office.

Lines. All types of communications facilities that may consist of telephone lines, coaxial cables, microwave or high frequency radio links.

Message Switching. A service provided which stores and forwards messages.

Multiplexer. A device which transmits/receives data from several sources simultaneously on the same channel.

Network. The entire communication facility described, including all offices, trunks and subscriber circuits.

Occupancy. The percentage of time that a traffic-carrying facility is busy.

Operator Call. A call identified by a unique address code requiring operator assistance.

Regional Office (RO). An office to control the routing and trunk assignments of traffic throughout the network.

Response Time. The elapsed time from receipt of the last digit in the address sent by the originating subscriber to the receipt of a valid response to the originating subscriber.

Restraint. A signal directed towards a subscriber terminal indicating that the terminal should temporarily halt transmission.

Rise and Fall Time. The time required for the leading or trailing edge of a pulse to rise or fall from 10 percent of its final value to 90 percent of its final value Routing. Selecting a path between the originating office and the destination office either directly or by way of an intermediate office.

RS 232C. A specification generated by the Electronic Industries Association which defines a standard interface between MODEM's and data terminals.

Signaling. Provides the means for managing and supervising the network.

Simplex. One-way communication capability.

Subscriber. A customer's terminal connected to the subject network.

Subscriber Circuit. A transmission facility from the subscriber to the district office.

Supervisory Channel. Channels dedicated between offices for the purpose of transmitting call processing signaling.

Supervisor Console. The console used by operating personnel to exercise control over the system.

Switching Center. An office location where equipment is assembled to provide for automatic connection of any combination of channels or trunks.

System. A term used to denote the configuration of hardware and software required within a district or regional office to perform the necessary switching center functions. The line of demarcation within an office defining the system is the intermediate distribution frame.

Tandem Switching. A scheme which connects two district offices through an intermediate office.

Terminal Device. Any input/output device supplied by the customer designed to receive/send information over the communication network.

Time Division Multiplexing (TDM). A multiplexing technique in which multiple data channels are concentrated on a common transmission path and separated by time.

Transmission Speed. The rate at which information passes over a communication facility, measured in bits per second (baud).

Trunk. A transmission path consisting of one or more channels between two switching centers.

Valid Response. A signal received by an originating subscriber (1) to start transmission on automatic answering, (2) a start of ring, (3) a busy indication or (4) any other miscellaneous indication.

GENERAL DESCRIPTION OF THE SYSTEM

Figure 1:
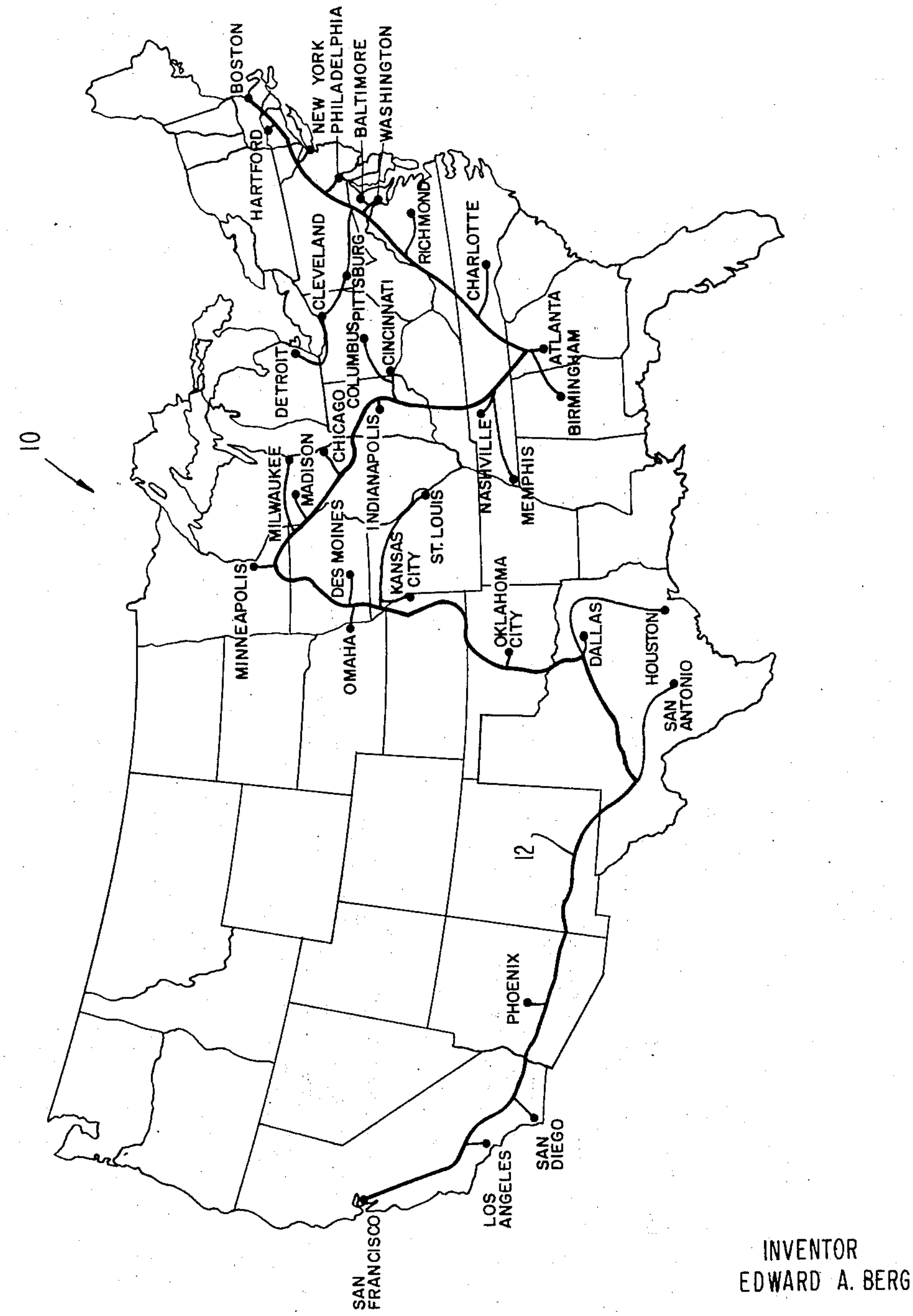
FIG. 1 is a diagram showing the transcontinental data transmission system of the present invention extending from San Francisco on the West Coast to Boston on the East Coast.

Referring now to FIG. 1 of the drawings, the system of the present invention is generally indicated at 10 and comprises an interconnected series of high channel density microwave backbone trunklines 12 following a route between San Francisco, Los Angeles, Dallas, Minneapolis-St. Paul, Atlanta, and Boston. Spur routes from the backbone trunk provide service to additional cities, such as San Antonio, Houston, St. Louis, Columbus, Cleveland, and Detroit. Since it is generally agreed that the market for data communication services will assume large proportions upon the availability of economical digital communication services, the route of the system was mapped to afford the largest possible number of potential subscribers ready access to the system. This selection was accomplished by identifying for initial service cities which are considered to have the greatest potential need for data communications. The principal indicators utilized in identifying each city are total population, number of corporations, dollar sales volume, number of computers, number of communicating terminals, and the number of employees of the corporations. These indicators identified a large number of cities but the 35 cities illustrated in FIG. 1 were selected for initial service on the basis of their immediate high potential interaction of data communications, as well as their proximity to the trunk.

It is recognized that the demand for services may not materialize precisely as initially forecast. Any forecast is necessarily a "snapshot" of a point in time and the demand for data communication service will increase substantially and will vary in complexion in the years ahead. It is for this reason that in the design of the system of the present invention great emphasis was placed on engineering flexibility. Channels of communication can be increased as needed to provide for an increase in traffic on a particular route.

The system switch and control is capable of optimizing the utilization of the transmission facilities by precise instantaneous control of traffic routing. It has been determined that 10 locations designated as district offices and one location designated as a regional office are sufficient to perform this function in the initial stages. A modular technique has been adopted throughout the system to facilitate not only additions to the initial system capability but rapid geographic augmentation to meet market demand.

The nationwide data communication network of the present invention has been designed to meet the major objectives of high reliability, rapid connection, ability to accommodate different data transmission rates, grade of service (circuit availability), system availability, and availability in all locations. The present system is designed to provide a degree of error rate probability less than $10^{-7}$. This will result in an average of no more than one error during transmission of 10,000,000 bits of data. The reliability of the system is derived from a number of technological features, a major one of which is the integrity and continuity achieved by the system's TDM transmission mode. Other contributing factors to this high degree of accuracy includes state of the art design, off-the-shelf equipment where available, and conservative path engineering including space diversity reception.

A data transmission path between any two compatible subscribers is established within 3 seconds following receipt of the last digit of the address identifying the destination.

A graduated scale of data rates are offered on a switched service basis to accommodate the growing demands for reliable, available and economical data transmission facilities, while maintaining compatibility with existing data communicating terminals. Initially, service up to 2,000 bits per second (bps) in the asynchronous mode and up to 14,400 bps in the synchronous mode of transmission are provided on a switched basis. The network is constructed to accommodate greater speeds of switched services as the market requires. In addition to the above speeds, 19,200 bps and 48,000 bps may be provided.

All channels, trunks, and switch matrices integrated into the network are designed and calculated to meet a grade of service goal of P.01 during the busy period. On an average no more than one busy indication in 100 attempts should be encountered due to network control. Outside of the busy periods, the grade of service approaches that of a non-blocking network. For intraoffice traffic, a grade of service of approximately P.005 is possible.

The network is designed to provide greater than 99.98 percent availability. The transmission system provides battery reserve standby power and alarm and order wire systems at all remote sites. Both transmission and switching systems maximize reliability by means of redundant equipment. The system ultimately will serve all locations desiring service. In all stages of system development and thereafter, the system can be interconnected with other carriers or authorized communications entities on a realistic basis in order to provide service to all locations, as well as to offer flexibility to meet individual customer requirements.

DIGITAL TRANSMISSION

The system of the present invention is completely transparent in that a subscriber need not convert his signals to a different transmission mode since the system transmits the digital signal in its original form. Maximum continuity is preserved and transmission efficiency is heightened. A further significant characteristic of a digital transmission system is the manner in which the signals are relayed. Each microwave station in the system is regenerative, it restores the symbol or bit pattern and transmits a new, clean and conditioned signal. Thus, noise is not cumulative as it is in analog transmission systems, and errors in transmission are reduced accordingly. Provisions for higher bit rate capabilities can be accomplished by a wiring change at the multiplexer servicing the subscribers and installation of new equipment is not necessary and no other changes are required in the basic transmission system.

For the user with simple terminals having no capability for error detection and correction, the system of the present invention offers the material advantage over present systems in that far fewer errors in transmission occur. The order of reliability is such that the frequency of retransmission due to network introduced errors is substantially reduced over that occurring in present systems. In short, data transmission by means of an end-to-end digital system is provided at a high speed and with excellent reliability.

In the present invention, the network makes full use of time division multiplexing (TDM) techniques, with simple phase shift keying of the radio transmitter to increase the efficiency of data transmission. The same techniques are utilized throughout the entire network, including the main trunk, spurs and local distribution systems. The transcontinental trunking system is designed so that the average hourly error rate will not exceed 1 bit error in $10^{-7}$ bits transmitted in the system. Errors occur mainly during the period of deep fading (50 db or more) and considering the low probability that more than 10 links in a given circuit will undergo such deep fades during the same hour, it is conservative to allocate a link error of $10^{-8}$.

The signals resulting from the time division multiplexing process are applied to a modulator which generates a multiphase signal. This signal is further amplified by the transmitter and applied to an antenna for transmission. The modulator can be replaced with other modulator equipment with higher indices, so that approximately four thousand 4,800 bps channels may be transmitted simultaneously over a single radio path. The received signal is amplified, demodulated, and conditioned to provide a clean, high speed data signal as an input to the demultiplexer. This demultiplexer separates the composite high speed signals into constituent channels which appear as separate data channels at the digital circuit switch intermediate distribution frame located in a district office. This switch directs the appropriate signal channels to the desired subscriber by way of the local distribution loop. Operation of the total system is full duplex (two-way simultaneous transmission).

The TDM techniques embodied in the network assign to each data channel a specific time slot for the transmission of data. In this way, the full power of the transmitter is delivered to each discrete time slot, avoiding the problems in conventional FDM systems caused by varying load conditions which occur where power must be shared with each additional channel added. The processing of each channel is identical to all other channels, and degradation in system performance due to variance loading is avoided. The channelization equipment, or multiplexers, are modular in design permitting economical installation. Expansion is readily accomplished by the installation of additional multiplexers and by making necessary adjustments to the radio equipment.

Low speed channels (150 bps) can be derived from 4,800 bps channels, again using TDM equipment. Special switched service groups, such as 9,600 bps and 14,400 bps, can also be provided by combining 4,800 bps channels. The multichannel capability required for this class of service requires only a wiring change. Additional channels required to accommodate an increased new service can be provided on a plug-in basis. The described transmission system is not limited to an upper range of 14,400 bps. Higher bit speeds are available upon special order in increments of 4,800 bps. The channel capacity of the radio system permits a reasonable upward extension of channels so that the capacity of the initial network can be increased without requiring additional radio circuits.

Functional components in the system are packaged in modules for economic installation and ease of upgrading. This procedure permits segments of the network to expand as the demand for transmission of data increases. All the many packages requiring integration to form the data communications network are within current technology and to minimize logistic and facilitate centralized parts distribution, all sites use identical equipment in quantities depending on the number and type of subscribers being serviced. This standardization of equipment permits more efficient installation of facilities.

The data carried on the system is transmitted over a high density microwave channel backbone trunk illustrated at 12 in FIG. 1 traversing the United States on a route which has been designed to serve the major data concentration points in the country. Spur trunks utilizing identical electronic equipment carry the data to city locations specified as district offices, lying off the backbone trunk route.

This trunk consists of microwave stations, each of which is either a repeater or a branching repeater. Each repeater receives, amplifies, and transmits all channels in the microwave path; a branching repeater has the additional capability of allowing a portion of the channels to be inserted. The channels dropped may be terminated at that point or may be transmitted over a microwave spur to provide service at locations not on the primary route. Connected to the microwave system are regional offices (RO) which control the activity of the network. Each RO has direct control of up to 10 district offices (DO) where switches are located. Each district office in the network can communicate with all regional offices, and can economically provide termination points for 1,000 to 6,000 terminals.

Communications equipment and associated multiplex and auxiliary equipment are housed in buildings or shelters of sufficient size to accommodate auxiliary power generation equipment and local battery supply in separate fireproof rooms. These buildings are generally of masonry construction with design modifications to allow for differences in environmental conditions. Depending on local conditions and regulations, some locations utilize prefabricated fireproof shelters. All buildings are constructed in conformance with local building codes and regulations. Sufficient property is provided to accommodate the buildings, outside fuel supply, and tower foundations. In most cases, the perimeter of the property is fenced and locked. Commercially or locally generated electric power is available at all sites and, additionally, a battery supply is provided at each site with reserve capacity capable of maintaining equipment operation for at least 8 hours without recharging. Each site is equipped with standby generators to provide power automatically to the batteries in the event of primary power failure. Power generation equipment is sequenced automatically at regular intervals to insure availability.

A station alarm system provides the maintenance control point with status information regarding the system status at each of the stations under surveilance. For example, the status of power is shown whether the station is operating on primary standby power or solely on battery reserve. A number of other conditions is shown also, such as transmitter and receiver operation, tower light operation, unauthorized entry, and the like. A capability exists to control certain functions at the stations from this alarm point, such as start generators, reset transmitters, and turn on floodlights. In each building, provision is made for ambient temperature control as required by the environmental demands of the site. Space air conditioning is provided where warranted, otherwise properly filtered, humidity controlled forced air ventilation is furnished. Thermostatically controlled electric space heaters are provided to maintain a constant temperature during the winter season.

Towers are of sufficient height to allow for necessary clearance and space diversity separation between antennas. The towers are generally self-supporting and engineered in accordance with current E.I.A. standards applicable to tower design. High performance, shrouded antenna reflectors with diameters appropriate to path performance requirements are used throughout the system. Low loss elliptical waveguide, factory cut to pre-engineered length, is used to insure ease in installation and maintenance and to insure low loss performance. Randomes or reflector cloths are utilized where local winter conditions so dictate.

The network is configured and the application software designed to permit a district office receiving a request for service to contact directly the regional office servicing the destination district office to secure a trunk assignment. In the event a primary trunk to the destination is not available, the regional office selects an alternate route and thereby completes the connection. In either event, a maximum of three switching centers is required to complete the connection. This network configuration and the computer software disciplines combined with efficient and reliable high speed switching equipment is designed to provide graphic response (within 3 seconds) and reliability required by the present day and future data communications user.

Following is a list of the 35 cities for which service is illustrated in FIG. 1 and a breakdown of the district and regional office locations and the channelization for the respective cities:

1. San Francisco
2. Los Angeles[1]
3. San Diego
4. Phoenix
5. Dallas
6. Houston
7. San Antonio
8. Oklahoma City
9. Knasas City
10. St. Louis[1]
11. Omaha
12. Des Moines
13. Minneapolis
14. Madison
15. Milwaukee
16. Chicago[1]
17. Indianapolis
18. Cincinnati
19 Columbus
20. Louisville[1]
21. Nashville[2]
22. Memphis
23. Birmingham
24. Atlanta
25. Charlotte
26. Richmond[1]
27. Washington
28. Baltimore
29. Pittsburgh[1]
30. Cleveland
31. Detroit[1]
32. Philadelphia
33. New York[1]
34. Hartford
35. Boston[1]

[1] District Office Location
[2] Co-located District and Regional Office

In calculating the quantity of 4,800 bps channels required between each point of the transcontinental microwave system, an analysis of calling fequency, by class and traffic characteristics during the busy period, was made. The results are reflected in the trunk segments and interstate channel requirements which follow.

CHANNELIZATION
Main Trunk

| Segment | No. of 4800 bps Channels |
|---|---|
| Boston to Hartford | 2600 |
| Hartford to New York | 800 |
| New York to Philadelphia | 1600 |
| Philadelphia to Pittsburgh | 3800 |
| Pittsburgh to Washington | 2800 |
| Washington to Richmond | 3800 |
| Richmond to Charlotte | 4000 |
| Charlotte to Atlanta | 3400 |
| Atlanta to Nashville | 4000 |
| Nashville to Louisville | 3400 |
| Louisville to Columbus | 4000 |
| Columbus to Indianapolis | 3400 |
| Indianapolis to Chicago | 2800 |
| Chicago to Milwaukee | 4000 |
| Milwaukee to Madison | 3200 |
| Madison to Minneapolis | 3000 |
| Minneapolis to Des Moines | 2000 |
| Des Moines to Omaha | 2200 |
| Omaha to St. Louis | 2800 |
| St Louis to Oklahoma City | 2200 |
| Oklahoma City to Dallas | 2000 |
| Dallas to San Antonio | 1200 |
| San Antonio to Phoenix | 1000 |
| Phoenix to San Diego | 1600 |
| San Diego to Los Angeles | 2000 |
| Los Angeles to San Francisco | 2400 |

-Continued

CHANNELIZATION

| Main Trunk Spurs Segment | No. of 4800 bps Channels |
| --- | --- |
| Hartford BR to Hartford | 2000 |
| New York BR to New York | 1000 |
| Philadelphia BR to Philadelphia | 2400 |
| Pittsburgh BR to Pittsburgh | 3800 |
| Pittsburgh to Cleveland | 2600 |
| Cleveland to Detroit | 800 |
| Washington BR to Baltimore BR | 1200 |
| Baltimore BR to Baltimore | 600 |
| Baltimore BR to Washington | 800 |
| Richmond BR to Richmond | 2400 |
| Charlotte BR to Charlotte | 800 |
| Atlanta BR to Atlanta | 400 |
| Atlanta BR to Birmingham | 800 |
| Nashville BR to Nashville | 7600 |
| Nashville BR to Memphis | 600 |
| Louisville BR to Louisville | 2200 |
| Columbus BR to Cincinnati BR | 1000 |
| Cincinnati BR to Cincinnati | 600 |
| Cincinnati BR to Columbus | 600 |
| Indianapolis BR to Indianapolis | 800 |
| Chicago BR to Chicago | 3200 |
| Milwaukee BR to Milwaukee | 1200 |
| Madison BR to Madison | 400 |
| Minneapolis BR to Minneapolis | 1200 |
| Des Moines BR to Des Moines | 400 |
| Omaha BR to Omaha | 1000 |
| St. Louis BR to Kansas City BR | 3200 |
| Kansas City BR to Kansas City | 1000 |
| Kansas City BR to St. Louis | 4000 |
| Oklahoma City BR to Oklahoma City | 400 |
| Dallas BR to Houston BR | 1200 |
| Houston BR to Houston | 400 |
| Houston BR to Dallas | 1000 |
| San Antonio BR to San Antonio | 400 |
| Phoenix BR to Phoenix | 800 |
| San Diego BR to San Diego | 600 |
| Los Angeles BR to Los Angeles | 4000 |

BR — Branching Repeater

Each trunking station is provided with alarm and control functions to permit remote site status monitoring and remote control of some site functions from control stations within the system. Control alarm points, generally located at district offices where 24 hour monitoring supervision can be easily provided, are distributed throughout the system.

Two types of order wire systems are provided in the network. An express order wire system is installed to provide direct communications between control alarm points. A local order wire system allows station-to-station conversation. Because the order wire systems are co-located with multiplex terminals, order wire channels can be operated synchronously. A full channel sampling rate of approximately 20 kbs may be used to transmit order wire voice samples and thus provide a reasonable quality of digitized voice transmission. An order wire channel occupies only one data channel and the order wire systems require one data channel for each station.

The alarm transmitting equipment at each station is provides with 32 alarm functions and 16 on-off control functions. One channel of the data transmission system (in each direction) is sub-multiplexed to provide this service. In the alarm sub-system, the inverter converts parallel alarm sensor inputs into a serial pulse stream with each pulse corresponding to a monitored function. At the master stations, located at control points, the stream is converted to a parallel output by the decoder. These outputs operate the master station alarm and control display circuitry. The control sub-system operates in a similar fashion, but in the reverse direction of transmission.

The present network represents the combination of digital transmission paths with two functionally different types of switching centers. The switching centers are the district offices which provide the subscriber's connection and regional offices which maintain network control. Both types of offices use identical equipment to perform identical or similar functions. For functions performed in one office or the other, a unique complement of equipment is provided. In all the switching centers, redundant equipment insures that the nonavailability of any unit will not cause the failure of the system. The salient functions performed by the district office are (1) provides subscriber terminations, (2) responds to all requests for service, (3) insures subscriber-to-subscriber compatibility by way of class code distinction, (4) determines and establishes intra-office switch linkage, (5) coordinates with regional office trunk assignments for inter-office transmission, (6) maintains records of all services provided to each subscriber (for billing purposes), (7) maintains necessary statistical information for future analysis, and (8) provides maintenance, status and suspect component identification.

The salient features of the regional office are (1) it maintains a complete network directory and (2) assigns all trunks within its area of jurisdiction, (3) determines and establishes intra-office switch linkage, (4) establishes alternate paths as required, (5) collects network use information from each district office at prescribed intervals, (6) maintains necessary statistical information for future analysis, and (7) provides maintenance, status and suspect component identification.

The number and geographical locations of the district and regional offices are dependent upon the number of subscribers and their locations. System expansion is based upon the expected trends in growth of the data communications market. As a consequence, the network is targeted toward establishment of 35 district offices strategically located across the United States so as to best serve the needs of the emerging data communications market.

Each subscriber utilizes a digital communications console to interface with the system. Entrance to the network may be either "local" or "remote." Local subscribers are represented in the district office switching equipment as a unique appearance. Remote subscribers are those whose geographic location is beyond the economic range of a district office (approximately 50 miles). These subscribers enter the network through a line concentrator. The subscriber may also be located some distance from the line concentrator, in which case connection is provided by digital microwave stations or conventional analog facilities.

Each switching center is configured in a modular fashion consistent with present packaging techniques and sound economical considerations. The heart of the switching center is a state of the art communications system presenting a new approach to the problem of processor-control communications. This system minimizes the need for processor intervention in communications processing, while providing for continuous monitoring of the operating efficiency of the system elements. To accomplish this, the following is provided: (1) Hardware to monitor the operating efficiency of each of the elements in this system; (2) Highly communications-oriented input/output section; and (3) An instruction repertoire and memory capacity designed to facilitate the formating of large amounts of communications data. The switching common control function in each switching center —regional or district office—is provided by a communications processor which controls all other modules and processes the supervisory and subscriber requests for source commands.

The main storage for the system is a core storage module. The cycle time for core storage is 900 nanoseconds, with the validity of data insured by a parity check performed automatically in the communications processors.

The unit providing the communications path for the transmission of data from one subscriber to another is the switch matrix which is controlled by the communications processor. The switch matrix uses existing components, repackaged to be more compatible with data transmission characteristics and is modular to facilitate growth. All paths through the switch matrix are full duplex, permitting transmission of digital data in each of two directions simultaneously. The size of the communications processors, the number of associated peripherals, and the sizes of the switch matrix at any office is determined by the number of subscribers to be accommodated. System objectives of rapid response, circuit availability, and reliability are maintained.

The digital communications console is installed at each subscriber site and provides the subscriber with the means of communicating with the district office through a key pack display console. Through the DCC, an operator generates the appropriate digits for directing the district office to establish a switched connection to another subscriber. The DCC may be operated automatically or manually. In either mode of operation, a system of indicators readily scanned by an operator provides an immediate overview of the operational status. The responsibility of initiating action to establish a connection from one subscriber to another rests with an operator in the manual mode of operation or a properly programmed computer in the automatic mode.

Existing data transmission service often provides substantially reduced capability and reliability in total or end-to-end communications services because of the reduced transmission quality of the local distribution circuits. The present invention incorporates a local distribution system compatible in performance with the other transmission elements of the network and consistent also with the communications services to be offered. The subscriber interface conforms to standards described in E.I.A. RS-232C and RS-366. Consequently, no changes in subscriber equipment is required.

For the subscriber utilizing the local distribution system of the present invention, the continuity of the digital signal from the data terminal or computer communications terminal is maintained to its destination. No digital-to-analog conversion is required for local distribution and the complexity of the communications interface to the network and attendant maintenance and reliability problems are reduced accordingly.

The local distribution facilities comprise specifically configured, low powered microwave equipment operating in the 11 GHz common carrier band. This band is generally free of frequency congestion. In order to optimize the utilization of frequencies, the local distribution system is designed to provide maximum subscriber density on each link.

In a typical city, subscribers may be distributed in cluster arrangements, composed of several concentration points or relatively high density. Such points may be industrial parks, large office buildings, areas of concentrated business bordering circumferential highways, shopping centers, and office building complexes. An additional number of data concentration points of lesser density may be designated in other appropriate locations until economic considerations preclude the use of microwave radio equipment for local distribution. The microwave terminals are used only to provide a digital connection to the district office. In the vicinity of the terminal, multi-pair cable is installed radially from the microwave terminal to other subscriber locations.

A multi-tier or ring configuration of microwave terminal locations totalling approximately 50 microwave stations are used to service the data concentration points basic area covered by a district office. Maximum radio link lengths are 5 miles and signals from distant stations are repeated from the outer tier or ring to the inner ring. To insure availability of frequencies, no microwaver station receives more than four frequencies.

In summary, the local distribution system consists of 16 basic microwave terminals, each with a 100 channel drop and insert capability and two basic terminals with a 200 channel drop and insert capability. Additionally, the system has four high density terminals, each with a 400 to 1,000 channel drop and insert capability. The local distribution system has the capability of terminating approximately 1,700-4,800 bps subscriber terminals without the use of line concentrators. For further expansion, a capability is provided that allows the use of line concentration. Subscribers having low speed transmission requirements are accommodated by the use of submultiple TDM multiplexers. Subscribers with requirements higher than 4,800 bps are accommodated by strapping input points of the multiplexer.

In most cases, it is possible to achieve line-of-sight range between the terminal points. Where possible, the antenna is located on the building in a manner to provide shielding to minimize mutual interference with other stations. The low power levels used in the transmitters largely relieve this problem. In those instances where a building or other structure interferes with line-of-sight, passive repeaters are utilized. Where active repeaters are required, the basic microwave without drop and insert capability can be used in an extremely low cost installation to repeat the channels.

The present system is designed to provide interconnection capability with other TDM or other analog modes of transmission. Other TDM carriers can be interconnected directly with the transmission system at a branching repeater or district office. Moreover, any repeater on the system can be converted into a branching repeater by installing digital equipment.

Interconnetion is not restricted to like mode carriers. Other microwave carrier or cable systems can interconnect with the present network regardless of transmission characteristics of carrier system. However, appropriate interfacing equipment is required and the characteristics of the service to the customer on an end-to-end basis is limited by the lowest quality characteristics as between the two systems. Satellite connection with the system is feasible, although dependent upon development of suitable terminal hardware to accommodate problems peculiar to the increased transmission distance of satellite transmission.

In addition to interconnection, it is possible to integrate capabilities other than microwave into the system transmission.

GENERAL DETAILS OF THE SYSTEM

Figure 2:
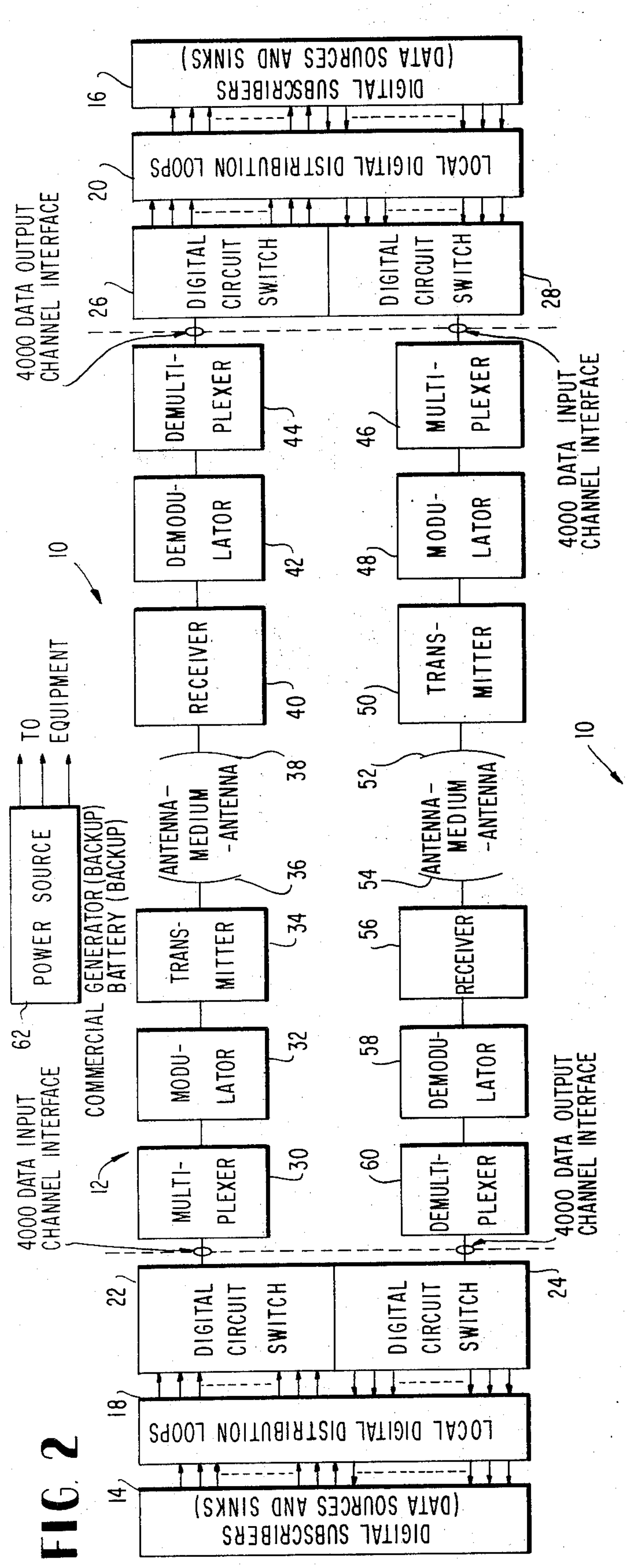
FIG. 2 is a simplified block diagram showing the time division multiplex system of the present invention.

FIG. 2 is a simplified overall block diagram of the basic system 10 of the present invention. The system is shown as connecting a first set of digital subscribers 14 at one point in the system to a second set of digital subscribers indicated at 16. The digital subscribers are connected through local digital distribution loops 18 and 20, respectively. Local distribution system 18 is connected to the trunking system 12 by digital circuit switches 22 and 24. Local digital distribution system 20 is similarly connected into the trunking system by digital circuit switches 26 and 28.

Transmissions from the digital subscribers 14 pass through the local distribution system 18 and the digital circuit switch 22 to a multiplexer 30, modulator 32, and transmitter 34, where they are transmitted by a microwave antenna 36 through the air (and by way of suitable repeaters where necessary) to a receiving antenna 38. The received signals pass through receiver 40, demodulator 42, and demultiplexer 44, where they are applied through digital circuit switch 26 and local digital distribution loop 20 to the subscribers 16. Similarly, signals from subscribers 16 are transmitted through the local distribution loop or system 20, and digital circuit switch 28 to a corresponding multiplexer 46, modulator 48, transmitter 50, and transmitting antenna 52. These signals are picked up by receiving antenna 54 and passed through receiver 56, demodulator 58, demultiplexer 60, and pass through digital circuit switch 24 and local loops 18 to the subscribers 14. Power sources are provided for the various components as indicated generally at 62 and these comprise commercial power sources, local generators as backup, and battery power supplies also as backup and rechargeable from the generators.

As can be seen from FIG. 2, the overall system starts and ends with the digital subscribers. These are the data sources and sinks as shown at the extreme right and left of the block diagram. Each subscriber is connected to the overall system by means of a local digital distribution loop. The loops are in turn connected to a digital circuit switch which selects an appropriate circuit for the generated data transmission or selects the address at which the incoming data is to be terminated.

Starting at the top left of the block diagram in FIG. 2, the digital circuit switch interfaces with the multiplexer by means of approximately 4,000 data input channels. The multiplexer 30 combines the separate data channels into a single high speed data stream operating at approximately a 20 megabit rate. This 20 megabit data stream is applied to the modulator 32 which generates a bi-phase signal. The bi-phase signal is further amplified by the transmitter 34 and applied to the antenna 36 for transmission. The received signal is first amplified in the receiver 40, then demodulated in the demodulator 42 where the data stream is also conditioned to provide a clean, high speed data signal as an input to the demultiplexer 44. The demultiplexer 44 separates the composite high speed signal into its constituent 4,000 channels and applies these 4,000 separate data streams to the digital circuit switch 26. The function of this switch is to direct the appropriate signal channels to their respective subscribers or addressees, and apply these signals to the data sinks.

Since the overall operation is fully duplex, signals generated by data sources at the subscriber locations can be transmitted simultaneously back to the other end of the system. The data processing is identical to that just described as the two channels shown at the top and bottom of the block diagram of FIG. 2 are identical, one providing a signal path from the left to the right and the other serving and data sources on the right and data sinks on the left.

Figure 3:
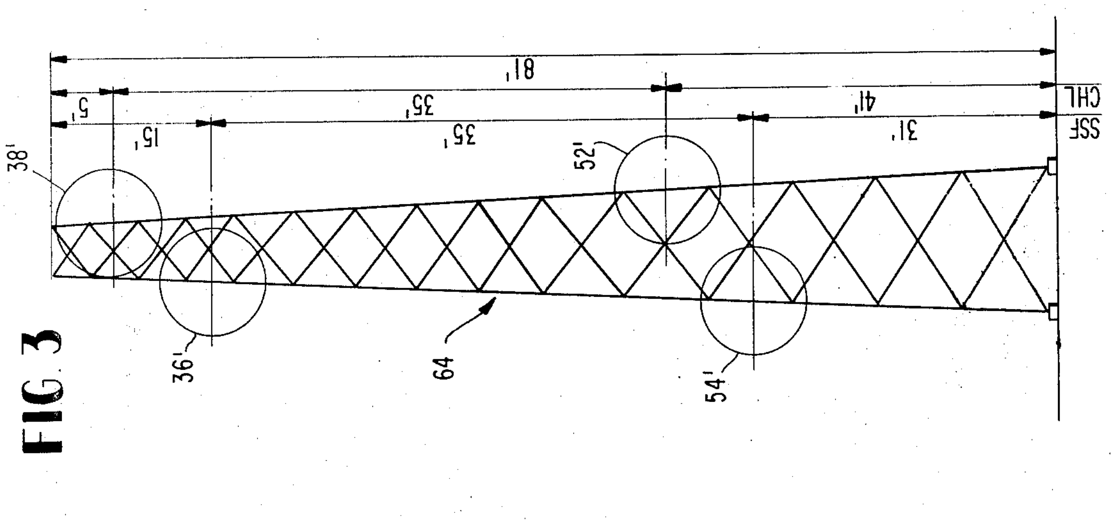
FIG. 3 is a schematic view of a repeater or relay tower constructed in accordance with the system of this invention.

FIG. 3 shows a typical antenna tower usable in the system of FIG. 2 and indicated generally at 64. Mounted on the tower are four antennas 36′, 38′, 54′ and 52′, corresponding to the transmitting and receiving antennas of FIG. 2. Antennas 36′ and 54′ are corresponding transmitting and receiving antennas and in one embodiment comprise a pair of 8 foot diameter antennas at an angle of 192°, 56 minutes to the north, operating at a frequency of 6256.5 megahertz. Antennas 38′ and 52′ in the same example were 10 foot diameter antennas and were at an angle of 139°, 46 minutes to the north, and operating at a frequency of 6137.9 megahertz. The tower shown is typical for a repeatered operation where signals can be sent and received in two different directions.

Figure 4:
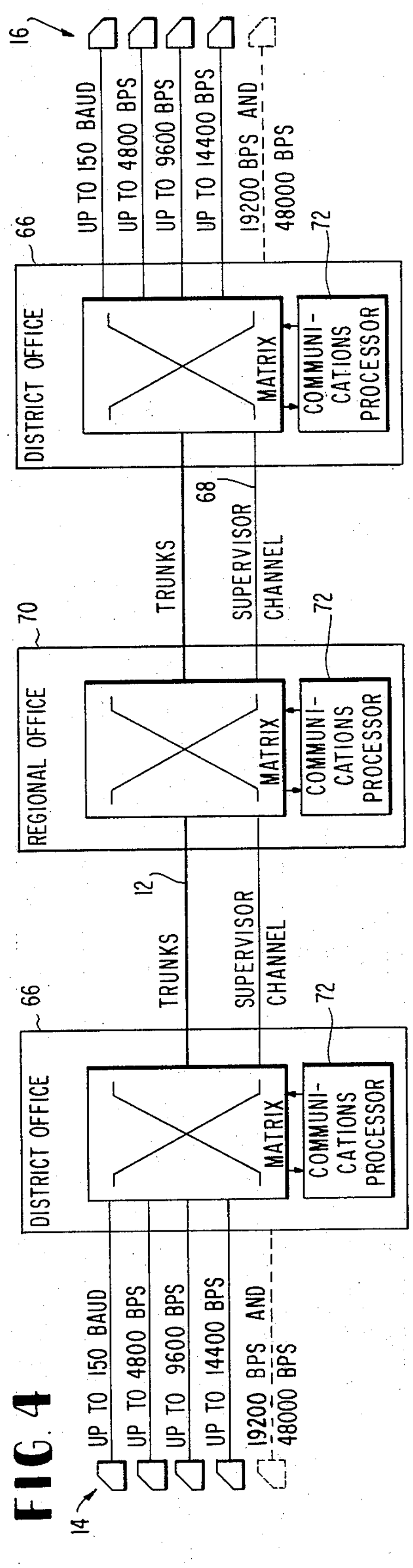
FIG. 4 is a schematic diagram showing the switched services offered by the system of the present invention.

FIG. 4 is a diagrammatic view illustrating the ability of the system 10 to accommodate different data transmission rates. The trunks 12 are connected through district offices 66 and a regional office 70. Each of these offices is connected by a supervisory channel 68 and each office is provided with a communications processer 72. Various subscribers at the left-hand end of the system are again indicated at 14 and subscribers at the right-hand end of the system are indicated at 16.

A graduated scale of data rates are provided on a switched service basis to accommodate the growing demands for reliable, available and economical data transmission facilities, while maintaining compatibility with existing data communicating terminals. Initially, service up to 2,000 bits per second (bps) in the asynchronous mode and up to 14,400 bps in the synchronous mode of transmission are provided on a switched basis. The network is planned to accommodate greater speeds of switched services as the market requires. In addition to the above speeds, 19,200 bps and 48,000 bps will be made available initially on a private service basis as the market demand requires.

Figure 5:
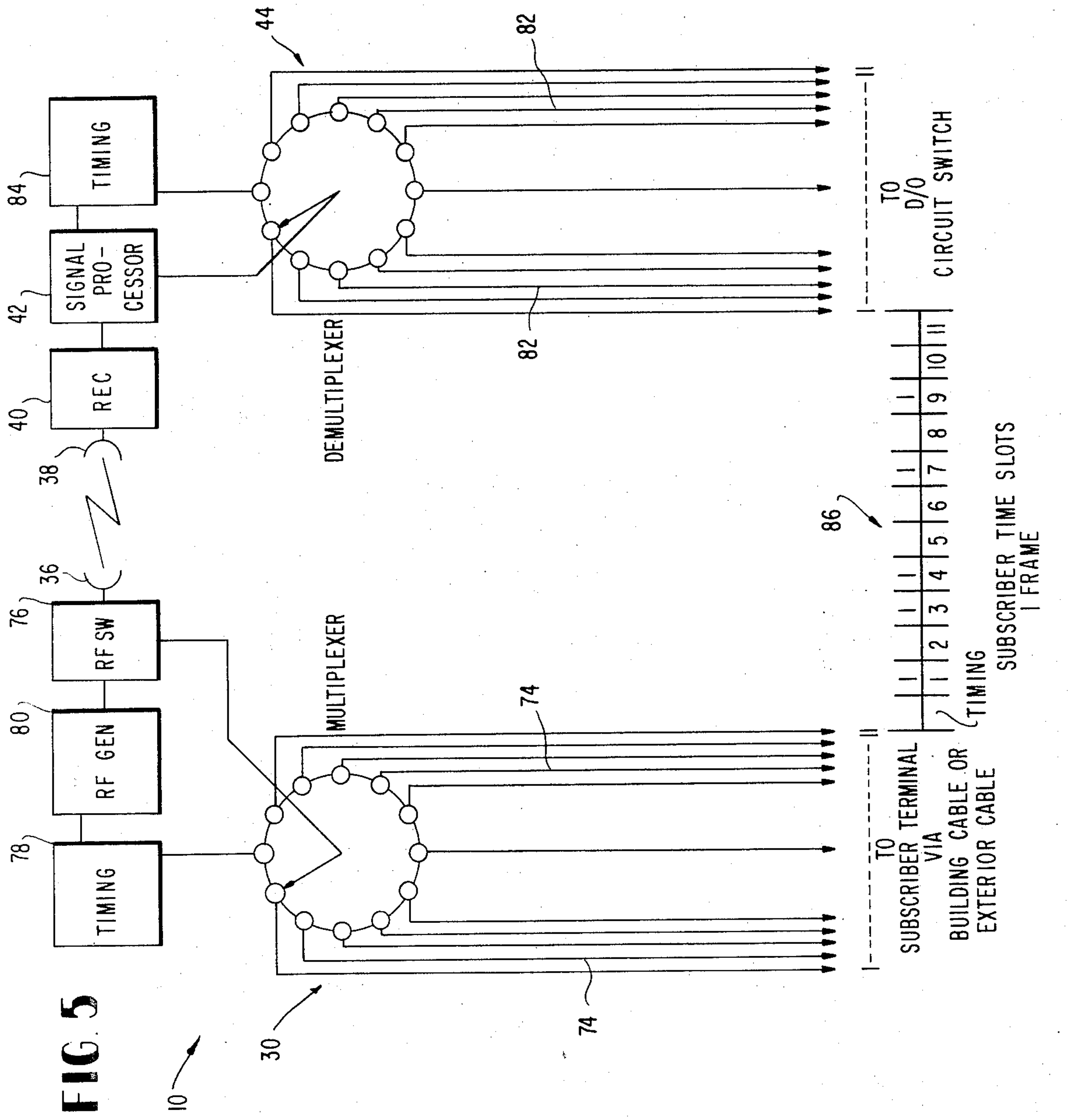
FIG. 5 is a diagram of the transmission logic illustrating a 12-channel multiplexer typical for "N" channels in the system.

FIG. 5 is a generalized diagram of the overall circuit showing the transmission logic. The multiplexer 30 receives signals from subscribers by way of leads 74 and these are applied from the multiplexer through an RF switch 76 to transmitting antenna 36. Connected to multiplexer 30 is the timing circuit 78 and RF generator 80. The received signal is amplified in receiver 40, demodulated and conditioned to provide a clean, high speed data signal as an input to the demultiplexer 44. This demultiplexer separates the composite high speed signal into constituent channels which appear as separate data channels at the digital circuit switch intermediate distribution frame located in a district office. This switch directs the appropriate signal channels to the desired subscriber by way of leads 82 and the local distribution loop. A timing circuit 84 connects the demodulator signal processor 42 to the demultiplexer 44. The subscriber time slots for one frame are illustrated at 86. The 12 channel multiplexer arrangement illustrated in FIG. 5 is shown as typical for "N" channels in the actual system.

Figure 6:
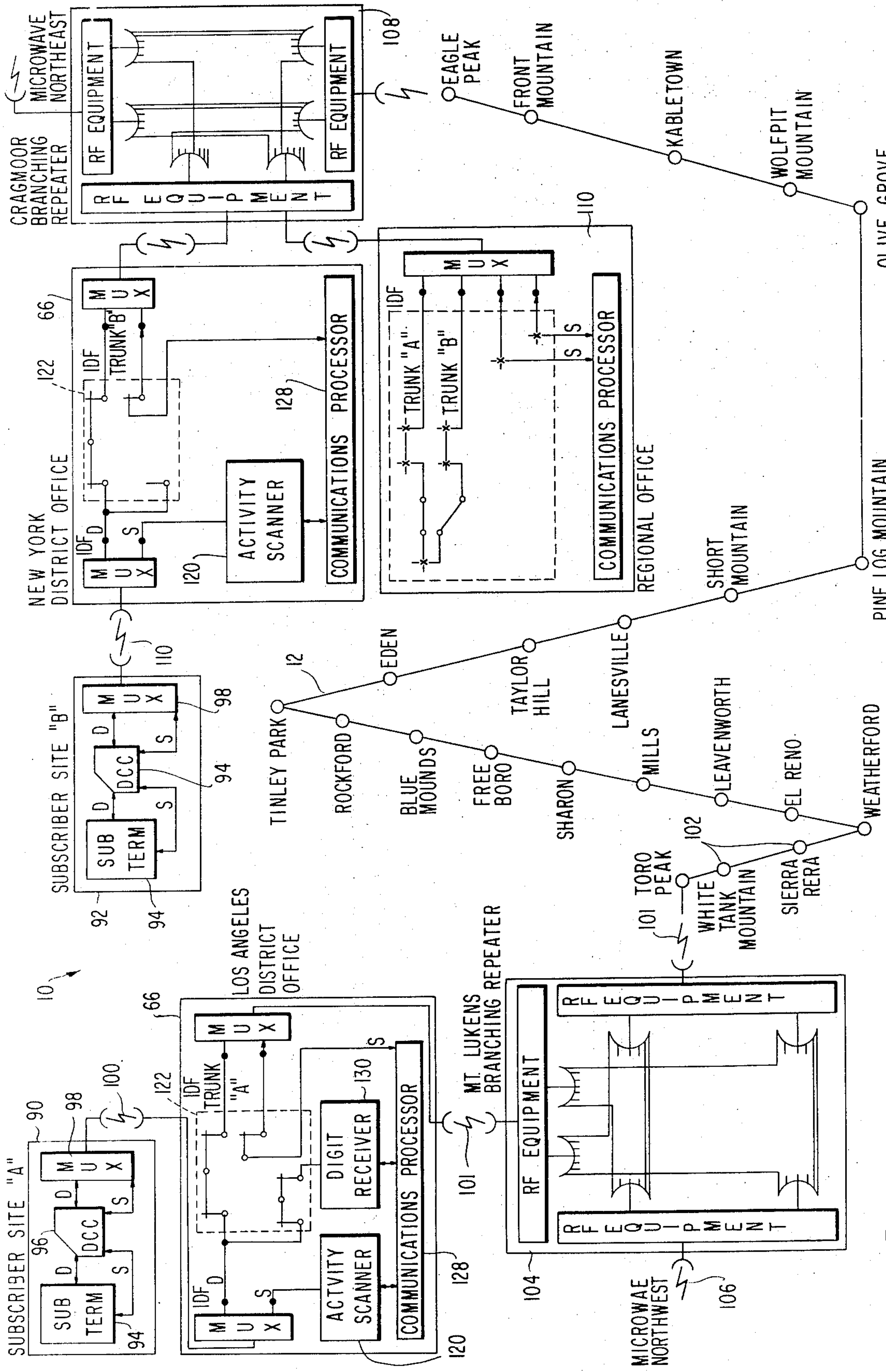
FIG. 6 is a system diagram showing a transcontinental digital connection inter-office call between Los Angeles and New York.

FIG. 6 is a slightly more detailed diagram of the system 10 of the present invention showing some of the circuitry of the district and regional offices. FIG. 6 shows an arrangement for connecting between a subscriber site A, indicated at 90 and located near Los Angeles, with a subscriber site B, indicated at 92 and located near New York. The subscriber circuitry is the same and comprises a subscriber terminal 94, such as a computer or the like, a digital communications console 96 for controlling the call, and a multiplexer/-demultiplexer 98. Connection is by way of a local distribution loop including a microwave link 100 to the Los Angeles district office 66.

From the district office, the communications signal passes through the microwave backbone links 101 by way of suitable repeaters indicated by the circles 102. A typical branching repeater is indicated at 104 and this branching repeater is illustrated as not only capable of relaying the signal from the Los Angeles district office to the Toro Peak repeater, but also adding signals received by a mircowave antenna 106. It is understood that the branching repeaters may add channels, drop channels, or both.

The signal from subscriber sit A passes through the microwave repeaters 102 and through an eastern branching repeater 108 to the New York district office 66 and to a regional office 110. The signal passes from the New York district office to subscriber site B at 92 by way of a local distribution loop including microwave link 110.

Figure 7:
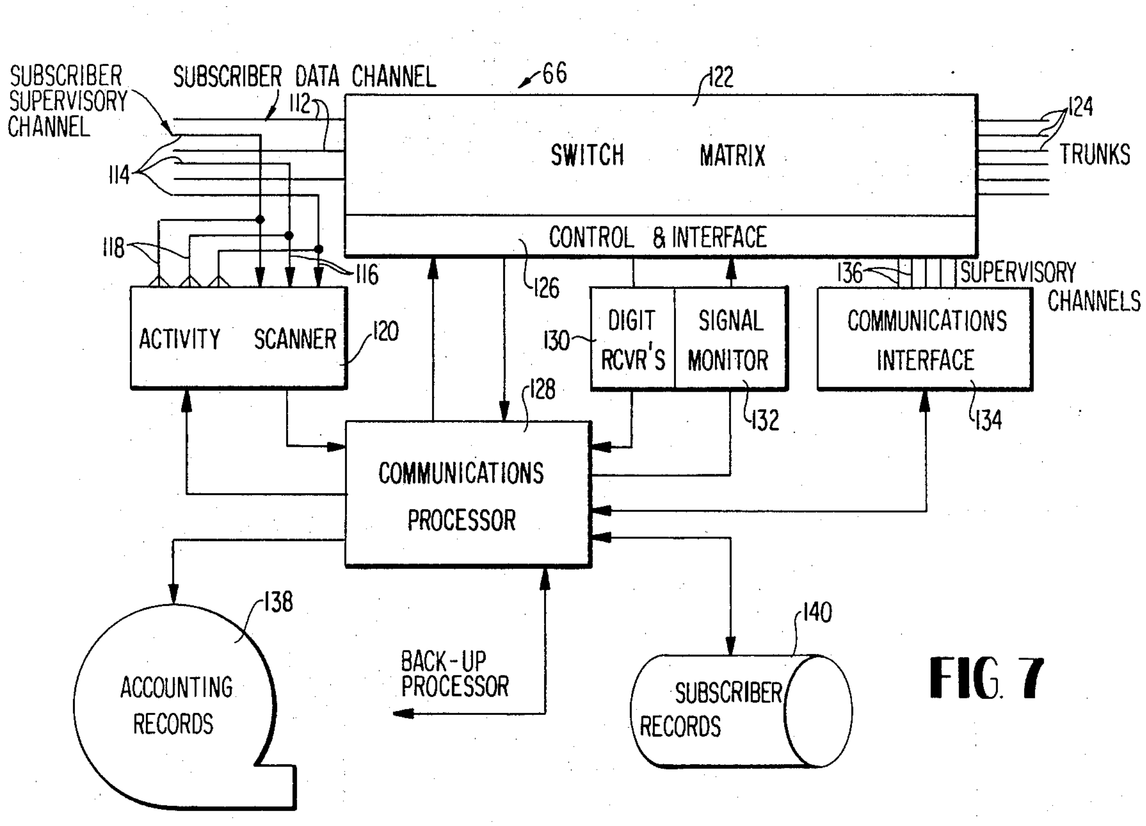
FIG. 7 is a block diagram showing the components of a district office.

FIG. 7 is a block diagram of a district office 66 and since the district offices are all of similar construction, the block diagram in FIG. 7 may represent either the Los Angeles district office or the New York district office 66 in FIG. 6. Coming into the district office from local subscribers over the local distribution loop are a plurality of subscriber data channels 112 and a plurality of subscriber supervisory channels 114. The supervisory channels 114 are connected to the input terminals 116 and the output terminals 118 of an activity scanner 120. The subscriber data channels 112 pass directly to a switch matrix 122 which establishes suitable connections between the subscriber data channels 112 and the microwave trunklines 124 forming a part of the microwave trunk 12 of FIG. 6.

Control of the switch matrix is through a control and interface unit 126 from a communications processor 128. Communications processor 128 constitutes the basic computer system for the district office and controls the other office functions. The communications processor 128 is interconnected with the activity scanner 120 as shown, with digit receivers 130, a signal monitor 132, and a communications interface unit 134 connected through supervisory channels 136 to the switch matrix 122. Communications processor 128 also supplies accounting information to an accounting records unit 138 and to a subscriber records unit 140.

Figure 8:
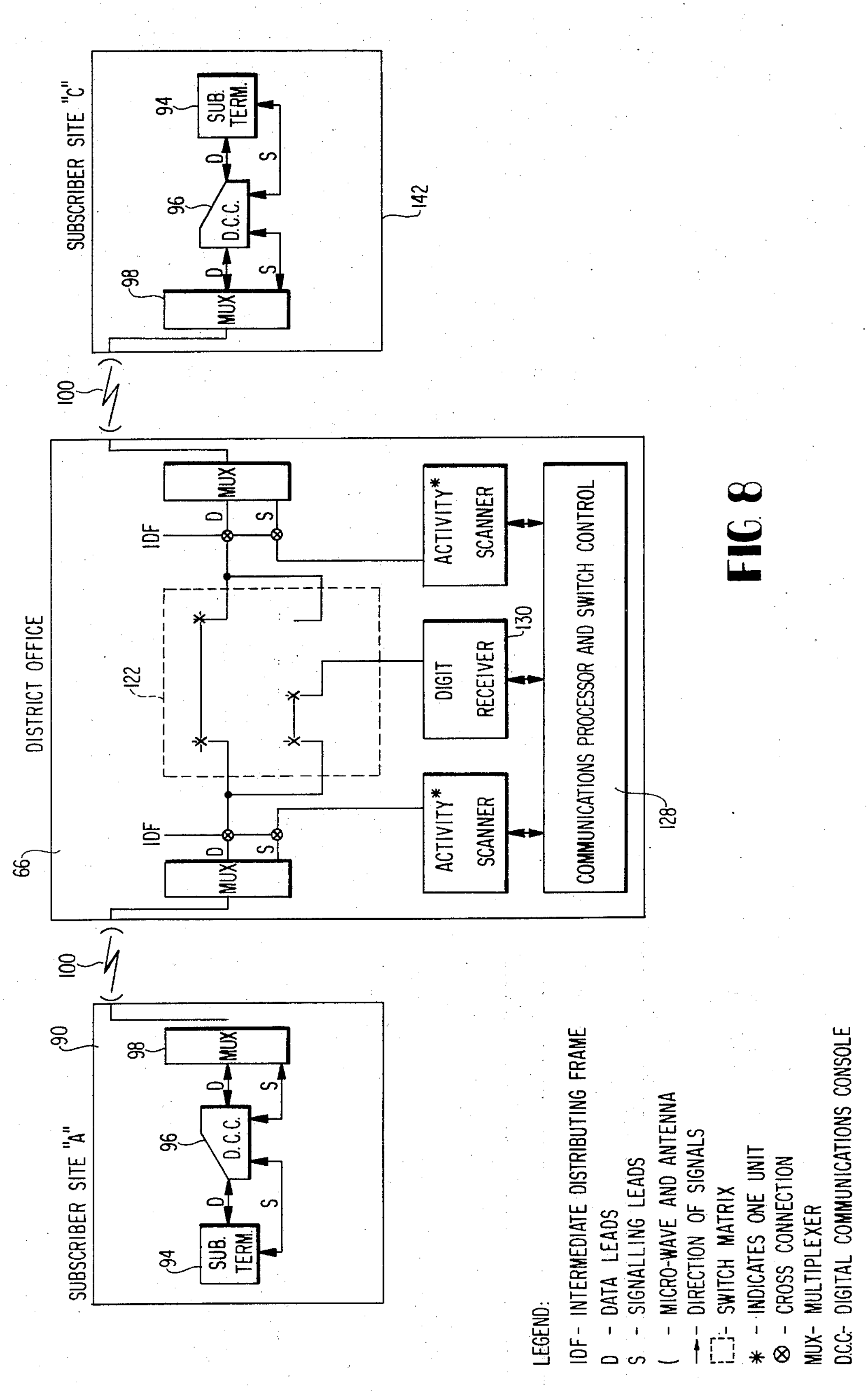
FIG. 8 is a diagram showing the digital connection for an intra-office call.

FIG. 8 shows the digital connection for an intra-office call as opposed to the inter-office call connections illustrated in FIG. 6. In FIG. 8, subscriber site A, illustrated at 90, is connected through a district office, which may be the same Los Angeles district office illustrated in FIG. 6, to a local subscriber site C, illustrated at 142. Connection from the district office is by local microwave links 100.

Figure 9:
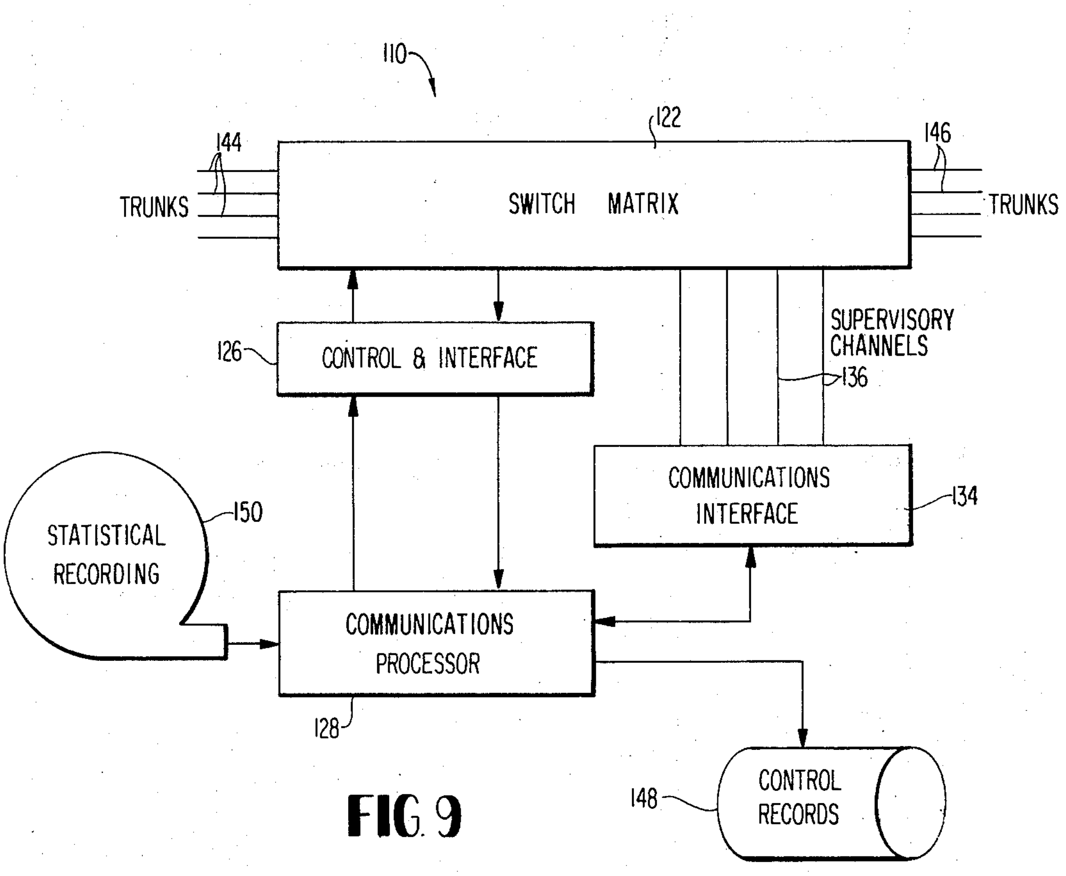
FIG. 9 is a block diagram showing the principal components of a regional office.

FIG. 9 is a block diagram of a typical regional office and, by way of example only, may form the regional office 110 of FIG. 6. The components of the regional office 110 are similar to the components of a district office 66 and like parts bear like reference numerals. In FIG. 9, a switch matrix 122 of the type also included in the district offices 66, connects the trunklines 144 and 146. The switch matrix is operated from communications processor 128, again through the control and interface unit 126. Connection to the switch matrix by way of supervisory channels 136 is through the communications interface 134. Communications processor 128 supplies an output to a control records unit 148 and receives statistical information from a statistical recording unit 150. It is an important feature of the system of the present invention that the district and regional offices use substantially the same equipment so that more or less standardized components may be utilized.

Figure 10:
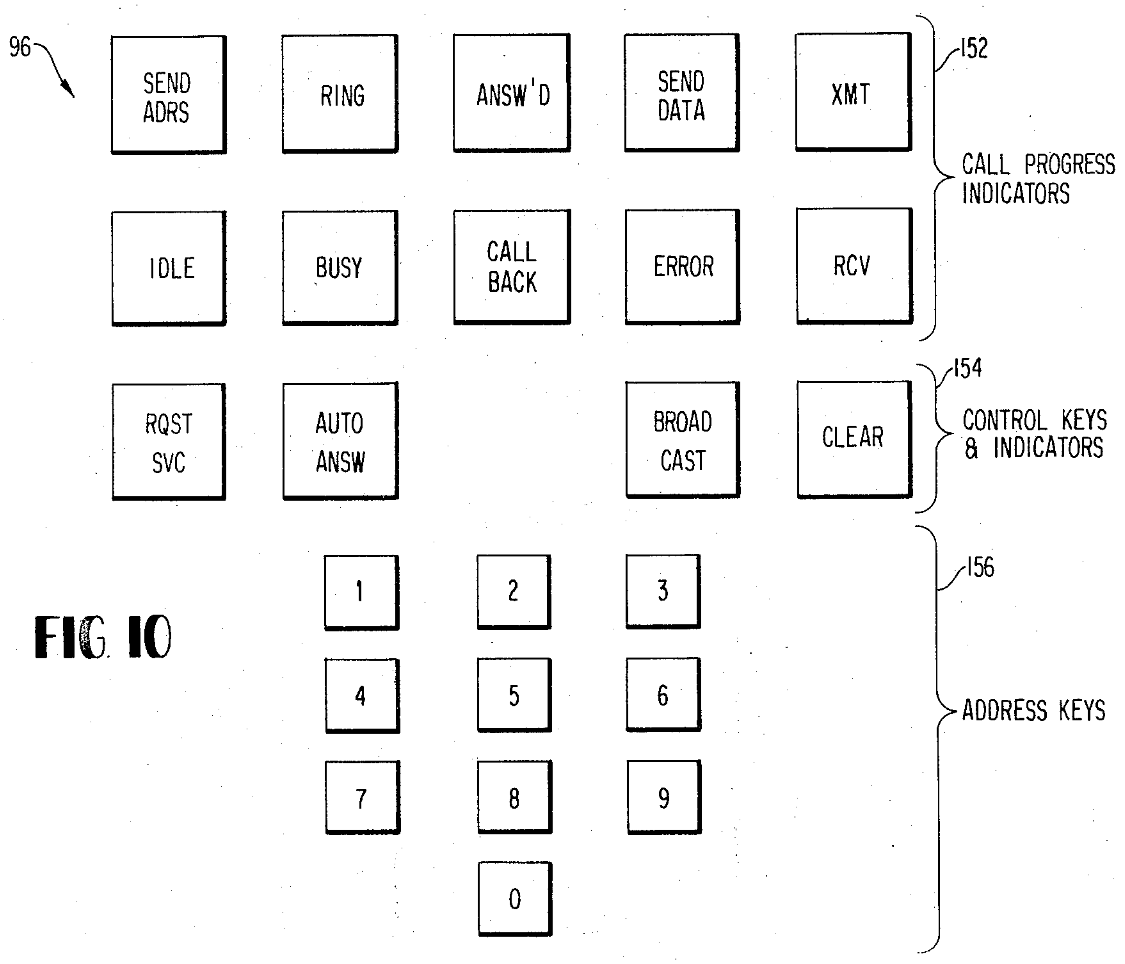
FIG. 10 is a diagram of the keyboard of the digital communications console constructed in accordance with the present invention.

FIG. 10 shows the keyboard of a typical digital communications console, such as the DCC 96 illustrated in FIGS. 6 and 8. The unit includes a set of call progress indicators 152 which, by way of example only, may be in the form of illuminated panels with suitable written identification. The communications console also includes a set of control keys and indicators which preferably are in the form of illuminated pushbuttons 154 and also a plurality of address keys 156 numbered from 1 to 10 (0–9). The digital communications console or DCC 96 and the data system of the present invention corresponds in all respects to a conventional telephone in a conventional telephone system. The unit is designed to provide all the information which is conventionally available to the operator of a telephone and is used as the control unit to establish and terminate the call by way of connection with the subscriber's terminal 94 of FIGS. 6 and 8.

Referring to FIGS. 8 and 10, following is a step-by-step action description illustrating the connection procedure utilizing the digital communications console of FIG. 10 for an intra-office call as illustrated in FIG. 8.

1. The operator after conditioning the communications terminal, depresses the "Request Service" key on the DCC.
2. For subscribers in outlying areas connected to a line concentrator, a connection to an available channel is automatically made and the "Request Service" function forwarded to the district office (DO).
3. The "Activity Scanner" in the DO detects the "Request Service" function and notifies the communications processor.
4. The communications processor assigns a digit receiver, buffers, and other system components for originating a call.
5. Paths through the switch matrix from the subscriber channel to the assigned local equipment are determined by the communications processor and transferred to the switch control unit where the path is established and tested. After receipt of a test completed satisfactory function, the processor initiates a function to the subscriber's DCC which causes the "Send Address" indicator to light.

6. The subscriber keys a seven digit destination address by depressing the digit keys on the DCC.
7. The digit receiver receives and passes the destination address to the processor. The destination address is given to the processor in two segments; the first three digits when received and the last four digits when they have been received.
8. The processor uses the first three digits to determine the proper destination DO. In this case, for example, the destination DO is itself. The last four digits are used by the terminating DO to identify the subscriber being called.
9. The processor determines to which subscriber the call is to be directed.
10. The processor assigns all equipment components to be used in completing the call.
11. A path through the switch matrix is determined by the processor and transferred to the switch control unit. The switch control unit causes the path through the matrix to be established and tested.
12. When the processor receives the function indicating a satisfactory completion of the path test, a function is sent to the subscriber's DCC, causing the subscriber's "Ring" lamp to light and an audible alarm to sound.
13. If the destination subscriber is connected to a line concentrator, the DO sends the last two digits of the subscriber's directory number to the concentrator. The concentrator connects the called subscriber to this circuit. The concentrator returns a connect function to the DO when this has been done. The DO then sends the ring function to the subscriber.
14. The processor now causes the digit receiver to be disconnected from the originating subscriber's circuit.
15. When the destination subscriber hears the audible signal, he depresses the "Request Service" key to answer the call.
16. This action causes a function to be sent to the originating subscriber's DCC and causes the "Answered" lamp to light.
17. The answered function is also sent to the DO where the processor causes entries to be made on a storage medium. These entries are used as a starting point for billing information.
18. When the subscriber terminals are ready to send and receive data, the DCC's exchange a function which causes the "Send Data" lamp to light.
19. The form and control of the data transmitted and received by the subscribers is controlled by the subscriber.
20. To disconnect, either subscriber depresses the "Clear" key on his DCC. This causes a function to be sent to the DO indicating disconnect.
21. The "Activity Scanner" in the DO detects the disconnect function and informs the processor.
22. When the processor detects the disconnect function, it makes appropriate entries onto a storage medium. These entries will represent the end of the billing period for this call.
23. The processor then causes all connections and equipment assigned to this call to be disconnected.
24. When the disconnect is completed, the processor sends a function to both subscribers which causes the "Idle" lamp to light on the DCC's.
25. The subscribers may now initiate a new call.

Referring to FIGS. 6 and 10, the following is a step-by-step description of the connection procedure utilizing the digital communications console of FIG. 10 for making an inter-office call, such as a Los Angeles to New York call as illustrated in FIG. 6.

1. The operator, after conditioning the communications terminal, depresses the "Request Service" key on the DCC.
2. For subscribers in outlying areas connected to a line concentrator, a connection to an available channel is automatically made and the "Request Service" function is forwarded to the district office (DO).
3. The "Activity Scanner" in the DO detects the "Request Service" function and informs the communications processor.
4. The communications processor assigns a "Digit Receiver", buffers, and other system components used for call origination.
5. A path through the switch matrix for the subscriber circuit to the assigned local equipment is calculated by the communications processor and transferred to the switch control unit where the path is established.
6. Upon receipt of a satisfactory path test function, the processor initiates a function to the subscriber's DCC which causes the "Send Address" indicator to light.
7. The subscriber keys a seven digit destination address by depressing the digit keys on the DCC.
8. The first three digits, when received by the digit receiver, are passed to the processor.
9. From an examination of the first three digits, the processor determines the proper destination DO. For example, the destination DO may be New York. This translation in the processor also results in identifying the regional office (RO) on which the destination DO homes.
10. The processor constructs a supervisory message, "Trunk Assignment Request," which is transmitted to the RO processor over an assigned supervisory channel to the RO through the Mt. Lukens branching repeater, through the main trunk system and the Palmerton branching repeater.
11. When the RO receives the trunk assignment request from the originating DO, the processor determines the proper routing for the call and selects the trunks to be used.
12. After the assignment has been made, the RO constructs a supervisory message containing the trunk assignment which is transmitted to the DO processor at Los Angeles over a supervisory channel.
13. After sending the trunk assignments, the RO processor canculates a path throug the matrix between the two trunks and transfers the path assignment to the switch control unit. The switch control unit causes the path through the matrix to be set up and tested.
14. When the DO processor has received the trunk assignment and the last four digits of the address, a supervisory message, containing the subscriber address, is transmitted to the RO over a supervisory channel.
15. After receiving the trunk assignment, the DO processor determines a path through the matrix from the originating subscriber to the assigned trunk, and transfers the path assignment to the switch control unit. The switch control unit causes the path through the matrix to be established and tested.

16. The RO processor, upon receipt of the subscriber address, constructs a supervisory message containing the trunk assignment and the destination subscriber's address. This supervisory message is transmitted to the DO at New York.
17. The processor at New York determines the status of the destination subscriber after translating the address included in the supervisory message. The processor also checks to insure compatibility between the originating and destination subscribers.
18. When the processor at the New York DO determines that the destination subscriber is available and the two subscribers are compatible, it seizes the destination subscriber line.

18A. If the destination subscriber is terminated on a line concentrator, the processor selects an idle circuit to the concentrator and sends a seize function to the concentrator.

18B. The processor connects a digit receiver to the selected circuit.

18C. When the line concentrator detects the seize function from the DO, it connects a "Digit Receiver" to the circuit and sends back a "Send" function to the DO digit receiver.

18D. The DO digit sends an indentity code representing the destination subscriber, upon receipt of the "Send" function.

18E. The concentrator uses the identity code to determine to which subscriber to connect the district office circuit.

18F. When the concentrator has received the identity code, it connects the circuit to the subscriber's line, sends a "Connected" function to the DO and disconnects the digit receiver from the circuit.

18G. The DO seize function is forwarded through the concentrator to the subscriber's DCC.

18H. When the DO processor receives the "Connected" function, it causes the digit receiver to be disconnected from the line.

19. The processor now determines a path through the matrix between the assigned trunk and the destination subscriber and transfers the path assignment to the switch control unit. The switch control unit causes the path to be set up and tested.
20. After the originating DO at Los Angeles has set up and tested a path through its matrix, the digit receiver begins transmitting a "Test" character toward the destination.
21. When the destination subscriber's DCC receives the "Test" character, it is transmitted back toward the originator along with a "Verification" function.
22. The originating DO digit receiver will receive the "Test" character verifying the connection. The "Verification" function is used to insure that the connected subscriber is the proper one.
23. After a good "Test" and "Verification," the digit receiver transmits a "Ring" function to both subscribers. The digit receiver informs the processor when ring is sent.
24. The originating DO processor causes the digit receiver to be disconnected from the originating subscriber.
25. When the originating subscriber's DCC detects the "Ring" function, it causes the "Ring" lamp to light.
26. When the destination subscriber's DCC detects the "Ring" function, it causes the "Ring" lamp to light and an audible alarm to sound.
27. When the destination subscriber hears the audible, the depresses the "Request Service" key to answer the call and stop ringing.
28. This action causes a function to be sent to the originating subscriber's DCC where the "Answered" lamp is lit.
29. This function is also sent to the DO at New York, where the processor constructs a supervisory message containing the "Answered" function and transmits the message on the supervisory channel to the RO.
30. The supervisory message is relayed by the RO back to the originating DO at Los Angeles, where the processor causes entries to be made on a storage medium. These entries will be used to indicate the start of the billing period.
31. When the terminals are ready to send and receive data, the DCC's exchange a function which causes the "Send Data" lamp to light.
32. The form and control of the data transmitted and received by the subscribers is controlled by the subscriber.
33. To disconnect, either subscriber depresses the "Clear" key on his DCC. This will cause a function to be sent to his respective DO indicating disconnect.
34. The "Activity Scanners" in the DO's detect the disconnect function and inform the processors.
35. In the destination DO, the processor constructs and transmits a supervisory message to the RO. The processor also instructs the switch control to disconnect the path through the matrix.
36. In the originating DO, the processor constructs and transmits a supervisory message to the RO. The processor also causes all connections made during the call to be disconnected and makes appropriate entries onto a storage medium indicating the end of billing on this call.
37. When the RO receives either disconnect supervisory messages, it causes the disconnect of the path through its matrix, making the trunks used on this call available to other traffic.
38. When the disconnect is complete in each DO, the processor causes a function to be sent to their respective subscribers which causes the "Idle" lamp to light on their DCC's.
39. The subscribers may now initiate a new call.

Figure 11:
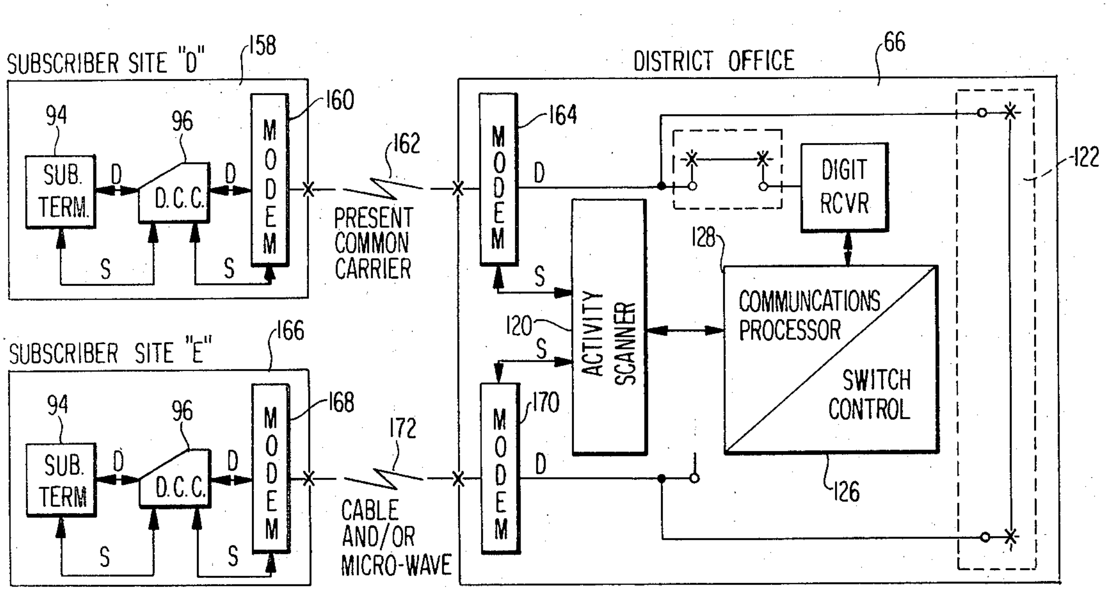
FIG. 11 is a diagram showing the analog line compatibility of the present invention with a digital communications console and MODEM for an intra-office call.

FIG. 11 shows a connection arrangement for an intra-office call through existing analog facilities. A subscriber site D is illustrated at 158 as connected through the district office by way of a MODEM 160, a common carrier link 162, and a district office MODEM 164. Subscriber site E, indicated at 166, is connected to the district office through MODEMS 168 and 170, coupled by a cable and/or microwave link 172. Both the connections in FIG. 11 illustrate the compatibility of the overall system and illustrate how the district office may be connected to subscriber sites through analog facilities such as the present common carrier link 162 and the cable or microwave analog links 172.

Figure 12:
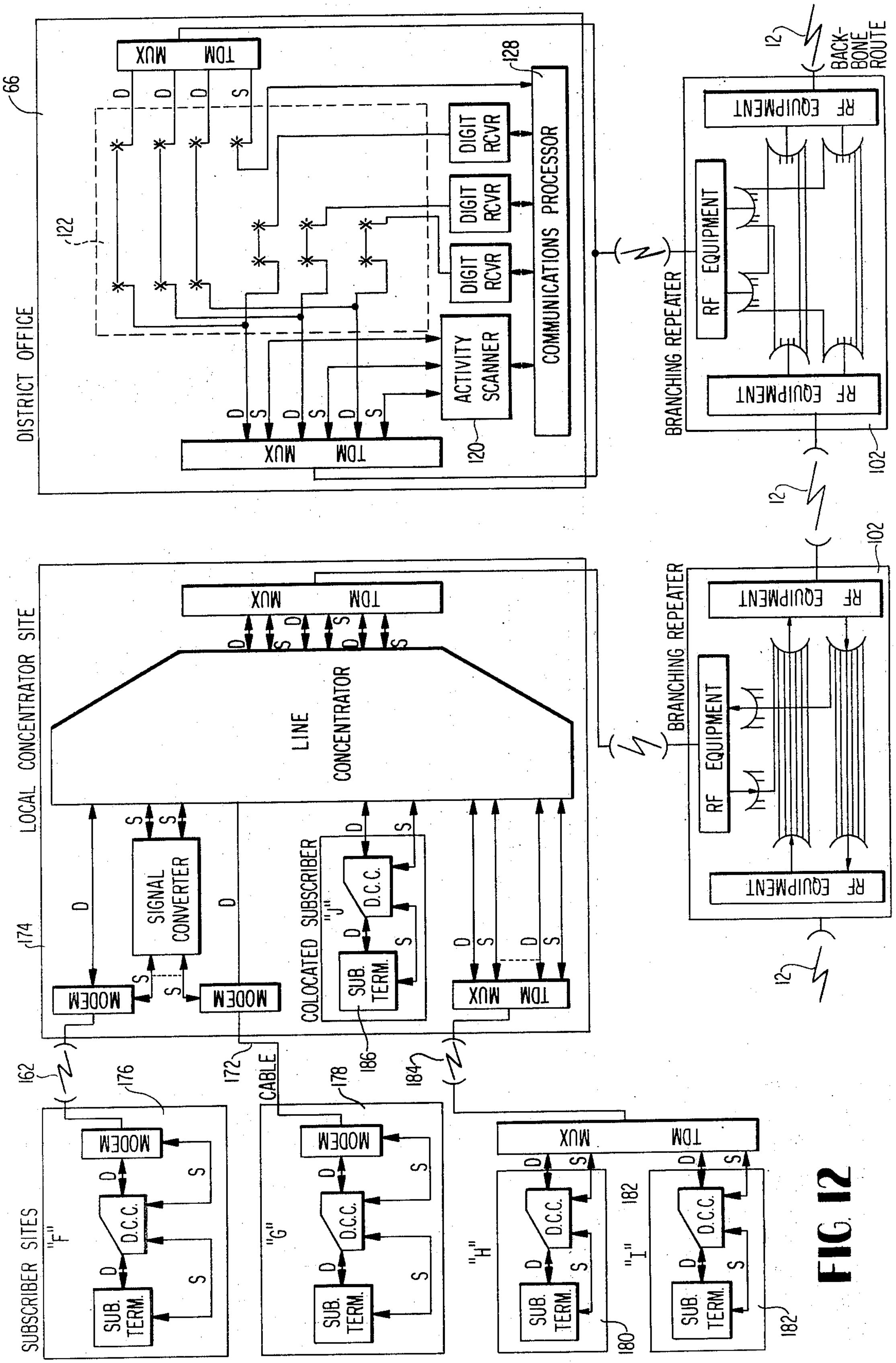
FIG. 12 is a diagram showing the remote line concentration provided in the system of the present invention.

FIG. 12 shows an arrangement by which remote subscribers gain entry into the system and to a district office 66. Remote subscribers are those whose geographic location is beyond the economic range of a district office (approximately 50 miles). These subscribers enter the network through a line concentrator, illustrated at 174 in FIG. 12. These remote sites F, G, H, and I are illustrated at 176, 178, 180, and 182 in FIG. 12 and pass through the line concentrator 174 to a branching one of the repeaters 102. Repeaters 102 are in the main trunkline or backbone route 12 and eventually connect by microwave links to a district office 66. If the subscribers are also located some distance from the line concentrator 174, as illustrated by the subscriber sites 180 and 182, connection is provided by way of digital microwave stations as illustrated by the microwave link 184. Connection alternatively may be through MODEM's and conventional analog facilities 162 and 172, as illustrated, for example, from sites F and G at 176 and 178. A configuration especially beneficial where many subscribers are located in one complex involves the co-location of the subscriber site and the line concentrator and this is represented by the subscriber site 186 labeled J.

The network of the present invention is designed to provide high quality, reliable communications service to public subscribers. In order to provide a highly refined long-distance transmissions system, it is recongnized that it must include a means of mobile connection to subscriber terminals.

In the present invention, the local distribution system is preferably in the form of a microwave low powered system designed to operate in the 11 GHz common carrier band. This band is generally free of congestion. In order to optimize the utilization of frequencies, the local distribution system is designed to provide maximum subscriber density on each link.

Figure 14:
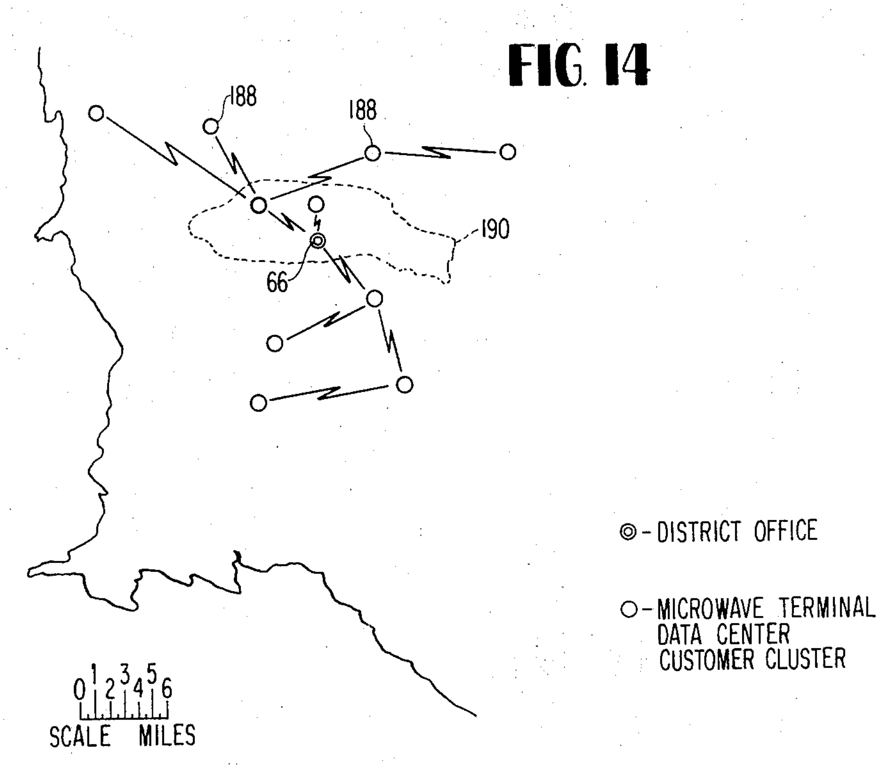
FIG. 14 is a diagram showing customer locations in clusters in a local distribution system constructed in accordance with the present invention.
Figure 13:
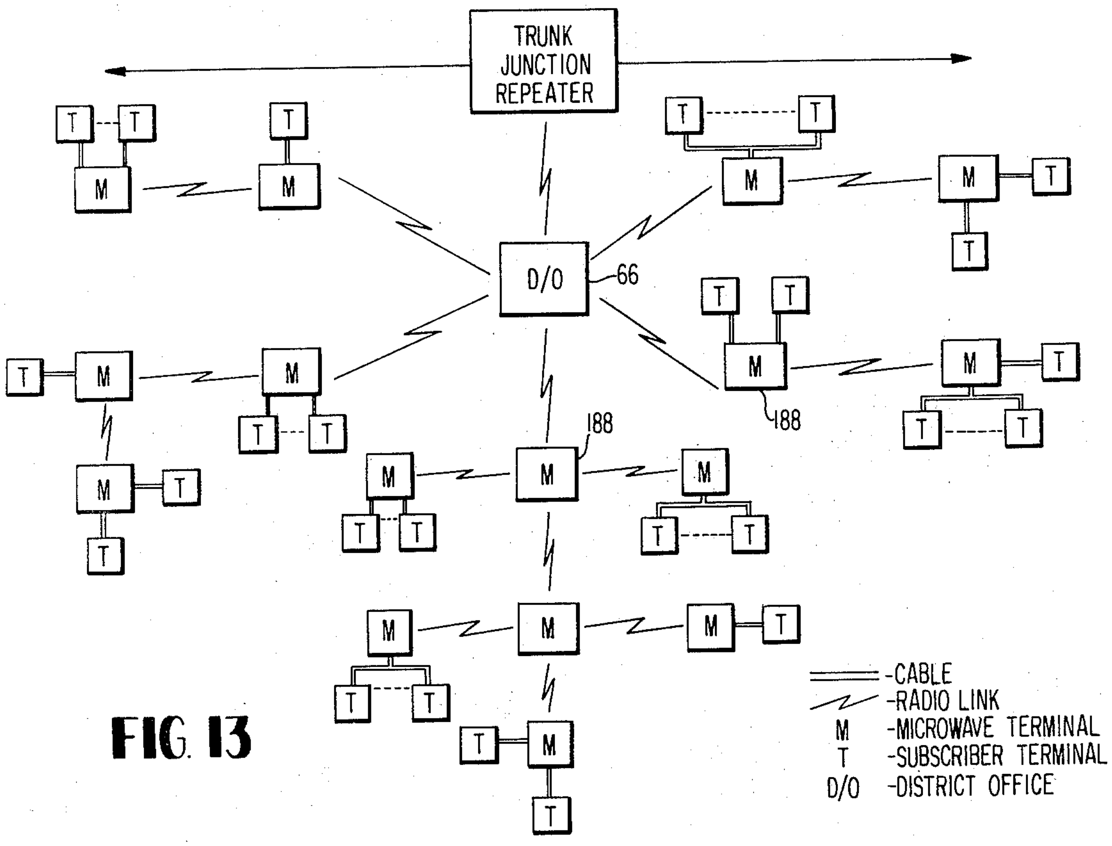
FIG. 13 is a diagram showing one of the basic local distribution plans for the system of the present invention.
Figure 15:
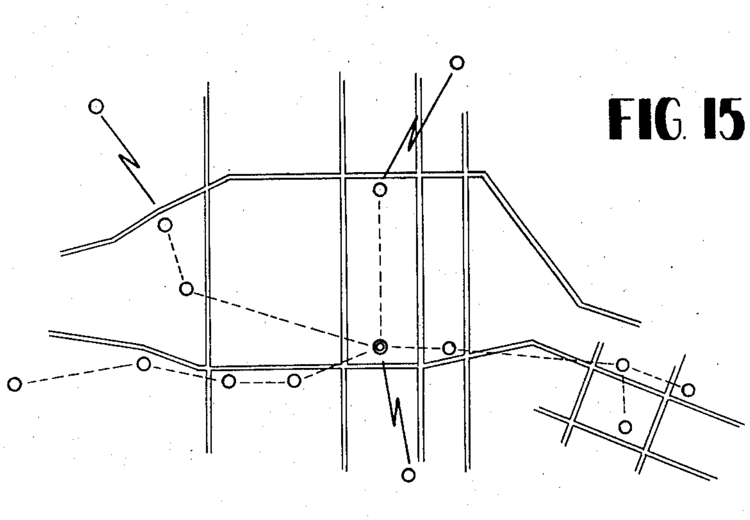
FIG. 15 is a diagram showing customer locations for an urban area.

FIGS. 13 and 14 illustrate the overall local distribution system of the present invention for a large city. The actual locations of potential customer terminals. such as highrise office buildings, banks, computer centers, industrial complexes, government office buildings, schools, and hospitals, were identified and analyzed to develop cluster areas which could be served with the type of microwave terminals designated for a local distribution system. FIG. 13 depicts the overall concept of the system within a representative city where a district office is connected by microwave links to a plurality of microwave local distribution terminals 188. FIG. 15 shows in detail the connections to the district office 66 for the dashed line area 190 of FIG. 14. This represents the area of heavy subscriber concentration, and the microwave radio or cable connections to the district office. FIG. 13 shows the basic multi-tier or ring configuration of the microwave terminal locations totaling approximately 50 microwave stations used to service the data concentration points basic area covered by a district office. Maximum radio links are 5 miles and signals from distant stations are repeated from the outer tier or ring to the inner ring. To insure availability of frequencies, no microwave station receives more than four frequencies.

A basic terminal package has been developed which has the capability of dropping and inserting 4,800 bps channels, as well as the capability of repeating channels from more distant terminals. The basic microwave terminal package includes a provision for routing a number of channels within the building accommodating the terminal; additionally, the terminal is engineered to extend its coverage by way of multipair shielded cables to adjacent buildings. This cable extends up to 2,000 feet in various directions from the terminal. Initial installation includes extra pairs to provides for future expansion.

Because of the necessity to repeat the more distant terminal channels at points of channel concentration, radio equipment capable of handling higher density traffic is employed, together with sufficient slave channel equipment modules to accommodate the additional requirements. House or building distribution cable is installed in signal ducts or raceways as dictated by building design. Adequate cost allowance has been made for hardware material necessitated by various in-building designs and drivers are installed at the multiplex equipment and at the subscriber interface to maintain the required signal level on the cable.

Figure 18:
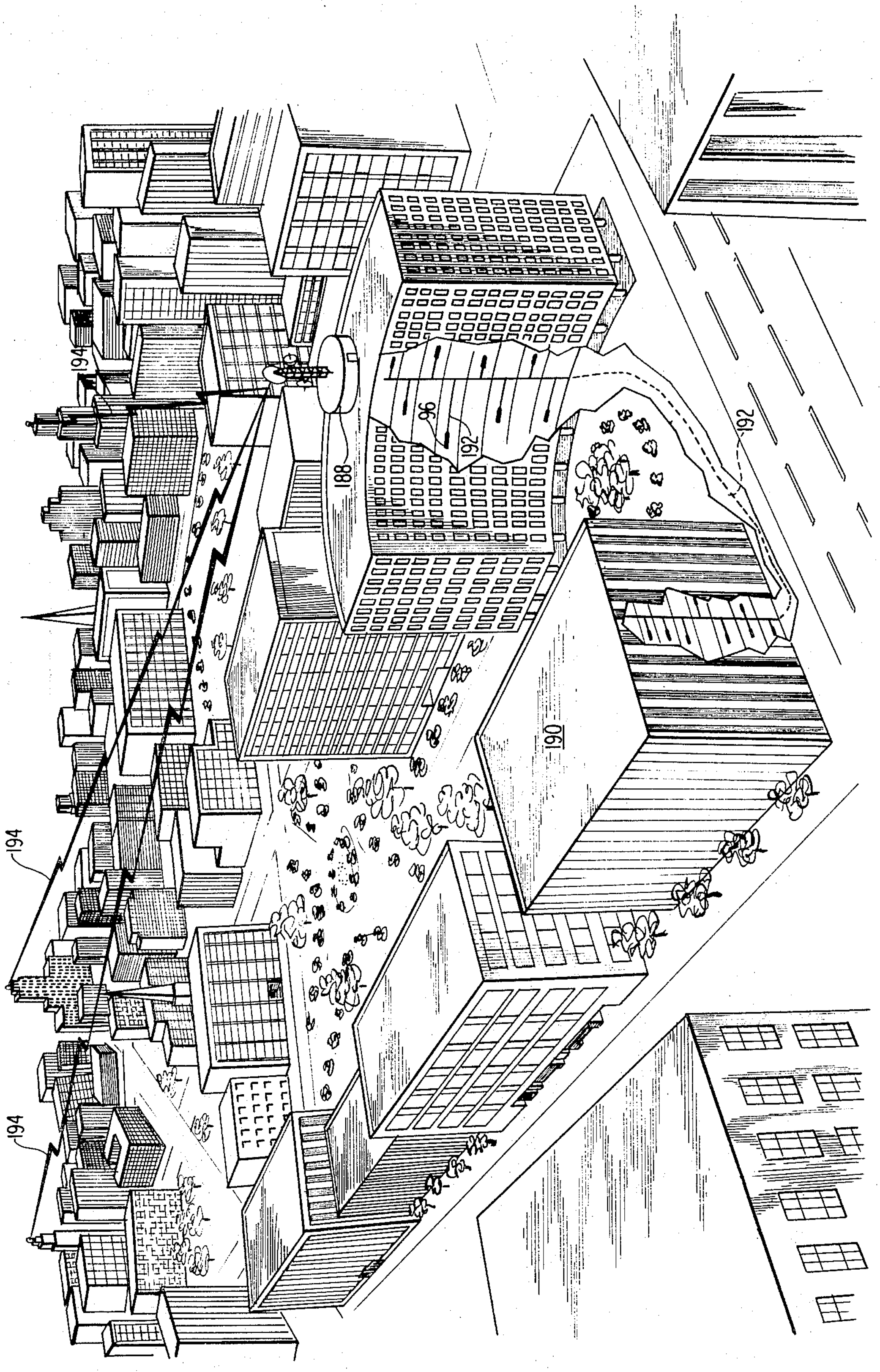
FIG. 18 is a pictorial representation of a portion of a local distribution system constructed in accordance with the present invention.

The cabinet in which the microwave equipment is roof-mounted is designed to protect the equipment against weather and extremes of temperature. Such a unit forming a local distribution system microwave terminal is illustrated on top of a building at 188 in FIG. 18. A cable connection between the terminal and a second building 190 is illustrated at 192 in FIG. 18. Microwave links to other terminals are illustrated at 194 in FIG. 18. The cabinet housing the equipment is approximately 8 cu. ft. in size and standard installation includes a roof mount for a 4 foot parabolic reflector used for the radio path. It may be necessary in some cases to utilize a short pedestal to mount the antenna in order to provide clearance over penthouse construction, parapets, or similar obstructions. Installation consists of securing the cabinet to the building structure, providing A.C. power mains, grounds and connection of signal cable. The size of the microwave equipment is such that it is not displeasing aesthetically.

Connection of the subscriber to the microwave terminal 188 within the building on which the microwave terminal is located is accomplished by connecting the subscriber from a branch terminal located within the building to the subscriber location as indicated at 192 and wiring into a digital communications console 96. The installation at the end of the outside distribution cable is similarly handled, the connection being made from the outside cable entrance terminal in the basement rather than from the multiplex on top of the building.

Figure 16:
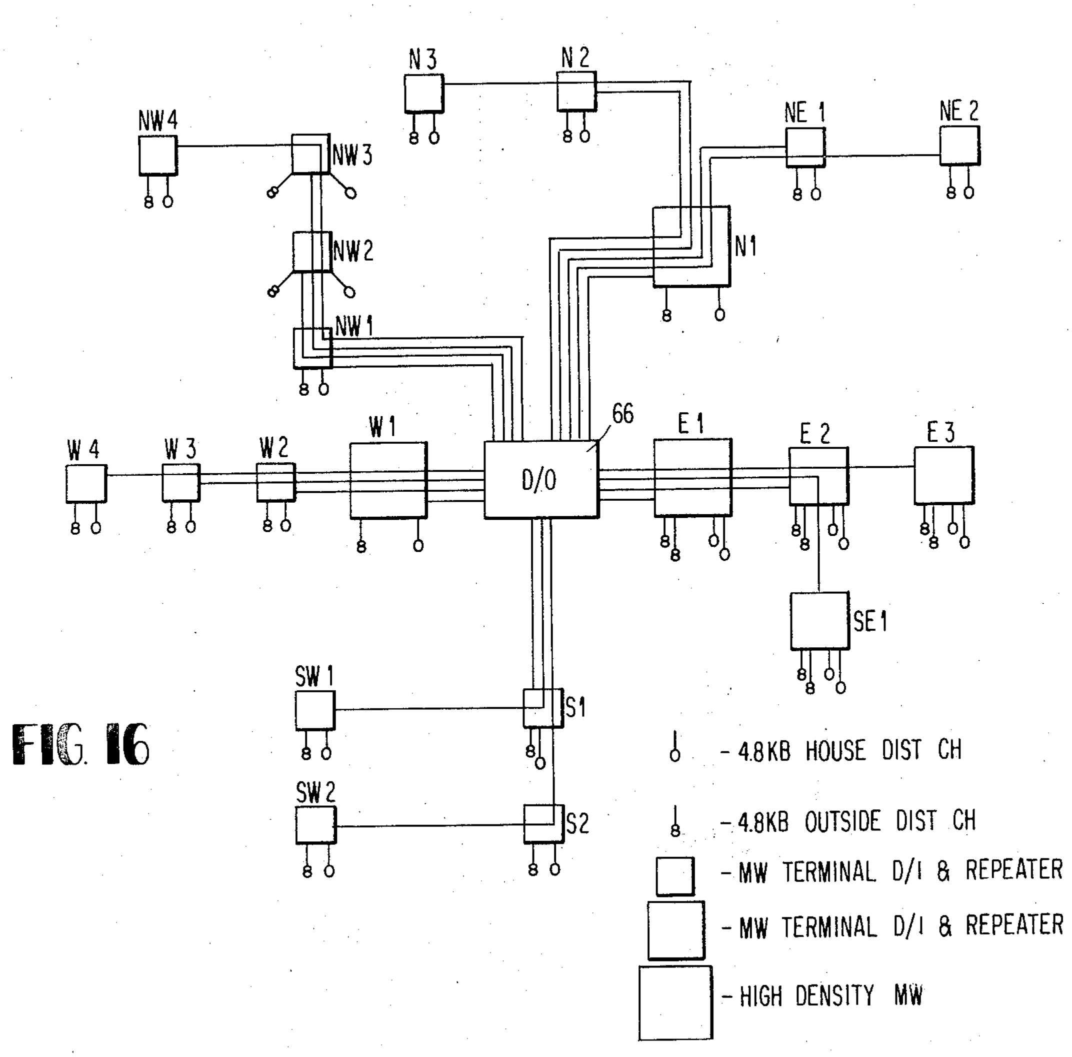
FIG. 16 is a diagram showing one of the basic plans for a downtown location in the United States.

In summary, the local distribution system consists of 16 basic microwave terminals 188, as illustrated in FIG. 13, each with a 100 channel drop and insert capability with two of the basic terminals having a 200 channel drop and insert capability. Additionally, the system has four high density terminals, each with 400 to 1,000 channel drop and insert capability. As explained above, terminals closer to the district office are used to repeat more distant stations as illustrated in FIG. 16. That is, the local distribution system shown in FIG. 16 has the capability of terminating approximately 1,700-4,800 bps subscriber terminals without the use of line concentrators. Subscribers having low speed transmission requirements are accommodated by the use of submultiple TDM multiplexers. Subscribers with requirements higher than 4,800 bps are accommodated by strapping input points of the multiplexers as described subsequently.

Figure 17:
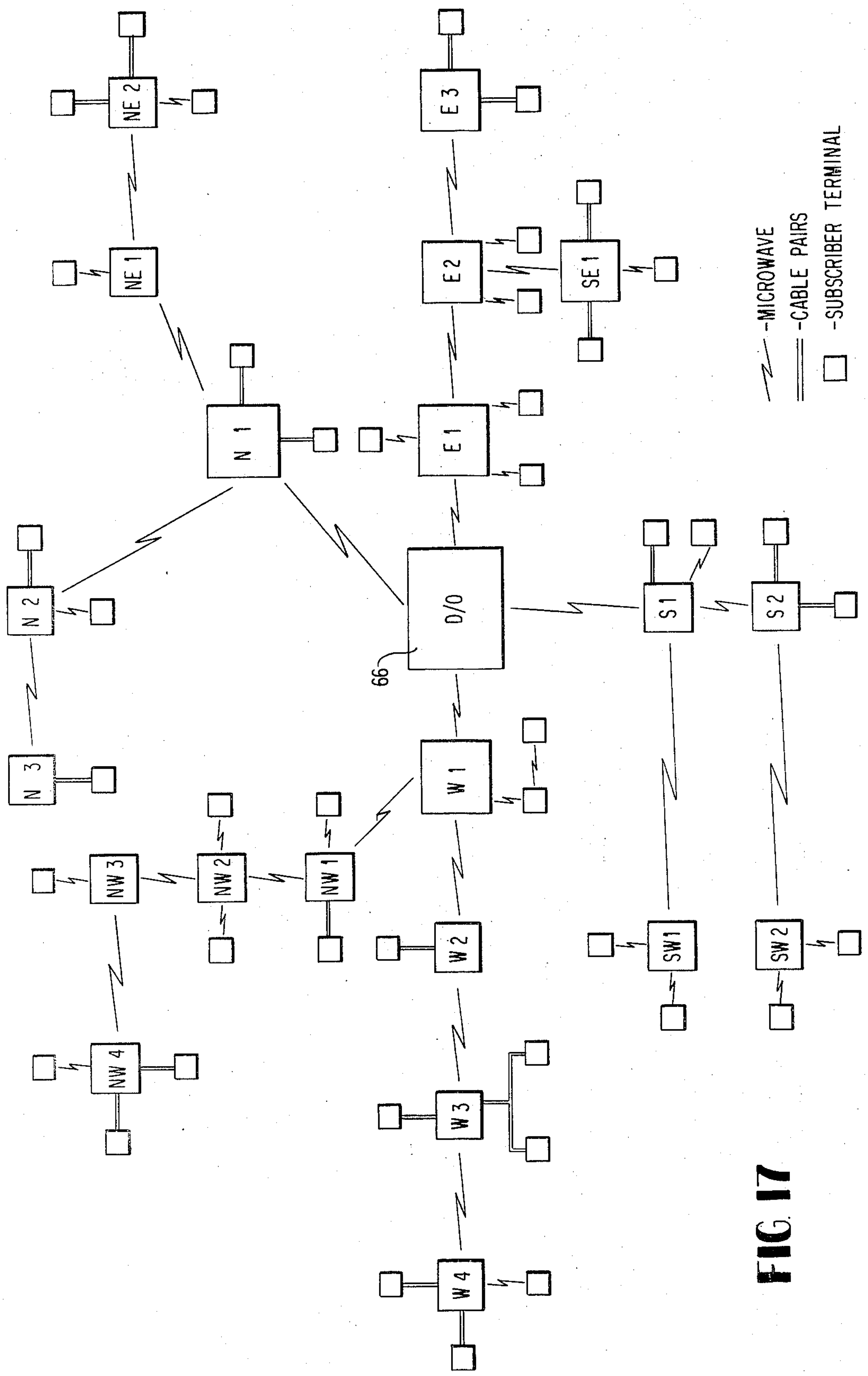
FIG. 17 shows an alternate local distribution plan in accordance with the present invention.

It is important to note that any of the basic microwave terminals for the local distribution system can easily be reconfigured for higher growth requirements by the addition of radio equipment capable of handling higher density channel loading and by the addition of slave multiple or channel equipment modules. As the geographic area serviced by these terminals grows, additional radio equipment can be installed to repeat channels back to the district office. The system discussed provides high flexibility to meet the differeing geographical and environmental conditions imposed by each terminal location. For example, if it is desired to locate a terminal in a building where it is impractical to lay outside access cable, a short-range microwave link may be established to this terminal location in lieu of the cable and such an arrangement is illustrated in FIG. 17. Lower density channel equipment (100 channels) will normally be used until the requirements for the terminal dictates higher capacity capability. As the basic microwave radio is the same, the future expansion is obtained merely by substitution of a channel equipment module of greater channel configuration.

In most cases, it will be possible to achieve line-of-sight range between two terminal points. Where possible, the antenna is located on the building in a manner to provide shielding to minimize mutual interference with other stations. The low power levels used in the transmitters largely relieve this problem. In those instances where a building or other structure interferes with line-of-sight, passive repeaters are utilized. Where active repeaters are required, the basic microwave without drop and insert capability can be used in an extremely low cost installation to repeat the channels.

DETAILED DESCRIPTION OF THE SYSTEM MULTIPLEXERS AND LINE CONCENTRATORS

The basic system multiplexing is performed by a group of multiplexer sets and line concentrators. FIGS. 19A through 19C, taken together, show an overall multiplexer system block diagram. Five representative digital communications consoles are illustrated at 96 in FIG. 19A. Two of these pass through a 4,800 bps multiplexer 196, while two others pass through the line concentrator 174 to the 4,800 bps multiplexer 196. A corresponding demultiplexer 198 is coupled to the digital communications console 96. Multiplexer 196 is connected through additional multiplexer sets 200 and 202 to the local distribution loop transmitter 204. A microwave link 206 (or laser link as described below), corresponding to those shown at 194 in FIG. 18, couples the transmitter 204 to a receiver 208 located in the district office 66. The signal passes from the receiver 208 through a 460.8 K bps demultiplexer 210 and two more demultiplexer sets 212 and 214 to the activity scanner 120. Signals are passed to the microwave trunk 12 by way of additional multiplexer sets 216, 218, 220, and 222, and microwave transmitter 224. Incoming signals from the trunkline pass through receiver 226 and corresponding demultiplexer sets 228, 230, 232, and 234. Also forming a part of the district office 66 are the multiplexers 236, 238, and 240 which are coupled to local distribution loop transmitter 242. The connection to the digital communications consoles 96 for incoming signals is by way of the microwave link (or laser link) 244, local distribution receiver 246, and demultiplexers 248, 250, as well as demultiplexer 198 previously described.

In the basic system illustrated in FIGS. 19A–19C, all users enter the system through a digital communications console (DCC). The system accommodates users operating at rates of 150 bps to 14,400 bps on switched service and can accommodate higher user data rates, up to 48 K bps, by private point-to-point service, bypassing the switch on a dedicated line basis.

Line concentration and multiplexing are performed in local distribution up to microwave or laser links operating at rates to 460.8 K bps. The local distribution system is tailored to meet subscribers' requirements in each area served by the system. Multiplexers are used to provide for modular expansion to accommodate varying numbers of lines as required, up to the designed maximum for input ports for each multiplexer. This design maximum is 32 input ports each for the 4,800 bps and the 153.6 K bps multiplexers, three input ports for the 460.8 K bps multiplexer, 25 input ports for the 3.84 M bps multiplexer, and five input ports for the 19.2 M bps multiplexer. The latter two multiplexers used in the microwave trunk links are also modular in design.

Demultiplexing at the district office is carried out to the level required to return each subscriber's line to the original data rate for switching. The activity scanner and digit receiver monitor all lines for call activity and process new calls. Multiple activity scanners are used to service the lines operating at different bit rates and to reduce the reaction time to a request for service. In-band signaling is provided for and can be used if desired operating at the subscriber's data rate, i.e., 150, 4,800, 9,600, or 14,400 bps.

The district office switch interfaces the microwave trunk link through four cascaded multiplexers, producing a maximum bit rate of 19.2 M bps for up to 4,000 channels, each channel operating at 4,800 bps. The 19.2 M bps output asynchronous multiplexer is of one design while all other multiplexers are basically the same asynchronous design with different clocks to meet specific requirements.

At successive trunk modes, some of the high speed multiplex links are demultiplexed with dropping and inserting channels to serve branches from the trunks. To avoid complete demultiplexing in each mode, the grouping of channels before multiplexing are arranged to combine in the same group those channels to be dropped out at a given point for branching.

Multiplexer clock rate is determined by plug-in time-clock modules which can be changed to match the requirements in each installation. This permits the use of the same basic multiplexer unit in various positions within the system. Input logic is also divided into modules, permitting the multiplexer to be configured to accommodate the input channels required up to the design maximum. System growth is facilitated by the capability to install a minimum configuration multiplexer initially, adding input channels as the demand for the service grows among subscribers.

To provide service at other than the basic input rates of 150 bps and multiples of 4,800 bps, strapping of input channels on the 153.6 K bps multiplexers is possible, increasing the channel bit rate in proportion to the number of channels strapped. This feature is used primarily in providing 9.6 K and 14.4 K bps service using 4,800 bps multiplexer input ports, but it can also be used for providing dedicated service at rates higher than 14.4 K bps up to 48 K bps and for users requiring multiples of 150 bps. Strapping is a manual function in most cases, performed when the multiplexer is installed or expanded, although the optional line concentrator that operates with various bit rate inputs simultaneously may be constructed to remotely accomplish the strapping on its output multiplexer.

The fully implemented line concentrator accommodates up to 28 full duplex inputs, concentrating them into 10 output ports. It connects subscriber lines requesting service to available output lines and connects incoming calls on any trunkline to the appropriate subscriber line as indicated by the partial address transmitted preceding the received call. The concentrator functions at various data rates. Thus, with a change in clock frequency, it may be used as a 150 bps concentrator, a 4,800 bps concentrator, or may be used with lines operating in multiples of 4,800 bps. All inputs to any one line concentrator operate at the same bit rate. The line concentrator is then installed in the system at a point where it can feed the multiplexer having input ports accepting the same data rate as the line concentrator.

An optional design change permits a single line concentrator to accommodate inputs operating at various bit rates, switching them to different output lines connecting to multiplexers operating at appropriate input rates. This is desirable in cases where relatively few users must be served where they operate at different data rates. Intermixing of rates on output lines requires additional logic in the line concentrator as well as a capability to strap ports in the 153.6 K bps multiplexer to which it is connected, if rates of 9.6 K and 14.4 K bps are to be accommodated.

Through the use of subscriber group multiplexing, i.e., the use of multiplexers at subscriber sites, it is possible to provide service to a large number of subscribers with one RF or laser link to the district office 66. A subscriber group multiplexer arrangement is illustrated in FIG. 20. The use of several levels of multiplexers/-demultiplexers (mux/demux) allows several subscribers with different rates to share a common communications link to the area district office. Subscribers with rates that are different can be multiplexed into and out of the same communications link. Strapping of mux/-demux input/output ports allows any rate that is a multiple of 4,800 bps to share the same multiplexer equipment. In the case of data terminals with 150 bps rates, a lower speed mux/demux unit is used to increase these low speed rates to the 4,800 bps input rate of the intermediate speed equipment that interfaces with the transmitter/receiver equipment in the communications link.

Strapping is a simple function that can be adjusted to subscriber requirements with a minimum of complexity and multiplexer port strapping is illustrated in FIG. 21. The several different rates which are supplied by different types of user equipment, i.e., 150, 4,800, 9,600, 14,400, 19,200, and 48,000 bps, are accommodated by strapping multiplexer input ports and demultiplexer output ports. As shown in the block diagram of FIGS. 19A–19C, the 4,800 bps input rate multiplexer can be used by users of different rates by simply strapping the proper number of input ports together. Since the basic rate of the multiplexer is 4,800 bps, the following table shows the rate increases with strapping:

| | Input Rate | Channels Strapped |
|---|---|---|
| 1. | 4,800 bps | 0 |
| 2. | 9,600 bps | 2 |
| 3. | 14,400 bps | 3 |
| 4. | 19,200 bps | 4 |
| 5. | 24,000 bps | 5 |
| 6. | 48,000 bps | 10 |

The multiplexer is not limited to an upper range of 48,000 bps. Higher bit speeds are available in any increment of 48,000 bps. The strapping assembly is preferably located on the front panel of the multiplexer/-demultiplexer units. This location offers a clear, unambiguous visual indication of the equipment port status. Strapping is accomplished electronically with the equipment and does not require the usual patch or wire changes required in most equipment of this type. This feature facilitates rapid changes in cases of user equipment rate changes.

A unique slide-actuated switch is used to change the strapping configuration by a simple move to one of three positions. An arrow indicates one of the two active configurations of the port. An arrow pointing up indicates that the port is in use. An arrow pointing left indicates that the port is strapped to the port at its left. With the switch in the center position, there is no indication, signifying that the port is not in use.

Previously, descriptions have been in terms of multiplexers and demultiplexers. These devices actually occur in multiplexer/demultiplexer sets. The sets are identified by the multiplexer output rate and there are five sets, namely, the 4,800 bps mux/demux set, the 150.6 K bps set, the 460.8 K bps set, the 3.84 M bps set, and the 19.2 M bps mux/demux set. All of the multiplexer sets have the identical functional design in order to decrease the total development effort and to simplify anticipated future logistical considerations. Each set always operates at its specified output rate. A more detailed block diagram in FIGS. 22A and 22B illustrates the main functional components and organization for each of the multiplexer sets.

When required, data and timing interface circuits are used primarily as impedance matching and voltage level converters so that all internal mux/demux operations can be performed with available integrated and MSI (medium scale integration) components. Each input interface circuit inputs directly to its corresponding input module, whereas each output interface circuit accepts and retransmits timing and data from its corresponding output module. All the multiplexer sets with the exception of the 460.8 K bps and the 19.2 M bps sets accommodate up to 31 input modules. There is a 1:1 correspondence of output modules within the same multiplexer set. The number of input/output modules used within a given multiplexer set is a direct function of its location within the overall multiplexer hierarchy. The 460.8 K bps set accommodiates up to three asynchronous data inputs while the 19.2 M bps multiplexer set accommodates up to five asynchronous data inputs. The common equipment sections for each multiplexer set, however, are identical.

The output data stream for each input module within the multiplexer is routed directly to its corresponding multiplexer gate input. Enable gate outputs from the electronic controller module for scan generation and control provide the timing during which data may be read out from each of the input modules to the multiplexer gates. A similar but inverse operation occurs within the demultiplexer portion. After the overhead control bits have been extracted from the demultiplexer data stream, an electronic controller module is used to distribute data to the proper output module. The electronic controllers in the multiplexer and demultiplexer portions of the equipment are synchronized by use of predetermined interpretation of the overhead control codes.

Each input and output module contains an elastic storage device in order to accommodate the asynchronous data inputs. In addition, the output modules contain a digital phase locked loop so that a smoothing operation can be performed on the data prior to retransmission through the output interface circuits.

The overhead generator (multiplexer) and detector (demultiplexer) perform a dual function. The first is to synchronize the multiplexer and demultiplexer portions of the set. The second function is to account for the data rate variations which, if ignored, would tend to cause the elastic storage to either overflow or underflow, thereby losing bit integrity. Specifically, the overhead channel is used to transmit an additional data bit from a given input module to its corresponding output module. This is a stuff operation. Conversely, the overhead channel is also used to signal a given output module that a fill bit (non-data bit) has been inserted by the multiplexer and should be removed prior to final retransmission. Since the multiplexer sets operate primarily as data distributers rather than a data processor, its design imposes no restrictions on the format, sequences, organization, or coding of the digital input data.

The 153.6 K bps multiplexer set normally operates with 4,800 bps input data. However, the design of its electronic controller module is such as to accommodate higher input rates by means of port strapping. The mechanical configurations of the circuits required to accommodate asynchronous data (input/output modules) permits significant flexibility for either increasing or decreasing the total number of data channels. From four to eight input/output modules can be added or deleted within the multiplexer sets by a simple manual operation.

Following is a set of 12 basic requirements that are satisfied by the multiplexer sets:

1. The multiplexer set shall acquire frame and maintain bit count integrity on all channels while accepting input data variations from each channel of up to ± 250 parts per million for nominal values.
2. The multiplexer portion of each of the above multiplexer sets shall automatically generate and transmit, as part of the composite multiplexed output data, the overhead synchronization data required for the proper operation of the demultiplexer portions of the corresponding set. The multiplexer portion of each multiplexer set shall not require information from the demultiplexer portion of the corresponding set to perform the overhead control data function. The overhead data shall be identical to the specific port rate for the multiplexer.
3. The demultiplexer portion of each of the above multiplexer sets shall receive and automatically detect the overhead control data for its proper operation.
4. Each multiplexer set shall be capable of operating with either an external or internal reference timing module. The mode desired shall be manually selectable.
5. Each of the above multiplexer sets shall have an output rate which is determined by the input data rate and its location within the overall multiplexer group.
6. Each of the above multiplexer sets shall be capable of accepting asynchronous data inputs (with associated timing).
7. Each multiplexer set shall automatically compensate for data entering an input module at a rate which differs from its normal value in the following way:
   a. When data enters an input module at a rate which is below its nominal value but consistent with the data rate variation limitations as specified, the multiplexer equipment shall automatically compensate by the injection of a FILL bit while simultaneously inhibiting a true data bit readout from the input module.
   b. When data enters an input module at a rate which is higher than its nominal value but consistent with the data rate variation limitations as specified, the multiplexer equipment shall automatically compensate by the removal of one data bit from the normal output module data stream and transmit it as a portion of the overhead control data. This is a STUFF operation.
   c. All information pertinent to the injection or deletion of data bits as described above shall be automatically transmitted through the overhead data channel. In the case where the data bit has been deleted (i.e., STUFF), the bit sense (whether the bit is a logic 1 or logic 0) shall also be transmitted through the overhead data channel.
   d. The overhead data channel for each multiplexer shall service each input module in that set in sequence.
8. All multiplexer sets (except the 460.8 K bps and the 19.2 M bps sets) shall be capable of operating with up to 31 input modules installed. Correspondingly, each demultiplexer shall be capable of operation with up to 31 output modules installed. For a given multiplexer set, there shall be a 1:1 correspondence between input and output modules. The 460.8 K bps set shall operate with up to three input/output modules and the 19.2 M bps set shall operate with up to five input/output modules.
9. The demultiplexer portion of each multiplexer set shall be capable of accepting the output data rate and associated timing of the multiplexer portion of the multiplexer set. The input timing shall establish the reference timing for the demultiplexer units.
10. Each output module within the demultiplexer portion of a multiplexer set shall accept data under timing commands from the demultiplexer unit. The output modules shall automatically restore the data and timing rate which entered the corresponding input module in the multiplexer portion of the multiplexer set. The output modules shall also operate with the demultiplexer synchronization detection circuitry in order to operate on overhead control commands. That is, it will automatically compensate for input timing variations experienced by the corresponding input module. These operations will result in either the addition or deletion of a data bit into the output module output data stream. Each output module will also smooth the output data stream to remove the accumulated distortion resulting from overhead command operations.

11. The demultiplexer unit shall derive all information pertinent to the injection or deletion of bits into or from the data stream from the overhead control data. When a data bit is to be injected into the output data stream, the bit sense (logic 1 or logic 0) shall be automatically determined from this overhead data.
12. The 153.6 K bps multiplexer set shall be operated nominally with 4,800 bps input rates; however, it shall also accommodate higher input rates by means of port strapping. Higher input rates shall be multiples of 4,800 bps.

As previously indicated, the number of digital communications console users may be significantly increased without assigning a unique multiplex port for each DCC by the use of line concentrators. The major function of the line concentrator is to provide service for N DCC users through the use of M multiplexer ports where N is greater than M by a factor of two or more. The line concentrator accomplishes this function by monitoring all DCC's interfacing the line concentrator for a request for serfice. On detecting a request for service (any DCC), the line concentrator (LC) determines the availability of an unused multiplexer port and assigns the port to the DCC requesting service.

The nature of the port assignment performed by the LC is to connect the DCC requesting service to the assigned port through a matrix crosspoint (bi-directional) capable of gating both timing and data. The line concentrator (LC) further disconnects assigned DCC's when their transmissions are completed and makes available the disconnected port for subsequent users requesting serfice. The LC (line concentrator) communicates with the district office via a separate supervisory channel for connecting or disconnecting any and all DCC's interfacing the LC.

FIG. 23 is a line concentrator flow diagram and the line concentrator performs its functions in the sequence described in FIG. 23.

Power on starts both a supervisory and request for service scanner. A request for service starts a search of contents of an associated memory for a location which has been cleared. One bit of the contents of each location is used as an "in use" designator and 5 bits are used to store the binary code representing the DCC number to which that location has been assigned. The location corresponds to the assigned port.

Searching for an available channel is accomplished by sequentially addressing the memory (by stepping the port counter) until an "in use" bit is found to be zero (0 bit). Since there are 10 ports total, a count of 10 tries of sequentially addressing memory and testing the "in use" bit for zero without success will cause a service request mask and the sending of a "busy" code. The first port to become idle, however, will immediately take away the mask and the port will be assigned to the first request detected by the scanner. For all "no requests" detected during the scan, the memory locations are interrogated to detect if this particular "no request" corresponds to a previously assigned port which has been disconnected by the district office. For this case, the LC erases the contents of the comparing location, carrying the "in use" bit and corresponding crosspoint.

The line concentrator derives its own internal timing for control operations and provides a selectable rate for interfacing with DCC's and multiplexers having rates of 150, 4,800 and 9,600 bits per second.

It should be noted that the only section of the line concentrator impacted by changing rates to accommodate different rate DCC's is the "busy reply controller." This is consistent with the optional time module selection for DCC's. The crosspoints of the matrice are capable of through putting data at rates up to 10 megabits per second. Since the supervisory channel receives external timing, it will operate at the rate of the input clock.

Compatible bit rate timing to the DCC for the busy code therefore is the only required selected timing. This is accomplished by the rate selected switch on the line concentrator. A single crystal frequency is used and counted down to provide the busy clock rate. The various rates are gated with the rate select switch in determining the busy signaling rate. Other rates are available with either replacing the crystal or using other divisions of existing crystal frequencies.

An optional feature of the line concentrator, easily implemented, is the capability to interface with users of different rates and to route their inputs to different rate multiplex ports simultaneously. As presently configured, the line concentrator can be manually switched to service any one of three rates (150 bps, 4,800 bps, and 9,600 bps) where the line concentrator input rate corresponds to the multiplexer port rate, i.e., 150 bps DCC's interface with the LC and the LC assigns ports to 150 bps mux/demux input/output port exclusively. The optional feature adds the capability for a predetermined number of DCC's of one rate to be serviced by the LC with port assignments of like rates and DCC's of another rate to be simultaneously serviced by the same LC with different port assignments (different mux/demux) of the same rate. Predetermined assignments have been chosen for this option rather than having a completely programmable random assignment device due to the cost and complexity. Other variations are, however, feasible to implement within the framework of the line concentrator organization.

It is possible to incorporate the inclusion of the predetermined assignment option so as to select the "busy" reply transmission rate consistent with the interfacing DCC rate and provide an additional "ports in use" memory. The second memory would be used to control the port assignment of the second rate. That is, during the scan of the sequentially assigned predetermined DCC's of the first rate, port assignment can be made from one "ports in use" memory, and during the continued scan of the sequentially assigned predetermined DCC's of the second rate, port assignment would be made from the second "ports in use" memory.

A detailed block diagram of a line concentrator is illustrated in FIGS. 24A and 24B. The line concentrator has been configured to allow 28 DCC users to share 10 multiplexer ports. This by no means is a maximum configuration but does represent a configuration consistent with initial developments. The line concentrator has been organized into five basic functional areas to facilitate expansion without requiring an organizational change. These major functional areas of the line concentrator are (1) request for service scanner, (2) controller, (3) supervisory receive and control, (4) busy reply controller, and (5) electronic crosspoint matrix.

The request for service scanner sequentially monitors each DCC data input line (in-band signaling assumed) for the presence of a "request for service" signaling code. The detection of a "request for service" sets a "service request" flip-flop for the DCC signaling. Note that a number of simultaneous "request for service" signals may be sent from the interfacing DCC's. The "request for service" signals are honored sequentially at a high controller rate until the LC experiences an overload. Once the port assignment capability (10 ports) has been reached, all subsequent requests for service are masked until a port becomes available at which time the address in the scanner is immediately serviced. A "busy" code is transmitted to the DCC requesting service when all ports are in use.

The controller acting on signals from the scanner locates an available port, connects the DCC data and timing line to the available port, records that the port is in use and steps the scan counter to its next cycle. The controller also provides the mask signals to the scanner when all ports have been assigned and disconnects the DCC's that have previously been granted service but now have completed their transmission.

The enable signal from the scanner activates the available port locator portion of the controller. The port locator scans all "ports in use" flip-flops until an available port is located. On finding an available port, the DCC number requesting service (scan counter output) is transferred to the location in the "ports in use store" memory specified by the port counter. Once the address is placed in the location of the memory, the "in use" flip-flop (a bit of the same memory location) is set. At this point in time the DCC number requesting service and the port assigned are in the scan counter and port counter respectively. The DCC number is also in the "ports in use store." These two codes are decoded to provide the electronic crosspoint matrix row and column select signals to connect the requesting DCC to the assigned port. The controller now instructs the scanner to continue by incrementing the scan counter. Monitoring will continue unless the mask is enabled, indicating the last assigned port was the last port available.

The "enable" from the scanner will occur each cycle for DCC's still in service when the scan counter interrogates its "service request" flip-flop. For this reason, each "enable" causes a compare on the scan counter and contents of the associative memory comprising the "ports in use store." If a "request for service" has previously been recognized and honored (by connecting the crosspoint), the DCC number requesting service will be contained in the store and a compare will result. For each compare, the request is ignored and the scanner is incremented to monitor the next "request service" flip-flop.

The request for service scanner consists of a special line receiver and maskable request service storage element for each DCC data input line. These lines (28) are sequentially wired to a 28 data selector/multiplexer addressed by a "scan counter" which modulos on the number of DCC's interfacing the line concentrator. Note that each scan counter state corresponds to a DCC number. As the scan counter cycles under control of the LC controller, the output of the data selector represents a "request for service" or "no request for service" for each DCC in a scan cycle. That is, the output of the data selector will become active when the scan counter reaches a DCC number (between 1 and 28) for which the first "request for service" flip-flop is set.

The active signal from the scanner is sent to the controller to determine if an unused port is available for the DCC requesting service. The controller also receives the scan counter "state" and "data selector inactive" signal for disconnect function servicing. The scanner "request for service" flip-flops also receive signals from the supervisory receive and control logic to initiate the connect and disconnect functions specified by the district office by the supervisory channel.

The supervisory receive and control logic of the line concentrator is unidirectional. This results from in-band signaling between the DCC and the district office. Each line concentrator has a port from the demultiplexer specifically assigned for the reception of supervisory messages from the district office. Supervisory signaling in the other direction is not required but is an easy addition for changes in scope or requirements. The district office can command the line concentrator to seize and connect the specified DCC to a specified port through the use of appropriate supervisory messages over the supervisory channel. The supervisory messages enter the line concentrator serially from the supervisory port of the demultiplexer and are stored in a command and address holding register. A bit counter stepped by the input clock records each bit received and determines when the complete message (a predetermined number of bits) has been received. The message is then decoded and the specified action performed by the concentrator.

The busy reply controller becomes active when all available ports have been assigned and the "all ports in use" signal is active. The busy scan counter sequentially monitors each DCC not being serviced for a "request for service" indication. For each detected "request for service" the busy reply controller generates and transmits a busy code to the DCC which causes the DCC to drop the "request for service" and illuminates the "busy" indicator. The busy reply controller becomes inactive when a port becomes available for assignment. The busy code is sent to the DCC over the same line as it receives data from the multiplexer and at the same rate.

Following are a list of seven basic requirements fulfilled by the line concentrator unit which interfaces between the user equipment (DCC) and a local mux/demux set:

1. The purpose of the line concentrator is to facilitate the connection of multiple DCC units into the local mux/demux configuration while utilizing a relatively small number of multiplexer input/output channels. In effect, the line concentrator functions as a pre-multiplexer and predemultiplexer on a time shared basis.
2. The present line concentrator configuration permits up to 28 user devices to be connected with 10 multiplexer set channels. The LC shall receive up to 28 data inputs and 28 corresponding timing inputs from each DCC. Conversely, it shall provide 28 output data lines and 28 corresponding timing lines to the DCC units. That is, two data and two timing lines shall be connected between the line concentrator and each DCC unit.

3. In a similar way, the line concentrator shall provide 10 data and timing lines to the local multiplexer and accept 10 data and timing lines from the corresponding local demultiplexer set. In addition, one additional data and timing pair shall be accepted from the demultiplexer unit for supervisory signaling.
4. The line concentrator unit will constantly monitor the user devices for an activity service request. If the line concentrator is not presently at full capacity, it shall, by the appropriate selection of the proper crosspoints within a switching matrix, connect the proper DCC to a multiplexer and demultiplexer channel. This in effect affords full duplex operation. If the line concentrator is presently at full capacity when a service request is detected, it shall generate and retransmit a busy code to the requesting device.
5. The line concentrator unit shall also constantly monitor the supervisory channel output from the local demultiplexer unit. Data within a supervisory message is generated and transmitted to the line concentrator by a district office processor. In this case, a call is being initiated by a remote user device and directed to a local DCC. The supervisory message shall contain sufficient coding to permit the line concentrator to perform the necessary matrix crosspoint selections. This will permit the in-band channel to be completed from the caller unit to callee unit. The line concentrator shall also monitor the supervisory channel for disconnect commands. The line concentrator shall then disconnect the specific crosspoint connection within the matrix.
6. Each line concentrator unit shall have the capability to operate with 150 bps, 4,800 bps, and 9,600 bps users. The rate at which the line concentator operates shall be switch selectable by manual means. Once selected, the line concentrator will always operate at that rate until changed by a different switch position; that is, all users connected to an LC must operate at the selected rate.
7. The crosspoint matrix within each line concentrator unit shall be flexible so that the ratio of user devices to multiplexer channels can be increased or decreased in order to more clearly match an optimum configuration.

FIGS. 25A and 25B constitute a block diagram of a line concentrator crosspoint matrix. The modulator electronic crosspoint provides reliable and rapid user servicing and control. The electronic crosspoint matrix is a 28 by 10 configuration and this configuration provides 280 bi-directional crosspoints capable of connecting/disconnecting the timing and data of each and every DCC to any one of 10 mux-demux ports. Selection and activating (connecting) or selection and deactivating (disconnecting) any crosspoint occurs under control of the line concentrator controller or supervisory network which receives its commands and addresses from the district office.

Implementation of the crosspoints is in a four by four or two by four block since the basic crosspoints storage elements consist of single medium scale integrated circuits containing four latch circuits. These latch circuits gate the timing and data transfer gates when the crosspoint has been selected and the latch set. Additional users (above 28) can be added by increasing the matrix size. The matrix size in number of crosspoints is equal to the product of the number of allowable DCC inputs and the number of multiplexer ports they must share. Implementation of the line concentrator allows expansion to 32 users with the following modifications: (a) A service request flip-flop addition for each DCC added, (b) A busy reply circuit for each DCC added, (c) Expansion of the cross-point matrix to a 32 by 10 (320 crosspoints) configuration, and (d) Driver/receiver additions for each added interface line.

Additions above 32 require expansion of the range of the scan counter and data selector. Expansion of 1 bit in the scan counter and one data selector increases the range to 48. The addition of two data selectors and a single added counter bit allows expansion to 64, etc. Over 128 users exceeds the range of the "ports in use" associate memory word length requiring additional stages to be added. Changing the number of ports servicing a concentrator over 12 causes the memory to require expansion and a port counter to have the range of the expanded memory. The electronic crosspoint matrix, of course, must be expanded for DCC or port expansion. Conversely, the line concentrator may be configured to accommodate a smaller number of users and/or available ports with corresponding reductions in hardware and cost.

The solderless wire wrap termination technique is used for interconnections in the multiplexer equipment and is currently considered the most preferred method. A dramatic decrease in termination failures as compared to soldered connection or taper pin terminations is achieved by utilizing this automatic wire wrap technique. Ultra high reliability has become a direct benefit of machine wire wrap. Wiring errors are held to a minimum by automated wire wrap process due to automated testing for proper wire placement at the time of wire insertion. The automatic routing of each wire on a unit logic board is controlled by a deck of programmed punchcards, each of which controls the insertion and testing of a single wire.

Plug-in integrated circuit connectors are utilized in the system to allow rapid replacement and minimize system downtime in the event of system failure. Individual connectors (up to 204) are mounted in rows on a drilled, lightweight metal plate. Each connector has wire wrap pins which when installed form the wire wrap plane for the wiring connections. Each connector in the system is marked to indicate the type of integrated circuit to be inserted in case replacement is required. As described, two of these wire wrap integrated circuits are fastened to a common frame which is removable from the chassis. An extender device is provided to allow dynamic system checking of a single integrated circuit drawer.

Power and ground connections to the logic panels are made by a laminated distributive capacitance bus bar. This laminated, distributive capacitance power distribution system insures high noise immunity of the equipment's power and ground system. Each power supply is filtered to insure no interaction from unit to unit in an area where many units share the same primary power source. Power supply on-off switching is accomplished electronically, thus eliminating the need for troublesome failure-prone relay contacts. All power supplies include overvoltage protection with resettable circuit breakers.

A typical multiplexer set, corresponding to the block diagram of FIGS. 22A and 22B, is illustrated in FIGS. 26 and 27. In FIG. 27, the front plate has been eliminated to indicate portions of the interior of the multiplexer/demultiplexer set. The set is designed to provide a high quality, low cost, producible unit with a mechanical configuration that provides good accessibility of all components for ease of operation and maintenance.

The multiplexer set consists of two standard 19 inch relay-rack-mounted chassis, one for the multiplexer and one for the demultiplexer unit. Each chassis is 19 inches wide by 22 inches deep by 10½ inches high and weighs approximately 85 pounds.

The front panel of the mux/demux is made in two pieces, the face panel (controls and lettering) and the doubler panel. The face panel, at the bottom, is 17 inches wide by 10½ inches high. This panel contains all operational as well as diagnostic controls for the mux/demux units. These include 31 slide switches, three fasteners, one on-off switch, 13 indicator lamps, two reset pushbutton switches, and two digital readout indicators (0 through 9). The face panel has etched letters and numbers and the panel is finished with one primer coat and two finish coats of paint with colors conforming to required specifications. The doubler panel acts as a spacer/structure for the face panel and chassis. Two handles are provided for handling the equipment when it is out of the relay racks.

The back panel, 10 inches high by 16 inches wide, has mounting provisions for 64 twinax connectors (data and timing) and one power cable. The connectors are marked with reference designations to provide ease of identification for cable hookup. The main chassis consists of six major parts: side panels, a forward module retainer panel, power supply chassis support brackets, a forward module retainer panel support bracket, and an interconnection wiring plane support bracket. Frosted aluminum with a coating of water-dipped lacquer is applied to the final assembly. The power supply consists of an aluminum chassis with all sides coated with water-dipped lacquer. Three power supplies, ± 8 V DC and + 5 V DC are mounted to this chassis with heat sinks.

The logic module (digital) consists of two back panel wiring planes with 204 DIP's (dual inline package integrated circuit devices) and one cast frame. The back panel wiring plane uses wire wrapped techniques for interconnection of the IC devices. The cast frame is "I" shaped with a large knurl nut screw for attachment of the module to the inner connection wiring plane. The logic modules are plugged in from the front of the mux/demux.

The input/output line drivers consist of ten printed wiring card assemblies 4 inches by 13 inches in size and each equipped with a draw strap. Each card assembly contains approximately 130 components for both digital and analog circuits. Edge-type card connectors are used and the card is laid out for use on automatic component insertion equipment. The card assemblies are inserted in the mux/demux from the front panel on plastic card guides. Perforated, black, anodized aluminum top and bottom chassis covers are provided.

FIGS. 28 and 29 are similar perspective views of a typical line concentrator. The concentrator is similarly designed for ease of maintenance and reliable operation. The concentrator is a bench or rack mounted chassis 16½ inches wide, 10 inches high, and 22 inches deep. It weighs approximately 40 pounds.

All subassemblies are mounted directly to an internal chassis, permitting ease of removal from the chassis when the hinged front panel is open. The power supplies and interconnecting harness are accessible with removal of the cover, a one-piece shell covering both sides and top. The hinged front panel, mounted to a doubler plate, contains all operational and diagnostic controls and components for the unit. The input/output connectors and power cable are located on the rear panel of the unit.

The electric components are mounted on printed wiring boards. Each subassembly type is a plug-in unit. A logic module and line drivers are similar to those described for the multiplexer set. The power supply assembly consists of three units which are mounted to a metal chassis with a base-mounted heat sink sandwiched between for good heat dissipation. Perforated cover panels on the line concentrator permit sufficient air flow for efficient removal of heat by natural conduction.

TRANSCONTINENTAL TRUNK LINKS

As previously described and best seen in FIGS. 1 and 6, data is transmitted between offices by way of a system of microwave stations forming a trunkline. The stations are located in such a manner as to form one continuous link across the United States. The geographical route for this link forms the shape of W. Each station consists of a minimum of a tower, a receiver, amplifier and transmitter and the towers are placed a suitable distance apart as determined by the terrain. The modulation technique for the trunk system is based on time division multiplexing in which data is formed into a continuous pulse stream, modulated at the microwave frequency and then sent to the microwave transmitter.

The basic data channel in the network of the present invention is a 4,800 bit per second channel. The data channels are preferably sampled by the time division multiplexer technique at a nominal 19.2 megabit rate, i.e., 4,000 times faster than the data channel. This allows for a transmission capacity of about 4,000 4.8 kilobit data channels. The capacity can be doubled by using a four-phase technique to shift the carrier. The capacity can be increased to three times the channels by using an eight-phase technique or to four times the channels by using a 16-phase technique. It is possible to go even higher in the number of channels but in any case an increased sampling rate is required to obtain at least one sample per bit.

If redundant sampling is desired, a nominal 1,000 channel system may be used with the transmission of data channels over the microwave link in modules of 1,024. The principle here is to take a minimum of four samples of each binary change of the data channel. These four samples are time multiplexed with the 1,023 other data channels and sent over the microwave links. At the receiving station, the microwave signal is demodulated into the 1,204 channels. A filter for each channel uses the four samples to recreate the original signal.

Data with a rate less than 4.8 Kb is sampled at the same sampling rate, thereby providing more samples per bit, for example, data with a 2,400 bits per second rate has eight samples per bit. Data with a rate higher than 4.8 Kb is connected to make multiple appearances. The effective sampling rate remains constant at a nominal 19.2 megabit rate. Data with a rate of 14.4 Kb is provided with three appearances so that the minimum of four samples per bit is maintained.

A redundant technique for the time division multiplex is illustrated in FIGS. 30, 31, and 32. FIG. 30 shows a 4.8 Kb signal. The duration of a bit is 208 microseconds. In this time period, four samples are taken as indicated by the four small triangles at 252. As was previously mentioned, a data signal of slower speed has a longer duration per bit and therefore has more than four samples per bit. The four samples per bit are shown in FIG. 31. The time between samples is one-fourth of 208 microseconds or 52 microseconds, this time being the reciprocal of the 19.2 KHz sampling rate for each channel.

An expanded version of one sample period is shown in FIG. 32. FIG. 32 shows a total of 1,024 chips per frame. A chip, as used here, defines a sample of one data channel. From the total number of chips, 28 are used by the microwave stations leaving a total of 996 chips or 996 data channels. Fifteen of the chips as shown are used to maintain synchronism for the microwave transmitters and receivers across the continent. A method such as the Barker code is used. One chip is used for alarm and control purposes between microwave stations. The 12 chips indicated for order wire are used for voice communication between microwave stations. The triangle indicator 254 above data channel chip 3 corresponds to the sample time in FIGS. 30 and 31. The 19.2 megahertz bit stream phase modulates the microwave carrier frequency.

FIG. 33 is a block diagram for a backbone or trunk system transmitter of the preferred system in which instead of the four to one sampling previously described, the system operates on a one to one sampling basis. The increased channel capacity more than offsets the disadvantages resulting from a one to one sampling ratio. The one to one sampling provides 4,284-4,800 bps channels utilizing MSK (minimum shift keying) modulation with a sampling rate of 21.504 megabits per second. The carrier frequency is in the 6 gigahertz band. Thus, the time division multiplex provides up to 4,284 channels at a 4.8 Kb synchronous data rate on a one to one sampling basis. Convenient building blocks in increments of 64 and 252 channels facilitate trunking and local distribution networks. In addition to the standard 4.8 Kb channels, interfaces are also provided for both low speed asynchronous data or high speed synchronous operation at the multiplex of the basic 4.8 Kb data rate.

The basic data modulation system is of the type shown and described in U.S. Pat. No. 2,977,417, patented Mar. 28, 1961, and is described as minimum shift keying. Although it is phase shift keying, MSK is also somewhat similar to FSK (frequency shift keying) since MSK produces a frequency shift of exactly one-half the data rate. However, it provides the equivalent of a four level system due to the method of encoding each data bit into MSK elements that have a period length of two data bits. This substantially reduces the bandwidth required for each element. However, the shape of each element is such that even though the period is two data bits in length, MSK can still be sent at the original data rate without intersymbol interference if certain conditions are met. The resulting signal from successive bits has continuous phase transitions and a constant amplitude. Bandwidth is the minimum for any constant amplitude system.

MSK can be generated either digitally or passively. In one method of passive generation, MSK is obtained simply by driving a bi-phase modulator through a filter with the appropriate transfer function. Since the resultant signal is essentially bi-phase with the addition of optimum filtering, this method offers a number of advantages. Spectrum occupancy is significantly less and the constant amplitude signal can be passed through limiters and nonlinear amplifiers, such as TWT's (traveling wavetubes) without distortion. Straight bi-phase on the other hand has AM components which if subjected to amplitude distortion generate additional side bands. The constant amplitude characteristic of the MFK also permits independent modulation of the auxiliary equipment, such as the order wire, alarm and control systems.

In order to generate MSK, modulation processes must be rigidly controlled. Bit rates and carrier frequencies must maintain specific frequency ratios and the output filter must provide precisely the proper transfer function. These requirements are more readily achieved at IF rather than at microwave frequencies. For this reason, a system was chosen which operates with a standard 70 MHz IF heterodyne frequency. The system is designed to provide data service with overall error rates of $10^{-7}$ for transmission over 100 hops. Trunk equipment availability is 99.9967 percent over 100 hops.

FIG. 33 shows a simplified block diagram of a trunk-line transmitter. A main and standby transmitter, designated A and B, respectively, are utilized to provide protection against equipment failures. Each consists of a complete set of the required equipment, including separate MSK modulators, up converters, TWT (traveling wavetube) amplifiers, and RF filters. Each of these sets of equipment receives the same nominal 20 megabit data stream as an input through a 6 db splitting pad 258. The A system includes an MSK modulator 260, an up converter 262, a TWT amplifier 264, and a diode switch and modulator 266. The output passes through a circulator 268 and a filter 270 to the antenna 272. The other system similarly includes an MSK modulator 274, a B up converter 276, amplifier 278, and diode switch and modulator 280. An auxiliary channel source 282 is connected to order wire input 284 and alarm input 286. A switch 288 alternatively connects the up converters to a first local oscillator source 290 or a second local oscillator source 292.

The modulator 260 converts the incoming data to a 70 MHz MSK wave which is then used to drive the up converter 262. In the up converter the incoming 70 MHz signal is mixed with an unmodulated RF signal from source 290 which is 70 MHz below the desired output signal. An upper sideband of the unmodulated RF carrier signal is developed at the required frequency which contains the modulation previously on the 70 MHz MSK signal and is used to drive the TWT amplifier 264 which increases the level to approximately 8 to 10 watts. This is then connected through the diode switch 266 to provide a minimum of 5 watts RF power at the desired output frequency to the antenna system feeders. The diode switches 266 and 280 are actuated by a switchover control unit 294 and determine which equipment set is connected to the antenna 272.

Logic inside the switchover control unit 294 receives inputs from the modulators and the TWT amplifiers in both the main and standby sets of equipment and generates the required switching voltages to transfer operation in the event of failure of a portion of the equipment. In order to minimize switching transients, the same source is used to drive the up converters for both sets of equipment. Since the 70 MHz output of each MSK modulator is locked to the incoming data bit rate, the use of a common source insures that the final RF frequency is the same regardless of which set of equipment is connected to the antenna. A switch unit senses the output of both the A and B sources at 290 and 292 and this switch 288 switches to the standby source in the event of failure of the main source. In addition to its switching function, the diode switches 266 and 280 both provide a capability for amplitude modulating in the RF signal being fed to the antenna. This is used for the auxiliary channel which transmits order wire, alarm and control information. The switching and modulation action is provided by high speed diodes so that operation can be transferred from main to standby transmitter in less than 5 nanoseconds from the receipt of commands from the switchover control unit 294. Using a 50 nanosecond bit period, less than 10 percent of the bit interval will be affected which is sufficient to prevent hits.

FIG. 34 is a simplified block diagram of a microwave trunkline receiver. Two separate receivers and antennas are used to provide space diversity protection against propagation variations. The first system A comprises an antenna 296, a bandpass filter 298, a mixer 300, an IF amplifier 302, and an MSK demodulator 304 feeding a data output terminal at 306. IF amplifier 302 supplies an output to an auxiliary channel demodulator 308 and a second AGC output to a combiner control unit 310. The MSK demodulator 304 supplies an AFC output to a local oscillator 312 feeding mixer 300. The B system includes an antenna 314, bandpass filter 316, local oscillator 318, mixer 320, IF amplifier 322, and MSK demodulator 324.

Bandpass filter 298 selects the desired signal from antenna 296 and mixer 300 converts the incoming RF signal to a 70 MHz IF. In IF amplifier 302, the signal is amplified, filtered and delay equalized. Two outputs are available from the IF amplifier. One output is obtained prior to the limiter and is used to drive the AM auxiliary channel 308 which supplies order wire output 326 and control output 328. The second output from the IF amplifier 302 contains a limiter which removes AM from the signal and is connected to the MSK demodulator 304. The 70 MHz signal from the limiter is connected to the MSK demodulator which recovers the digital data. A gate in the output of the MSK demodulator provides a switch to connect the data to the outgoing line upon command by the combiner control 310. The combiner control unit selects the desired signal based on the relative strengths of the AGC voltages developed in the two receivers and in the absence of any alarms indicating improper operation of the demodulator, actuates the gate in such a fashion that the data output is taken from the receiver which is operating with the best input signal to noise ratio. Switching time for the gate is less than 5 nanoseconds in order to insure that operation can be switched from one receiver to another without introducing hits in the recovered data stream. The demodulators also develop an AFC voltage which is used to control the frequency of the local oscillator 312 in such a manner that the 70 MHz IF frequency is maintained within the tolerances necessary to insure optimum operation of the demodulation equipment.

The auxiliary channel demodulator 308 receives AM modulated signals from each of the two IF amplifiers 302 and 322 and selects the signal with the best signal to noise ratio as determined by the comparative AGC voltages fed to the combiner control unit 310. The selected signal is then demodulated and the resulting low speed data stream is used to drive order wire and control functions.

FIG. 35 is a block diagram of a one-way repeater with auxiliary channels. In FIG. 35, like parts bear like reference numerals. At each repeater, the data signal is recovered by MSK demodulators which regenerate and retime the data. This prevents the accumulation of noise and allows each transmitter to be driven by a clean digital signal. The combiner control selects the demodulator with the best expected error rate as determined by the relative AGC voltages in the two receivers and connects this signal through splitting pads into two sets of transmitting equipment. A transmitter is then selected by the switchover control unit and connected to the antenna 272. Normally, the A transmitter is utilized unless and alarm condition is indicated or a manual switch is made for maintenance purposes.

FIG. 36 is a simplified block diagram of a two-way repeater in which like parts again bear like reference numerals. As can be seen in FIG. 36, the transmitter and receiver equipment is repeated for two-way transmission. FIG. 36A shows a branching repeater including a pair of additional antennas 326 and 328 for dropping and inserting channels connected to a regional or district office.

FIG. 37 is a simplified block diagram of an MSK modulator. The unit comprises a translator 330 which receives the data input and supplies it to a MSK modulator filter 332 and through amplifier 334 to the MSK output. The latter is in turn connected to a power output detector 336.

MSK (minimum shift keying) was chosen as the type of modulation best suited to perform the task of high speed data transmission via microwave. This type of modulation is realized through two orthogonal phase-modulated subchannels that are summed after they are amplitude modulated. Amplitude modulation is a form of weighting which restricts the bandwidth. It results in a two-frequency type system characterized by an instantaneous frequency shift from one frequency to the other at the switching instant and by an absence of phase transients. Minimization of frequency shift results in the minimization of bandwidth for a given information rate and the MSK waveform when evaluated as a function of time has no discontinuity in value. The first derivative of the waveform with respect to time is continuous when signaling elements are switched at the peaks of the waveform.

In analyzing MSK as a two-frequency system, it is found very similar to coherent frequency shift keying (CFSK) with a modulation index of one-half and phase continuity at the transitions. The bandwidth requirements of this type of CFSK and MSK are equivalent in terms of spectrum density. MSK being a form of PSK achieves a 3 db gain in noise immunity over CFSK due to the method of generating the modulation and the method of detection. Thus, MSK achieves the benefits of non-band limited PSK, while retaining the advantage of abrupt transitions in a minimum bandwidth. Abrupt transitions are important because of timing recovery at the receiver where identification of the transition is necessary. Ordinary filtering of PSK signals will tend to smear the transition and thereby increase the complexity and cost of transition detection.

An MSK modulator accepts a serial binary information and applies this information to a wave as modulation which contains no DC component so that it may be handled as an analog signal by the various mediums. The basic scheme is illustrated in FIG. 37 and is to drive a passive filter with a digital signal and receive an analog (modulated) signal out of the filter to interface with the medium. This is achieved by utilizing a return to zero (RZ) digital signal as an input to the filter and designing a filter whose response to these pulses provides the desired modulated signal. As an example, a filter is designed whose response to a pulse is one and one-half cycles of a sine wave occupying two periods of the input serial data rate. This provides overlapping portions which add to give portions of a cosine wave at two related frequencies (with two possible phases for each frequency) and containing the required binary information. The envelope of MSK is of constant amplitude, allowing amplification by nonlinear devices, therefore achieving efficient use of power.

FIG. 38 is a simplified block diagram of an MSK demodulator. Matched filter detection is used in that the signal is processed through a matched filter 338 that performs an integration and provides a maximum output (positive or negative) at the end of each period. This filter maximizes the signal to noise ratio and thereby minimizes the error rate due to noise. A sample of the matched filter output at the end of each period provides an estimate of its polarity to a decision element 340. A decision as to the data content is then made based on an estimate from the sampler.

A need arises in demodulating an MSK signal to recover timing and provide a clock for sampling the received signal. This clock is phase and frequency referenced to the transmitted data clock. The transmition detector 342 solves this problem by detecting the data transition (0 to 1, etc.). Although this happens on a random basis, it occurs in increments (multiples) of the data rate. Therefore, the detected transition is sufficient to phase lock a servo loop and recover data timing. Furthermore, since the data transition is in the time domain, it will not be affected by frequency offsets resulting from the microwave link.

Frequency offsets resulting from lack of synchronization between microwave transmitter and receiver frequency standards are compensated for with a phase and frequency correction loop. This loop mixes the 70 MHz time signal down to its basic (base and) frequency. The basic MSK signal contains two frequencies with each frequency having a possibility of two phases at any instant. Therefore, it must be modified to permit phase locking to the received signal. This basic MSK signal is passed through a frequency doubler 344 to obtain a continuous phase FKS signal. A continuous phase FKS signal contains two frequencies and each frequency has only one possible phase at an instant. This FSK signal is sampled with the data clock in a sampler 346 and the sampler output is used to control a voltage control oscillator 348. The phase locked VCO then contains the frequency correction necessary to compensate for the frequency offset introduced by the microwave link.

Signal erection is a phase rotation alignment to erect the cosine signal and thereby minimize the sine component of the basic MSK signal frequencies prior to application to the detector filter. An output from the phase/-frequency correction loop VCO is delayed (phase shifted) by delay line 350 and mixed with the 70 MHz type MSK signal in mixer 352 to provide signal erection. The resulting basic MSK signal is amplified and fed to the detection filter which is a matched cosine MSK filter.

Each TWT subsystem has a waveguide diode switch provided at the output port. These components are used for switching hot standby channels in and out of operation. Either manual or automatic switching capability is provided in the control circuitry and actual switching time is sufficiently fast in order to reduce data bits to a minimum during the switchover period. Switchover to the standby channel is carried out automatically when the main channel output power drops by approximately 6 db. Logic circuitry provided in the control module does not allow switchover to a bad transmitter automatically. The main transmitter can be selected manually.

FIG. 39 is a transmitter converter block diagram. The converter comprises a pump oscillator 354, a waveguide to coax adapter 356, an isolator 358, bandpass filter 360, coupler 362, isolator 364, all connected through a directional coupler 366 to balanced mixer modulator 368. The 70 MHz input passes through pad/equalizer 370 and a 70 MHz amplifier 372 to the mixer modulator. The mixer modulator is connected to the traveling wavetube through isolator 374, a coupler 376, a bandpass filter 378, isolator 380, and waveguide to coaxial cable adapter 382.

The details of oscillator 354 are shown in FIG. 40. The pump oscillator is used to generate a local RF signal to heterodyne with the 70 MHz signal and produce a new RF signal containing the MSK information. The pump oscillator frequency is normally 70 MHz below the output frequency. This means that the sum frequency of the pump oscillator frequency and the 70 MHz IF signal is used as the new RF output signal. Using this scheme allows for increased transmitter frequency stability at the heterodyne repeater as follows: (a) the local oscillator is below the incoming RF signal and a 70 MHz different signal is selected for use, (b) the pump oscillator frequency is added to the 70 MHz IF signal, and (c) both solid state local oscillators are in the same environment and any change in ambient temperature, etc., that would cause drift should affect both oscillators about the same. Therefore, using the sum and difference frequencies the error cancels out and the frequency stability is maintained within 30 KHz at 6 gigahertz.

The pump oscillator is a solid state device that contains two separate oscillators, namely, a crystal oscillatore 384 and a cavity oscillator 386. Oscillator 384 is a reference oscillator that is controlled by a crystal 388 operating between 100 and 120 megahertz. The output of this oscillator is supplied to a step recovery diode 390 where it is multiplied by 10 and the resultant 1 to 1.2 megahertz signal is connected to a phase discriminator 392. Oscillator 386 is a cavity oscillator that oscillates between 1 and 1.2 GHz. The output of this oscillator is applied to a step recovery diode 394 and connected by way of a directional coupler 396 to the phase discriminator 392. The output of the phase discriminator (the low pass loop) is coupled to the cavity oscillator 386 as a control and thereby phase locks the cavity oscillator to the crystal controlled oscillator. This provides crystal controlled stability. The step recovery diode 394 receives the output of the cavity oscillator, multiplies it by five or six times (depending on the frequency) and applies it to an RF filter 398 that is tuned to the selected frequency. The output of the filter is connected to a type N coaxial fitting for service connection and the nominal output level is 50 millewatts. This technique of limited multiplication provides a low noise microwave source by eliminating the beeps and chirps developed with many steps of multiplication.

Referring again to FIG. 39, the waveguide/coaxial adapter 356 is used to accept the RF signal from a coaxial transmission line and insert it into a waveguide transmission line. A probe-coupled type N coaxial fitting is mounted on a rigid waveguide stub with a shorted end. The fitting is located approximately one-fourth wavelength (depending on frequency) from the shorted end in order to obtain the maximum transfer of energy. The adapter allows a flexible transmission line to be sued between the pump oscillator and the rigid waveguide, thereby simplifying the packaging of the waveguide assembly. Load isolator 358 is a waveguide ferrite device that provides the correct impedance match to the output of the pump oscillator by isolating it from the effects of mismatching in the waveguide. It has a forward attenuation of less than 0.5 db and a reverse attenuation of at least 20 db. Thus, the load isolator passes the transmitted waves but absorbs the reflected waves.

The bandpass filter 360 passes only the desired band of frequencies (pump oscillator signal), attenuating other band frequencies or any spurious signals that might be present. The bandpass filter is a two-cell, direct coupled, rectangular cavity filter constructed in a section of waveguide. The cells are separated by circular coupling irises and a tuning screw is mounted in each cavity section. The tuning screws make possible the proper tuning of the filter over its range of frequencies. The basic filter design work is done near the high frequency end of the tuning range. Inserting the screws into the cavities increases the capacitance loading, thereby tuning the filter lower in frequency. Tuning of the filter is normally a factory procedure. The 20 db coupler 362 (test point section) consists of a section of waveguide with a sampling loop probe that is connected to a coaxial fitting mounted on the waveguide section. The output of this coupler is fitted with a crystal detector that provides the performance monitor with a relative indication of the pump oscillator output level.

Load isolator 364 is similar to isolator 358 previously discussed. The variable shorts $H_1$ and $H_2$ are used to adjust the shortened end section of the waveguide to the optimum impedance for a particular frequency. $H_1$ is adjusted for a maximum transfer of energy along the directional coupler and $H_2$ is adjusted for optimum bandpass flatness. Directional coupler 366 is used to transfer the pump oscillator signal from one section of waveguide to another.

The pad and equalizer 370 is used to control the level and slope (bandwidth response) of the incoming signal. For input cables of less than 25 feet, only the pad is used. For input cables of more than 25 feet, both the pad and equalizer are used. The equalizer will provide amplitude equalization for links of RG-59/U or WE-724 cable in 50 foot increments to 200 feet of cable. This will allow equalization to the nearest 25 feet of cable. The equalization sections are placed in or removed from the circuit by shorting plugs. The pad provides attenuation in 1 db steps to 20 db. The average level into the pad is + 7 db and out of the pad is − 3 db, thereby requiring approximately 10 db of attenuation. A 70 MHz amplifier 372 tuned with fixed gain provides the high level signal required to drive the balanced modulator (Varactor diodes). The amplifier has approximately 23.5 db of gain.

The mixer modulator 368 is a Varactor-modulator which heterodynes the 70 MHz IF input signal (containing the MSK information) and the pump oscillator signal (at the desired RF frequency) to produce a new RF carrier signal containing the based band information. The 70 MHz IF signal gates (turns them off and on) the Varactor diodes to pass (or radiate) the pump oscillator signal down the waveguide. The gating action causes the frequencies to mix and produces output signals of the pump oscillator frequency plus multiple sideband frequencies (spaced 70 MHz apart), both above and below the pump oscillator frequency. The first or upper sideband signal (sum of the pump oscillator frequency and the 70 MHz frequency) is used as the selected or desired RF carrier output signal.

The action of the balanced modulator reduces the output level of the pump oscillator frequency by about 20 db but further filtering is required for this frequency and the undesired sideband frequencies. Varactor diodes are used to achieve this combining effect. The positioning of the variable shorts $H_1$ and $H_2$, the high level output of the 70 MHz amplifier, and the biased adjustment for the diodes are critical to the proper operation of the modulator. The Varactor diodes develop self-bias by rectifying the 70 MHz input signal and use a balanced control (located in the 70 MHz amplifier) for optimizing the bias voltage.

The load isolator 374 is similar to isolators 364 and 358. Coupler 376 likewise is similar to coupler 362 previously described. These couplers are used as test points for maintenance or trouble shooting and sometimes are fitted with detectors to provide relative power indications or wave meters for frequency indications.

Bandpass filter 378 passes only the desired band frequencies (the first order upper sideband) while attenuating the oscillator signal and the undesired upper and lower sideband frequencies. The bandpass filter is a three-cell, direct coupled, rectangular cavity filter constructed in a section of waveguide. The cells are separated by circular coupling irises and a tuning screw is mounted in each cavity section. The tuning screws make possible the proper tuning of the filter over its range of frequencies. The filter is otherwise similar to the bandpass filter 360 previously described. Load isolator 380 and adapter 382 are similar to the isolators and adapters described above.

FIG. 41 is a block diagram of the traveling wavetube waveguide assembly. This unit comprises an adapter 384 and input attenuator 386 connected to one end of a traveling wavetube 388. The other end of the traveling wavetube is connected through a coupler 390, an isolator 392, a three-cell rejection filter 394, and another isolator 396 to a coupler 398. FIG. 41 shows this coupler connected to a detector 400 and a performance monitor 402. A coupler 404, bandpass filter 406 and shutter 408 connect the remainder of the circuit through a circulator 410 to the antenna.

Adapter 384 is used to remove the RF signal from the coaxial transmission line and insert it into the waveguide transmission line. A type N coaxial fitting is mounted on a rigid waveguide stub with a shorted end. The fitting is located approximately one-fourth wavelength (depending on the frequency) from the waveguide short in order to obtain maximum transfer of energy. The adapter allows a flexible transmission line to be used for the input signal and in turn allowed the waveguide assembly to be mounted in a drawer. Extending the drawer provides maximum accessibility to the waveguide components for routine checking and testing. The 10 db attenuator 386, mounted in the input section of the waveguide to the traveling wavetube, consists of a resistance card attached to a small metallic rod. It extends into the waveguide and is adjusted for the desired input level.

The traveling wavetube operates in the usual manner through electron bunching to impart energy to the electromagnetic wave and to increase the wave amplitude. At the end of the helix near the other end of the traveling wavetube, the amplified energy is radiated into the waveguide and conducted away from the tube. The 20 db coupler 390 (test point section) consists of a section of waveguide with a sample loop probe that is connected to a coaxial fitting mounted on the waveguide section. It samples the RF signal out of the traveling wavetube and removes less than 0.1 db level from this output signal. The purpose of the coupler is to provide a test point to aid in maintenance and trouble shooting. Isolator 392 is a waveguide ferrite device that provides the correct impedance match to the output of the traveling wavetube isolating it from the effects of mismatching the waveguide due to the three-cell reject filter 394. It absorbs the reflected waves but passes the transmitted waves.

The three-cell reject filter 394 presents a high attenuation to the pump oscillator frequency, the undesired sideband (difference frequency), and the second order harmonic of the desired sideband while presenting no insertion loss to the desired sideband (sum frequency). Normally cell No. 1 is used to reject the pump oscillator frequency which is 70 MHz below the assigned frequency. Cell No. 2 is used to reject the difference frequency which is 140 MHz below the assigned frequency and cell No. 3 is used to reject the second order harmonic of the sum frequency which is 70 MHz above the assigned frequency. Non-standard frequency plans of antenna arrangements may require different tuning of the reject filter cells. Isolator 396 is similar to those previously described. The 37 db couplers 398 and 404 sample the RF signal to be transmitted. Each removes less than 0.1 db level from the transmitted signal. Coupler 390 is coaxially connected through the detector assembly to a power monitor unit. Coupler 404 is used for testing or monitoring the output frequency. The detector 400 takes the signal sampled by the coupler, rectifies it and applies the rectified current to the performance monitor 402. This latter contains a meter that provides relative indications of supply voltage ( − 24 or 31 48) and transmitted power. A toggle switch is used to change the meter to the desired indication. The power indication is used when tuning the traveling wavetube. Bandpass filter 406 is a five-cell filter but otherwise similar to those previously described. A quick disconnect flange permits the waveguide assembly to be easily disconnected from the main line waveguide so that the drawer assembly can be slid forward for servicing. An interlock switch is incorporated in the quick disconnect flange so that power is removed from the traveling wavetube when the drawer is extended. The shutter assembly 406 is a manually operated waveguide switch controlling the output signal of the subsystem. It is used during tests or out of service adjustments and might cause interference to other equipment connected to the same waveguide feed. The three port circulator 410 connects the RF signal of the subsystem into the main line waveguide feed for taansmission to the antenna. The port to port forward loss of the circulator is approximately 0.1 db and the reverse loss is approximately 23 db. It also provides the proper termination for the subsystem output and thereby keeps the voltage standing wave ratio at a minimum and a return loss optimized.

FIG. 42 is an IF heterodyne receiver block diagram. The incoming signal from the antenna passes through a circulator 412, a shutter 414, a five-cell bandpass filter or preselector 416, a three-cell reject filter 418, and an isolator 420 to a circulator 422. The other arm of the circulator is connected to the receiver local oscillator 424 through a waveguide/coax adapter 426 and a two-cell local oscillator filter 428. Circulator 422 connects to a mixer 430 whose output is passed through a preamplifier 432, an RF equalizer 434 and a system equalizer 436.

From the system equalizer 436, the signal passes through an IF filter and equalizer 438, AGC amplifier 440, and limited 442 to a 70 MHz insert oscillator 444. The 70 MHz output is provided at terminal 446.

The three port circulator 412 connects the RF signal from the main line waveguide feed into the receiver subsystem. The port-to-port forward loss of the circulator is approximately 0.1 db and the reverse loss is approximately 23 db. It provides a proper termination to the antenna and allows the receiver to be disconnected from the main line waveguide feed without affecting other equipment connected to the same feed line. The shutter 414 is a manually operated waveguide switch controlling the input signal to the subsystem. It is used during tests or other service adjustments and when the receiver is disconnected from the main line waveguide feed. The bandpass filter (preselector) 416 passes only the selected band of frequencies out of all the signals present in the feed line to the receiver. The bandpass filter is a five-cell filter and is otherwise similar to the waveguide filters previously described.

The reversible waveguide flange is used to provide a point for putting a test signal into the receiver subsystem. After the waveguide assembly drawer has been extended, the clamps on the reversible waveguide flange are removed and the section of waveguide containing the bandpass filter is reversed. Then the clamps are reconnected. This puts the open quick disconnect flange in a position that is accessible for connecting an RF test set. Three-cell reject filter 418 is used to reduce susceptibility to interfering frequencies or spurious noises. The cells are tuned to different reject frequencies, depending upon the band, frequency plan, and antenna system used. Sometimes it rejects image frequency, ± 70 MHz of selective frequency, and 113 MHz below carrier frequency. Isolator 420 is a waveguide ferrite device similar to the isolators previously described while circulator 422 is a three port circulator used to connect the incoming power signal and the local oscillator signal into the mixer. The circulator provides a correct termination to all three legs while also providing isolation. Local oscillator 424 is used to generate a local RF signal to heterodyne with the incoming RF signal and produce a 70 MHz IF signal. The local oscillator 424 is similar in construction to the pump osicllator of FIG. 40 and will not be described in detail. The local oscillator frequency is normally 70 MHz below the incoming frequency and the difference frequency is selected as the 70 MHz IF signal. Adapter 426 is used to remove the RF signal from a coaxial transmission line and insert it into a waveguide transmission line. It is similar to the adapters previously described. The local oscillator attenuator controls the amount of local oscillator power reaching the mixer (crystal detector) 430. For optimum conversion efficiency, the local oscillator attenuator is adjusted to read between the red mark limits on the mixer meter. The local oscillator attenuator consists of a resistance card attached to small metal rods that position it within the waveguide. The local oscillator filter is a two-cell filter and rejects all signals but the proper local oscillator frequency. The bandpass of the local oscillator filter is approximately 10 to 12 MHz.

Mixer 440 heterodynes the incoming RF signal (containing the base band information) and the local oscillator signal (at the desired RF frequency) to produce a 70 MHz IF signal containing the MSK information. A special designed mixer section is used in order to keep the 70 MHz IF signal as clean as possible. When the two RF signals are applied to the nonlinear crystal (mixer), it produces the two original RF frequencies, the sum frequency, the difference frequency (70 MHz), and second order harmonics of the two original RF frequencies. If all of these RF signals are allowed to reflect around in the mixer waveguide, they will again encounter the crystal and produce more mixing of signals. This will produce additional 70 MHz signals that are lagging in time and will create interference to the desired 70 MHz signal. Therefore, the mixer waveguide section is designed to attenuate (absorb) the signals after they pass the mixer crystal. A special trap is required to attenuate the sum frequency signal and the second order harmonic signals of the two originally RF frequencies because they are out of band. IF preamplifier 432 is a broadband amplifier that is used to amplify the 70 MHz IF signal as it leaves the mixer crystal. It is mounted as an integral part of the mixer to minimize noise pickup and to provide the correct impedance match. It provides approximately 30 db of gain and has a nominal noise figure of 3 db.

IF equalizer 434 is used to compensate for phase delay created by the waveguide components located within the heterodyne receiver. Although it is called an RF equalizer, it compensates at the 70 MHz IF signal port. The unit is normally adjusted at the factory with the waveguide assembly it is to be used with. The unit consists of identical isolation amplifiers separated by selected plug-in equalizer cards. It provides constant input and output impedances and operates at unity gain, thereby allowing it to be bypassed or inserted in the signal bus without disrupting levels. System equalizer 436 is composed of two equalizer units. The first unit is used to equalize for phase delay caused by the waveguide run and the antenna. Again, the compensation is done at the 70 MHz IF port for effects occurring in the RF signal path. The second unit is used as a mop-up equalizer to compensate for any effects not allowed for in the other equalizers. Most of these effects occur in the RF signal path.

The filter/equalizer 438 is used to determine the selectivity of the IF amplifier. Two options are available, namely, (a) 40 MHz bandwidth to 3 db port, and (b) 25 MHz bandwidth to 3 db ports. The filter/equalizer compensates for all envelope delay distortion created by filters. This unit consists of isolation amplifiers separated by filter, equalizer and matched filters as required. It provides constant input and output impedances and is operated at unit gain. This is a factory adjusted unit but may be interchanged between receivers without disrupting levels. The AGC amplifier 440 is used to provide a constant level output signal from a varying level input signal. It will provide an output of ± 0.75 db with an input signal of − 50 to 0 db. The AGC amplifier also provides test jacks that are used for path alignment purposes and a fast/slow AGC switch that is used in alignment tests. The AGC amplifier provides two output connections. One is the standard output with 0 db level driven by parallel emitter followers. The other is the auxiliary output 448 with 0 db level driven by a low impedance source.

The 70 MHz insert oscillator 444 is used to provide a quieting signal (keeps the following receivers from going into full noise) for the following equipment during a prolonged path fade or equipment failure. This allows fault alarm and service channel information to be used during a failure. The 70 MHz insert oscillator senses a signal from the AGC amplifier for switching information. It consists of (a) a diode switch that is used to switch the 70 MHz IF signal containing the MSK information and the 70 MHz quieting signal and (b) a crystal controlled 70 MHz oscillator that is used to generate the quieting signal. Limiter 442 is provided to eliminate amplitude variations riding on the upper and lower edges of the frequency modulated 70 MHz IF signal. It provides a high level + 13 dbm and a low lever 0 dbm output signal.

FIGS. 43 and 44 show an MSK transmitter and receiver subsystem with FIG. 43 showing the drawers and panels in place and FIG. 44 showing the interior contents with the front panels removed. The transmitter and receiver subsystem, generally indicated at 450, comprises a plurality of removable drawers in which the various components, such as the transmitter converter of FIG. 39, the traveling wavetube assembly of FIG. 41, and the IF heterodyne receiver of FIG. 42, are incorporated as separate subunits. In FIG. 44, a transmitter-converter of the type illustrated in FIG. 39 is shown at 452, a traveling wavetube waveguide assembly of the type illustrated in FIG. 41 is shown at 454, and an IF heterodyne receiver of the type illustrated in FIG. 42 is shown at 456. The physical construction of the transmitter-converter 452 is illustrated in FIGS. 45A and 45B, the physical construction of the TWT amplifier subsystem 454 is illustrated in FIGS. 46A and 46B, and the physical construction of the IF heterodyne receiver 456 is illustrated in FIGS. 47A and 47B. The various components previously described in conjunction with the circuit diagrams are similarly labeled in the physical construction of FIGS. 45–47. Items 458 in FIG. 44 are power distribution units.

The auxiliary channel system illustrated at 460 in FIG. 35 is used primarily for service channel and fault reporting service between stations of the microwave trunk system. The channel is independent of normal multiplex operation and is on a party-line basis, making the auxiliary channel independent from the high speed data on the RF channel, allowing its speed of transmission to be reduced to approximately 926 kilobits. The channel is amplitude modulated onto the transmitted microwave carrier by utilizing the standby switch 266 of FIG. 33 provided at the output of each transmitter. Approximately 1 db of AM is used. At the receiver (FIG. 34), the RF carrier is down converted to 70 MHz, filtered and passed through the AGC amplifier to recover the modulation. The output of the AM detector is amplified and fed into the auxiliary channel demultiplexer. The demultiplexer provides timing circuits for distinguishing between surface channel and fault alarm reports. It also allows signals to be fed through to the auxiliary channel multiplexer and modulated onto the outgoing transmitter carrier.

The MSK modulation process produces an output that is almost completely free of any AM components and therefore yields to this application very nicely. Since the AM is stripped from the carrier before reaching the MSK demodulator by normal receiver limiter action, it does not degrade the system performance. Diversity switching allows the auxiliary channel demodulator to work with the operating receiver only. Control for this switch is provided from the main diversity control circuits.

FIG. 48 is a simplified block diagram of the order wire, alarm and control system for the trunkline. This system is designed to provide the following functions and services: (a) party-line communication between a maximum of 12 stations, (b) private line communication between stations with a maximum of six simultaneous conversations (12 stations), (c) reporting of 32 alarm conditions from each of up to 12 stations to a designated master station, and (d) control of up to 16 on-off functions and up to 12 stations from a designated master station.

Transmission of voice, alarm and control information is in digital form in order to utilize the order wire MODEM previously described. Bandwidth requirements are held to a minimum consistent with channel performance, the comparing of the large number of order wire circuits involved, the modulation format dictated by the order wire MODEM, and equipment simplicity. The equipment design employs MOS LSI techniques where speed requirements allow in the time frame of system implementation and bi-polar intergrated circuits where higher speeds are necessary.

With regard to performance, the following have been established as minimum requirements: (a) voice channel signal to noise (including companion advantage) — 40 db, (b) crosstalk isolation — 60 db, (c) complete alarm updating time — 10 seconds, (d) alarm system bit error rate — 1 in $10^{-7}$, (e) single control response time — 1 second, and (f) control bit error rate/controlled station — 1 in $10^9$.

In order to meet the performance requirements listed above, pulse code modulation (PCM) is utilized to transmit the digital voice information between stations. Time division switching is used to select the called station, with each station being assigned a "home" or listen time slot. Each voice sample is encoded as a six bit binary number and transmitted in the time slot associated with the called station along with signaling (busy/idle) bit and a supervisory bit. The supervisory bit is provided to allow each station to periodically (once every half second) insert alarm data, and the master station to insert control information. Signal combining where necessary is accomplished at a digital level, both to reduce cost and complexity, and to minimize the signal degradation inherent in a decoding/audio combining/encoding process. Since 13 channels are provided, each channel is sampled at an 8 KHz rate and a two bit frame synchronization pattern is provided, the data rate for the system is approximately 926 K bits per second. Double pulse modulation is fed to the order wire modulator, resulting in a requirement for an upper cutoff frequency of 1.852 MHz in the order wire MODEM. The double pulse technique, which is actually a special case of digital phase modulation, is used because of the simplicity of recovering clock from the data steam at each station.

Other techniques can, of course, be used to implement the order wire/alarm subsystem. Delta modulation, for instance, reduces the cost of the encoder and can in theory be of a lower bit rate for the various channels. However, when signaling and alarm and control are considered, either the data rate must be increased significantly or the equipment necessary to insert the auxiliary information must be increased significantly in complexity. Further, Delta modulation does not lend itself to digital signal combining. Consequently, quantizing noise adds on a multi-party connection directly as the number of parties is increased. As a result of the foregoing considerations (among others), the PCM system described is used as offering the nearest optimum combination of performance, hardware simplicity, and data rate.

The order wire control panel is shown at 460 in FIG. 49. This device (1) provides "express" order wire access to all stations in the segment of the system (up to 12 stations). Designated stations can be given override capabilities. (2) It provides party-line (local) order wires with voice signaling to all stations in the system's segment. (3) It provides digital indication of express order wire status and visual as well as audible signaling. To place a private line or express order wire call to another station, the operator lifts the handset and depresses the illuminated call pushbutton associated with the called station. Removing the handset from the hook-switch, marks the signaling bit in the calling station time slot busy unless the station is being operated on the local order wire. Depressing the call switch marks the called station time slot busy. All stations monitor the signaling bit in all time slots and utilize this information to illuminate the call lamp when a station is busy. Further, this information is used to lock out the express order wire call switch to preclude a third party from inadvertently interrupting an established connection. At the called station, an audible ring signal is activated and the answer portion of the incoming indicator flashes. When the called party removes his handset from the hook-switch, the ringing ceases and the answer portion of the incoming indicator comes on steady. If the called party had been operating on the local or party-line order wire, he could have answered the express call by depressing the incoming switch. Operation of this switch will transfer his audio circuitry to the express order wire. A second operation of the switch will transfer him back to the local order wire. The answer portion of the incoming indicator will resume flashing when the operator goes back to the local order wire for as long as the calling party remains connected. The calling party may terminate the express order wire connection by returning his handset to the hook-switch, depressing the off switch associated with the called station or selecting another station. All stations continually monitor the local order wire time slot.

An operator may enter the party-line by simply depressing the local order wire talk switch when his handset is off the hook. Voice signaling is used on the local order wire.

Local indicators for the 32 points reported by the fault alarm transmitter are provided on the order wire control panel. The order wire circuitry, fault alarm scanner/transmitter, and control receiver are housed in a slide-out draw behind the order wire control panel. The 16 control contact closures from the controller receiver are brought up to a stationary connector on the rear of the drawer frame.

A fault alarm receiver and a control transmitter are provided at the master station. These are shown at 462 and 464 in FIGS. 50A and 50B, respectively. The fault alarm receiver 462 of FIG. 50A accumulates a status report from each station, checks the validity of the report, compares the current status report for each station with the last valid report received, and notes any change between the two reports. If there is no change, the receiver proceeds to the next station and goes through the same process. If a change is detected, an audible alarm is sounded, a change of state lamp is turned on for that station, and the new report is written into the receiver memory. The operator may examine the status of the station reporting the change of state (or any station for that matter) by positioning the slide switch to the appropriate station number. The station status will then be displayed from the receiver memory. The change of state lamp may be reset so that any subsequent changes will be alarmed. The fault alarm receiver incorporates the following features: (1) 32 faults per station, (2) 16 stations, (3) all solid state, including indicator lamps (light emitting diodes), (4) internal memory retains last status reported before transmission path failure, display updated from memory upon demand, (5) change of state detected at receiver, (6) complete status update of 12 station segment every 8 seconds, and (7) slide-out drawer for easy maintenance.

The control function transmitter at the master station is shown at 464 in FIG. 50B. To transmit a control function, the required station is selected by the slide switch, the pushbutton switch or switches are operated for the functions to be transmitted, and the send switch is depressed. The function switch and the send switch are illuminated as they are operated and remain illuminated until transmission is complete. A clear switch is provided to cancel the function switches prior to transmission. The control function transmitter incorporates the following features: (1) 16 "on-off" control functions at each station, (2) momentary "on-off" pushbuttons, illuminated to show control function being sent, off automatically when function has been transmitted, (3) all solid state with plug-in cards, (4) slide-out drawer for easy service access.

In FIG. 48, for west to east transmission, the receiver down converter supplies a signal to the order wire demodulator 466. This passes to a sync recovery and timing network 468 and to an adder 470. A PCM transmit terminal 472 is connected to the adder, along with a PCM receiver terminal 474. Similarly, for east to west transmission, the receiver down converter is connected to an order wire demodulator 476, sync recovery and timing network 478, and adder 480. An alarm transmitter 482 is connected to adder 480. In the order wire system, the following conditions apply: (a) the westmost station in the 12 station system is the master station, (b) alarm information is transmitted east to west, (c) control information is transmitted west to east, and (d) independent clocking is provided for west to east and east to west transmissions to avoid the necessity for time aligning the two paths. The local clocks are sufficiently stable in the rest condition to maintain system performance in the event of failure of the upstream path.

The serial bit stream from the order wire demodulator 466 is applied to the sync recovery and timing circuit 468 where the bit cell boundary transitions are detected to phase lock the local bit rate clock and frame sink is established. The received signal is routed to a one bit storage in the adder 470 and clocked out to the order wire modulator by the local bit clock. The sync recovery circuit provides time slot identifying information to the PCM receiver and transmit terminals 474 and 472 so that these terminals can strip off or insert data at the proper time. Strapping is provided in these terminals so that the home time slot for each station can be selected. When the supervisory bit is zero, data from the order wire demodulator 466 is routed to the PCM receiver terminal, either in its home time slot when that station is being called or in the time slot of the called station when that station is originating traffic. The received terminal converts the received word into analog form in the conventional manner. East to west traffic is handled similarly with the required combining taking place in the received terminal. Data from the PCM transmit terminal is routed to both the east and west order wire modulators through their associated adders in the appropriate time slot. Encoding in the transmit terminal is accomplished a bit at a time by successive approximation at the data clock rate.

If the received word from the direction of the master station contains one in the supervisory bit position, the incoming data in that time slot is routed to the control register and the previously received word is held in the PCM receive terminal. Since the master station is constrained to preempt not more than one word every half second, the effect on transmission quality is negligible. Similarly, approximately every half second the alarm transmitter interrupts the PCM transmit terminal for one word period to send status information back to the master station.

LOCAL DISTRIBUTION SYSTEM

The present common carrier analog facilities were designed many years ago for voice service with little or no consideration for present day data requirements. Because of the heavy investment in these facilities, predominantly wire pairs, they have been modified many times and then adapted to data service through the use of complex interface equipment which often restricts the full utilization of the user terminal, always with the constraint that the analog transmission not be impaired. With the rapid increase in the demand for data services, the limitations in this approach are readily apparent.

An important feature of the present invention is that it provides for high speed data transmission all the way through the system from one subscriber terminal to the other. Thus, the local distribution system must be fully compatible with and maintain the high quality of transmission that exists through the trunklines as described above. A typical arrangement for the local distribution system is illustrated in FIGS. 51A and 51B which also shows the relationship of the local distribution system to the trunklines. In FIGS. 51A and 51B, the trunklines operating in the microwave band at 6 gigahertz are connected through 6 gigahertz spur lines of the same construction as the trunklines as illustrated at 484. In certain limited instances, it may be necessary to make connection through a repeated multipair cable and this is shown at 486, but it is understood that this is the exception rather than the rule and that the system is basically a microwave system completely through to the district office 66. The remote line concentrator illustrated at 174, which forms in effect a small or limited district office, is similarly connected by microwave link 488 to the main trunkline 12.

The local distribution system establishes connections from the district office to the digital communications consoles or DCC's of the individual subscribers. Again, the local distribution system in the embodiment of FIGS. 51A and 51B is primarily a microwave system but one which operates in the 11 gigahertz range as indicated by the radio links at 490. Again, in exceptional cases, it may be necessary to establish connection to the DCC's through repeated multipair cables as indicated at 492 or through wire pairs as at 494 and sometimes even through other facilities, such as commercially available lines as indicated at 496. It is understood that the principal links, however, in the local distribution system, are the 11 gigahertz radio links.

Important features of the local distribution system include the fact that it is all time division multiplex mode of transmission and time division combining of in-bound links and radio repeaters, it handles all radio local distribution requirements within a single frequency (40 MHz channel pair) allocation, it is a fully synchronous system and all asynchronous subscribers are converted to synchronous at the initial entry point into the system, and it is based, as is the trunk system, on a base transmission rate of 4,800 bits per second through the local distribution channels. The radio design is such that it provides an all-digital radio system which is highly immuned to interference and is based on a recognized allocation (in the 11 gigahertz band) which uses high band and low band assignments to separate transmitters and receivers, one high band channel and one low band channel being all that is required for the entire local distribution system.

The 40 MHz channel is subdivided into six subchannels, each with a 100 data channel capacity. As the transmissions emanate from the district office or central site, these channels are used to provide interference-free communications. At some point in distribution, the capacity requirements drop from 1,000 to 100 data channels. At the same time, there is significant branching requirements to distribute the data. The channelization plan and the radio designs are compatible with the multiplexer configuration, thereby providing a grouping of narrower channels within the prime allocation. Thus, the frequency allocation plan has a hierarchy that matches the multiplexer plan with attendant system advantages. After branching, the multiplexer groups are terminated at non-branching microwave sites and broken down for individual channel distribution.

The basic digital rate for subscribers and hence the service channel rate is 4,800 bits per second. However, lower speed channels can be efficiently accommodated through the use of submultiplexing equipment. Higher rates in multiples of 4,800 bits per second can be accommodated and the system is fully synchronous in order to conserve spectrum space and to simplfy the multiplexer concept and equipment.

The local distribution system is fully duplex and is fully time division multiplex, including the combining of multiple in-bound TDM groups at the repeater terminal. A fully time division multiplex system results in a maximum utilization of frequency spectrum. While operating primarily in the 11 gigahertz band, the system is compatible with radio operation in the 38 gigahertz (or 18 gigahertz) band for short range links where 11 gigahertz interference is too high. The radio links are designed for 35 db system margin before a BER of $10^{-8}$ is reached. Rain rates of 25 mm/hr and propagation fades on a 5 mile path are never expected to exceed 10 db. All rooftop equipment contains small weather-proof enclosures designed to allow easy expansion for system growth and easy access for maintenance. These enclosures are incorporated into the supports for the antenna and RF equipment and the weight is kept low to improve the stability of the entire assembly. Maximum link distance is 5 miles and the total distance for a series of links in the microwave local distribution system is 50 miles.

The local distribution system is frequency coordinated with other systems already using the 10.7 to 11.7 gigahertz frequency band and uses 40 MHz channel blocks consistent with existing user established frequency plans. The FCC rules permit allocations up to 50 MHz in the 10.7 to 11.7 GHz band but most existing systems occupy only 40 MHz and use frequency plans with 40 MHz channel spacings. The same arrangement is used in the present system in order to avoid difficult frequency coordination problems with other users.

Most equipment is designed to operate in the 10.7 to 11.7 GHz band employing frequency plans recommended by CCIR REC 383 or the Western Electric TL frequency plan which are identical. These frequency plans are shown in FIG. 52. The plan arranges that all receivers are in one-half of the RF band and all transmitters are in the other half of the RF band, with a standard frequency translation at a repeater (or back to back remodulating terminal) of 530 MHz. This reduces the complexity of transmit/receive diplexers in the radio equipment and reduces self-induced interference between transmitter and receivers at a repeater location. At a repeater, back to back transmitters (or receivers) operate on the same frequency but with alternate antenna polarization. This is normally referred to as a two-frequency plan.

This plan requires the allocation of only two 40 MHz wide RF frequency assignments spaced by 530 MHz and these two assignments provide a two-way communications system. The 530 MHz spacing is not essential, provided that one of the frequency assignments is in each half of the frequency band. As an example, the frequency assignments of channel 12' TX (11,685 MHz) and channel 12 RX (11,155 MHz) are shown connected in FIG. 52. This subfrequency plan can be applied to any of the 40 MHz channel blocks in the primary frequency plan. It provides 6 subfrequency assignments within the 40 MHz allocation and takes advantage of the main features of the primary frequency plan. These are (a) adjacent channels are alternately polarized. This provides typically 25 db (20 db minimum) of polarization discrimination between adjacent channels and reduces the receiver selectivity requirements. (b) Transmitters (or receivers) using the same frequency back to back at a repeater employ opposite polarization. (c) Where the number of carrier assignments is less than the full capability of the frequency plan, district office outgoing channels can be frequency separated from district office incoming channels. This variation is shown in the frequency plan of FIG. 54 which is an alternate to the base plan shown in FIG. 53. The use of the frequency plan in a station layout which shows a partial expansion of the frequency plan is illustrated in FIG. 55. Channel 12'-3' means the primary frequency plan. Channel 12' at 11,685 MHz center frequency and subfrequency plan channel 3' within that channel 12' frequency assignment. With short distances possible between repeaters and fewer subfrequency plan assignments required for transmission away from the district office than toward it, both the antenna polarization discrimination and frequency discrimination advantages can be realized to avoid self-interference due to overshoot, siting, etc. Although both polarizations of antenna are employed, it should be noted that dual polarized antenna feeds are not required. This is because at any particular link, the appropriate TX and RX can be selected with the same polarization. This is also illustrated in FIG. 55.

In summary, the present subfrequency plan is exactly equivalent to the well-proven frequency plans employed by existing systems in the 10.7 to 11.7 GHz band which separate transmitters and receivers by 530 MHz. Further, it is implemented by obtaining only two 40 MHz frequency allocations in the 10.7 to 11.7 GHz band (two frequency plan). It is possible to plan paths with either polarization discrimination for back to back operation on a single frequency or frequency discrimination by selection of frequency assignments without reuse of frequency. With the complex radio networks necessary within a city area, it is considered extremely advantageous to retain these two degrees of freedom for planning the optimum frequency assignments for each radio path.

As stated above, the selection of the modulation and transmission technique in the local distribution system is principally influenced by spectrum and channel utilization considerations and the practical aspects of equipment design and operation. It is noted that the links are designed to provide approximately 40 db of system margin so that minor performance differences between several modulation techniques are not a deciding factor. The spectral transmission characteristics are determined by the type and distribution of the premodulation and pulse modulation filtering and, of course, the inherent spectral characteristics of the specific technique. From an analysis point of view, various filter transfer functions are used to determine the spectral and performance characteristics of a particular design. These include gaussian, raised cosine and half raised cosine filters with bandwidths specified in terms of the data rate. The degree to which the predicted performance characteristics, and spectral signature, are realized in practical equipment is greatly influenced by how well the assumed filter forms can be realized. From a practical point of view, an approximation to a gaussian response has found general use.

The modulation used for the local distribution system is biternary FM. In biternary modulation, a three-level waveform is produced at the regenerator while using but two levels at the transmitter. When applied to an FM radio, it is possible to divide the pre-detection and post-detection filtering so that FM threshold occurs simultaneously with the established BER threshold. When fully deviated, this is called optimum FM. For a $10^{-4}$ BER threshold (including an order wire capability), the band occupancy for biternary FM is less than 1.9 times the bit rate using optimum deviation; for binary FM this becomes about 2.6 times the bit rate with optimum deviation. This may be compared with a filtered bi-phased PSK signal which has a band occupancy factor slightly less than 2.5 times the bit rate if a gaussian shaped filter is employed.

The demodulators of the FM receivers are conventional in design and the bit error performance is based upon operational equipment performance and includes an additional 0.5 db safety factor beyond the degradations of real filters and circuits. The radios of the local distribution system are located on the rooftops of buildings in most cases. The radio location first should be centralized for the distribution to customers in the immediate area and, second, the location must be proper for siting to adjacent radio locations which may number as many as five and possibly more.

FIG. 56 is a block diagram of the local distribution radio system showing transmitters and receivers. The receiver comprises an RF preselection filter 498, a mixer 500, a crystal controlled local oscillator 502, an IF preamplifier 504, a gaussian shaped IF filter 506, an AGC amplifier 508, limiter 510, frequency discriminator 512, and regenerator 514. All input carriers within the 40 MHz allocated bandwidth of the system are fed to the RF preselection filter 498 and then to the receiver mixer 500. The local oscillator 502 for the mixer is a microwave source phase locked to a multiple of the quartz crystal. The microwave source consists of a basic voltage controlled oscillator at about 1.3 GHz, followed by a X9 multiplier, and delivers an output level of + 5 dbm. The local oscillator frequency is set at 70 MHz below the desired output carrier frequency such that the desired carrier frequency at the input to the receiver mixer is converted to the 70 MHz IF frequency. The desired carrier here means the desired carrier frequency of the subfrequency plan. Following the receiver mixer is the low noise IF preamplifier and then the gaussian shaped IF filter with a bandwidth consistent with the modulation characteristic. Following the filter, the AGC amplifier controls the gain required to raise the 70 MHz IF signal to a fixed level suitable to drive the amplitude limiter and frequency discriminator. The gaussian IF filter precedes the AGC amplifier and limiter to remove adjacent received carriers prior to applying the signal to these nonlinear circuit elements. The video output of the FM discriminator is then processed by the digital regenerator to provide a clean digital output of 1 volt peak to peak.

The local distribution system transmitter comprises a driver amplifier 516, a gaussian shaping filter 518, a voltage controlled oscillator 520 with an AFC circuit 522, a X4 multiplier 524, a transmitting filter 526, and a power divider 528. Voltage controlled oscillator 520 operates at approximately 3 GHz and includes a sample output signal which is used to drive the digital AFC circuit 522. The AFC compares the VCO frequency with that of a quartz crystal reference frequency and derives an AFC correction voltage. The AFC correction voltage is fed back to the VCO and maintains the transmitter output frequency within ±0.002 percent. The modulation is also applied to the voltage controlled oscillator by the driver amplifier and gaussian shaped filter 518, designed to minimize the spectrum occupancy with a level adjusted to provide one-quarter of the required transmitter output carrier deviation. This VCO output is then multiplied by the X4 multiplier 524 to the 10.7 to the 11.7 GHz band as is the carrier deviation. Transmitting filter 526 rejects unwanted outputs from the X4 multiplier and feeds the desired signal to the TX/RX diplexer or four-way power splitter 528. The transmitter can be set to operate under any one of the carrier frequency assignments of the subfrequency plan. As described, the receiver front end is 40 MHz wide and is later restricted to 6 MHz by the gaussian IF filter. The system is used with single antenna polarization and an antenna diameter of 4 feet. The maximum path length is 5 miles.

In order to carry the 4,800 bps traffic over wire pairs, use is made of a wire line driver illustrated in FIG. 57. This device has basically the same functions as a MODEM but since it is specifically designed for wire line transmission, and is not limited to voice frequency bandwidth, it is much less expensive than a MODEM. The wire line driver is used at each end of the multipair cable connecting the digital communications console with the time division multiplexer. The two ends are basically the same but some economies are possible at the multiplexer by sharing part of the timing with other channels. FIG. 57 shows a block diagram of both the transmit and receive sections of the line driver. The transmitter accepts binary data and timing. The timing is used to clock the binary to di-phase converter. The resultant signal, essentially a modulated squarewave at the bit rate, is applied by a power amplifier to a transformer and thence to the transmit pair. The unit comprises a transformer 530, a variable attenuator 532, amplifier 534, equalizer 536, and a clamping circuit 538 from which the signal is fed to a decision circuit 540 and di-phased to binary converter 542. The clamper also feeds a clipper 544, differentiator 546, rectifier 548, phase detector 550, and counter 552. The receive pair enters the receiver through transformer 530. Variable attenuator 532 is provided to set the level because the regenerator will give its best noise performance over a range of only about 6 db. It is only necessary to know the approximate line length to set this and no test instruments are required. The same applies to the equalizer. Clamp circuit 538 is used to stabilize the voltage levels of the signal so that an accurate decision can be made. The signal is clipped, differentiated, and rectified for timing extraction. A digital phase lock loop is used here because for the low rate involved it is less expensive and more stable than an analog VCO. The oscillator 554 is free-running at a high multiple of the desired sampling rate. The phase detector 550 compares the counter output with the transition signals and changes the division ratios slightly from time to time to keep the counter output locked to the incoming data. A single decision around the midpoint of the signal is taken and the resultant regenerated diphase is converted back to binary. FIG. 58 shows the binary to di-phase converter and power amplifier in the transmit section of the wire line driver of FIG. 57.

The local distribution system also contemplates the use of repeated cable transmission in such a way that the cable can be used interchangeably in the system with microwave, at least up to the capacity of the cable system. For this purpose, a standard interface is provided by both the microwave and cable systems. FIG. 59 is a block diagram of such an interface unit. This unit can be used at either end of the cable with the difference that the buffer is needed at the inbound end only. The unit comprises a buffer 556, error decoder 558, timing generator 560, dummy pattern detector 562, regenerator 564, and voltage controlled oscillator 566. The outboard end of the interface unit includes error coder 568, dummy pattern insertion circuit 570, bi-polar converter 572, and power amplifier 574. The data and timing from the group multiplexer is applied to the error coder. The timing generator by multiplication and division generates the requires 15 to 44 KHz timing signal for the cable system. Frequency multiplication is not naturally a digital operation but it can be accomplished by a voltage controlled oscillator and divider chain. Dummy digits are inserted to make up the rate difference and the result converted to di-phase. Power amplifier 574 drives the line through a transformer. Power for the repeaters is inserted at the transformer.

When the signal comes in off the cable, it is regenerated and converted into binary. The dummy pattern detector locates the dummy bits and removes them. It is then necessary to regenerate the timing rate to operate the error decoder. In the outbound direction, this timing drives the group demultiplexer. In the inbound direction, the timing reads the data into the buffer and the multiplexer provides the readout.

ALTERNATIVE OPTICAL LOCAL DISTRIBUTION SYSTEM

In place of the 11 GHz microwave local distribution system described above, it is possible to use an optical local distribution system. The optical system has the advantage that it is small, self-contained, and provides reliable full duplex transmission between any two points in the local distribution facility. The optical system does not utilize the crowded microwave portion of the spectrum, nor require any external antenna or plumbing, thereby making it easy to install and highly portable if relocation is necessary. It provides high quality, full duplex transmission at an adequate rate between the district office and a cluster of local subscribers. It can also be used between a microwave terminal and nearby subscriber terminals. In situations where a single subscriber has a transmission rate which prohibits the use of a telephone line or cable, the optical transciever can provide the service at the most economical cost.

FIG. 60 shows an optical local distribution system constructed in accordance with the present invention. In this system, a district office 66 is connected to a pair of subscriber terminals 576 and 578 through a pair of optical transmitter/receivers 580 joined by an optical link 582. An additional subscriber terminal 584 is shown connected to the district office 66 through a similar optical link and by way of a pair of microwave transmitters/receivers 586 and 588 and an 11 GHz microwave link 590. The microwave link is included in FIG. 60 to show its compatibility with the optical local distribution system and may be of the type previously described.

In the optical local distribution system, the optical transmitter receives a non-return to zero (NRZ) serial data from the data source which can be the district office multiplexer, a microwave terminal or a subscriber terminal. This data is then conditioned to produce a low duty cycle pulse which drives a modulator. The modulator sends a relatively short, high current pulse to a gallium arsenide diode. This current pulse causes the diode to emit a pulse of light which is collimated by the transmitter optics and directed to the receiving site.

The received data enters the receiver system through the receive optics, which focus the incoming optical energy on the face of a PIN silicon photodiode. This photodiode produces a current which is proportional to the received power. The current is amplified by a low noise preamplifier and further amplification is performed by an AGC amplifier. This amplifier has an automatic gain control (AGC) range of $10^4$ in voltage to provide for the large variations in signal level produced by changing atmospheric conditions. Additional dynamic range is provided by the limiting action of the PIN photodetector. The output from the amplifier is also passed to a timing extractor which controls the threshold or decision circuit, that is, it tells the circuit when to examine the output. The output of the decision circuit is a serial NRZ data format. Received timing information and data signal are then fed to line drivers for distribution to the final destination.

While either a light emitting diode (LED) or laser diode can be used as the light source, a laser diode as an infrared source for the optical transmitter is preferred in that the laser diode is greatly superior to a light emitting diode in providing maximum fade margin and link reliability. Both types of diodes operate on the same principle, i.e., an infrared proton is emitted when an electron makes a transition from the conduction band to the valence band in the junction region of a PN semiconductor. Current injection is the pumping or excitation mechanism in each case. In the light emitting diode, stimulated emission is relatively weak and, as a result, peak power output is low, average power output is comparatively high, the emission spectrum is broad, and the emission takes place over a very large solid angle (nearly a hemisphere) and over a relatively large area. In the laser diode, simulated emission is a powerful mechanism so that by comparison with the LED, peak power output in the laser diode is increased significantly, average power output is reduced somewhat, the emission spectrum is considerably narrower, and the solid angle into which energy is radiated is greatly reduced as is the active area of emission.

The optical detector is a square law device in that output signal current is proportional to incident signal power. Signal to noise current or voltage ratio in this type of detection process is proportional to the product of peak signal power and total energy contained in the signal pulse. It is therefore advantageous to maximize peak power provided that average power or total signal energy is not seriously reduced at the same time. A good laser diode is capable of approximately 20 times the peak power output of a light emitting diode (LED) with corresponding reduction in total pulse energy of a factor of two or less. All other parameters being the same, the laser diode is therefore capable of producing a 20 db signal to noise improvement in comparison with an LED. In addition, the narrow emission spectrum of the laser diode is advantageous in the event it is desirable to increase receiver sensitivity by replacing the PIN detector with an avalanche detector.

FIG. 61 is a block diagram of an optical transmitter and illustrates the extreme simplicity of the laser transmitting device. It comprises a line driver 589 internal clock 591, one-shot multivibrator 592, logic gate 594, modulator 596, light source 598, and transmitting optics 600. The non-return to zero (NRZ) serial data from the originating data source is provided to AND gate 594, along with a narrow timing pulse from the originating data source. The AND gate produces a pulse when the signal is a "1" and no output when the data signal is a "0."

The AND gate output is then sent to modulator 596. The gallium arsenide laser 598 is a current switched device and therefore the modulator must supply a pulse of current to the diode. The type of current switch used in this system is a transistor operated in the avalanche mode. The laser diode itself forms part of the charging capacitance and the avalanche transistor provides a very low impedance discharge path for the charged capacitor. This results in a 50 ampere sink current pulse with a 20 manosecond pulse width. The lead length between the modulator and the laser diode is very critical due to the fast pulse and high current, therefore the modulator and diode are packaged in a single module. The laser diode is mounted with its case grounded for heat dissipation and placed so that the lead line between it and the transistor switch is less than ¼ inch. The light pulse from the diode is then collimated by the transmitter optics. The transmitter modulator is shielded in order to eliminate interference with any of the receiver components. The modulator draws current only when a signal pulse is present. When the signal pulse is absent, the diode capacitance is charged and remains charged until the next signal pulse triggers the avalanche transistor switch.

The transmitter provides a local clock and line driver which can be used for synchronizing the data source bit rate if required. This clock can also be used as a test signal to check link operation by sending a continuous bit stream. The principal characteristics of the optical transmitter are peak power—5 watts, data rate—500 kilobits per second, pulse width—20 nanoseconds, beam width—2 milleradian, and wavelength—9,050 angstroms.

FIGS. 62A and 62B, taken together, constitute a block diagram of the optical receiver for the local distribution system. The receiver is a highly reliable, low noise, all solid state unit employing a synchronous operation for minimum bit error rate. The optical receiver includes receiving optics 602, a silicon PIN photodiode 604, a cascode preamplifier 606, four stages of integrated circuit amplification 608, a phase lock loop including a voltage controlled oscillator 610, loop filter 612, phase detector 614, comparator 615, a logic circuit, generally indicated at 616, a one shot 617, and a pair of line drivers 618 and 620. The receiver optics focus incoming signals onto the active area of the photodetector. The photodetector is a PIN silicon diode which has extremely fast response time (0.5 nanoseconds) with its maximum sensitivity occurring at $\lambda =$ 8,300 angstroms, which is very close to the gallium arsenide transmitter wavelength of 9,050 angstroms. For certain applications requiring maximum sensitivity, a silicon avalanche detector may be used instead at a slight increase in cost. The PIN detector is a backbiased diode which has a very high electric field existing in the depleted area so that generated carriers produced by the incoming signal are immediately swept out of the depleted region. Thus, the detector looks like a constant current source which has an output current proportional to input light power. The detector has a sensitivity of 0.35 amp/watt, a dark current of 0.07 microamp, an active area of 0.033 $cm^2$, a bias of 100 volts, and a capacitance of 5 picofarads (total circuit capacitance equal 10 picofarads).

The signal from detector 604 is amplified in discrete component preamplifier 606 in order to achieve a low noise figure. The preamplifier employs a cascode circuit in order to reduce the miller capacity effect which would increase the noise output. This type of preamplifier yields a 2 db noise figure. The preamplifier is followed by four stages of integrated circuit amplifiers which are capable of an AGC range of 80 db, i.e., the voltage gain may be varied by a factor of $10^4$. This is required to insure that the voltage input to the threshold detector due to the transmission of a "1" data symbol is constant independent of operating range and atmospheric conditions.

Under short range, clear weather conditions, sufficient signal is received to saturate the detector diode which limits at an output of approximately 0.1 volt. This has no adverse affect on performance since the diode recovers instantaneously after the signal pulse is terminated. Total voltage gain following the detector is adjusted by a long time constant (slow attack) AGC loop so that any received "1" in excess of 14 db above the equivalent input noise produces a voltage at the threshold comparator 615 which is twice the threshold detection level. Foul weather range is improved slightly by operating in a charge detection rather than a current detection mode. In the charge detection mode, the detector time constant and the amplifier bandwidth are matched to the interpulse period rather than to the pulse width. In addition to range improvement, this mode provides a significant simplification in circuit design since the amplifier bandwidth is greatly reduced. The receiver employs a bandwidth of 500 KHz.

The phase lock loop generates a local clock which is used to control the sample time of the signal at the threshold comparator 615 and provides timing for the terminal to which the data is being sent. Since there may exist periods of extended "0" transmission, the phase lock loop employs an extremely stable VCO or voltage controlled crystal oscillator 610 which is set as close in frequency as possible to the transmitter clock. The VCO is driven by digital phase detector 614 which samples the incoming bit stream and produces a voltage proportional to the phase error between the local clock and the bit stream. This error voltage is applied to the VCO through low pass filter 612 which eliminates the phase noise but responds to the slower variations in frequency of the VCO and the transmitter clock.

The locally generated clock examines the output of the threshold comparator 615 at the time when the signal is at its peak (in the center of the interpulse period for the charge detection mode). If the signal exceeds the threshold level, the clock sets an RS flip-flop 622; if the signal is less than the threshold level, no output appears from the threshold circuit and the clock resets the flip-flop. This action generates an NRZ data stream. The NRZ data stream and the clock pulses are applied to line drivers capable of driving 500 feet of RG-108/U cable for routing to the destination terminal interface.

FIG. 63 is a schematic diagram of the receiving optics showing the optical train which images the incoming signal onto the infrared detector. The parameters are chosen to provide an optimum combination of background rejection and ease of alignment. The system comprises a receiving lens 624, an alignment mirror 626, filter 628, field stop 630, and detector 632. The principal operational parameters which must be balanced in order to obtain optimum optical design are light collecting capability (aperture), background rejection, and ease of alignment. The aperture is limited by overall size of the transmitter/ receiver package, while background rejection is governed by the optical bandwidth of the spectral filter 628 and the total field of view subtended by the detector. Ease of alignment is determined by the system field of view, constrained by limitation imposed by the background rejection requirement.

The total power collected by the topical receiver and focused on the detector is given by:

$$P_o = \pi\ P_d/4\ D_{o\,R}^{\ 2}\ \tau_R \qquad (1)$$

where $P_d$ = power density at aperture $D_{o\,R}$ = entrance aperture diameter = 5 inches $_R$ = optical receiver transmittance = 0.8

Another parameter governing the light gathering ability of an optical instrument is its speed which is related to the $F-$ number, given by:

$$F_R = f_R/D_{o\,R} \qquad (2)$$

Here $f_R$ is the system focal length which is 19.7 inches; giving an $F-$ number of 3.9. For lenses on the order of a few inches in diameter, systems with $F = 2$ or larger can be made with single molded lenses which are considerably less expensive than individually ground lenses.

The fluctuating background noise power is proportional to the total background power incident on the detector. This background power is caused by scattered solar radiation, air glow optical radiation, etc. The background noise power can be reduced below amplifier noise by constraining the detector field of view and minimizing the optical bandwidth of the radiation incident on the detector. The receiver optical bandwidth is controlled by a spectral filter. The full angle field of view is given by:

$$FOV_R = d/f_R \tag{3}$$

where $d$ is the effective diameter of the detector and $f_R$ is the system focal length. The detector effective diameter is determined by the diameter of the field stop located directly in front of the detector's active area. The diameter of the active area of the PIN-3 detector is 1.8 mm. However, this diameter is restricted to 1 mm by the field stop. For a 19.7 inch focal length, the full angle field of view is therefore 2 mrad which is sufficiently narrow to reduce background noise below amplifier noise without imposing a difficult alignment problem.

The fine alignment of the optical receiver with the transmitter at the other end of the data link is accomplished by tilting the alignment mirror in both elevation and azimuth. The mirror holder has been designed so that one complete revolution of either alignment screw causes a corresponding 3 mrad angular displacement of the transmitter image. The fine alignment is accomplished by observing the transmitter image through an alignment scope and rotating the elevation and azimuth adjustment screws until the cross hairs in the eyepiece fall on the image of the transmitter lens.

FIG. 64 is a schematic view of the transmitting optics used to collimate the infrared energy from the light emitting source into a beam of approximately 2 mrad and provides for convenient alignment of the transmitted beam. The components of this system comprise the light source or laser diode 598, pupil lens 632, alignment mirror 634, and objective lens 636. The objective lens collects the majority of radiated energy from the diode and focuses this radiation into a narrow transmitted beam. The objective lens must subtend a central angle of nearly 40° at the diode in order to achieve a collection efficiency in excess of 85 percent.

The focal length of the objective lens is determined by the dimensions of the radiation source and the required divergence of the transmitted beam. The gallium arsenide injection laser is an equivalent rectangular source approximately 0.015 inch long by 0.004 inch wide. The transmitted beam divergence, or transmitter field of view, is determined by the largest dimension of the source. This beam divergence $\Delta\theta_T$ is given by:

$$\Delta\theta_T = d_S/f_T \tag{4}$$

where $d_S$ is the long dimension of the source and $f_T$ is the transmitter focal length. From Equation 4, a 2 mrad transmitted beam divergence requires a 7.5 inch focal length.

Having established the focal length on the basis of beam divergence and source dimension, the collecting efficiency of the transmitting optics is then governed by the aperture or diameter of the objective lens. This diameter, $D_T$, is constrained to 5 inches by the overall dimensions of the transceiver unit. The central angle, $\theta_T$, subtended by the objective lens is then:

$$\theta_T = 2\tan^{-1}(D_T/2f_T) = 38° \tag{5}$$

Therefore, 88 percent of the emitted radiation is collected by the objective. The lenses are coated with a thin layer of magnesium fluoride in order to reduce the amount of radiation reflected from the lenses and thus enhance the transmission. Since optical transmission at only one wavelength is desired, in the region of 9,050 A, the total transmission of the entire optical train is as high as 90 percent. Thus, the total quantity of radiation concentrated in the 2 mrad transmitted beam is 79 percent of the radiation emitted by the source.

The parameter which specifies the speed of the optical transmitter is the F-number, given by:

$$F_T = f_T/D_T \tag{6}$$

For the dimensions specified above, $F_T = 1.5$.

Monochromatic optical systems with F-numbers larger than three can usually be designed using only one lens, as is the case with the receiving optical system. Smaller F-number systems require more than one lens; therefore, to reduce the spherical aberration, astigmatism, and coma of the transmitting optics, a small pupil or corrector lens has been placed directly in front of the source.

An additional constraint placed on the optical design is that the source beam divergence, $\theta_T$, the source diameter $d_S$, the transmitted beam divergence $\Delta\theta_T$, and the final transmitting lens diameter $D_T$ be related by:

$$D_T\,\Delta\theta_T \cong d_S\,\theta_T \tag{7}$$

As $D_T = 5$ inches $= 127$ mm
$\Delta\theta_T = 2$ mrad
$d_S = 0.4$ mm
$\theta_T = 338° = 640$ mrad
this condition is well satisfied.

Fine adjustment of the transmitting optics is accomplished by using the technique described above.

The optical transmitter and receiver lenses have been deliberately separated in order to reduce cross talk caused by atmospheric scattering of a portion of the transmitted beam back into the receiving optics of the same station. It can be shown that the power back scattered into a receiver by atmospheric scattering of radiation emitted from a source at the same location is proportional to $1/R^3$. Here $R$ is the distance from the transmitter/receiver to the region at which the emitted radiation is scattered. This $1/R^3$ relationship is reasonable since the intensity of the back scattered radiation is also reduced by scattering as it travels back to the receiver. If the transmitted beam and receiver beam are well collimated, this region is located at the intersection of the two beams. In the system of this invention, the lens centers are separated by a distance of 18 inches. In order to take full advantage of lens separation in reducing back scatter, it is important that beam intersection be maintained at as great a distance away from a given station as possible, consistent with the range between the two stations. This, in turn, makes independent alignment of transmitting and receiving optics desirable. The present invention provides independent alignment while sighting through a single eyepiece.

FIG. 65 is an overall view of the optical system and in particular shows the components involved in alignment. In addition to the components previously described, the optical system includes a sighting mirror 638, an eyepiece 640, and an eyepiece filter 642. The unique feature of the alignment technique is a rotating mounting holding the detector, source and sighting mirror. When the mount is rotated through 21° clockwise, the source is moved from the center axis of the transmitting lens and the sighting mirror is positioned so that the cross hairs in the eyepiece lie on the center axis of the transmitting optics. Likewise, when the mount is rotated counterclockwise, the detector swings off the receiver axis and the cross hairs lie on the transmitter axis. The single eyepiece can therefore be used to align both optical trains. The eyepiece has an overall fied of view of 7° and the cross hairs subtend 0.1 mrad. An absorption filter 642 is located directly in front of the eyepiece to prevent possible eye damage in a short range situation should the second station inadvertently transmit during the alignment procedure. The alignment procedure is as follows: (1) Conduct coarse adjustment using external eye on sight and (2) rotate the sighting mirror mount to receiver position. Adjust receiver alignment mirror. (3) Rotate sighting mirror mount to transmitter position. Adjust transmitter alignment mirror. (4) Rotate same mirror mount to operate position.

FIG. 66 is an enlarged schematic half-view of a production package with the cover removed, more clearly illustrating the alignment elements. The device comprises a transmitter and receiver housed in a common package. The package is illustrated at 644 in FIGS. 67, 68, and 69, which are front, side, and elevational views, respectively, of the transmitter/receiver or transceiver package. The package is a flat, two-piece aluminum casting joined on the horizontal centerline and held together by bolts. Weather sealing prevents entrance of moisture and dirt. Two objective lenses are mounted on the front face of the package, one for the transmitter and one for the receiver. Lens hoods 646 and 648 protect the optical system from extraneous light.

Brackets and fittings on the bottom of the package provide attachment to a pipe mast 650. Adjustments in azimuth and elevation permit coarse aiming of the package to an accuracy of ¼°. Metal aiming sights are attached to the sides of the lower casting to facilitate coarse aiming. The mounting bracket on which the package rests is a casting which fits on the top of a round mast. This bracket is free to rotate while making azimuth adjustments. A clamping bolt 652 when tightened prevents rotation of the bracket. A bolt 654 at the top of the bracket engages angles on the bottom of the package. This permits tilting the package in elevation. Attached to the bottom of the bracket is a threaded I-bolt 656 which acts as a diagonal brace and holds the package firmly in elevation.

The optic path is folded to conserve space as best seen in FIG. 66. The mirrors which hold the light beam are adjustable for accurate positioning of the beam on the sensors. Fine aiming adjustment is provided by positioning the mirror mount in azimuth and elevation. The adjustment consists of three allen-head screws accessible from the bottom of the package. One screw provides elevation adjustment, an eccentric screw provides azimuth adjustment and the third screw securely clamps the mount after adjustments have been made. Printed circuitboards and other electrical components are mounted on suitable bosses and standoffs integral with the lower casting and electrical connection to the package is made through a weatherproof connector on the bottom of the package. The size of the package is 24 inches long, 12 inches wide, and 6 inches deep. Lens heads protrude 3 inches on the front side. The package is positioned in a flat altitude to reduce wind resistance. The corners of the package are octagonal for aerodynamic as well as aesthetic reasons. All adjustments are accessible from the rear or below the package and allen-head screws are used to facilitate tool engagement and assure positive rotation. Maximum range for the optical link is in the neighborhood of 3,500 meters.

CIRCUIT SWITCHING

The system of the present invention is a nationwide switched network which provides data communication links for customers through transmission facilities and switching centers. The transmission system spans the United States and is linked through five regional offices which provide network control. Eight district offices connected to each of the regional offices provide the capabilities necessary to connect up to 4,000 subscribers per district office. Connections between subscribers are made by circuit switching at district and regional offices. A subscriber receives a system response within 3 seconds after he submits his connection request. For example, a "ringing" signal will be given if the called party is not busy and other conditions are satisfied. The incompatibilities caused by differences in speed or bandwidth capabilities between sending and receiving terminals are resolved by the switch processors and other network components. When differences are discovered during the calling process, the equipment necessary for conversion of speed and codes is assigned to a call. Microwave links forming the trunklines provide communication paths for the network. The links are connected by stations which receive, amplify and transmit the signals. These stations function as either repeaters or branching repeaters, the latter type allowing channels to be separated or inserted into the main trunkline path.

Channels entering or leaving the microwave path at branching repeaters are switched by a regional or district office. The regional office is used to reassign channels to accommodate changing loads, to switch channels for individual calls, and to switch in special equipment. The district office switch is mainly used to connect subscribers when they are making or receiving a call. The network is structured to transmit data over channels which have basic data rates of 4,800 bits per second. Over the radio path, these channels are separated by using time division multiplexing. The TDM allows several channels to be combined to give rates of 9.6 kb, 14.4 kb, and 48 kb. Switched service up to 14.4 kb is provided to subscribers. Non-switched service up to 48 kb is provided. Service of 150 bits per second or slower is provided by concentrating a number of such channels into one 4.8 kb channel.

The office equipment is based on timing for synchronous circuits supplied from the transmission time division multiplexer previously described. This external timing is supplied to MODEM's used with analog subscriber circuits and also supplied to the DCC's. A unique timing signal is supplied at the baud rate for each data rate serviced by the network. The office terminations use the external timing signal for transmission and reception of data over the subscriber circuits and the external timing signal must be synchronized in both phase and frequency to receive data signals.

The process of making a call connection involves the use of the circuit switching capability. In the simplest case, the connection made provides a path between two subscribers with similar terminals using the same district office. A more complex connection might involve two district offices, a regional office, and several concentrator devices. Subscribers of the network are able to transmit both asynchronous and synchronous data. The speeds and modes are categorized as (1) asynchronous not greater than 150 bps, (2) asynchronous or synchronous not greater than 4.8 kb, (3) synchronous at a rate of 9.6 kb, (4) synchronous at a rate of 14.4 kb, and (5) synchronous at a rate of 48 kb. When it is desired for a subscriber to transmit data to more than one party, a conferencing capability allows up to seven subscribers to be connected at one time. In this mode of operation, all connected parties receive the data transmitted by any connected party. Thus, only one party may be transmitting at any given instant. The capabilities of store program computer enables conference calls to be established using abbreviated addressing. Abbreviated addressing also allows subscribers to reach often-called numbers with three digits instead of a normal seven digits number. For example, a company may have 10 facilities which are called frequently. The use of the abbreviated address allows connections to be made to any of these facilities with the use of three digits per facility.

With automatic callback, subscribers who try to establish a connection with another subscriber but are unable to do so because the called party is busy, may have the connection put through when the called party becomes free. This service is provided by an automatic callback feature of the system. When a subscriber wishes to use this service, he indicates so at the time of his call. After receiving the busy indication, he performs a normal disconnect and waits for the call to be completed. Should he initiate a call before the pending call occurs, the callback service is cancelled. The network capabilities also allow subscribers to restrict inward calls to those coming from a number or any one of a set of numbers held in the subscriber's directory. Using this service, the subscriber is able to provide protection for data files which could be misused and is able to schedule use of his terminal equipment to meet operating plans.

Intercept is also provided for calls which cannot be completed due to addressing errors, attempts to call restricted numbers, or other similar conditions resulting in an intercept by the switching processor. A fault indication is sent to the subscriber and indicated to him by his digital communications console. Certain intercept conditions do not result in notification to the subscriber but cause action to be taken by the system. One example is that of a changed number. When the system detects this condition, the new number is substituted automatically and the call is processed normally. A notification is given to the system operator and a notification is given to the subscriber at some later time. Subscribers may wish to check the operation of their equipment by performing "loop back" or other system tests. Special service code numbers are provided for this purpose. Directions for use of these testing facilities are provided to the subscriber in his operating manual.

Low speed conversion is provided for subscribers who wish to communicate with other subscribers whose equipment has a different operating speed. The speed conversion equipment resolves differences in most speed asynchronous transmissions to allow, for example, a 60 word per minute device to transmit to a 50 word per minute unit. The sending terminal is regulated to prevent overrun by supervisory signals sent to the DCC from the district office. The subscriber's sending terminal must be capable of obeying this type of control. High speed conversion is also provided and the transmission is supervised to prevent overrun by allowing blocks of data to be sent only as fast as the receiving device may accept them during high speed synchronous transmission. The speed conversion equipment acts as a buffer for either the synchronous or asynchronous conversion, receiving the characters or blocks of characters, storing them, and then retransmitting them at the speed of the receiving device. In order to use this service, the transmitting device must be capable of accepting this type of control. The assignment of speed conversion devices occurs at the time the call is placed. The requirement for the equipment is determined by comparing the classes of service of the calling and called parties. The message switching processors also handle calls between asynchronous and synchronous subscribers when the need arises.

The system capability includes facilities which convert from one code to a second code to provide compatibility between terminal devices. Initial implementation of the conversion process is on a one by one character substitution basis. That is, the conversion does not increase or decrease the total number of characteric in the message. The code conversion service may be used in conjunction with the speed conversion. As with speed conversion, the required equipment is assigned at the time the call is processed. The call is processed in the usual manner after assignment of the required equipment.

The message switching capability of the network also provides a delayed delivery service for messages and other information. Subscribers using this service are able to transmit a message to a message switching facility which will carry out the delivery to the called party or parties. The delay in delivery may be only a few seconds or may be several hours, depending on availability of the called party's terminal, delivery instructions, and priorities. The advantage to this subscriber is that he need be connected only long enough to transmit his message to the switching center; he is then free to receive calls or make other calls. The message switching service is available to all subscribers regardless of their class of service. Since messages are stored before being transmitted to the recipient, the differences in speed are automatically resolved.

The switching system includes a store-and-forward feature which is able to hold the messages passing through the system until they can be delivered to the destination. Messages which can be delivered within minutes or a few hours are held on more rapid access devices than those which will not be delivered for a full day. The messages transmitted to the store-and-forward processors are stored in the origination subscriber's code. The retransmission to the destination terminal results in this code being compared to the recipient's code. If a different exists, a conversion is made.

FIGS. 70A and 70B together show the configuration of a 4,000 subscriber district office 66. The district office (DO) provides the system with the capabilities needed to connect subscribers, switch subscriber lines, switch trunks, accept addressing information, control subscriber terminal equipment, concentrate low speed data, and convert speeds and codes. The system has a total of 40 district offices and they are evenly distributed to provide eight district offices for each regional office. The individual items making up the district office are commercially available components and are identified in FIG. 70 by their commercially available names. Since the principal function of the district office is that of making switch connections to connect subscribers, the most significant components are the switch matrix 122, the switch control 124, and the two illustrated communications processors, each generally indicated at 128. In the preferred embodiment, the switch matrix 122 and switch control 124 take the form of a commercially available system manufactured by Stromberg-Carlson, a subsidiary of General Dynamics. These units are composed of one or more trunk and link networks, each accommodating up to 1,024 inlets and include power control elements. They are constructed to operate under control of the switching processor 128. The switching network comprises a modular, multi-link, switching network composed of units which are sealed, dry-reed relay cross point matrices. These have the advantages of high speed switching, noise-free high quality transmission, long life without maintenance, reduction of floor space, high control capacity, flexibility and adaptability, and improved traffic control and management. These units have the additional important advantages of making it possible to optimally match the switch and control circuitry to the abilities and requirements of the stored program processor and to provide ease of installation and expansion flexibility while insuring the required standards of reliability.

A module is the main building block for the switch and is composed of 16 sealed dry-reed relays. Each relay has six reeds (four required for send and received pairs and two for control). These 16 relays are packaged in a four by four plug-in printed circuit module with four inlets and four outlets. The reed contacts are precious metal, plug-in terminals are gold, and each relay has an operate and hold coil. The switch control 124 is equipped with switch control circuitry which interfaces its switching matrix to the peripheral interface adapter (PIA) bus of the processor 128 which controls the entire switching office. The switch control operates in three modes: the network connection mode to set up a connection, the network release mode to release paths, and network trace mode to read back the path for a given inlet terminal. A special command allows the trace of all inlets and this can be accomplished in less than 30 milleseconds. The path is given in one 24 or 25 bit word and describes all links and switching modules used in the path. This allows rapid reconstruction of the switch map in the switching processor.

Each switch control unit has control equipment to perform these functions: mark, hold, trace, continuity test, and release. A description of the path from inlet to juncture requires one 24 or 25 bit word. This represents part of the control command issued by the processor and also the word return by the switch control when a path trace is requested. To make a connection, the switching processor is required to construct a command word using the switch map and availability tables. A duty cycle of the switch is less than 25 milleseconds for a mark and release operation. A trace function requires approximately 20 milleseconds. The processor, with the aid of the switch control, is able to detect and locate most faults as they occur. Such faults can be detected without a specific command from the processor. For a network with 40 district offices and 4,040 subscribers each and five regional offices, eight matrices and switch controls are rquired per district office and ten or eleven for each regional office.

The operation of the district office switch is governed by the subscribers who initiate requests for connections. Their requests are indicated through inputs to the activity scanner 120 and the address signaling A-MINs (ASA-MINs). The latter device decodes the subscriber addressing information and brings it into the processor used for control of the switch. The activity scanner notifies the processor 128 of "active" or "clear" state of each subscriber. The switch matrix is operated by the switching processor by way of the switch control. In addition to its capability of operating the switch matrix, the switch control has the ability to inform the switching processor of bad connections and indicate the status of connections currently being held by the matrix.

Although the switch control is shown connected to each of the two switching processors, it receives commands only from the on-line processor. The second processor acts in a backup capacity ready to assume a switching control in the event of suspected trouble in the on-line processor. Acting as the principal control element for the switch matrix, the processor carries out the calculations necessary to discover a path through the switch matrix. This path information is fed to the switch control in the form of commands which are to be executed. The average time to complete a switching operation is less than 25 milleseconds. This average time is not directly applicable to the calculation of the time required for completing a call connection however, since the disconnection operation is more rapid than the connection operation. The average operate time is effectively decreased by the ability of the system to overlap other call process functions with the switch operate interval.

The switch matrix has four contacts per crosspoint providing the capability that four-wire switching can be achieved. For optimum use of four-wire full duplex transmission, a balanced interface circuit is preferred. The processor is formed preferably from a commercially available computer system identified as COMCET 60 manufactured by the Comcet Corporation of St. Paul, Minn.

FIGS. 71A and 71B taken together are a detailed block diagram of the configuration for a regional office 110. The primary functions of a regional office are associated with the operation of the network itself. Such functions include assignment of trunks for use by district offices, the switching of trunk channels, and the handling of concentrated information. The system has five regional offices located at Los Angles, Calif.; Dallas, Tex.; Chicago, Ill.; Atlanta, Ga.; and Washington, D.C. Each of these offices is similar in capability with similar equipment and programs.

Figures 71A, 71B, 71C:
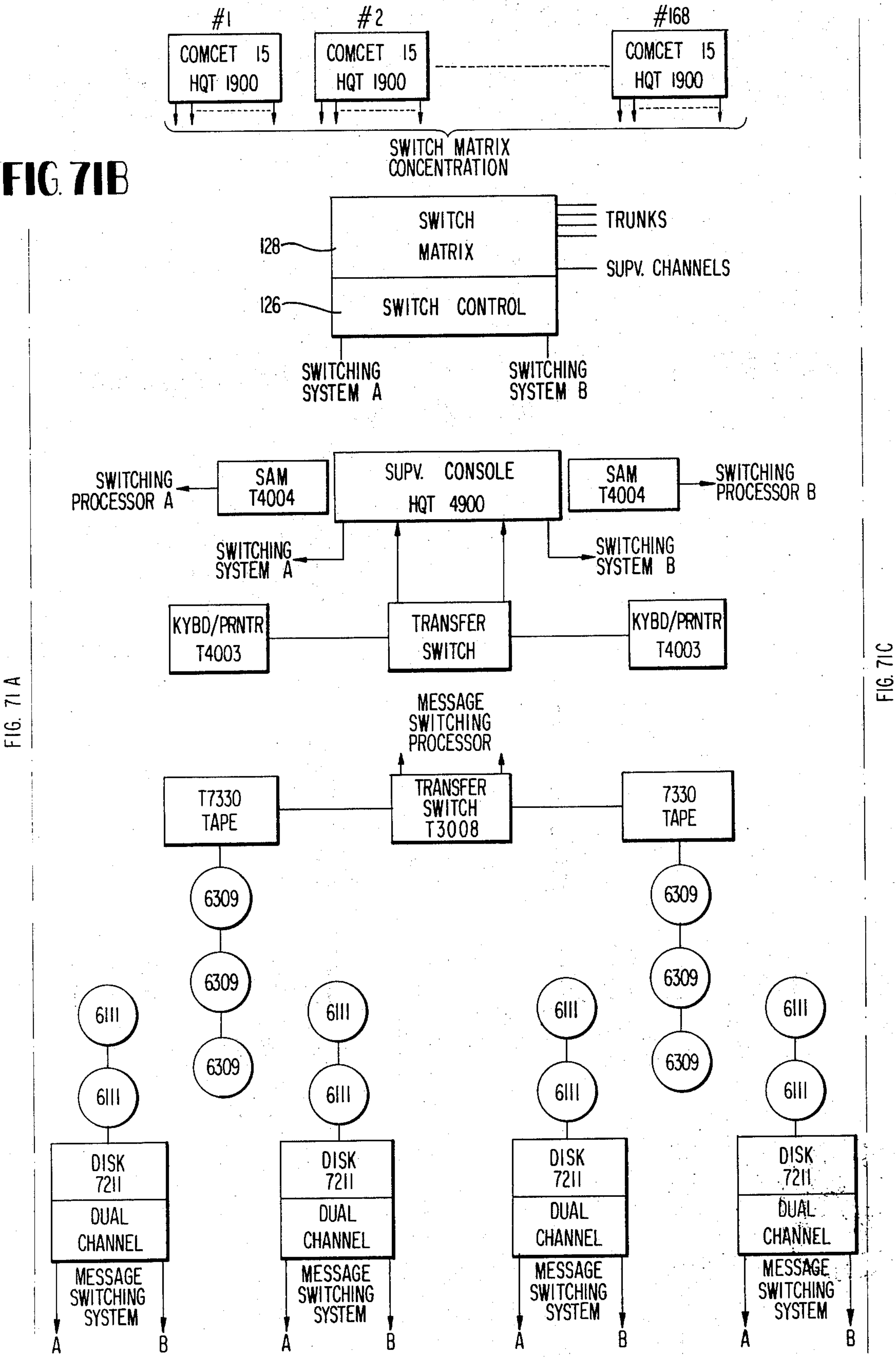
Figures 71B, 71C:
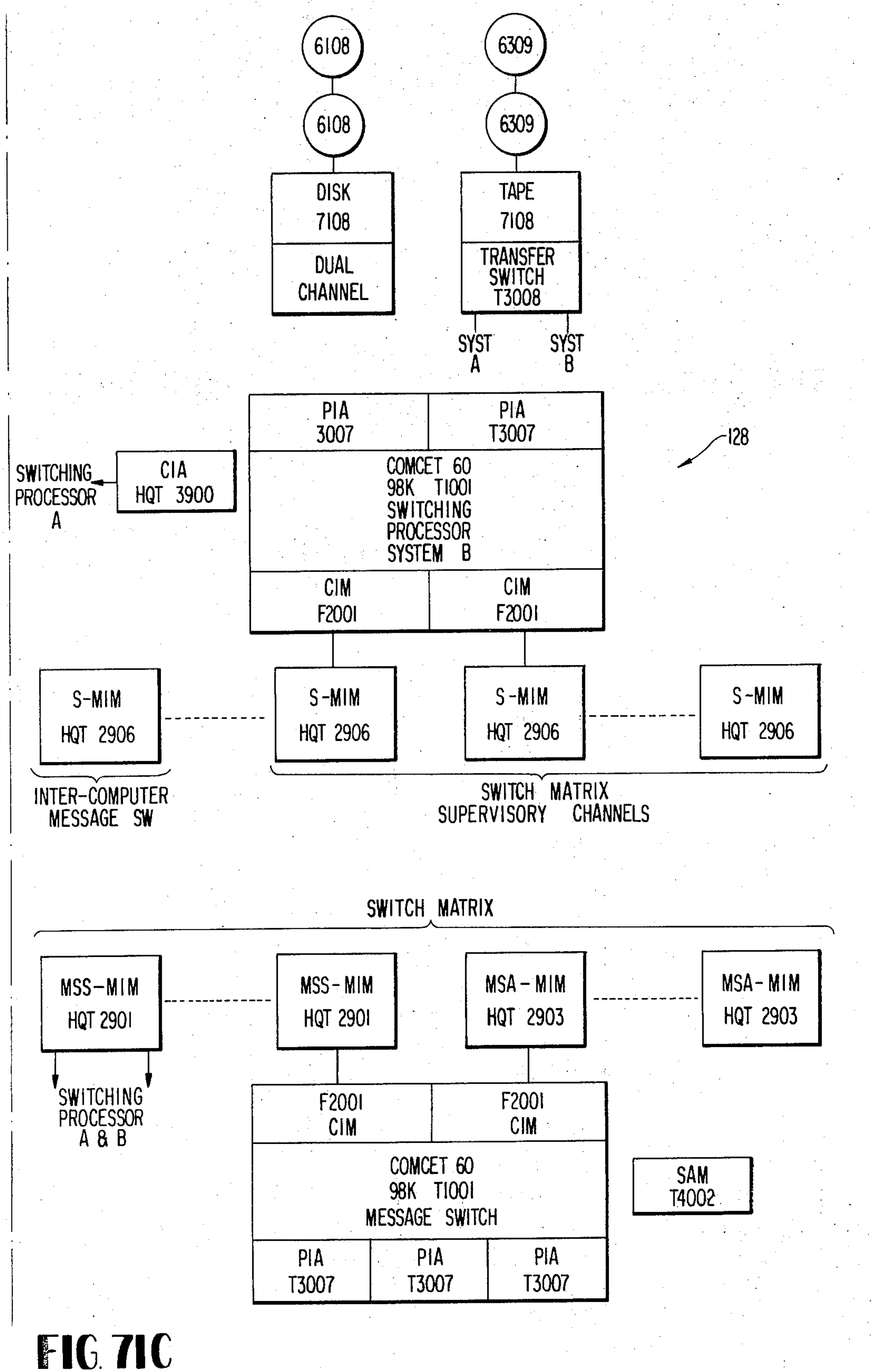

The regional office configuration is shown in FIGS. 71 and, as with the district office, its principal function is that of making switch connections. The switch matrix and switch control and the switching processors are therefore the main elements of the regional office. The two offices are similar in many respects and the regional office is only briefly described.

In the regional office, the switch control processor 128 receives information from other regional offices and from district offices over the supervisory channels. The concentration of data at the district offices requires that the regional offices be able to deconcentrate, switch and reconcentrate the low speed data lines. The regional office is equipped to perform circuit switching by means of a space division switch matrix. The switch matrix receives its commands from the switching processor via the switch control. In addition to operating the switch matrix, the switch control has the ability to inform the switching processor of bad connections and to indicate the status of connections currently being held by the matrix. The switch control in the regional office is equipped with an interface to each switching processor. A switch control receives commands from an on-line processor which calculates the crosspoints to be set or cleared to accommodate a given call request or other operation. The regional office, using COMCET 15's receives data from district offices in concentrated format over the 4.8 kb channels and deconcentrates it. The 32 lines per concentrated trunk are made available for switching into other COMCET 15's.

Following is a list of more detailed description of many of the components of the district and regional offices depicted in FIGS. 70 and 71:

COMCET 60 T-1001

The COMCET 60 processor is a special purpose communication oriented computer that combines full data processing with a unique input/output (I/O) section designed to handle large volumes of communications traffic. In addition, the processor interfaces with standard data processing peripherals or other COMCET processors.

Processor logic is divided into separable sections packaged in plug-in modules. These are mounted in the processor main cabinet. If necessary, a matching expansion cabinet can be added to the main cabinet to accommodate overflow of modules in a large system. Sections considered common to all COMCET 60's include:

1. The Central Processing Unit.
2. A random access 36 bit core memory.
3. The I/O logic which couples the various peripheral, computer, and communication interface modules to the processor.
4. The Communication Interface Module (CIM) which exchanges data between the processor I/O and up to eight MODEM Interface Modules (MIM).
5. System Acitivity Monitor (SAM) logic which which polls hardware points and accumulates data bout system loading (activity).

Optional logic includes modules which interface the processor with various peripherals and/or other computers and several versions of the MIM interface with different types of common carrier equipment. These modules mount on racks in either the main processor cabinet or in the expansion cabinet.

The internal processor operation utilizes a basic 32 bit word. Logic construction favors a binary (base 2)/hexadecimal (base 16) conversion for expressing register contents, etc., so hexadecimal is the numbering system used when referring to the processor.

A random access core storage module is an integral part of the processor. The basic (minimum) memory size is 32,768 nine-bit (eight data, one parity) bytes. Addition of seven (maximum) more optional modules, expands core size to 262,144 bytes. Processor hardware automatically generates and checks the pairty bit associated with each byte. Parallel data transfers in and out of core may be handled on a full word, half word, or byte basis. Full word transfers consist of 32 bits (four bytes), half word transfers consist of 16 bits (two bytes), and byte transfers consist of 8 bits The processor I/O section interfaces the processor with external equipment. The I/O section handles six (maximum) channels, two of which are reserved for communications, and four of which interface with peripheral or other computers. All six channels may be simultaneously active. I/O logic under program control transfers data in or out of the processor. Full buffering capability on each channel allows the processor to set up I/O operations which take care of themselves and, via interrupts, notify the processor when selected operations are complete.

In addition to the six I/O channels, the Operator Console and SAM Display also have interface logic which allows access to the processor. Operator Console I/O utilizes the interrupt system to transfer data back and forth on a single byte basis. The processor sends video, via a coax cable, to the SAM Display; in return, it receives the selector switch information which selects different display pictures.

The System Activity Monitor polls 144 strategic hardware points thousands of times per 5 second polling period and generates numerical activity values which are statistics necessary for system planning. At the end of each polling period, activity values enter assigned main storage locations and an interrupt notifies the system software that they are available for logging or tabling.

Results of each poll period appear in bar-graph format on the SAM Display Console. Displays are realtime showing the percentage of activity during each polling period. Software can expand the activity value displays to 256 bars by generating values from other data not gathered by System Activity Monitor polling.

COMCET 60 T-1002, F-1003

The COMCET 60 Memory Module is a high speed, ferrite core memory. It is packaged in plug-in assemblies and uses integrated circuits wherever possible. The memory power supply is sequenced to protect stored data during power turn-on and turn-off, and in most cases during power loss.

The memory features:

1. 900 nanosecond read/restore cycle time.

2. Direct access to any full word (32 bits), half word (16 bits) or byte (8 bits).
3. A parity check bit for each byte.
4. Modular construction. Each core memory module contains 32,768 bytes consisting of eight information bits and one parity bit per byte.

PERIPHERAL INTERFACE ADAPTER (PIA) T-307

The Peripheral Interface Adapter (PIA) interfaces between a COMCET I/O channel of a COMCET 60 and various peripheral subsystems. The PIA's pass the processor commands to peripheral subsystems, i.e., magnetic tape, disk activity scanner, switch matrix control, and supervisory console. Up to three PIA's (four if there is no CIA) can be provided with each COMCET 60 processor. Each PIA contains logic for interfacing up to eight non-communication subsystems.

COMPUTER INTERFACE ADAPTER (CIA) HQT-3900

The CIA provides the interface necessary for direct connection of two COMCET 60 switching processors. The CIA provides this means by a special direct interface which is separate from both the PIA or the CIM interfaces. This CIA interface provides a path by which either COMCET 60 can send either command or data to the other COMCET 60.

COMMUNICATIONS INTERFACE MODULE (CIM) F-2001

A CIM controls input communications to the COMCET 60 processor and output communications to remote devices. A CIM controls a maximum of eight MIM's and thus may accommodate 32 lines. Thus, two CIM's can control 64 lines maximum.

Each CIM has hardware detection capability for 32 unique control codes. Each MODEM interface may utilize any number of these control codes in groups of four. With two CIM's, up to 64 unique control codes are hardware detectable by the system. Control codes (detection of) in the data stream are used to provide buffering, to generate interrupts, and to control data transfer functions.

SYNCHRONOUS MODEM INTERFACE MODULE (S-MIM HQT-2906)

Each S-MIM controls four (maximum) full or half duplex lines. Each S-MIM passes from 1,200 bps to 230,400 bps (MODEM limitation only). The S-MIM's are utilized for interfacing the switch matrix to the switching, concentration and conversion processors, and as the interface between the switching processor and the concentration and conversion processor.

MULTIPLE SPEED SYNCHRONOUS MODEM INTERFACE MODULE (MSS-MIN HQT-2901)

The multiple speed synchronous MODEM interface module (MSS-MIN) is basically a standard synchronous MIM with the addition of the following features. Under program control, each full duplex terminal can select one of several clock speeds for transmission and receiption of data. The program can also control the selection of a particular sync character and EOM character, and the choice of seven or eight level character size. The above features allow this module to dynamically adapt to a particular subscriber's data format before it is switched into the subscriber's data channel. The MSS-MIM is used for calls requiring speed conversion, code conversion, or message switching. It is packaged on a full row logic deck and housed in the COMCET 60 cabinet or its expansion cabinet.

MULTIPLE SPEED ASYNCHRONOUS MODEM INTERFACE MODULE (MSA-MIM) HQT-2903

The multiple speed asynchronous MODEM interface module interfaces a maximum of four asynchronous MODEM's to CIM. Incoming serial data is stripped of start and stop bits and converted to parallel eight bit bytes for presentation to the COMCET 60. Outgoing data is received in parallel form from the processor, start and stop bits are added, and the data is serialized to the MODEM. These functions can be performed for four duplex lines operating simultaneously and at different speeds. MODEM status is continuously monitored and any change is immediately passed to the COMCET 60 via the CIM. The MSA-MIM differs from the standard asynchrnous MODEM interface module (A-MIM) by providing the following additional features.

The MSA-MIM can select one of three data rates under program control for transmission and reception of data. In addition, the program can select the proper character size of either five, six, seven, or eight levels. The MSA-MIM is used with the COMCET 60 processor to terminate ashychronous calls requiring speed and code conversion or message switching.

ADDRESS SIGNALING ASYNCHRONOUS MODEM MODULE (ASA-MIM) HQT-2 00

The ASA-MIM is similar to the A-MIM except that the ASA-MIM has additional capabilities of special character recognition. The ASA-MIM is used to receive the address digits from a subscriber and perform the normal MIM functions and transmit the information to the switching processor. In an output mode, the ASA-MIM performs the normal MIM functions as subscriber signaling is transmitted from the office to the subscriber.

CODE CONVERSION MODULE (CCM) HQT-2902

The code conversion module (CCM) is similar to a standard MIM in appearance but is unique in its function and application. The CCM consists of four code conversion circuits each having the capability to convert data codes on a byte per byte basis, allowing the processor to devote additional time to higher priority tasks. Each circuit is able to convert to or from any one of four combination prewired code sets, having seven or eight level character length. It interfaces to the processor via a CIM circuit in the same manner as the standard MIM's. The CCM therefore has the capacity for processing four independent calls simultaneously. The program defines which code sets are to be used for each call processed.

SYSTEM CONSOLE T-4003

The system console is used in the present system in conjunction with the switching processors. The system console provides an effective system/operator interface by means of a keyboard, printer, operator's controls, and the provision of mounting a SAM display.

The operator's panel contains all COMCET 60 operator control switches and indicators.

COMCET 60 CONSOLE T-4001

The COMCET 60 console is used in the present system with the COMCET 60 processors which are used for speed and code conversion. The COMCET 60 console provides a means of effective system/operator interface by a KSR 35 keyboard printer and stand. The COMCET 60 console differs from the system console in that there are no operator's controls or provision for a SAM.

SYSTEM ACTIVITY MONITOR (SAM) T-4004

The SAM is a visual display indicating system activity. The SAM indicates without tying up the machine or its operators for lengthy analysis:

1. What the actual workload of the communications processor is.
2. How the core memory is being used.
3. How much additional communications traffic the system can manage.
4. What the degree of system balance is.

The SAM monitors all major (144) hardware points and up to 112 software points within the COMCET system and compares actual workload (± 3.9 percent) to theoretical maximum workload.

The SAM monitors the following points:

1. Processor Wait State — (1 point)
2. Processor Problem State — (1 point)
3. Processor Interrupt State — (1 point)
4. Internal Storage Activity — (1 point)
5. Input/Output Channels — (12 points)
6. I/O Communications Lines — (128 points)

The SAM stores this data in a special memory module. The data is used for two functions: (1) The COMCET 60 Supervisor Program can capture the data and maintain a system use profile for a defined period of time, i.e., past peak minute, peak hours, 24 hours, etc. The data can identify peak load conditions of system unbalance along with frequency and time of occurrence. (2) The SAM also drives a visual display which plots and displays the data in bar graph form on a viewing monitor. The image is updated every 5.2 seconds. A set of switches on the console panel selects display points (32 at any given time).

Optionally, the SAM also has the ability to monitor 112 software points throughout the system. The software points detect potential problem areas, such as buffer pools, queuing, etc.

SUPERVISORY CONSOLE HQT-4900

The supervisory console provides a common control point for critical elements of a redundant system. The supervisory console provides a complete status indication of the elements making up the system designated as the on-line system, as well as the backup system. Controls at the console provide the means of reconfiguring the elements of the two systems. The console also provides indication of a fault status of any of the critical system elements.

The supervisory console interfaces the on-line and the backup switching processors via a PIA channel. It is via this interface that the supervisory console receives a periodic status check from each processor. A failure to receive a status check from the on-line processor indicates that it is failing to perform its mission. If the backup processor has successfully updated its status check, a recovery procedure is initiated.

Whenever a backup processor status check fails, a fault indication is received at the supervisory console. Under this condition, the failure of the on-line processor only results in a fault indication at the supervisory console and manual intervention is required.

The detection of an on-line processor failure and the initiation of an automatic recovery procedure results in the following:

1. An instruction is sent to the backup processor requesting that it load the programs necessary for on-line operation.
2. An instruction is sent on the on-line processor requesting that it cease on-line functions.
3. Enable/inhibit signals are sent to subsystems such as the activity scanner, switch control and disk. This enables the new on-line processor interface and inhibits the previous on-line processor interface.

The supervisory channel also provides the option of manual recovery, at the discretion of the operator. System faults are audible and/or visually displayed on the console.

COMCET 20 T-1004

The COMCET 20 is a high speed stored program processor which executes and operates on instructions and operands from a 900 nanosecond memory with complete read/write cycle time of 900 nanoseconds. The COMCET 20 provides for a maximum of 64 asynchronous mixed speed lines and one module of four 4,800 bit per second synchronous lines. The memory is capable of expansion to a maximum of 65K bytes of storage. The COMCET 20 is used in the present system in a district office for the concentration of low speed asynchronous data which is to be transmitted to another office. The data is concentrated into a 4,800 bit per second line for transmission on a trunk. Speed and code conversion required by the low speed asynchronous subscribers is also performed by the COMCET 20 processor.

COMCET 15 HQT-1900

The COMCET 15 provides economical and efficient full and half duplex line termination for data communication lines. The COMCET 15 provides flexibility and expansion in mixing line speeds to meet network or configuration requirements. The COMCET 15 application in the regional office is the concentration/deconcentration of the low speed asynchronous data from the district offices via one 4.8 KB trunk. The COMCET 15 receives concentrated data from a 4.8 KB trunk and deconcentrates this data to 32 low speed lines. Data is therefore concentrated at 32 to 1 in a full duplex mode.

ACTIVITY SCANNER HQT-9900

The activity scanner scans the subscribers' supervisory channels and periodically inputs the state (i.e., active or clear) of each subscriber supervisory channel to the switching processor. In addition, the scanner accepts commands from the switching processor which results in transmission of signals to the subscriber via the supervisory channel. These signals are "disconnect" (a command to force the subscriber terminal to the clear state), "restraint" (a command to indicate that the terminal is to temporarily halt transmission), and "resume" (a command to indicate the terminal may resume transmission). The activity scanner interfaces to the switching processor via a PIA input/output channel. It interfaces to the subscriber's terminal via the subscriber supervisory channel to the digital communication console. The maximum capacity of the activity scanner is 4,000 subscriber lines. Small capacities are available by means of a modular design. The activity scanner is designed to operate in conjunction with an independent backup unit. Either of two scanners can be accessed by either of two switching processors to maintain operation when a processor or a scanner requires maintenance. Each activity scanner is housed in its own cabinet containing power, cooling, cabling facilities, and necessary provision for maintenance.

CONFERENCE BRIDGE MODULE HQT-2904

The conference bridge provides a maximum of seven compatible subscribers to be connected together to allow any one conferee to transmit to all other conferees. Data rates up to 14.4 KB are allowed. Subscribers desiring to make a conference call indicate the proper address code to the switching processor whereby a non-busy bridge is connected to the desired subscribers via the switch matrix. The discipline of allowing particular conferees to transmit is the responsibility of the originating subscriber. The conference bridge fully expanded has the capacity for facilitating 105 conference bridges. Modular design also allows application of smaller sizes.

SWITCH MATRIX

The switch matrix is a device used to make connections between subscriber circuits, trunks and special equipment. The switch matrix itself is transparent to the data by providing the proper routing of each data path. A matrix is capable of transmitting data rates of up to 14.4 KB. The switch matrix is modular in concept so that it may be expanded as the need arises, and also so that the switch can be adapted to various sizes of offices.

SWITCH CONTROL

The switch control is a device which provides the interface between the switch matrix and the switching processor. The switch control receives commands from the switching processor via a PIA channel. After receiving and interpreting the command, it initiates the necessary operations in an orderly sequence to the switch matrix. If in the process of performing this orderly sequence, some fault is found in the desired path, or if the path defined by the processor's command is not valid, the switch control notifies the processor of the discrepancy. The characteristic of reliability is emphasized in the switch control. The design concepts contributing significantly to the high reliability of the switch control are that the control is highly modular so that a failure of one module increases the blocking probability but does not preclude service to any one or group of subscribers.

DISK SUBSYSTEM T-6108 AND T-7108

The 6108 disk storage unit provides a compact, rapid, random access mass storage capability for the COMCET 60 computer communications system. The 7108 disk storage control unit provides the control necessary to interface a maximum of two 6108's to a PIA. A second optional PIA interface allows access to the subsystem by either of two PIA's. The 7108 control unit is contained in the same cabinet as the first 6108 and features the ability to determine the number of the next sector available (sector tracking). This feature, when employed with the request current address function, allows minimum latency programming techniques to significantly reduce the 8.5 M's average access time.

The 6108 also features first word write. The first four bytes of any sector may be written alone without altering the remainder of the sector. This provides a 32 bit address linkage between multiple segment records. This capability eliminates read before write when updating linking addresses.

DISK SUBSYSTEM T-6111 AND T-7211

Utilizing removable disk packs (CDC 850), the 6111 provides on-line storage of over 6 million bytes of data. A maximum of eight 6111's may be used with a 7211 disk storage control unit. The 7211 offers the additional advantage of dual channel operation, thus allowing two processors to access the sybsystem via the same control.

Minimum latency programming is facilitated by two features:

1. The ability to operate one 6111 drive while moving the heads to the desired cylinder on the other (concurrent seek).
2. The drive operates on the desired sector the first time it arrives at the read/write head after a head move (sector tracking) rather than waiting to find the beginning of the track.

MAGNETIC TAPE SUBSYSTEM T-6309 AND T-7330

The 6309 magnetic tape drives provide IBM compatible nine track recording. The 7330 magnetic tape control unit provides for connection of a maximum of eight 6309 tape drives. Dual vacuum capstans that supply tape motion, contact only the non-recording surface. Loop control and tape tension are supplied by vacuum columns.

LINE PRINTER SUBSYSTEM T-7336

A drum type printer, the 7336, features a swing out drum assembly for easy access to forms and ribbon. Horizontal and vertical forms alignment can be adjusted while the printer is in operation. Mechanically, the 7336 is engineered for minimum maintenance with such advantages as heavy duty hammers and electromagnetic non-friction type paper feed clutch.

The control unit, including a one print line buffer memory, is built into the 7336 cabinet for direct interfacing with a CoMCET PIA.

CARD READ/PUNCH SUBSYSTEM T-7501

The 7501 will read, punch or read/punch 80 column cards in one pass through the transport. Feed stop for a full stacker and immediate motor shut off for card jams are standard features. An additional feature allows a card to be fed out of the punch station at full speed immediately after punching the last desired column (feedout). A self-contained control unit provides the interface to a COMCET PIA.

Part of the function of a district and regional offices involves line concentration. The 4.8 KB trunks could be used at less than one-thirtieth of their capacity if they were used to transmit asynchronous data at 15 characters per second. This inefficiency is due to the basic transition speed and the inclusion of start and stop bits which each character. The district office equipment overcomes this inefficiency by removing the start and stop bits and by concentrating the information from 31 low speed lines onto one 4.8 KB trunk. The removal of the start and stop bits is accomplished by the interface units which convert the serial bit stream to characters. If the characters being transmitted are assumed to be represented by 8 bits, the 4.8 KB trunks have a character transmission rate of 600 characters per second. In theory, one 600 character per second trunk can handle the information concentrated from 40-15 character per second lines. In practice, this maximum cannot be attained since additional information must be transmitted to provide line identification, to provide synchronization, and to accommodate the characteristics of the concentrating processors. In actuality, the concentrators are able to handle 31 low speed lines per 4.8 KB trunk.

FIG. 72 shows a processor for concentration and the processor may be formed by a COMCET 20. The processors are used at each district office to concentrate the low speed asynchronous lines. The capabilities of each processor provide concentration facilities for 62 low speed lines as shown, and these 62 lines are logically divided into two sets of 31. Each set of 31 is concentrated with the data transmitted on one synchronous line. The concentration is carried out by the processors which scan 31 lines sequentially to build up blocks of information for transmission at the 4.8 KB rate. After addition of checking information, the block contains the information found on each of the 31 lines during that time interval.

The concentrated trunk provides the equivalent of 31 lines at each district office for an intra-regional call and this is shown in FIG. 73. The subscribers of the system have no particular awareness that concentrated lines are being used to carry their low speed transmission. Since all low speed lines concentrate onto one 4.8 KB trunk, all 31 lines are transmitted to the same destination. Typically, these concentrated lines are between district and regional offices as shown in FIG. 74. In this arrangement, the 4.8 KB trunk is deconcentrated again to provide 31 lines at the regional office. After switching, the lines enter another concentrator. The number of concentration devices at each district and regional office is determined by the holding times, traffic requirements, and availability requirements, as well as the capabilities of each concentrating unit.

Subscribers of the present network who have terminal devices operating at different speeds are able to establish communications and transmit data using the speed encode conversion services. The speed encode conversion capability is available for subscribers of all service classes. Two general categories are defined. One category is for asynchronous transmissions having rates up to and including 15 characters per second. The other category is for higher speed transmissions using synchronous transmission techniques. The two categories are distinguished because of the equipment used and techniques which differ for the handling of each. The low speed conversions use the concentration equipment just described to perform the code conversion operations, while the higher speed conversions are carried out by equipment in the district offices.

The low speed asynchronous transmission enter the district office in the code set used by the subscriber terminal. At the time the call occurs and the service classes are compared and are found to be different, the switching processor instructs the concentrator processor to perform the conversion during the call. As each character is received at the sending district office, it is converted to the equivalent character for the receiving terminal. Differences in speed of sending and receiving terminals are resolved in two different manners for asynchronous transmissions. When a low speed terminal is sending to one having a higher speed, the operating speed of the receiving terminal is automatically accommodated by the availability of the data. Since both terminals are asynchronous, the receiving rate is that of the sending terminal.

When an asynchronous terminal is transmitting to one having a lower speed, the transmitting speed is governed by the originating district office which sends "restraint" and "resume" signals to the DCC after receiving a supervisory message from the destination district office. In this manner, the amount of data that is allowed to accumulate in any of the offices is limited to a few characters. If this system were not used, a large amount of storage would be required to handle the data which would accumulate during a transmission involving speed conversion. The sending terminal must, of course, have the ability to accept these signals.

Conversion of codes for higher speed transmissions presents a slightly different situation since these transmissions are usually carried out using synchronous data transmission techniques. The information to be converted is not looked at character by character as it enters the conversion processor. Rather, an entire block is received; then the character is converted at one time. After conversion, the characters are again assembled into the required format for the receiving terminal device.

The conversion of the high speed transmissions is carried out in each district office by the COMCET 60 processor. Each converter processor communicates with the on-line switching processor. The information to be converted is received into a processor and stored in character form. The conversion is then performed by sending the stored information through a code converter module (CCM) which operates through a CIM connection. The high speed conversion capability of the CCM allows one conversion module to handle the requirements of many high speed communications channels. The configuration for the high speed conversion processors therefore has only one CCM consisting of 4 code conversion circuits per processor. The conversion process for the high speed data is similar to that of the lower speed asynchronous data since it converts on a character by character basis. For the conversion process, the character sets of the two terminals involved must have a one for one character conversion.

As with the slower rate transmission, the change of speed process must be governed. The regulation of the sending terminal is more critical in the higher speed transmissions since a change of speed involves the storing of vast amounts of data. The scheme for controlling the sending rate of a high speed device transmitting to a slower one is much the same as for the asynchronous slower speed transmissions discussed. The basic difference is that the "resume" issued to the sending terminal allows a block of data to be transmitted rather than controlling individual characters.

The district office provides communications to each of the five regional offices by way of dedicated supervisory channels. The hardware configuration to serve this purpose consists of seven full duplex communications terminals on each switching processor, two of which are spare terminals for backup. The district office generates and transmits supervisory messages over these channels for the calls it originates. The district office also answers interrogations by the regional office for incoming calls by means of supervisory channels. All transmission over these channels is synchronous at 4.8 KB.

For intra-office communications, the district office uses a synchronous 4.8 KB communications channel to connect the switching processor to each of the conversion processors (COMCET 60) and to each of the concentrator processors (COMCET 20), thus allowing the switching processors to act as a hub for all communications between equipment in the office. The switching processors communicate directly with each other via the computer interface adapter (CIA).

Subscriber signaling serves to allow an exchange of information concerning the processing of a call and to indicate particular call status. The subscriber circuits are furnished with a separate supervisory channel which allows information to be exchanged between the subscriber terminal and the district office independent from the data channel. These supervisory circuits interface to the district office switching processor by way of the activity scanner. The signaling techniques used over the supervisory channel utilize DC levels of assigned duration to indicate the particular signal.

The district office is equipped with a supervisory console which monitors office equipment readiness and indicates equipment assignment within the office configuration In addition, it facilitates automatic and manual switching between the backup and on-line switching systems. The district office records information concerning system operation and the use of system facilities by subscribers. During the processing of each call, a packet of information is created which describes the call and is held on disk storage. Upon completion of the call, the information is recorded on magnetic tape. Data regarding system failures is also recorded by the system upon detection during call processing operations or during the operation of automatic test and manually initiated test routines. The call information recorded includes the sufficient data needed for billing or statistical reasons and the statistical data collected at the offices is used to analyze the operation of the systems, systems components, and operating procedures.

The arrangement for concentrating a number of low speed channels into one high speed channel is associated with the district office. The regional office, using COMCET 15's, receives data from district offices in concentrated format over the 4.8 KB channels and deconcentrates it. The 32 lines per concentrated trunk are made available for switching into other COMCET 15's. The regional office is configured with two switching processors, one serving as an on-line processor and the other serving as a system backup. The roles can be interchanged between processors by manual or automatic initiation of a switchover. Two secondary storage subsystems (disks) equipped with a dual computer interface associated with the switching processor allows access by either switching processor.

Another important feature of the regional office involves a provision in the system of the present invention of dynamic trunk allocation. That is, since the transmission path linking the regional and district offices follows a route which minimizes the number of repeaters, it does not necessarily correspond to the logical layout of the network. The required logical layout is provided by bringing portions of the path into the switch matrices located at district and regional offices. Channels brought into these switches can be used to provide subscriber trunk circuits or they can be connected back into the transmission path. An arrangement of this type is illustrated in FIG. 75. FIG. 76 shows a typical dynamic trunk configuration.

The regional offices allocate these switchable channels to each district office in accordance with the predicted or observed traffic patterns. Control information sent from a regional office designates which channels are to be switched through, which are available for trunk connections, and the destination of available trunks. The allocation is made for fixed time intervals rather than on a call by call basis.

The dynamic trunk allocations are made automatically and the regional offices coordinate the allocation of trunk circuits to provide the best combination of 4.8 KB, 9.6 KB, and 14.4 KB trunks to handle traffic and optimize usage of available capacity. The general scheme for this allocation is illustrated in FIG. 77.

The regional office is provided with a dedicated supervisory channel to all district offices and to the other regional offices. The switching processors are each equipped with a full duplex communication MIM for each channel. The MIM's interfaced to the switch matrix are switched but are assigned on a semi-permanent basis. Switching of the MIM's takes place in the case of circuit failure or other extraordinary occurrences. The store and forward message switching capability allows subscribers to submit information to the system for delayed delivery. The equipment necessary for this operation is also included in the regional office.

The connections of the message switching processor in the regional office system allow it to be treated as an ancillary device to the switching processor. Through direct connection, the switching processor sends commands which define the message switching operation to be performed and details of the switch connections being used. The message switching processor is able to communicate directly with subscribers who use headers and other control information in their transmissions for control. This mode of operation requires that the message switching processor be capable of handling subscriber signaling in both directions. This function is served by the MIM's assigned to the message switching processor. The MIM's for these calls are in two categories: the MSA-MIN's servicing the asynchronous traffic and the MSS-MIM's servicing the synchronous traffic. All these MIM's are switched onto the desired trunks by way of the switch matrix.

SUMMARY

It is apparent from the above that the present invention provides a new and improved transcontinental communications system particularly designed to act as a common carrier network for the transmission of high speed digital data. High speed and reliability are preserved throughout the system from one end to the other so that one computer may be connected directly to another almost anywhere in the continental United States and full advantage taken of a conventional digital computer's ability to handle and process vast amounts of information in a relatively short time. The system traverses the continental United States with a high channel density microwave backbone trunk operating in the 6 gigahertz microwave frequency range and so constructed to require a minimum bandwidth in the frequency spectrum. By utilizing minimum shift keying, it is possible to provide approximately 4,000 full duplex channels having a transmission rate of up to approximately 4,800 bits per second in two spaced 25 megahertz wide frequency bands.

The system utilizes time division multiplexing in providing an all digital data transmission path which is transparent so that the received characters are identical to those transmitted. Inherent advantages in the digital transmission system include increased reliability, maximum channel density in assigned frequency bandwidths, efficient utilization of transmitted power, maximum potential for system expansion, and flexibility of system configuration. The system is composed of three basic elements, namely, the trunking or backbone microwave system, a switching system in which computer processors control switching through a switch matrix at district and regional offices, and a local distribution system fully compatible with the trunking system so that high speed digital data transmission is effected from one subscriber to another. In each microwave station, the system is regenerative in that it restores the symbol or bit pattern and transmits a new clean and conditioned signal so that noise is not cumulative and errors in transmission are reduced accordingly. Operation of the total system is full duplex for two-way simultaneous transmission and the basic digital system is fully compatible with existing services which may be connected into the system through MODEMS or other interface equipment.

The present invention is directed to a system designed to meet an already critical need in the communications industry and one which unquestionably will increase in a very short time. For example, of the approximately 1.25 million retail establishments in the United States, about 260,000 represent requirements for data communications facilities because they are outlets of multi-unit chains with centralized credit, inventory control, purchasing, distribution, and billing functions. These retailing establishments require the frequent transmission of large amounts of data from "point of sale" outlets to centralized computer facilities. Of the approximately 325,000 existing manufacturing establishments in the United States (including remote sales, administrative and warehousing offices), about 74,000 locations are elements of multi-unit manufacturing companies. The manufacturing segment currently utilizes more remote terminals than any other segment, even though the concentration of data processing activity today is primarily in accounting-oriented systems, such as payroll and invoicing. Current trends identified by manufacturing concerns indicate a tremendous growth in their data communications requirements as they achieve greater breadth and sophistication in their operating and marketing systems. As these areas develop, data communications requirements for manufacturing concerns will swell significantly both in volume and scope of required services.

Facilities of the processing industries in the United States include about 21,000 operational, distribution, sales and administrative locations. Moreover, these processing organizations service over 200,000 retail outlets, not included in the demand potential for the retail segment. Currently, the potential data communications oriented applications in these industries range from a nationwide credit card sales and accounting system, to process control systems for refinery and chemical processes. All of their applications require transmission of data from a number of remote locations for processing and storage at one or more centralized locations. In recent years, investment banking and brokerage firms (over 7,000 sales and accounting offices), stock exchanges, banks, and the investing public as a whole (over 26,000,000 investors) have been the victims of a severe log-jam in the processing of the paper and information necessary to conduct their complex and vital business. Toward these objectives, several communications oriented information systems are fully operational in the investment banking community. These can be subdivided into two major areas: (1) services provided to the industry, such as odd lot and round lot trades, quotations on listed and unlisted securities, last sale ticker and block trading capability; and (2) applications such as order and trade processing, and customer information retrieval which is operated by individual firms for their own use. From a communications standpoint, these systems represent significant data transmission requirement. These requirements will increase dramatically in the near future as a result of two factors. First, growth in the number of investors and availability of quotation information to larger numbers of individuals will increase the demand for currently available services. Second, new services are contemplated by several firms which will lead to even greater communications requirements.

The banking industry is presently striving to speed and simplify the flow of financial data in order to provide funds and credit where and when they are needed. There are over 33,000 national, state and private banking locations not including many thousands of consumer finance and savings and loan institutions. Thes installations represent major current demand for data transmission services. Savings alone is ranked among the five top current data communications applications in all economic segments. Financial information demands rapid access and highly reliable transmission. In the future, as banks move to the "checkless" or "lesscheck" society, attention will be focused on the electronic clearing of checks. Currently, about 22 billion checks are written annually. Some 300,000,000 demand and time deposit accounts exist in national, state and local banking institutions representing about 500 billion dollars in deposits. The volume of financial exchanges is likely to grow dramatically as financial transactions are captured at the source and the movement of paper replaced with data transmission.

Some 98,000 insurance companies and independent agent offices currently serve the United States public. The insurance industry is attempting to expand and enlarge the base of casualty, property and health coverage. This industry is among the largest users of data processing equipment. Several large underwriters have implemented major data processing systems and most of the large insurance companies are currently re-evaluating their data processing efforts with the objective of concentrating computer hardware and technical skills in as few locations as possible. Realization of this objective in conjunction with implementation of planned third generation systems will dramatically increase the industry's requirements for the transmission of data to and from centralized locations. Many of these applications will require high speed transmission facilities in short bursts.

Other applications are computer services in which major users of data processing capabilities are suppliers of generalized and specialized services in two major categories: (1) time sharing, where users have at their discretion access to the full computational powers of a large computing facility shared by several users simultaneously, and (2) service bureaus where full data processing services are made available on an "as needed" basis, usually to meet the daily data processing needs of several customers. Shared data processing services offer a viable economic alternative for those potential data processing users who either cannot justify their own in-house facility or have infrequent requirements for data processing services which exceed in size and sophistication the capabilities of their in-house systems. Such potential users include small manufactureres, merchants and self-employed professionals, among others. In addition, many larger organizations augment in-house business data processing installations with the use of time sharing terminals for engineering, scientific, statistical, and operations research applications. Computer related services also include specialized services for information retrieval (real estate, publications, general information, etc.). Most industry experts project a ten-fold or greater growth in industry revenues within the next 5 or 6 years, which revenues are currently estimated at close to 100 million dollars.

The dramatic increase in the student population, and ever growing demand for quality education at all levels, and a critical percentage of qualified teachers, pose a processing demand on data processing technology to assist in the development of new educational techniques. There are several application areas in which research has begun and practical results have already been achieved for which computer/ telecommunication systems play a critical role. Major implementation retrieval systems have been established to minimize search time by subject, author, date, or any other parameter. In these systems, each inquiry is transmitted to a central data base where modern search techniques extract pertinent data and transmit it back (often in sizable quantities) to the source inquirer. The role of data communications in the development of these vital applications should be to provide a reliable, inexpensive means of connecting elementary, high school, college and graduate students with central computers for library data banks and programmed instruction courses. Although this form of instruction can be provided by an "on-site" teaching unit—computer controlled learning affords greater flexibility and responsiveness in monitoring and recording student progress.

While the number of patients per doctor is expected to remain fairly constant in the United States in the near future, the demand for medical services is increasing because of the greater proportion of the total population projected for the over-65 age bracket. Simultaneously, the costs of medical services are rising as hospital care, drugs, and private care become more expensive. These two disturbing trends point up the need to use new technology as effectively as possible to sustain high levels of medical care while keeping costs under control. The potential of the medical profession for using computer/telecommunications technology is limitless.

Finally, the federal government is currently the largest single user of computers, terminals and communications systems in our economy. The range of existing data processing applications is as broad as federal government activities. However, additional processing requirements are being identified constantly, and advanced data processing/communications requirements are entirely feasible with today's technology. Many of these applications require ultra-high reliability, rapid access, and high speed transmission, flexibility to interconnect quickly with many different points and the volume of data is huge and will probably grow enormously as government services are increased.

The identification and development of large-scale information systems for state and local government use has been expanding rapidly in recent years. Several large cities have already implemented or are planning near term implementations of sophisticated crime control systems. Welfare accounting systems are essential if communities and states are to control effectively their large health and other public assistance programs. Population data base development and utilization will be essential to urban planning and renewal efforts. The role of data transmission in these and other programs will be significant, especially in facilitaating facilitating of data among states. In addition, automated project management systems for controlling large highway and building construction projects can contribute significantly toward more effective tax dollar utilization in the development of major public facilities.

In view of the present existing demand and a demand which can only rapidly increase in the foreseeable future, it is believed that the system of the present invention in providing the rapid transmission of digital data is essential to the rapid and orderly advance of many sectors of the economy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A common carrier type data transmission network comprising a plurality of first full duplex data transmission channels and a plurality of second full duplex data transmission channels, a digital circuit switch having first and second groups of inputs and first and second groups of outputs and including means for connecting any input to any output, a first set of combination time division multiplexer-demultiplexers coupling said first group of switch inputs and said first group of switch outputs to said first channels, a full duplex microwave backbone trunk comprising a first microwave transmitter and a first microwave receiver, a second set of combination time division multiplexer-demultiplexers coupling said second group of switch outputs and inputs to said first microwave receiver and transmitter respectively, said backbone trunk including a second microwave transmitter and a second microwave receiver, said first and second transmitters including means for digitally modulating a microwave carrier, each of said first and second microwave receivers including means for demodulating said carrier, a series of microwave repeater stations coupling said first microwave transmitter and receiver to said second microwave transmitter and receiver, and a third set of combination time division multiplexer-demultiplexers coupling said second microwave transmitter and said second microwave receiver to said plurality of second data channels.

2. A transmission network according to claim 1, wherein said repeater stations include means for demodulating said carrier and rebroadcasting an amplified reshaped modulated carrier.

3. A transmission network according to claim 1 wherein said modulating means comprises means for applying binary modulation to said microwave carrier.

4. A transmission network according to claim 1, wherein said second set of multiplexer-demultiplexers multiplexes said second group of switch outputs at a rate of approximately 20 megahertz.

5. A transmission network according to claim 1, wherein said modulated carrier contains approximately 4,000 channels each having a transmission rate of up to approximately 4,800 bits per second, said channels being located with a bandwidth of 25 megahertz.

6. A transmission network according to claim 5, wherein said carrier is in the 6 gigahertz frequency band.

7. A transmission network according to claim 5 wherein said carrier is in the 11 gigahertz frequency band.

8. A transmission network according to claim 1, wherein said microwave carrier is phase modulated with the intelligence to be transmitted.

9. A transmission network according to claim 1, wherein said plurality of first data transmission channels form a local distribution transmission system.

10. A transmission network according to claim 9 wherein said local distribution system comprises a plurality of microwave links.

11. A transmission network according to claim 10 wherein said local distribution links operate in the 11 gigahertz band.

12. A transmission network according to claim 10 wherein said local distribution links comprise microwave carriers frequency modulated in accordance with the intelligence to be transmitted.

13. A transmission network according to claim 9, wherein said local distribution system comprises a plurality of digital links.

14. A transmission network according to claim 3 including a plurality of digital communications consoles coupled to each of said local distribution links.

15. A transmission network according to claim 9, wherein said local distribution system comprises a plurality of optical links.

16. A transmission network according to claim 15, wherein said local distribution system comprises a plurality of infrared links.

17. A transmission network according to claim 16, wherein said local distribution system comprises a plurality of laser links.

18. A data transmission network according to claim 1 wherein said first and second full duplex data transmission channels are coupled to digital communications consoles at subscriber sites.

19. A data transmission network according to claim 18 wherein said digital communication consoles are coupled to subscriber data terminals.

20. A data transmission network according to claim 18 including a switching line concentrator coupling at least some of said digital communication consoles to said first multiplexer-dimultiplexer set.

21. A data transmission network according to claim 20 wherein said line concentrator includes a space division crosspoint matrix.

22. A data transmission network according to claim 1 wherein at least some of said multiplexer-demultiplexer sets have strapped ports.

* * * * *

UNITED STATES PATENT OFFICE
CERTIFICATE OF CORRECTION

Patent No. 3,824,597 Dated July 16, 1974

Inventor(s) Edward A. Berg

It is certified that error appears in the above-identified patent and that said Letters Patent are hereby corrected as shown below:

Col. 15, line 41, "Randomes" should read --Radomes--.
Col. 20, line 3, "points or" should read --points of--;

Col. 23, line 28, "sit A" should read --site A--.
Col. 30, line 8, "provides" should read --provide--.
Col. 31, line 12, "differeing" should read --differing--.
Col. 35, line 56, "for nominal" should read --from nominal--.
Col. 36, line 18, "normal" should read --nominal--.
Col. 38, line 23, "selected" should read --select--.
Col. 41, line 44, "concentator" should read --concentrator--
Col. 41, line 56, "modulator" should read --modular--.
Col. 44, line 67, "1,204" should read --1,024--.
Col. 45, line 46, "4,284-4,800" should read --4,284 - 4,800--.
Col. 49, line 51, "transmition" should read --transition--; line 64, "base and" should read --base band--.
Col. 51, line 34 "sued" should read --used--.
Col. 54, line 6, "31" should read -- - --.
Col. 58, line 30 "steam" should read --stream--.
Col. 60, line 45 "receiver" should read --receive--.
Col. 70, line 46, "topical" should read --optical--.
Col. 73, line 22, "fied" should read --field--.
Col. 79, last line "bout" should read --about--.
Col. 80, line 17 "pairty" should read --parity--; last line "900 nanosecond" should read --90 nanosecond".
Col. 82, line 33, "MODULE" should read --INTERFACE MODULE--.

UNITED STATES PATENT OFFICE

CERTIFICATE OF CORRECTION

Patent No. 3,824,597 Dated July 16, 1974

Inventor(s) Edward A. Berg

It is certified that error appears in the above-identified patent and that said Letters Patent are hereby corrected as shown below:

Col. 86, line 57 "CoMCET" should read --COMCET--.
Col. 87, line 43, "transmission" should read --transmissions--.
Col. 88, line 4, "transmission" should read --transmissions--.
Col. 92, line 46, "Thes" should read --These--.
Col. 93, line 27, "manufactureres" should read --manufacturers--.
Col. 94, line 33, "facilitaating facilitating" should read --facilitating interchange--.
Col 96, line 37, claim 20, "multiplexer-dimultiplexer" should read --multiplexer-demultiplexer--.

Signed and sealed this 20th day of May 1975.

(SEAL)
Attest:

RUTH C. MASON
Attesting Officer

C. MARSHALL DANN
Commissioner of Patents and Trademarks